United States Patent
Beall et al.

(10) Patent No.: US 6,169,992 B1
(45) Date of Patent: Jan. 2, 2001

(54) SEARCH ENGINE FOR REMOTE ACCESS TO DATABASE MANAGEMENT SYSTEMS

(75) Inventors: Christopher W. Beall, Boulder; John D. Motycka, Evergreen; Samuel S. Pendleton, Louisville; Brooke E. Terpening, Golden; Matthew A. Appelbaum, Boulder; Michael R. Neal, Superior, all of CO (US)

(73) Assignee: Cadis Inc., Boulder, CO (US)

( * ) Notice: Under 35 U.S.C. 154(b), the term of this patent shall be extended for 0 days.

(21) Appl. No.: 08/747,164

(22) Filed: Nov. 8, 1996

Related U.S. Application Data

(60) Provisional application No. 60/006,317, filed on Nov. 7, 1995.

(51) Int. Cl.[7] .................................................. G06F 17/30
(52) U.S. Cl. ........................ 707/103; 707/104; 707/203; 707/513; 345/419; 345/335; 345/968
(58) Field of Search ................................ 707/103, 104, 707/513; 345/419, 335, 968

(56) References Cited

U.S. PATENT DOCUMENTS

| | | | |
|---|---|---|---|
| 3,343,133 | 9/1967 | Dirks | 711/112 |
| 4,318,184 | 3/1982 | Millett et al. | 707/1 |
| 4,879,648 | 11/1989 | Cochran et al. | 345/353 |
| 4,887,206 | 12/1989 | Natarajan | 705/29 |
| 4,918,602 | 4/1990 | Bone et al. | 705/1 |
| 4,930,071 | 5/1990 | Tou et al. | 707/4 |
| 4,984,155 | 1/1991 | Geier et al. | 705/26 |
| 5,021,992 | 6/1991 | Kondo | 706/50 |
| 5,109,337 | 4/1992 | Ferriter et al. | 705/29 |
| 5,133,075 | 7/1992 | Risch | 707/201 |
| 5,146,404 | 9/1992 | Calloway et al. | 705/1 |
| 5,191,534 | 3/1993 | Orr et al. | 364/468.12 |
| 5,206,949 | 4/1993 | Cochran et al. | 707/4 |
| 5,210,868 | 5/1993 | Shimada et al. | 707/104 |
| 5,218,699 | 6/1993 | Brandle et al. | 395/684 |
| 5,257,365 | 10/1993 | Powers et al. | 707/100 |
| 5,260,866 | 11/1993 | Lisinski et al. | 705/29 |
| 5,283,865 | 2/1994 | Johnson | 345/357 |
| 5,398,336 | 3/1995 | Tantry et al. | 707/103 |
| 5,404,506 | 4/1995 | Fujisawa et al. | 707/4 |
| 5,416,917 | 5/1995 | Adair et al. | 395/500 |
| 5,446,880 | 8/1995 | Balgeman et al. | 707/9 |
| 5,446,883 | 8/1995 | Kirkbride et al. | 707/10 |
| 5,530,852 | 6/1996 | Meske, Jr. et al. | 395/208.36 |

(List continued on next page.)

OTHER PUBLICATIONS

Dean et al., "Java security: From HotJava to Netscape and Beyond," IEEE, pp. 190–200, Jan. 1996.

* cited by examiner

Primary Examiner—Paul V. Kulik
Assistant Examiner—Jean M. Corrielus
(74) Attorney, Agent, or Firm—Burns, Doane, Swecker & Mathis, L.L.P.

(57) ABSTRACT

A system is disclosed for remotely accessing database management systems (5130) and performing guided iterative queries of knowledge bases (110) over a communication circuit such as the Internet (5124). The system includes a Web browser (5120) having a Java™ runtime environment (4015), and executable content client (5121) that may be downloaded from a remote location (103). A Krakatoa proxy server (5128), socket (5021), and tunnel (5129) establish a mechanism for remote procedure calls through firewalls (5126) via an HTTP server (5127). Guardrail counts (750) are preferably displayed to the remote searcher to facilitate guided iterative queries of the remote knowledge base (110). A configurable graphical action region (700) is preferably provided to the remote searcher via a graphical user interface to provide powerful navigation and linking of diverse useful information which varies based upon contexts selected by the remote searcher.

15 Claims, 76 Drawing Sheets

U.S. PATENT DOCUMENTS

| | | | |
|---|---|---|---|
| 5,560,005 | 9/1996 | Hoover et al. | 707/10 |
| 5,696,965 * | 12/1997 | Dedrick | 707/10 |
| 5,727,950 * | 3/1998 | Cook et al. | 434/350 |
| 5,734,119 * | 3/1998 | France et al. | 84/622 |
| 5,736,984 * | 4/1998 | Jellinek et al. | 345/338 |
| 5,742,768 * | 4/1998 | Gennaro et al. | 395/200.33 |
| 5,754,830 * | 5/1998 | Butts et al. | 395/500 |
| 5,761,499 * | 6/1998 | Sonderegger | 707/10 |
| 5,835,910 * | 11/1998 | Kavanagh et al. | 707/103 |
| 5,838,965 * | 11/1998 | Kavanagh et al. | 707/103 |

Packet Organization

Packet Trailer Definition

Packet Header Definition

| | | | | | |
|---|---|---|---|---|---|
| Vendor Code -626 | Vendor Part No. -624 | Vendor Contact -627 | Address -628 | Vendor Name -629 | Sales Office Locations -630 | Dealers Who Carry This Vendor's Merchandise -631 |

*FIG. 26C*

| | | | | |
|---|---|---|---|---|
| Internal Part No. -622 | Vendor ID -623 | Vendor Part No. -624 | Title -625 | ... -626 |

*FIG. 26B*

| Team | Wins # | Losses # | Winning % # | Games Out # | Last 10 | Streak | Home | Road | vs East | vs Cent | vs West | Batting Avg # | At Bats # | Runs uF | Hits # | Doubles # | Triples # | Home Runs # | RBI's # |
|---|---|---|---|---|---|---|---|---|---|---|---|---|---|---|---|---|---|---|---|
| CAL | 67 | 87 | 0.435 | 18 | 2-8 | Lost 2 | 41-37 | 26-50 | 30-31 | 25-36 | 12-20 | 0.276 | 5419 | 730 | 1497 | 245 | 22 | 185 | 695 |
| OAK | 74 | 82 | 0.474 | 12 | 3-7 | Won 1 | 36-39 | 38-43 | 24-38 | 32-29 | 18-15 | 0.265 | 5443 | 832 | 1443 | 276 | 21 | 240 | 797 |
| SEA | 83 | 71 | 0.539 | 2 | 9-1 | Lost 1 | 43-38 | 40-33 | 31-30 | 31-30 | 21-11 | 0.288 | 5424 | 961 | 1563 | 331 | 19 | 235 | 922 |
| TEX | 86 | 70 | 0.551 | 0 | 3-7 | Won 2 | 47-30 | 39-40 | 42-20 | 30-31 | 14-19 | 0.286 | 5487 | 901 | 1570 | 313 | 30 | 214 | 865 |
| CLE | 95 | 60 | 0.613 | 0 | 8-2 | Won 2 | 48-29 | 47-31 | 40-20 | 28-18 | 27-22 | 0.292 | 5474 | 920 | 1600 | 321 | 23 | 211 | 873 |
| KC | 72 | 84 | 0.462 | 23.5 | 5-5 | Lost 2 | 35-42 | 37-42 | 27-34 | 19-28 | 26-22 | 0.265 | 5368 | 717 | 1424 | 277 | 38 | 118 | 662 |
| MIL | 76 | 80 | 0.487 | 19.5 | 6-4 | Lost 1 | 38-43 | 38-37 | 23-31 | 31-21 | 22-28 | 0.279 | 5462 | 861 | 1524 | 286 | 39 | 174 | 813 |
| MIN | 76 | 80 | 0.487 | 19.5 | 2-8 | Lost 1 | 37-42 | 39-38 | 30-31 | 19-27 | 27-22 | 0.289 | 5466 | 849 | 1579 | 319 | 46 | 115 | 785 |
| CWS | 83 | 74 | 0.529 | 13 | 4-6 | Won 1 | 43-36 | 40-38 | 37-25 | 22-25 | 24-24 | 0.281 | 5473 | 879 | 1539 | 275 | 33 | 191 | 842 |
| BAL | 85 | 70 | 0.548 | 4 | 6-4 | Won 2 | 43-37 | 42-33 | 26-20 | 34-25 | 25-25 | 0.275 | 5440 | 918 | 1496 | 284 | 28 | 246 | 885 |

1-10 of 14 items displayed

Enumerated Set Selector Specific Data

Boolean Selector Specific Data

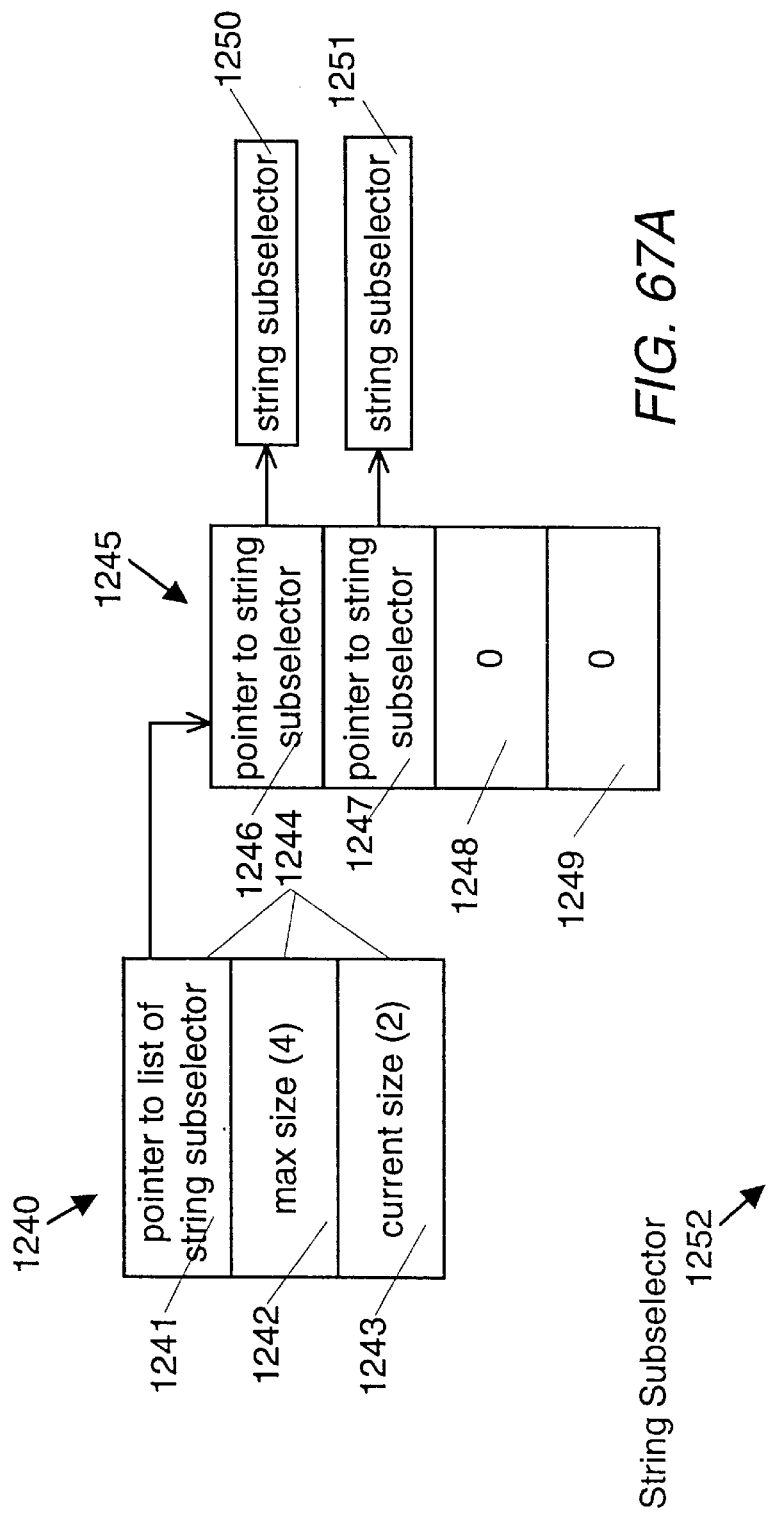
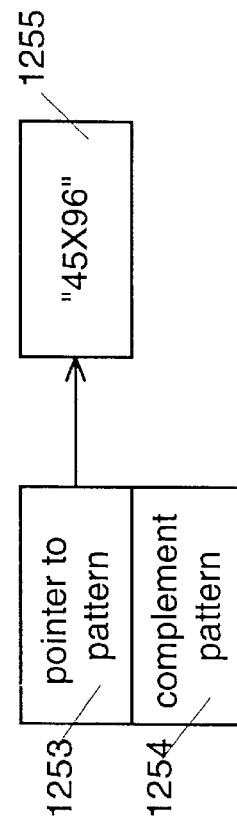
FIG. 67A
FIG. 67B

SEARCH ENGINE FOR REMOTE ACCESS TO DATABASE MANAGEMENT SYSTEMS

CROSS-REFERENCE TO RELATED APPLICATIONS

This application claims the benefit of the filing date of provisional patent application Ser. No. 60/006,317, filed Nov. 7, 1995, by Christopher W. Beall, et al., for SEARCH ENGINE FOR REMOTE OBJECT ORIENTED DATABASE MANAGEMENT SYSTEM, the entire disclosure of which is incorporated herein by reference. This application incorporates by reference the entire disclosure of application Ser. No. 08/339,481, filed Nov. 10, 1994, by Thomas S. Kavanagh, et al., for OBJECT ORIENTED DATABASE MANAGEMENT SYSTEM, now U.S. Pat. No. 5,838,965. This application also incorporates by reference the entire disclosure of application Ser. No. 08/527,161, filed Sep. 12, 1995, by Thomas S. Kavanagh, et al., for METHOD AND APPARATUS FOR CONCURRENCY IN AN OBJECT ORIENTED DATABASE, now U.S. Pat. No. 5,742,813. In addition, this application incorporates by reference the entire disclosure of application Ser. No. 08/526,555, filed Sep. 12, 1995, by Thomas S. Kavanagh, et al., for IMPROVEMENTS IN AN OBJECT ORIENTED DATABASE MANAGEMENT SYSTEM, now U.S. Pat. No. 5,835,910.

BACKGROUND OF THE INVENTION

On the past, there has been a long felt need for world-wide access to information in a speedy, cost effective and convenient manner. The present invention addresses this need. While the invention will be described herein in connection with an object oriented database management system, certain features and aspects of the invention have broader application.

In an object oriented database management system, it is often advantageous to provide access to knowledge base over a communications circuit that has a finite bandwidth. The communications circuit, for example, may be a local area network ("LAN"), a wide area network ("WAN"), or the internet. Suitable communications circuits can permit access to a knowledge base for remote locations that may be separated by great distances. However, speed is an important consideration that must be adequately addressed in any practical system in order for it to be successful. Although improvements in network protocols and speed have been the focus of much attention, nevertheless networks have limitations on the amount of traffic and the throughput that can be accommodated. Performance may be adversely impacted by delays inherent in moving large amounts of data over such a communications circuit. The performance problems with, for example, the Internet persist even as network transmission speeds and capacity are increased. The Internet may be compared to a multi-lane highway. Increases in speeds may be analogized to raising the speed limit on a highway. Increases in capacity may be analogized to widening the highway to provide more lanes. Yet, the highway may still slow to a crawl during rush hour. The problem is that as quickly as additional lanes can be built, the number of cars using the highway increases just as fast or faster. Similarly, the number of users of the Internet has grown almost exponentially, resulting in an increase in the amount of data that must be transported by the network during a given period of time. Therefore, performance and speed remain important issues that must be addressed regardless of incremental improvements in the speed or capacity of the Internet or other networks.

Remote access to a database such as an object oriented knowledge base may be achieved over a communications circuit. It is desirable to provide a system for remote access that provides great flexibility and speed. A suitable search engine and interface are needed for remote access. For example, a need exists for a system that allows an object oriented database system to be accessed in a manner which permits guided iterative queries at speeds and performance levels that are consistent with cost effective, time efficient and productive use of such data, for example, by engineering and design personnel, and other customers in general. Un particular, a search engine is needed to permit guided iterative queries of an object oriented database system over the Internet, in a seamless environment that permits navigation of the World Wide Web (sometimes referred to simply as "the Web") via hypertext links in HTML documents in conjunction with queries of the object oriented database system.

There are many examples where a search engine such as that provided by the present invention is needed. One example may be a new product design project where the major components need to be specified in a time efficient manner, and it is necessary or desirable to research what components are available.

For example, an electronic product may need a series of integrated circuits (IC's) that will boost performance beyond the current design—and beyond the professed operation of a new product that a competitor has just announced. Even if, for example, a supplier such as National Semiconductor has just come out with a new IC that would work, the information concerning such a brand new component available from a supplier would not be found in any of the data books available at the offices of the engineers and designers of the product. Alternatively, at the temperature tolerances a new product needs, the designers and engineers may not be able to find a databook for available components that states exactly how given components of interest will perform. In the past, it was typically necessary to order preliminary data sheets, (which typically are incomplete in nature and sometimes inaccurate), order some samples of components that appeared to be suitable, design them in, prototype the product, test it, and hope that the silicon produced still met what the original specification sheets said. This may consume valuable time, and delay the introduction of a new product.

In the past, this scenario may have been repeated in many companies because of a lack of timely, accurate and complete information on available components and parts that are commercially available for use in a particular design of a new product. In addition, there has been a long felt need for engineers and designers to have access to this information without having to know any part numbering sequence, data sheet naming scheme or description text. They needed to have access to information about products based on how they think about them—i.e., accessing the information according to the attributes of the component or product that is needed. For IC's, it may be power levels, tolerances, and package types; for office supplies it may be product type, size and cost, an so forth.

It is desirable for engineers and designers to get access to this information almost instantly. In the past, searching through catalogs has been cumbersome and time-consuming. Maintaining an up-to-date library of catalogs at the office of the engineer or designer has been relatively costly and time-consuming. Obtaining up-to-date information by calling a sales representative of a supplier has not been entirely satisfactory, and further consumes time. There has been a need to minimize the time required to search for and find each component that is needed for a product design, so that the engineers and designers can get on with the useful work that they need to do to produce a new product.

Engineers and designers need to be able to successively narrow their search for a needed component, and to be able to quickly look for substitutes if they do not find what they originally requested. And they need to have access to any information unique to them as a customer, such as special pricing, delivery times, or even preannounced components or parts available only to strategic customers. Moreover, engineers and designers have needed access to such component and design information to be provided at little or no cost, for example, as an extension of their relationship with the vendors of the components.

The above described examples are sufficient to demonstrate that prior art methods have not been entirely satisfactory. However, the present invention has broad application beyond the limited examples discussed above.

SUMMARY OF THE INVENTION

The present invention involves the use of executable content (for example, Java™ applets) downloadable over a network or a wide area network (such as the Internet or the World Wide Web) to local processing equipment in order to enable interactive search of a remotely located information repository such as an object oriented database which must be accessed over a communications channel having limitations on bandwidth and throughput.

The present invention may be advantageously used in a database management system to facilitate efficient and speedy remote access to, for example, an object oriented database or schema over a communications circuit having a limited bandwidth or throughput capability. The present invention reduces or eliminates time consuming transmission of unnecessary digital information over the communications circuit and allows access to information in a database in conjunction with executable applets while providing the ability to navigate and access resources available over the communications circuit.

The present invention provides engineers and designers with the possibility that they can get direct access to their key supplier's data on-line, via the Internet. Not only is this information typically accessible at any time day or night, but it is data far richer than what is typically published in a static databook, catalog or product brochure. And such information can be absolutely current and up-to-date.

A preferred embodiment has been implemented in a product offered under the trademark "Krakatoa™", available from CADIS, Inc. of Boulder, Colo., which utilizes a language and runtime system distributed by Sun Microsystems under the name "Java™."

For example, a Java™ implementation of a client usable over the Web may provide virtually instant, intuitive access, and parametric searching with guided iterative query feedback of a database of information, and is usable on any Internet client platform supported by Java™, including PCs, MACs and UNIX workstations.

A search engine in accordance with the present invention may be advantageously used to provide remote access to data, and search capability with guided iterative feedback. Other available resources can be linked via URLs to information in a database, and widely separated and independent information repositories can be effectively tied together seamlessly. The present invention may be advantageously used to provide access over a wide area network, preferably the Internet, to such things as component product data. However, the present invention is not necessarily limited in application to wide area networks or the Internet, but may also be advantageously applied in local area networks and other client/server systems.

In a preferred embodiment, a user accesses an object oriented knowledge base over a communications circuit such as the Internet. The user has a remote computing or communication device that may include a navigation program such as a world wide web browser, a runtime environment (such as that provided by Java™), executable content downloaded over the communications circuit from the knowledge base or an associated storage location which is run by an executable content client, which includes an executable content knowledge base retriever. A suitable embodiment may include a knowledge base server connected to a network or coupled to the communications circuit. The communications circuit may typically have one or more knowledge base clients connected to the communications circuit. The knowledge base server is preferably an object oriented database management system that includes a dynamic class manager, a connection manager, a query manager, a handle manager, a units manager, a database manager, and a file manager. An object oriented lock manager may also be included for concurrency control, and is preferably implemented as part of the knowledge base server.

An object oriented database management system in accordance with that described in application Serial No. 08/339,481, filed Nov. 10, 1994, by Thomas S. Kavanagh, et al., for OBJECT ORIENTED DATABASE MANAGEMENT SYSTEM (U.S. Pat. No. 5,838,965), provides a suitable implementation of a system for parametric classification and retrieval. The present invention may be used with such a system to provide access to data in seconds or less, over local area networks, wide area networks, or even over the Internet during nominal traffic periods. There are times when congestion over the Internet can slow the exchange of data significantly. During such periods, the advantages of the present invention in speeding remote access to knowledge bases can be significant. An object oriented database management system, such as that described in application Ser. No. 08/339,481, (U.S. Pat. No. 5,838,965) used in conjunction with the present invention may provide the capability of a guided, iterative query over the Internet with virtually instant feedback to a user each time a selection is made, even where the user is located remotely with respect to the database system that is being queried.

A suitable system for providing rapid, parametric retrieval of product information over a network may comprise the following:

1) An object oriented knowledge base management system;

2) A schema development tool that is used to build a classification schema for the information in the knowledge base, (the tool preferably requires no programming skills, compiling, or knowledge of operating systems); and, 3) Concurrent seat access to permit a plurality of users to simultaneously access the knowledge base.

Other unique features disclosed include a concept referred to herein as "guardrails." When a searcher navigates to a given class in a hierarchical knowledge base, the attributes of that class are displayed to the searcher. The attributes are constrained by the current values used by the instances of the class. These guardrail attributes are available to be selected and set as search criteria to further refine the search.

Attributes that have discrete values can be "guardrailed." For example, attributes that are of a Boolean type, enumerated type, or enumerated set type may be "guardrailed." In the case of a "guardrailed" attribute, guardrail counts are computed for that attribute and are displayed to the searcher.

For a given query, the set attribute selectors that are set as search criteria are examined, and instances that meet current query criteria are used to calculate guardrail counts. The guardrail counts that are displayed to the searcher represent the number of instances having each possible value for the guardrailed attribute that also meet the current query criteria. Thus, the searcher knows immediately, without doing another search, how many instances corresponding to the current query criteria have each value for the guardrailed attribute. This may assist the searcher in avoiding setting search criteria in iterative queries that produce a query result of no instances.

Another unique feature disclosed is a concept referred to herein as "extended queries." "Extended queries" provide complex queries into a database that is currently in use, or even into another separate database. An "extended query" may link one subtree in a hierarchical object oriented knowledge base to another subtree in that hierarchical object oriented knowledge base. It is possible, using extended queries, to establish links between the attributes. It is also possible to do cascading queries. An extended query can map to another knowledge base, or a class can be mapped to itself.

Yet another unique feature disclosed is a concept referred to herein as a "configurable graphical action region." Such a region, preferably built as a configurable graphical action bar, may provide a powerful graphical interface for extended queries. In addition, a configurable graphical action region may be used to provide a powerful graphical user interface to dynamic parameterized URLs. In a preferred implementation, a configurable graphical action bar has action buttons that are configurable so that different parameters will be passed on a remote procedure call based upon certain events. The action buttons are dynamic so that different extended queries are performed based upon a selection of a class or instance contained in a current query result, providing a configurable, class-dependent query.

A system in accordance with the present invention may optionally include tools to assist in the development of a custom product schema, as well as the extraction of parametric attributes from a database of pre-existing product data, known as legacy data processing, and tools to assist in the creation of a product knowledge base.

Information concerning the Java™ programming language and Java™ scripts has been published by Sun Microsystems. Specifications for the Java™ language appear in J. Gosling, B. Jay & G. Steele, *The Java™ Language Specifications* (1996), the entire disclosure of which is incorporated herein by reference. Additional background information relating to object-oriented databases appears in W. Kim, *Introduction to Object Oriented Databases* (1990); W. Kim & F. H. Lochovsky, *Object-Oriented Concepts, Databases, and Applications* (1989); C. J. Date, *An Introduction to Database Systems* (rev. 1984); and R. G. G. Cattell, *The Object Database Standard: ODMG-93* (rel. 1.1 1994), all of which are incorporated herein by reference.

BRIEF DESCRIPTION OF THE DRAWINGS

FIG. 26B is a schematic diagram of certain attributes stored in the parts knowledge base depicted in FIG. 26A.

FIG. 26C is a schematic diagram of certain attributes stored in the vendors knowledge base depicted in FIG. 26A.

FIG. 40 is an example of a screen display generated by an executable content retriever client showing a configurable dynamic action bar.

Figure 51:
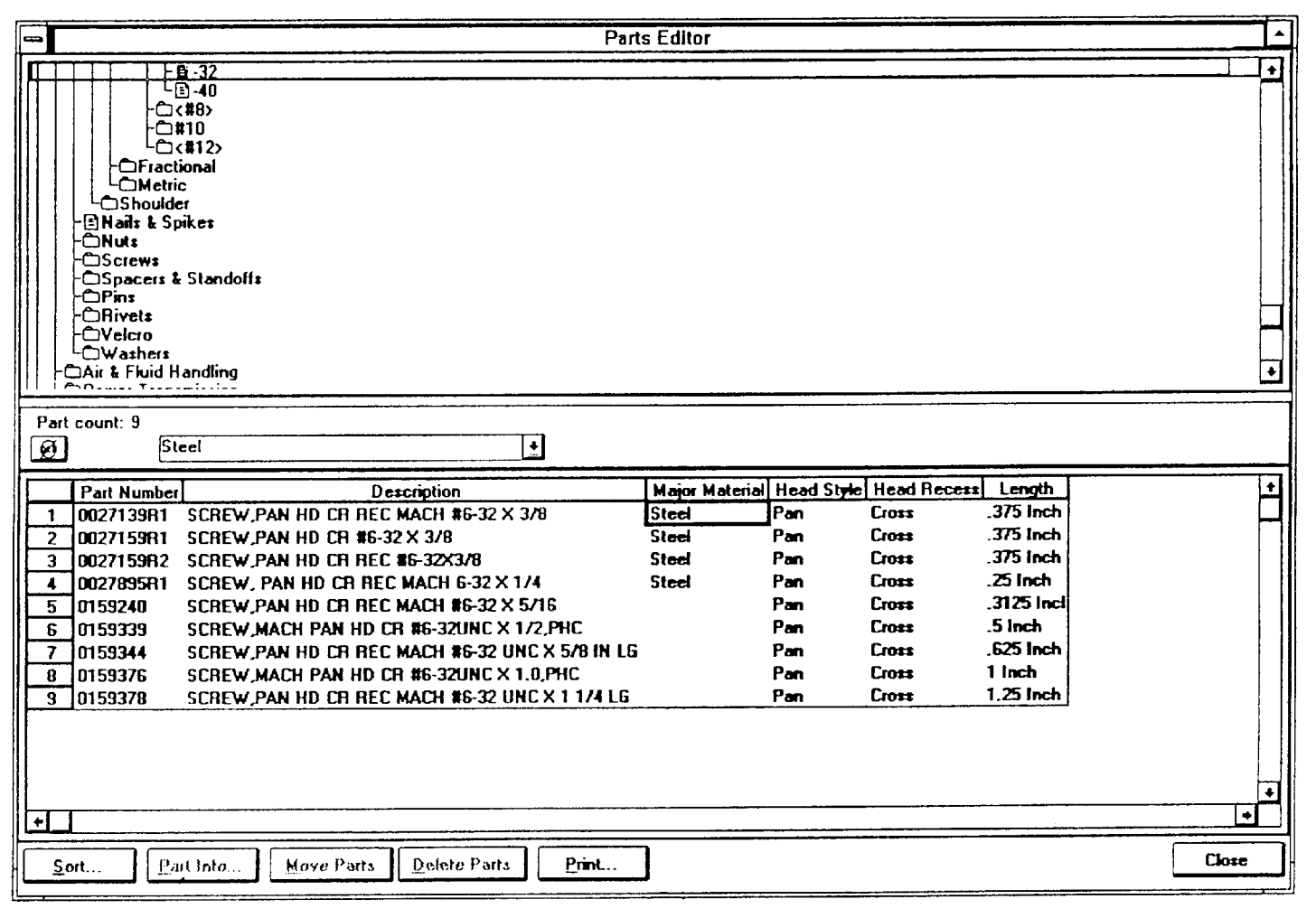

FIG. 51 depicts a display screen showing information displayed in an example of a parts editor window.

FIG. 67A is a schematic diagram showing the structure of string, string array, and international string selector specific data objects.

FIG. 67B is a schematic diagram of a string subselector object.

DETAILED DESCRIPTION OF A PREFERRED EMBODIMENT

Figure 1:
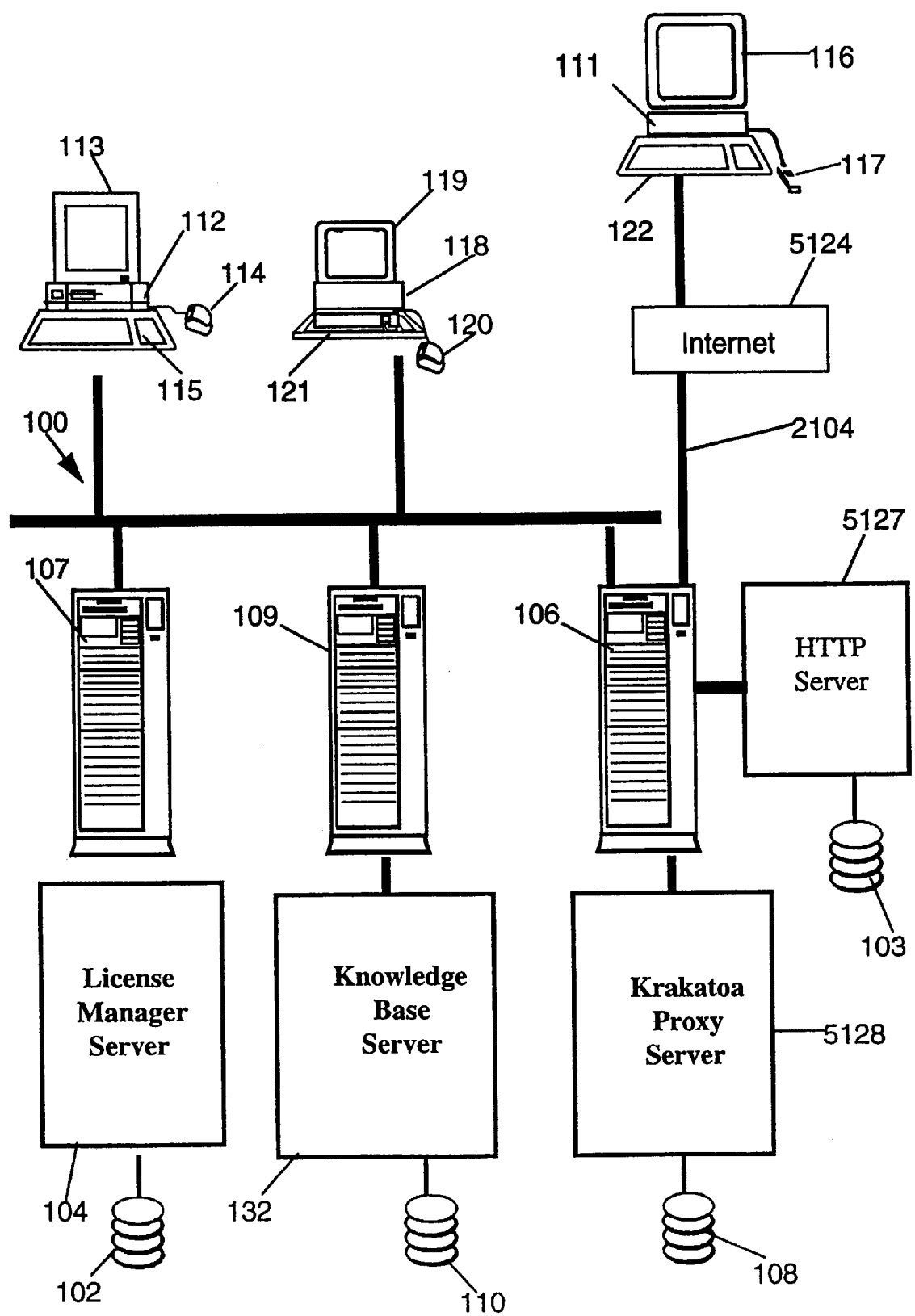
FIG. 1 is a schematic diagram which depicts a network environment that is suitable for an embodiment of the present invention.

Virtually every company in business today must provide information on their products to their customers. While at the same time, potential customers seek information on the products they must purchase. In practice, few purchases are based on the physical item, but rather upon the information about the item (i.e., goods or services) offered for sale. A need has long existed for such information to be provided to potential customers in a manner where the information is easy to find and access, accurate, up-to-date, and complete.

Yet in today's traditional business model, almost all product information is provided in verbal or hardcopy form. It is exchanged as telephone calls, catalogs, spec sheets, and sales visits. It is expensive for the suppliers. And it is frustratingly cumbersome, incomplete, and time-consuming for the customer. The present invention may be utilized to provide quick and easy access to accurate, up-to-date, and complete information even over a limited bandwidth communication channel such as the World Wide Web.

On accordance with the present invention, information may be disseminated over a network such as the World Wide Web in a manner where the information is quickly and intuitively accessible so that potential customers can easily find what they're looking for. The present invention further provides the capability of supplying potential customers with more than a simple description of a product or service. Potential customers may view two-dimensional images of a product, they may navigate around three dimensional images of the product, they may hear it they can observe simulations of the product, either alone or in custom configurations. Potential customers may be provided with access to product information, pricing information, availability information, and competitive information. Sufficient information may be provided for the customer to make an informed purchase decision.

For example, a semiconductor manufacturer could publish its entire product content on the Web for the benefit of its customers, using present invention. The semiconductor manufacturer's customers would be able to quickly search the manufacturer's entire product line for components that fit the customer's design requirements, by doing guided iterative queries of the data using the attributes or parameters of the components needed for a pending design. The customer could then download a wealth of information on the components of interest. The information made available could include circuit simulations that plot performance data for particular operating conditions. The operating conditions could be changed, different components could be substituted, and the simulation could be rerun as many times as the customer desired to do so. With the present invention, the exchange of information is greatly facilitated.

Application Ser. No. 08/339,481, filed Nov. 10, 1994, by Thomas S. Kavanagh, et al., for OBJECT ORIENTED DATABASE MANAGEMENT SYSTEM, now U.S. Pat. No. 5,838,965, describes parametric search technology and legacy processing methods, which may be used, for example, to provide parts information management systems. Large discrete manufacturing companies typically manage hundreds of thousands—often millions—of parts, and incur enormous expense in creating and maintaining those parts and the information about those parts. The object oriented database management system described in application Ser. No. 08/339,481, now U.S. Pat. No. 5,838,965 may provide virtually instant parametric access to a company's parts data, without the need for a part number or text description of the parts. The legacy processing methods provide the ability to extract parametric attributes from widely scattered, often inconsistent parts data that has been accumulated over years of history.

There are a number of hindrances to effective use of the World Wide Web for interactive use, arising from the fact that the basic unit of interaction is a document written in HTML (Hypertext Markup Language). Each user input requiring a response from a service available on the Web in an HTML mediated environment requires the creation and downloading of a fresh HTML document to the user's Web browser. This leads to the need to create, keep track of, and clean up many interim documents representing each step of the user's interaction with a service. In addition, the need to download the entire interim HTML document at each step places serious performance limitations on the use of this mechanism for interactive applications.

Achieving acceptable performance levels in the application of the present invention requires careful attention to the use of resources available to the executing agent or module. In this case, one of those resources is network bandwidth. Since the bandwidth of the network is finite, it makes reasonable sense to want to be conservative about it's use. However, there are other reasons to want to do so. Client/server applications used on the Internet can involve considerable distances between a client and a server. This is complicated by the fact that as the distance increases, so does the probability that a communication packet that is moving between the client and the server will encounter delays caused by other network traffic.

Client applications usually require server data to present through an interface to the user. Normally the only mechanism they have to acquire this data is through programming interfaces provided by the server. If the programming interfaces are constructed in such a way that the client application is required to make several server calls in order to satisfy the user's request, then the response time to the user is the summation of the round trip delays experienced for all of the calls. For long distance operations, such as those operating via the Internet, delays generated by a multi-call architecture can sometimes aggregate to many minutes.

For the architecture described and illustrated herein, this problem has been circumvented by architecting the data structures such that a client can receive information from a server in one client/server exchange, or one remote procedure call.

These problems only get worse when the HTTP protocol must be used as a transport mechanism between a client and a server. The HTTP/1.0 protocol requires that the client connect to the server, transfer the request data, and receive the response, which is all followed immediately by a disconnection. To establish new connections, network protocols must determine a route to be used for communication between the client and the server. Once routing information has been determined, it is typically stored, and the client and server will use the predetermined routing information to establish the route for communications.

Applications which require many exchanges to satisfy user requests can be plagued by response time problems in the best of network scenarios. When the transport mechanisms require many additional connections to be established to provide a requested service, the problem gets orders of magnitude worse. The present invention achieves advantages over the prior art by combining multiple functions or requests into a single connection communication, under circumstances that would otherwise require multi-connection communication using conventional methods.

The present invention makes use of a Web browser with a capability of executable content. Java™, a language and runtime system distributed by Sun Microsystems, may be used as a suitable mechanism for the creation of executable content. A suitable Web browser including a capability of executable content that may be employed in connection with the present invention is Netscape Navigator™, version 3.0 or higher. Other suitable Web browsers include Microsoft's Internet Explorer™, version 3.0 or higher. It is believed that almost any web browser that is Java-enabled would be suitable. Rather than simple interaction consisting of the creation and downloading of HTML documents, a navigation client, such as a Web browser including a capability of executable content such as Java™, may allow the creation of application programs, called "applets," that run directly in the Java runtime environment provided within the browser. These applets may be distributed as architecturally neutral program units expressed in bytecodes that execute against a virtual computer implemented by the Java runtime environment.

A particular type of especially advantageous interactive application, performing guided iterative queries of an object oriented knowledge base, can be implemented using a system comprising the following elements:

1. an object oriented data base management system server;

2. a World Wide Web browser or other runtime program capable of managing executable content;

3. a client application written as executable content, capable of running in the browser as part of a runtime environment;

4. a remote procedure call mechanism written as executable content, capable of running in the browser or runtime environment; and, 5. an interface mechanism on the server side capable of translating received remote procedure calls into actual calls to the object oriented database management server.

Figure 2:
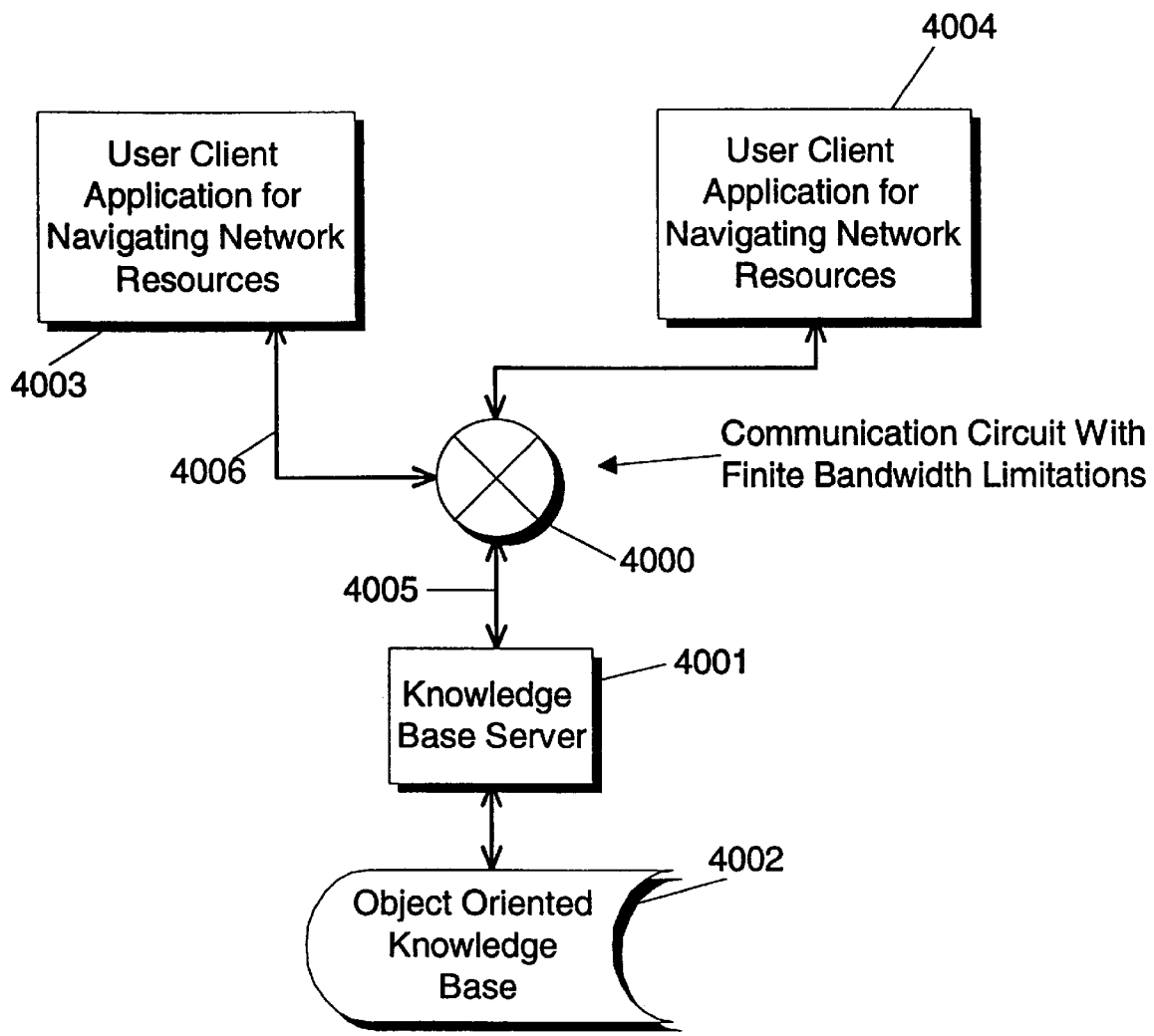
FIG. 2 is a simplified schematic diagram which depicts a communication circuit environment that is suitable for an embodiment of the present invention.

FIG. 2 is a simplified schematic diagram which depicts a communication circuit environment that is suitable for explaining the structure and operation of an embodiment of the present invention. In the illustrated example, a communications circuit 4000 having a finite throughput capability and bandwidth limitations is provided. For example, the communications circuit 4000 may be a local area network or a wide area network. The network 4000 may comprise one or more networks that employ an ATM protocol, Ethernet, token ring, FDDI, or other suitable implementation of a digital communications system. In the illustrated embodiment, the communications circuit 4000 is the Internet. Although the communications circuit 4000 has a finite throughput capability and bandwidth limitations, the present invention will operate satisfactorily over a communications circuit that has no such limitations. It will be appreciated by those skilled in the art that a significant advantage of the present invention is that it is capable of operating with fast response times and that it provides good performance over communications circuits that have such limitations.

In FIG. 2, a knowledge base server 4001 is shown connected to the communications circuit 4000. The knowledge base server 4001 maintains a database or knowledge base, preferably an object oriented knowledge base 4002. In the illustrated embodiment, the knowledge base server 4001 has a TCP/IP connection 4005 to the Internet 4000, although the present invention is not necessarily limited to any particular type of connection or protocol.

A plurality of user client applications 4003 and 4004 are connected to the communications circuit 4000. The user client application 4003 comprises a client operable to navigate network resources connected to the communications circuit 4000, such as the knowledge base server 4001. In the illustrated embodiment, the user client application 4003 comprises a web browser 4003, and is connected to the Internet 4000 via a TCP/IP connection 4006. The web browser is preferably capable of retrieving HTML documents from servers (not shown) connected to the Internet.

Figure 3:
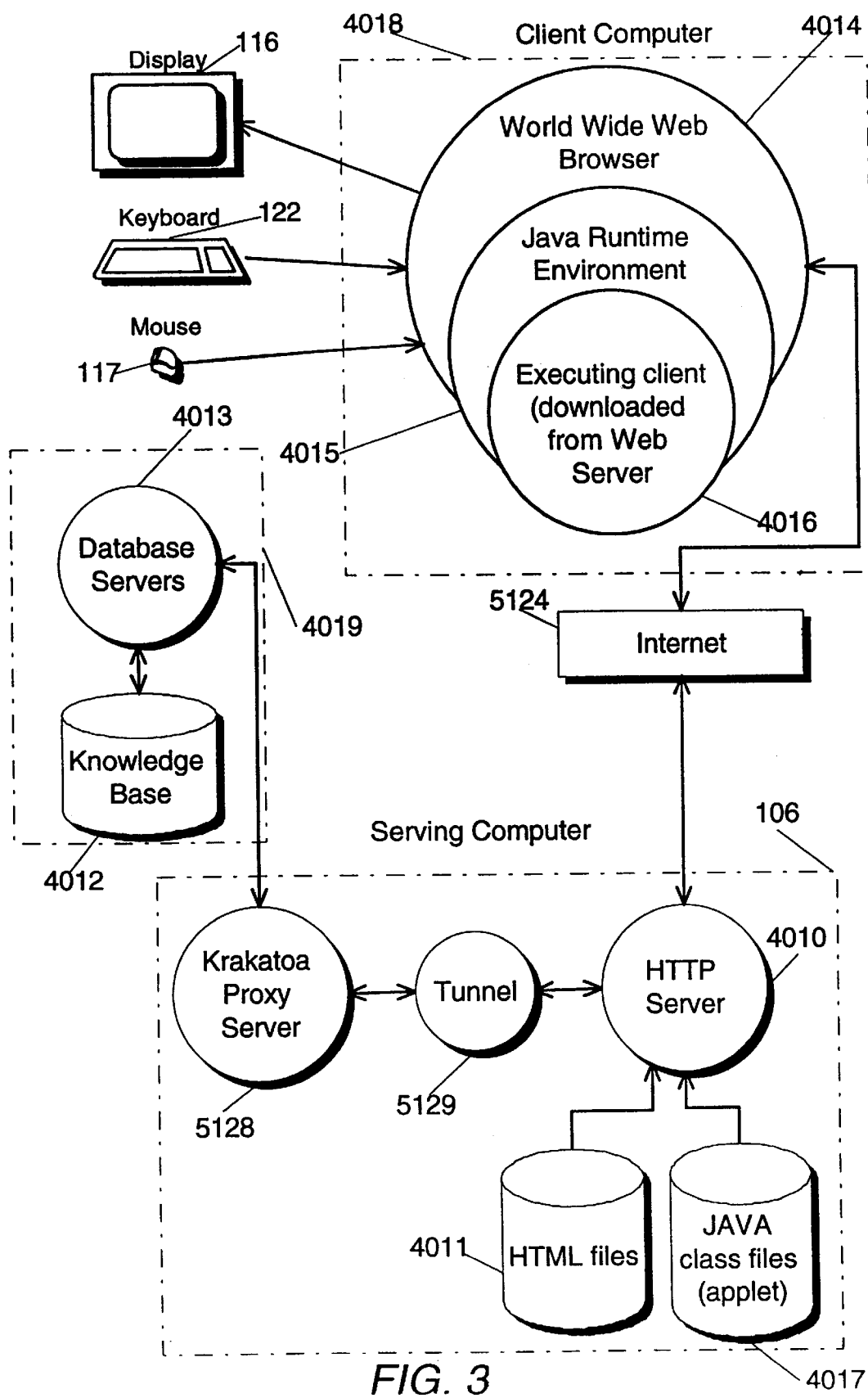
FIG. 3 is a simplified schematic diagram which depicts an embodiment of the present invention.

FIG. 3 is a simplified schematic diagram showing a suitable architecture and an example of a search engine using the present invention. A user's computer 4018 is shown running a web browser 4014. The web browser 4014 includes a capability for executable content, such as a Java runtime environment 4015. A web server 4010 in this example includes an HTML document 4011 that contains a reference (such as hypertext link) to a searchable knowledge base 4012. The browser 4014 may be used to navigate the Web and to retrieve the HTML document 4011. By clicking (using, for example, a mouse 117) on a hypertext link to the knowledge base 4012, the user connects via the Internet 5124 and invokes the HTTP server 4010 which downloads Java class files 4017 which, when downloaded, become executable content 4016 in the Java runtime environment 4015.

Thus, in accordance with one aspect of the present invention, executable content 4016 from storage 4017 on a serving computer 106 is transferred to a client computer 4018 and runs as an executable content retriever client 4016. Then, executing appropriate procedure calls, the executable content knowledge base retriever 4016 performs searches, including guided iterative queries, of an object oriented knowledge base 4012, and a graphical representation of the results are visible to the user on a display 116. In accordance with a preferred embodiment of the present invention, guided iterative queries of an object oriented knowledge base 4012 may be performed via the Internet 5124 and displayed on a user's display 116 in significantly less time than was possible in the past using conventional techniques. It will be appreciated by those skilled in the art that this is a significant advantage of the present invention.

Access to knowledge base servers 4013 is preferably accomplished using a proxy server 5128. In a preferred embodiment, the HTTP server 4010 communicates with the proxy server 5128 via tunnel 5129 in a manner which is described more fully below. In the illustrated embodiment, the proxy server 5128 and the HTTP server 4010 are advantageously located on the same serving machine 106. For performance reasons, the database servers 4013 and knowledge base 4012 are preferably located on a separate machine 4019, but there is no requirement that they be implemented that way. In addition, although a mouse 117 is a preferred input device in the illustrated example, a user may alternatively use other devices such as a keyboard 122 for input.

Figure 4:
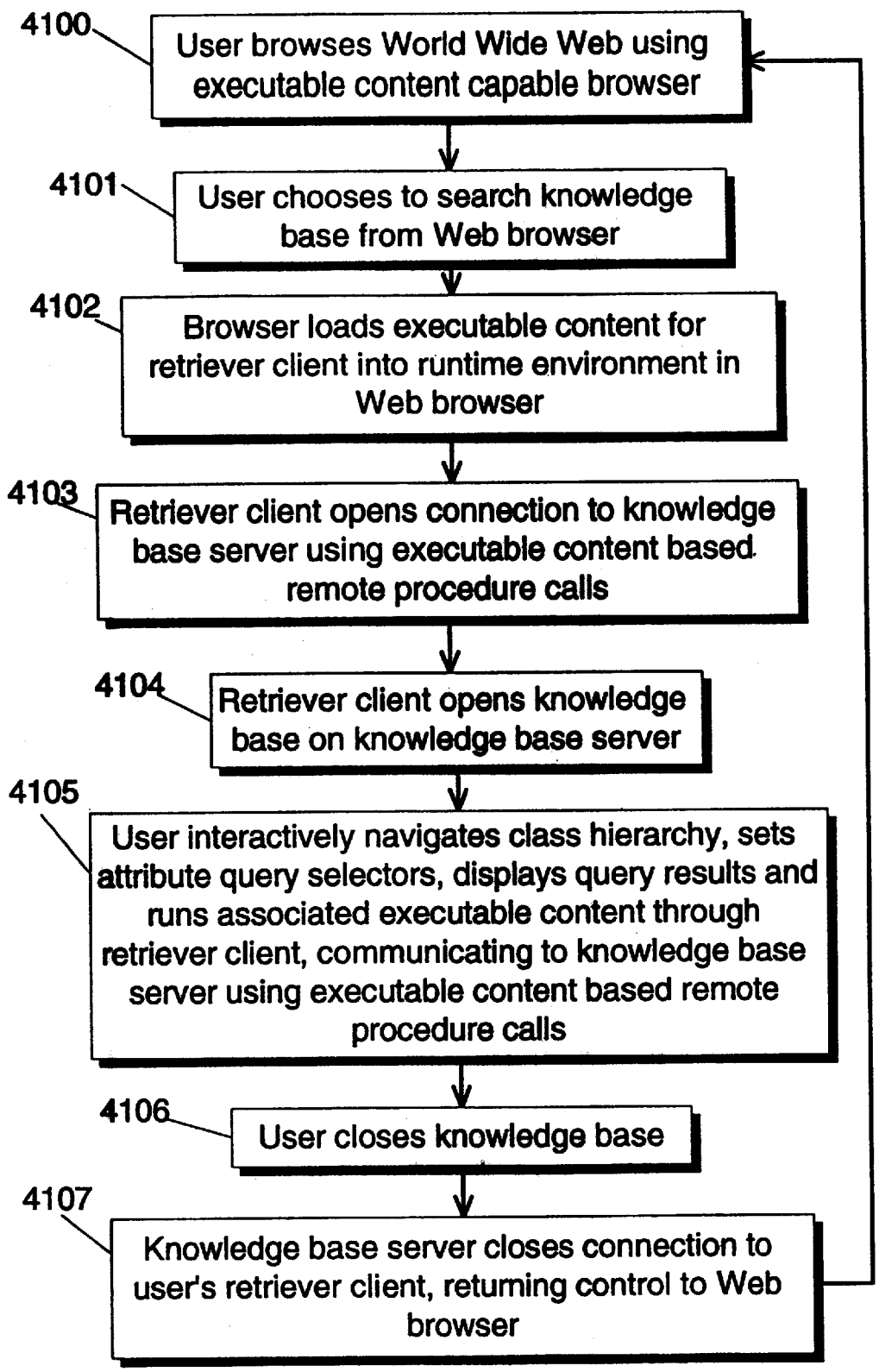
FIG. 4 is a flow chart showing steps in a process embodying aspects of the present invention.

FIG. 4 is a flow chart showing steps in an overall process that may be performed according to the embodiment illustrated in FIG. 3. Referring to FIG. 4, a user interacts with an executable content capable web browser in step 4100, and chooses to search a knowledge base 4002 in step 4101. This choice in step 4101 results in the automatic download of executable content or an applet 4017 in step 4102 which may become the client side of the retrieval application 4016. The retriever client 4016 opens connection to the knowledge base server using executable content based remote procedure calls in steps 4103. The retriever client 4016 opens the knowledge base server 4013 in step 4104. In step 4105, the user interacts through a graphical user interface embodied in the client retriever 4016 to navigate a class hierarchy of the associated knowledge base 4012, set attribute query selectors, display matching instances, and run other executable content associated with classes, attributes, standard values of attributes, and instances.

Referring to FIG. 4, in step 4106, when finished, the user closes the knowledge base 4002. In step 4107, the knowledge base server 4001 closes connection to the user's retriever client 4003, returning control to the Web browser 4014.

For example, an electronics design engineer may need to find an integrated circuit to meet a requirement in a design. He knows the type of device and its operating characteristics, and also knows that his company prefers to use parts from National Semiconductor. For example, assume that the designer needs a standard linear analog buffer amplifier. Using an executable content capable Web browser 4014 such as Netscape Version 3.0, he may connect to a National Semiconductor Web site over the Internet 5124 and begin browsing at the site. In this example, this site has a hyperlink for parts search and document retrieval. The user clicks on the hyperlink, resulting in the download of a Java application (applet) 4017 that begins executing in the Java runtime environment 4015 within the Netscape browser 4014. The user is presented with a graphical display on his display screen 116.

Figure 19:
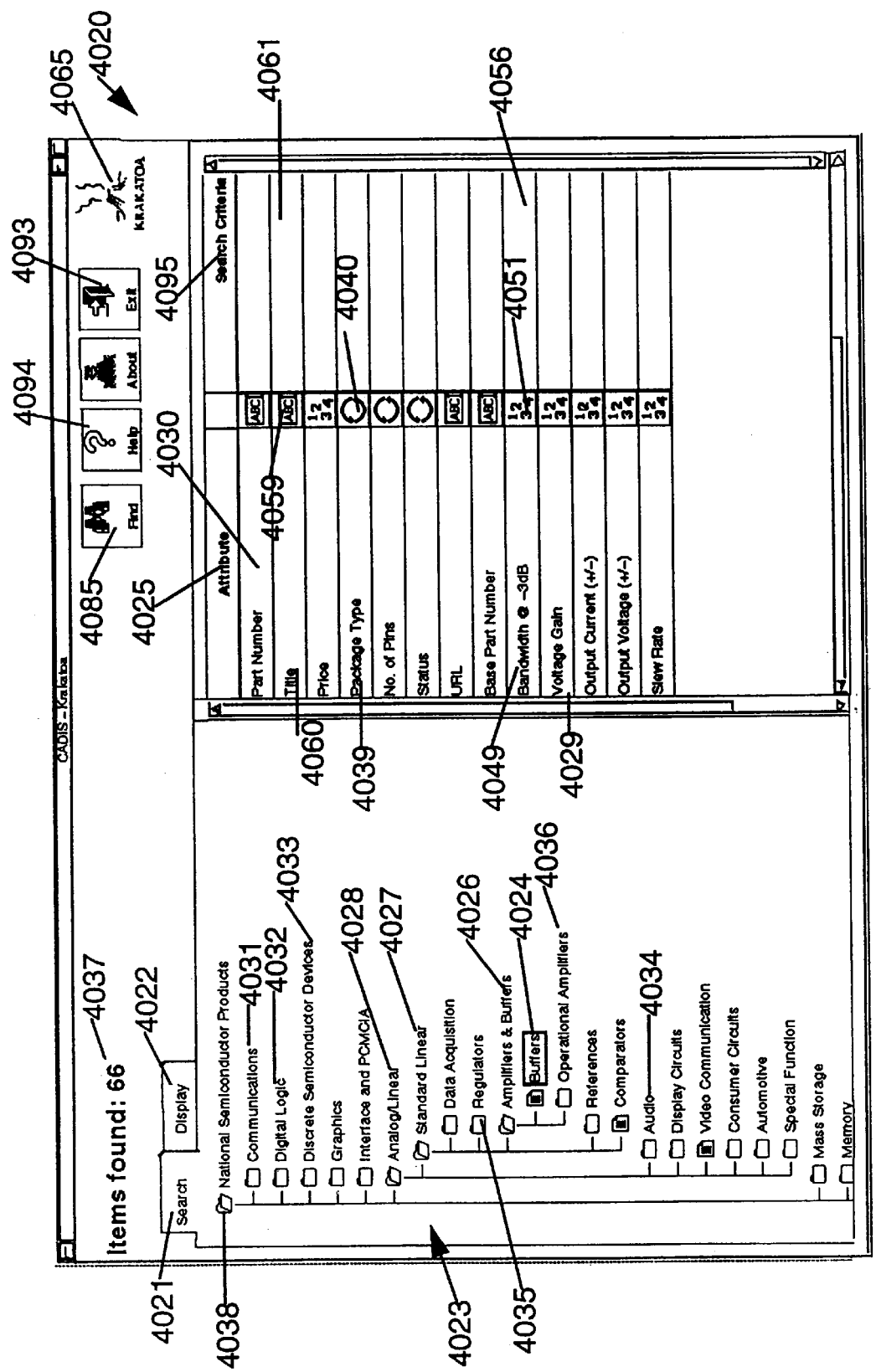
FIG. 19 depicts an example of a display screen showing information displayed in a window during operation of an embodiment of an executable content retriever client remotely accessing an object oriented database management system.

FIG. 19 illustrates an example of a display on the user's display screen 116 when the user is remotely accessing an object oriented knowledge base 4012 via the Internet 5124 using an executable content retriever client 4016. The executable content retriever client 4016 displays a search results window 4020. The search results window 4020 includes a search tab 4021 and a display tab 4022. Either the search tab 4021 or the display tab 4022 may be selected by the user. The illustrated example shown in FIG. 19 shows the appearance of the search window 4020 when the search tab 4021 has been selected. Clicking on the search tab 4021 reveals an outline based hierarchical display of classes of integrated circuits 4023 in the left-hand portion 4023 of the window 4020.

In a preferred embodiment, the user may employ guided iterative queries to find the needed integrated circuit. The search window 4020 may initially display only the root class 4038 in the knowledge base 4012, or may alternatively display a first level of classes, such as the "communications" class 4031, the "digital logic" class 4032, the "discrete semiconductor devices" class 4033, etc., including the "analog/linear" class 4027. The user clicks on the "analog/linear" class 4028 to open it, which causes the executable content retriever 4016 to display the "standard linear" class 4027, and other classes on that same level, such as the "audio" class 4034. The user clicks on the "standard linear" class 4027 to open it, thereby causing the display of the "amplifiers & buffers" class 4026, the "regulators" class 4035, and other classes on that same level. By clicking on the "amplifiers & buffers" class 4026, the user opens it to display the "buffers" class 4024 and the "operational amplifiers" class 4036. The user selects the "buffers" class 4024 by clicking on it, and that class is displayed as a highlighted representation 4024 as shown in FIG. 19.

At each step of the process of navigating the hierarchical display of classes 4023, the user is presented with an "items found" count 4037. In the example shown in FIG. 19, the items found count 4037 is sixty-six, indicating that the currently selected "buffers" class 4024 contains sixty-six instances.

The right-hand portion of the window 4020 is a attribute display window 4025. In this object oriented knowledge base 4012, attributes are inherited by classes 4024 from a parent class 4026. For example, the "buffers" class 4024 will inherit attributes from its parent class "amplifiers & buffers" 4026, such as a "voltage gain" attribute 4029. The parent class "amplifiers & buffers" 4026 will, in turn, inherit attributes from its parent classes: the "analog/linear" class 4028 and the "standard linear" class 4027, such as the "part number" attribute 4030. The "buffers" class 4024 may also have additional attributes that are not inherited.

Figure 20:
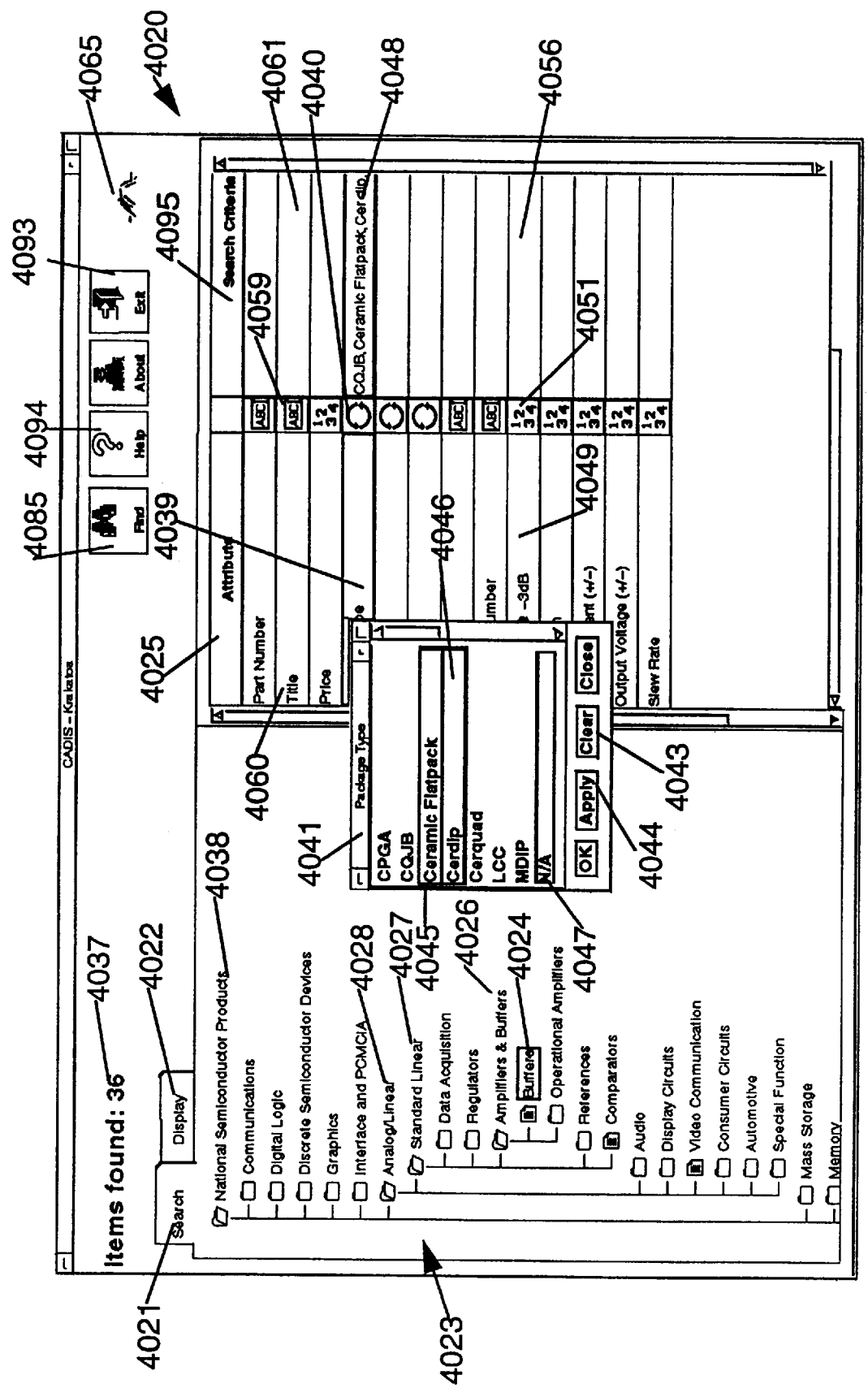
FIG. 20 depicts an example of a display screen showing information displayed in a window during operation of an embodiment of an executable content retriever client remotely accessing an object oriented database management system, including a dialog window for selecting enumerated attribute information to set search parameters.

The user navigates the class hierarchy 4023 to the class 4024 of integrated circuit that is required. In this case, the user is interested in finding a standard analog linear buffer amplifier. The user can, at any time, also set search parameters for attributes 4039, 4029 appropriate to the currently selected class 4024 within the hierarchy 4023. For example, FIG. 20 illustrates an example of setting search parameters for an enumerated attribute 4039, which in the illustrated example is a "package type" attribute 4039. A predetermined type of icon 4040 is displayed to the user to indicate that this attribute 4039 is an enumerated attribute. The user clicks on the icon 4040 associated with the "package type" enumerated attribute 4039 to select it, which opens a dialog window 4041 displaying the possible values for this enumerated attribute 4039.

The user may click on any one of the enumerated attributes displayed in the dialog window 4041 to select the attribute. If the number of enumerated attributes are too great to display all of them in the dialog window 4041 at the same time, a scroll bar 4042 may be used to bring additional attribute values into view. By holding down the "Control" key on his keyboard 122 while he clicks with his mouse 117, the user may simultaneously select several of the enumerated attributes to be used as search parameters. In the illustrated example, the user has selected "package type" attribute values of "ceramic flatpack" 4045, "cerdip" 4046, and "N/A" 4047. The "N/A" value 4047 is given to any instance that does not have an indicated value for the enumerated "package type" attribute, which may often result when existing legacy data is converted to a different knowledge base format. The user may conveniently deselect all of the selected attribute values (for example, if he wants to change his search) by clicking on a clear button 4043 in the dialog window 4041.

Once the user has selected the values 4045, 4046 and 4047 that he wishes to use for the enumerated attribute 4039 in his search, he clicks on an "apply" button 4044 in the dialog window 4041. After the apply button 4044 is clicked, the selected values 4045, 4046 and 4047 for the enumerated attribute 4039 are displayed in the attribute value display window 4048 associated with that enumerated attribute 4039. In addition, the parts found count 4037 is updated to reflect the results of the search. In the illustrated example shown in FIG. 20, thirty-six instances conform to the applied search criteria.

Figure 21:
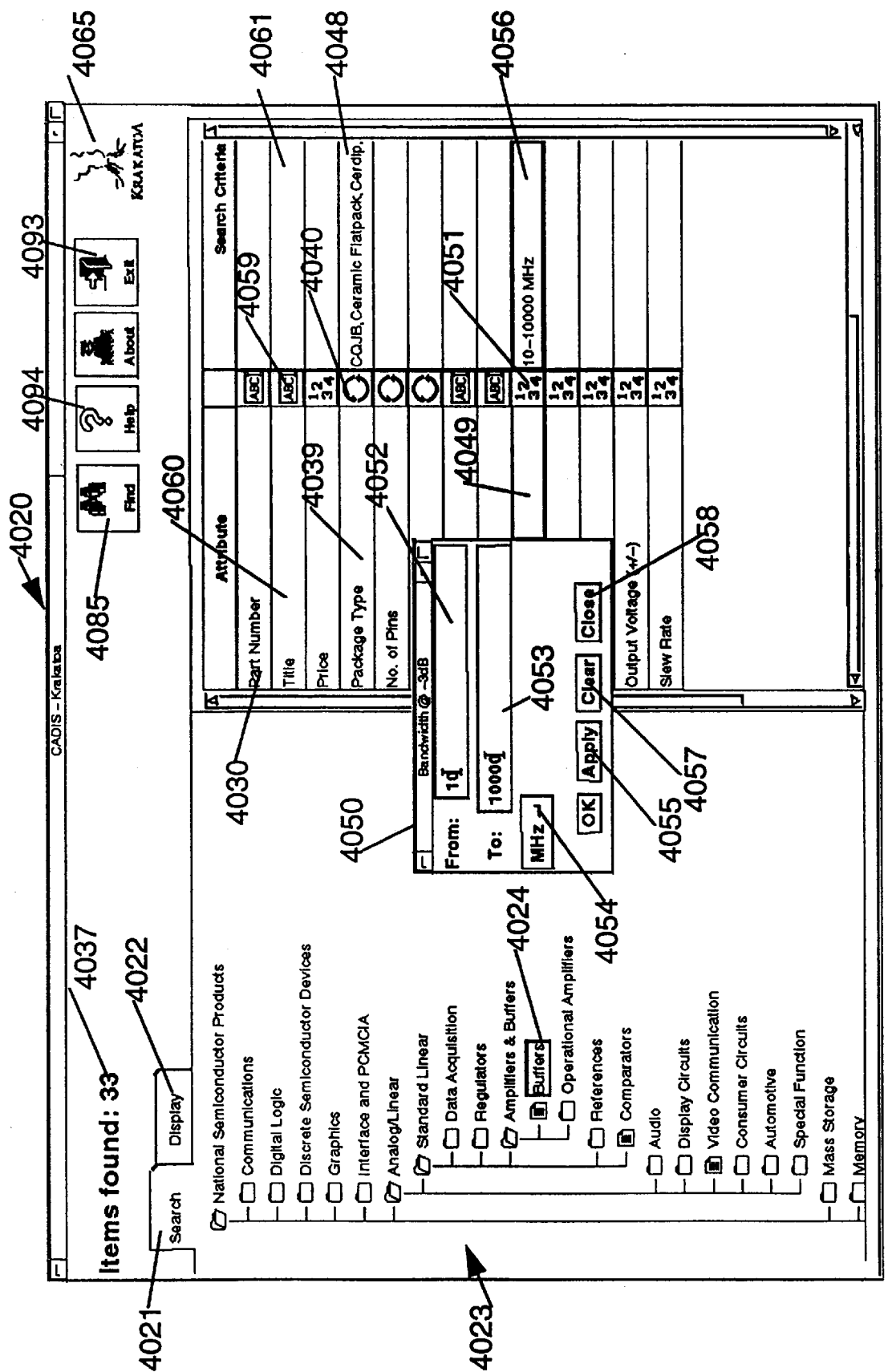
FIG. 21 depicts an example of a display screen showing information displayed in a window during operation of an embodiment of an executable content retriever client remotely accessing an object oriented database management system, including a dialog window for entering numeric attribute information to set search parameters.

Other types of attributes may be used to set search criteria to zero in on a desired part that satisfies a user's design requirements. For example, FIG. 21 shows the numeric attribute "bandwidth" 4049 being used to set search parameters. The "bandwidth" attribute 4049 is identified for the user as a numeric attribute with a numeric type icon 4051 which appears next to the attribute 4049. When the user clicks on the numeric icon 4051, a dialog box 4050 opens to allow the user to specify a range to be used as a search parameter. In the illustrated example, the user may use the dialog box 4050 to specify that the bandwidth attribute 4049 should have a value between ten MHz and ten thousand MHz by entering those values in a first range specify window 4052 and a second range specify window 4053, respectively. The units are expressed in a units window 4054. When the user clicks an "apply" button 4055, the indicated range is applied as a search parameter for the bandwidth attribute 4049, and in this example, the modified search parameters reduce the items found count 4037 to thirty-three. When the user clicks the apply button 4055, the range used in the query will be displayed in the attribute value display window 4056 next to the bandwidth attribute 4049 as shown in FIG. 21.

A clear button 4057 may be used by the user to reset or clear the values in the dialog box 4050. The dialog window 4050 may be closed by clicking a "close" button 4058.

Figure 22:
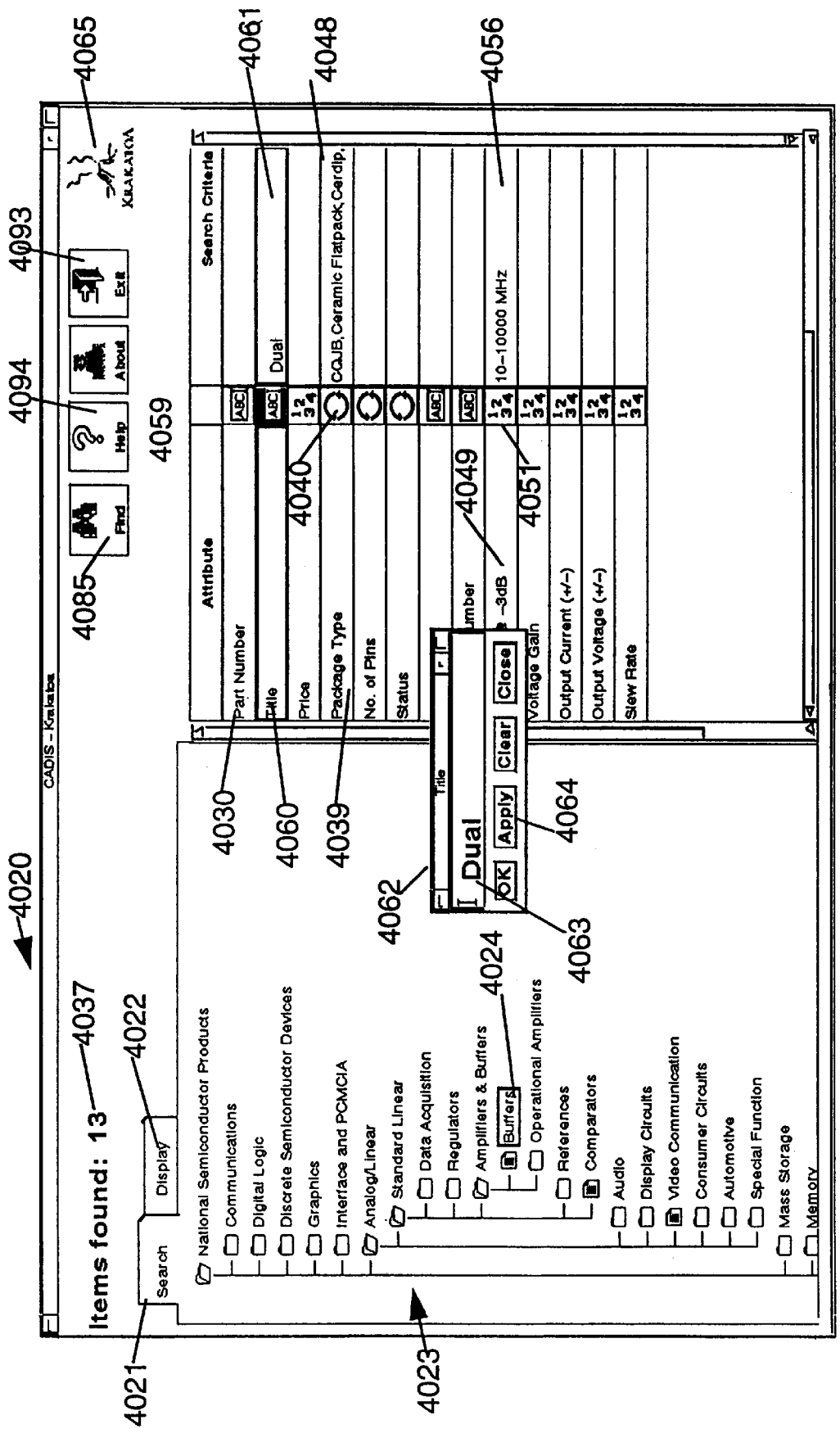
FIG. 22 depicts an example of a display screen showing information displayed in a window during operation of an embodiment of an executable content retriever client remotely accessing an object oriented database management system, including a dialog window for entering character or text attribute information to set search parameters.

Character or text attributes, such as the title attribute 4060, may be used to set search parameters. This is shown in FIG. 22. Clicking on a character type icon 4059 next to the "title" attribute 4060 opens a dialog window 4062. Text strings may be entered in a text window 4063 in the dialog box 4062 to specify the text to be used as a search parameter. In a preferred embodiment, the search logic returns a "match" or "hit" whenever the text string entered in the text window 4063 matches any part of the title attribute value of an instance. It is as if "wild card" characters were on either end of the text string 4063 entered by the user.

In FIG. 22, the user enters "Dual" in the text window 4063 of the dialog window 4062 and clicks the "apply" button 4064. The entered text string appears in a text attribute display window 4061 next to the "title" attribute 4060. In the illustrated example, this action reduces the number of items found 4037 to thirteen.

Each navigational and search parameter setting step results in communication with the remote database server 4019, with the count of parts 4037 that currently satisfy the search criteria being displayed for the user, allowing the user to efficiently reduce the counts of parts 4037 being considered to a small, manageable number. For example, the initial number in parts available at the root class 4038 of the class hierarchy 4023 might be fifty thousand, with the user finally deciding to display ten to fifteen parts that satisfy his criteria after navigating to a class 4024 and setting one or more search parameters as described above.

The user then displays information about the matching parts, such as a text description, or other parametric attributes of numeric, enumerated, or Boolean types. This is done by clicking on a "display" tab 4022. Clicking the display tab 4022 results in a display shown in FIG. 23. An instance display window 4066 opens to show information about the instances returned which met the search parameters entered by the user. In the illustrated example, a sequential number 4067 is assigned to each instance. The part number 4068, title or description 4069, price 4070, and package type 4071 for each part is displayed. Additional information may be viewed by moving a scroll bar 4072. The order in which the parts are displayed may be changed by clicking a sort button 4074. For example, parts may be sorted based upon price 4070, or based upon package type 4071.

The information for a part might also be marked as having additional information associated with it on the World Wide Web. For example, the complete data sheet for a part, including all specifications, usage notes, and characteristics information, may be available as an HTML document, with its Universal Resource Locator ("URL") associated with the parts as one of its parameters. If an instance is selected and it has a URL associated with it, a "hot links" button 4075 will become active. The user may click on the hot links button 4075 to cause the browser 4014 to retrieve the HTML document, or download an applet in the form of executable content (for example, a circuit simulation applet to model the selected integrated circuit's performance). The user may choose to browse this associated information by choosing to view linked data, resulting in the launch of an instance of a Web browser with the URL. URLs may also be associated with any class, attribute, or standard attribute value within the knowledge base 4012. For example, a URL for an HTML document describing all of National Semiconductor's plastic integrated circuit package types could be associated with an enumerator for the attribute package type 4071. Selecting the option to view this linked data would launch the Web browser 4014 beginning at the URL, allowing the plastic package application notes to be viewed. Any of these associated URLs might also be Java applets, whose launch results in execution of the applet locally within the users Web browser 4014. For example, an output voltage attribute might have an associated HTML page containing an applet that interacts with the user, accepting various input parameters and dynamically graphing the resulting voltage or current curves representing device characteristics. This allows for interactive functionality associated with any database element to be delivered to the user on demand.

Finally, the user may decide to order a sample of a part. The user would choose an "order sample" link associated with the information displayed for a part, and an applet would run in the browser allowing the user to specify quantity desired, intended use, ordering and billing information. This information would be communicated using an executable content based remote procedure call mechanism to an application at National Semiconductor that would automatically verify and place the order for the user. An executable content based remote procedure call mechanism will be described in more detail below.

Figure 23:
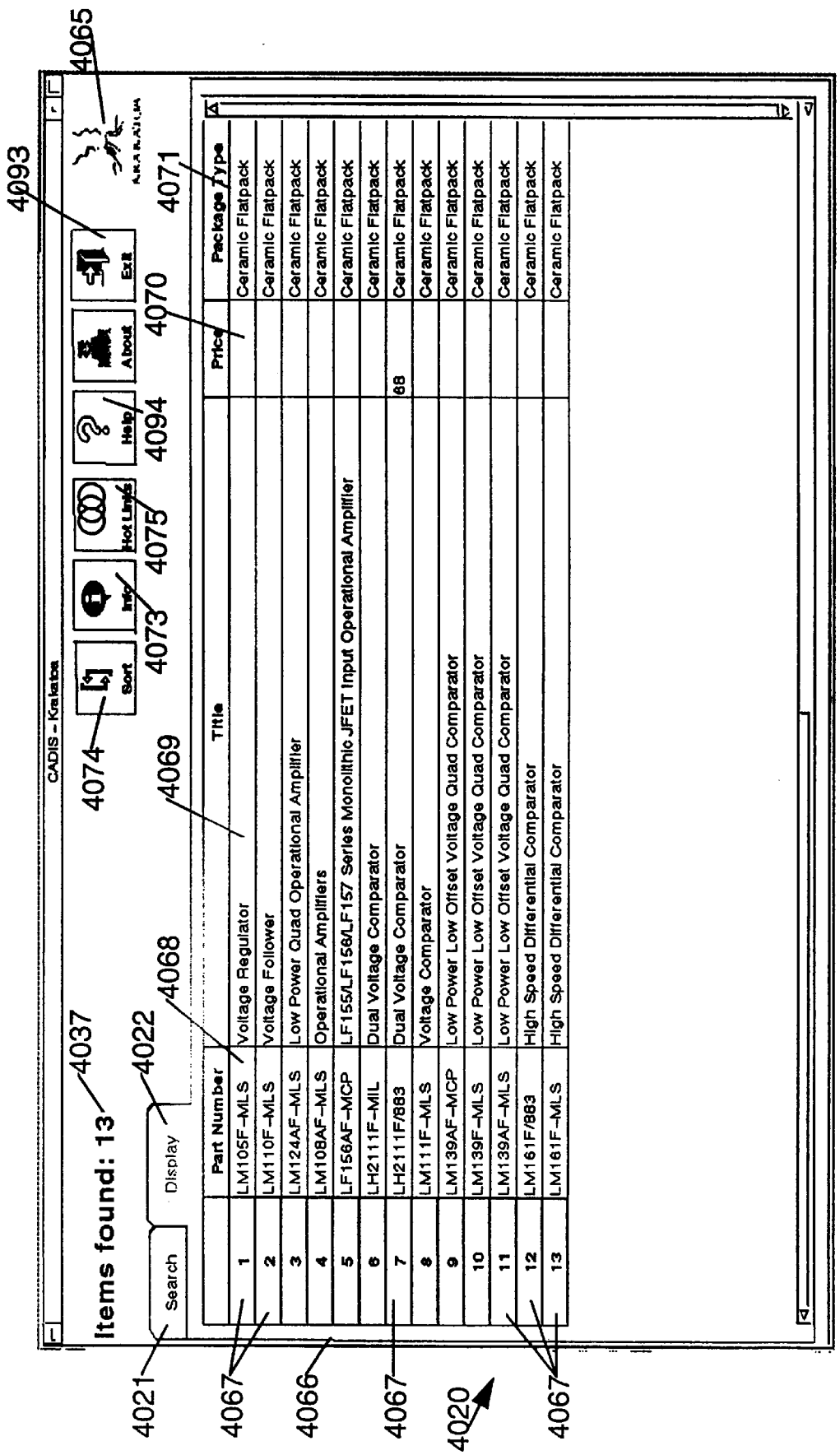
FIG. 23 depicts an example of a display screen showing an instance display window that opens when the "display" tab shown in FIG. 22 is selected to show information about the instances returned which met the search parameters entered by the user.
Figure 24:
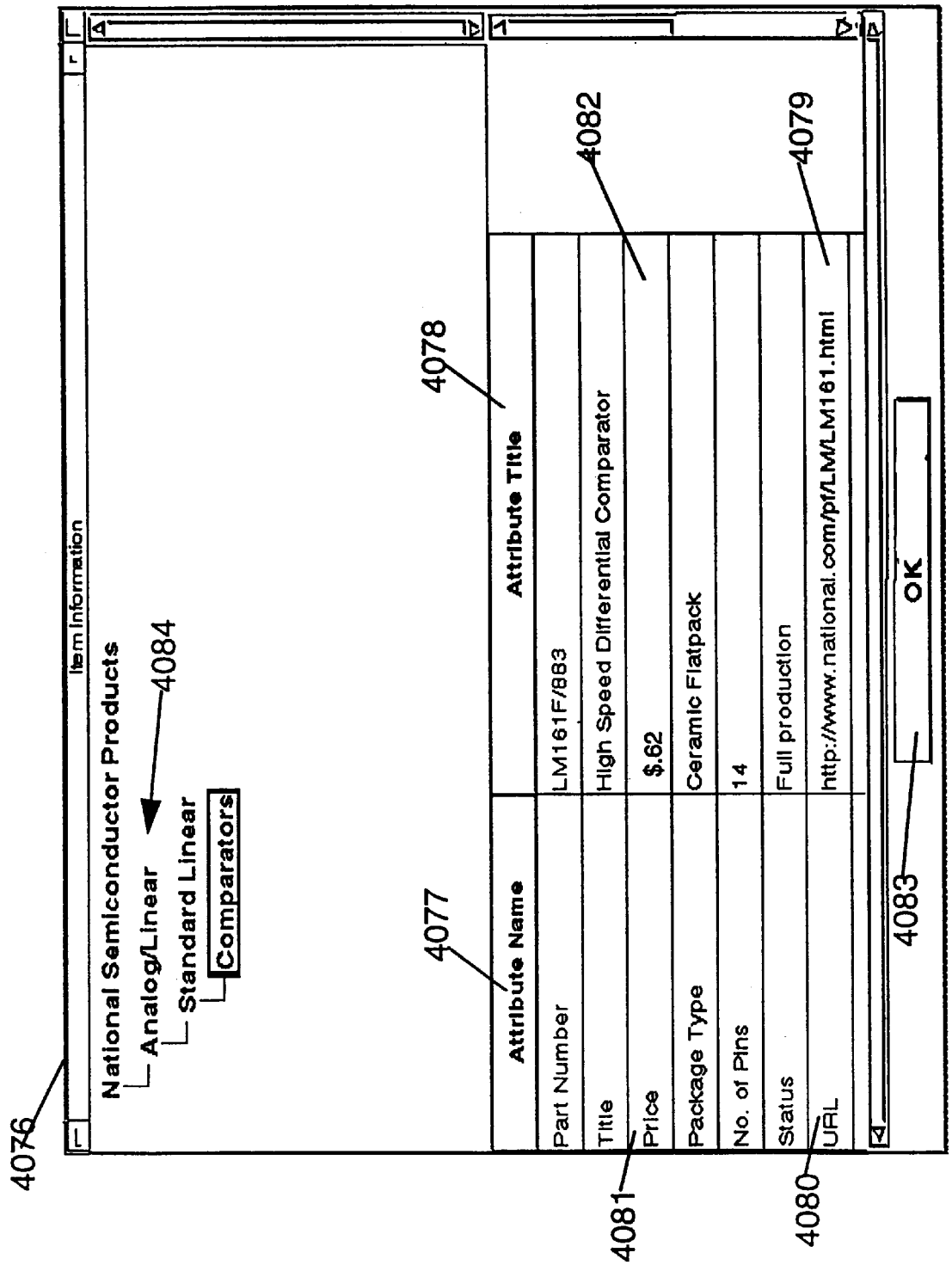
FIG. 24 depicts an example of a display screen showing an item information window displaying detailed information about an instance which may be opened by clicking an "information" button shown in FIG. 23.

Referring to FIG. 23, an instance (or in this example, a part) may be selected, and detailed information about the instance (or part) may be displayed by clicking an information button 4073. An item information window 4076 shown in FIG. 24 will then be displayed. The item information window 4076 displays attributes 4077 in one column, and the associated attribute values 4078 in another column. A URL 4080 associated with this item may be shown, and a its value 4079 would be the actual uniform resource locator information for the hyperlinked HTML document, applet, or other information. Information, such as price 4081, may have a user ID dependent value 4082. The server 4013 may associate a particular price with predetermined destination information based upon the user's indicated Internet address, so that discount pricing information for preferred customers may be displayed as the value 4082 for the price attribute. Similarly, the currency may be converted to the user's local currency using the current exchange rate based upon the user's location indicated by the information sent with the user's query. In addition, the language used for the display could be selected based upon such information. If the user's origin information indicates that the current query comes from a user located in France, the display may automatically switch to the French language for the display of the query results.

The item information window 4076 preferably includes an outline display 4084 of the class hierarchy that the part resides in. The item information window 4076 may be closed by clicking an "OK" button 4083.

Figure 25:
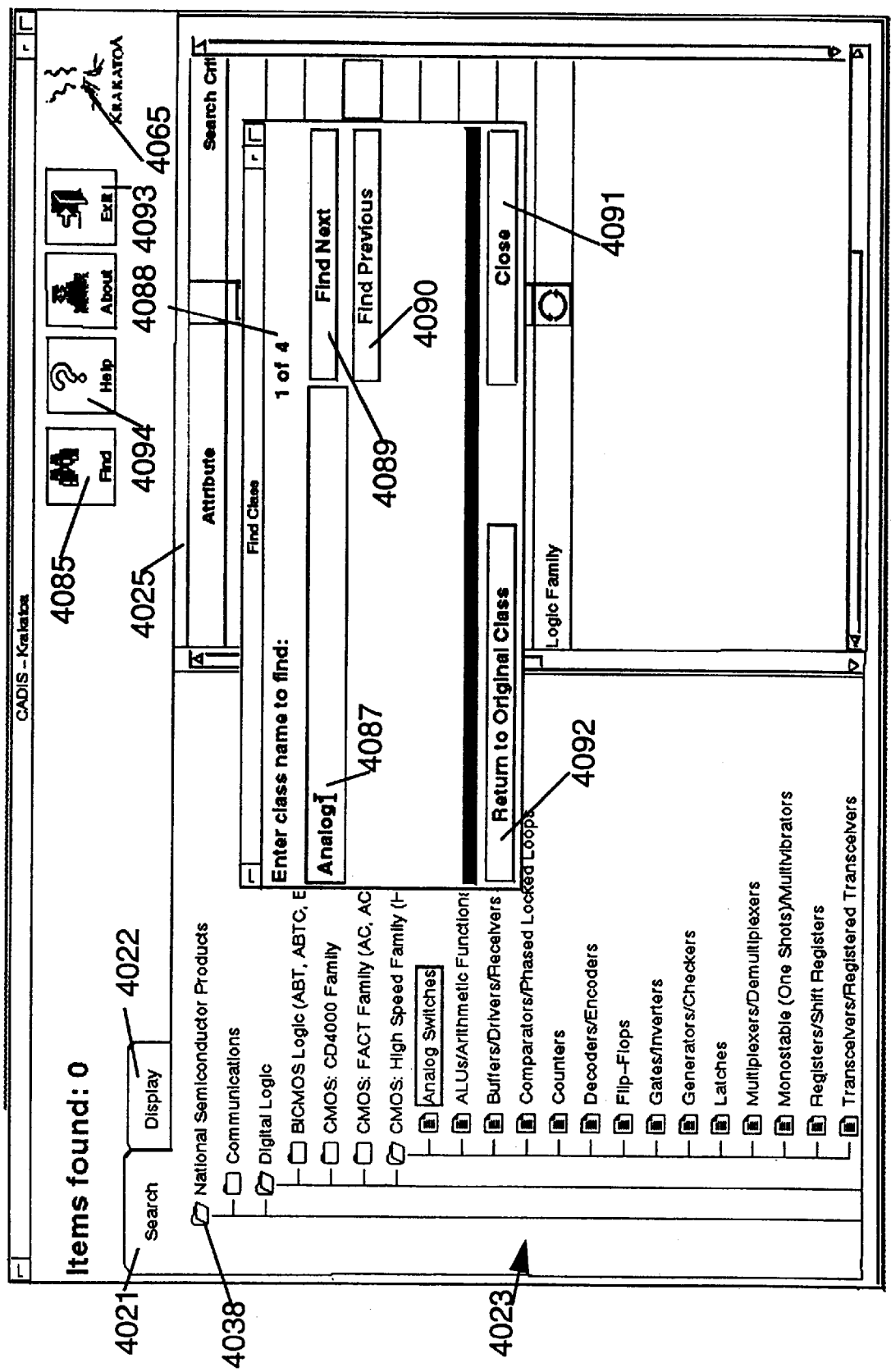
FIG. 25 depicts an example of a display screen showing information displayed in a class name dialog window which opens when a user clicks on the "find" button shown in FIG. 19.

Referring to FIG. 19, searching may be further facilitated by providing a mechanism for locating classes by name. For example, a user may be looking for analog devices. He may be interested in finding any class that uses the word "analog" in the name of the class. A "find" button 4085 may be used for this purpose. When a user clicks on the find button 4085, a class name dialog window 4086 opens, as shown in FIG. 25. A text entry field 4087 is provided where the user may type in a character string to be used in a search of class names. The query results include an indication 4088 of how many classes were found corresponding to the text entered by the user. The user may view the results by alternately clicking a "find next" button 4089 and a "find previous" button 4090. The dialog window 4086 may be closed by clicking a close button 4091. Alternatively, the dialog window may be closed, and the user returned to the original class he had selected before performing the class search, by clicking button 4092.

At any point, a user may access context sensitive help by clicking a help button. 4094. A user may terminate the retriever client 5121 by clicking an exit button 4093.

An animated icon 4065 may be displayed in a preferred embodiment to identify to the user a particular type of executable content applet 4016.

The system described in application Ser. No. 08/339,481, filed Nov. 10, 1994, by Thomas S. Kavanagh, et al., for OBJECT ORIENTED DATABASE MANAGEMENT SYSTEM, (now U.S. Pat. No. 5,838,965), may be advantageously used for the knowledge base server 4013. Such a system, in conjunction with the present invention, may provide a parametric search engine that allows intuitive, definitive and virtually instant remote access to data based on parametric attributes; which is how customers and searchers typically think about the product or item for which they are searching. This interactive, intuitive search mechanism can be delivered over the World Wide Web, connecting server sites to customer client sites in a whole new, powerful way. The present invention is the first system to employ true client/server architecture where interactive calls are being made to a server during an applet session comprising executable content downloaded over the connection between the client and a server.

The present invention may be better understood in connection with the embodiment shown in FIG. 1. This illustrated embodiment employs a network 100 having a client/server architecture including a knowledge base server 132. The knowledge base server 132 is associated with and coupled to a knowledge base 123. A server host 109 may be designated to run the knowledge base server 132, with the software for the knowledge base server 132 and the knowledge base 123 preferably residing on a local disk drive 110. In accordance with the present invention, the server host 109 is preferably connected to a wide area network 2104. (See FIG. 7). In an especially preferred embodiment, the server host 109 is preferably connected to the Internet 5124, either directly or via the network 100. (The Internet is a specific example of a wide area network, and is believed to be the largest wide area network on Earth).

Figure 5:
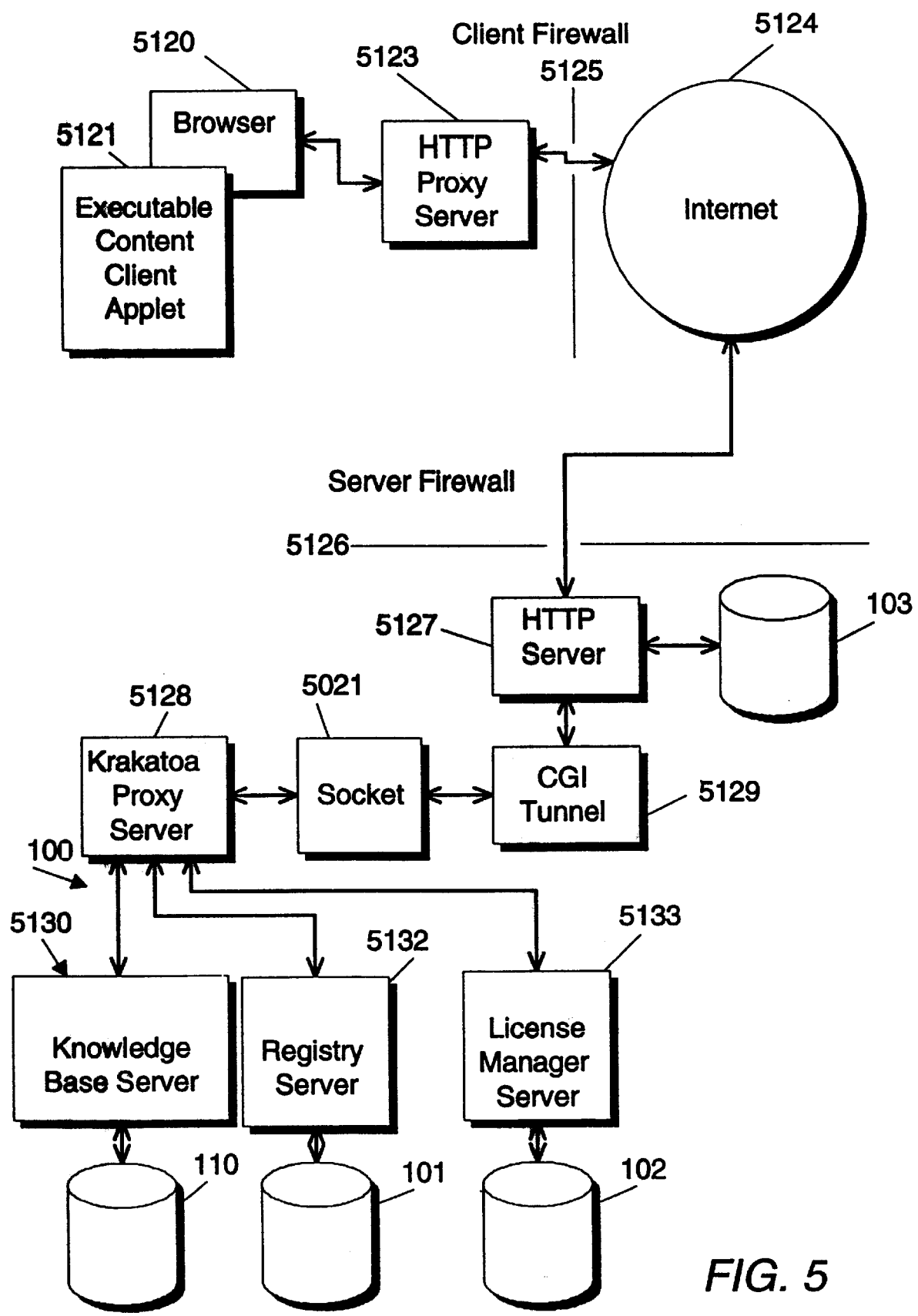
FIG. 5 is a schematic diagram of an embodiment of the present invention.

One or more knowledge base clients are connected to or otherwise able to communicate with the knowledge base server 132. In accordance with a preferred embodiment of the present invention, a knowledge base client 111 may be located at a remote location relative to the server host 109. Communication between the remotely located knowledge base client 111 and the knowledge base server 132 may occur via a communications circuit such as the Internet 5124. Preferably, the remotely located knowledge base client comprises an applet 5121, which includes a graphical user interface ("GUI") and an executable content client 5121 that runs as executable content under the control of a World Wide Web browser 5120, as shown in FIG. 5. The web browser 5120 includes a capability for executable content, such as a Java runtime environment. Referring again to FIG. 1, the network 100 may include knowledge base clients 112, 118, and 111, which are connected or capable of communicating with the knowledge base server 132 over the network 100. The network 100 may be a wide area network, in which case one or more of the knowledge base clients 112, 118, and 111 may be an executable content client 5121 that runs as executable content under the control of a browser having a capability for executable content, such as a Java runtime environment, suitable browsers including version 3.0 or above of Netscape Navigator™ or Microsoft Internet Explorer™. The network 100 may be a local area network, in which case one or more of the knowledge base clients 112 and 118 may be machine specific local applications, suitable examples of which are described more fully in application Ser. No. 08/339,481, filed Nov. 10, 1994, by Thomas S. Kavanagh, et al., for OBJECT ORIENTED DATABASE MANAGEMENT SYSTEM, now U.S. Pat. No. 5,838,965.

A Krakatoa proxy server 5128 is used to facilitate transfer of information between a remote client 111 communicating over the Internet 5124 and the knowledge base server 132. The Krakatoa server 5128 serves as a proxy between an HTTP server 5127 and the knowledge base server 132. In the embodiment described herein, the Krakatoa proxy server 5128 runs on the same host 106 as the HTTP server 5127, for reasons which may be better understood in connection with the detailed description of the operation of the Krakatoa proxy server 5128.

Detailed Description of a Krakatoa Proxy Server

A Krakatoa proxy server 5128 is a multi-threaded server that simultaneously services requests from multiple clients 5121 that are concurrently connected. The server 5128 has the ability to provide direct connection through a communication circuit 5124, the Internet being the preferred communications circuit 5124, as well as the ability to provide a simulated socket using the hypertext transfer protocol, sometimes referred to as the "http protocol." Information concerning the hypertext transfer protocol may be found in T. Berners-Lee, et al., *The Hypertext Transfer Protocol—HTTP/1.0* (1995), the entire disclosure of which is incorporated herein by reference. The http protocol provides a mechanism that transfers a single document for each connection made. The proxy server 5128 works with a tunneling agent 5129 that encapsulates the protocol data for movement as a document through the http protocol. The proxy server 5128 maintains information about each client session to provide the illusion of a continuous session, despite the use of individual connections for each remote procedure call ("RPC") data exchange with the client 5121.

Figure 12:
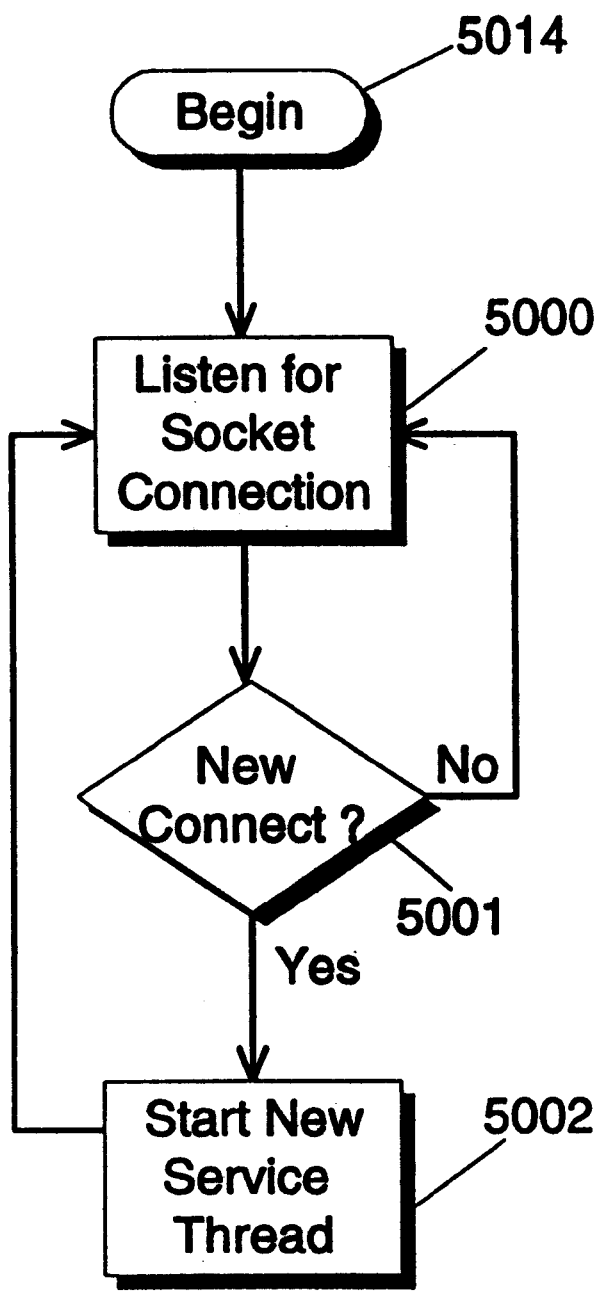
FIG. 12 is a flow chart illustrating a method for starting a new thread.

The proxy server 5128 handles the multiple concurrent connections by establishing a Java thread for each client connection that is being processed. The connection mechanism is illustrated in FIG. 12. Item 5000 shows the operation beginning by listening to a selected port on the server that is running the proxy server code. When a connection is established in 5001 with a client 5121 on a remote computer via a connection channel like the Internet 5124, the proxy server 5128 creates a thread in 5002 to handle the client connection, and then continues to listen to the port for another connection with another client computer.

Figure 9:
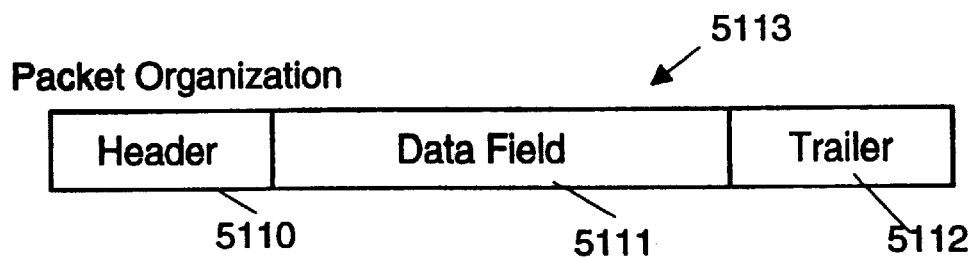
FIG. 9 is a schematic diagram depicting the layout of a packet of digital information used by the present invention.
Figure 10:
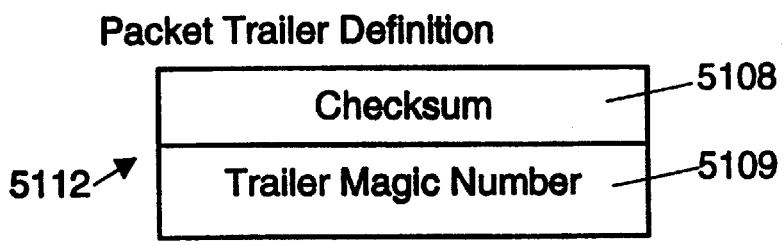
FIG. 10 is a schematic diagram depicting in more detail the layout of the trailer of the packet shown in FIG. 9.
Figure 11:
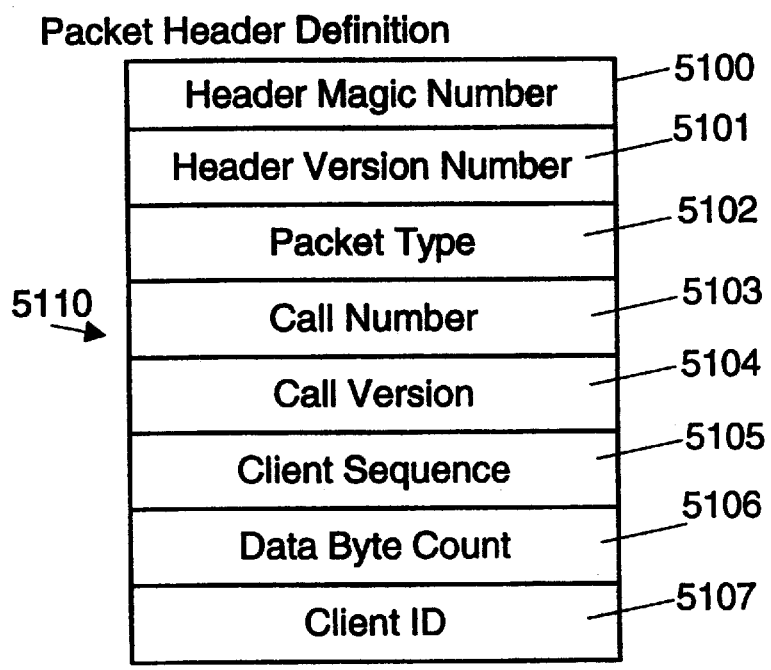
FIG. 11 is a schematic diagram depicting in more detail the layout of the header of the packet shown in FIG. 9.
Figure 13A:
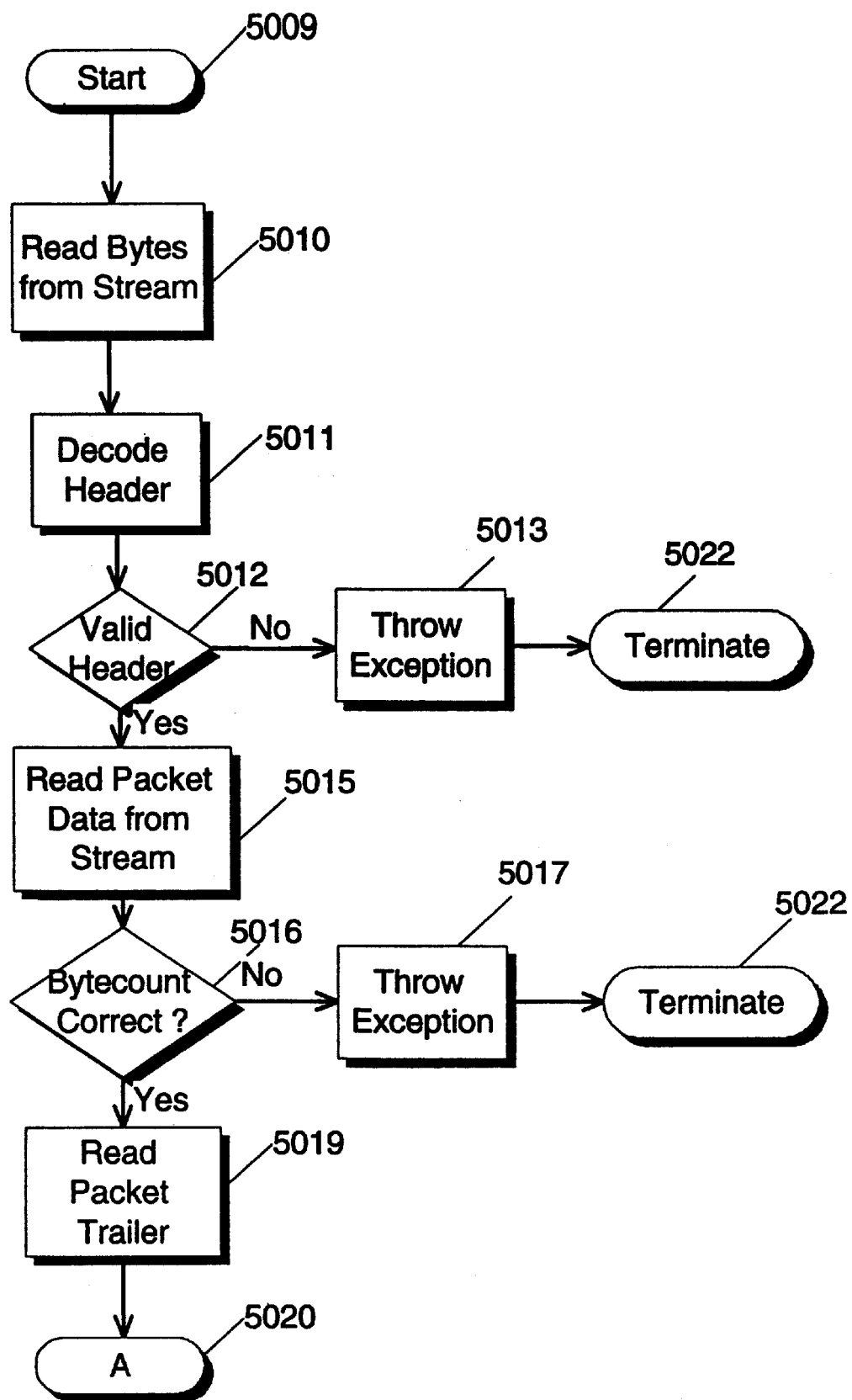
FIG. 13A is a flow chart illustrating a method for a client connection, including the processing of a call packet, performing a procedure call, and sending of a reply packet.
Figure 13B:
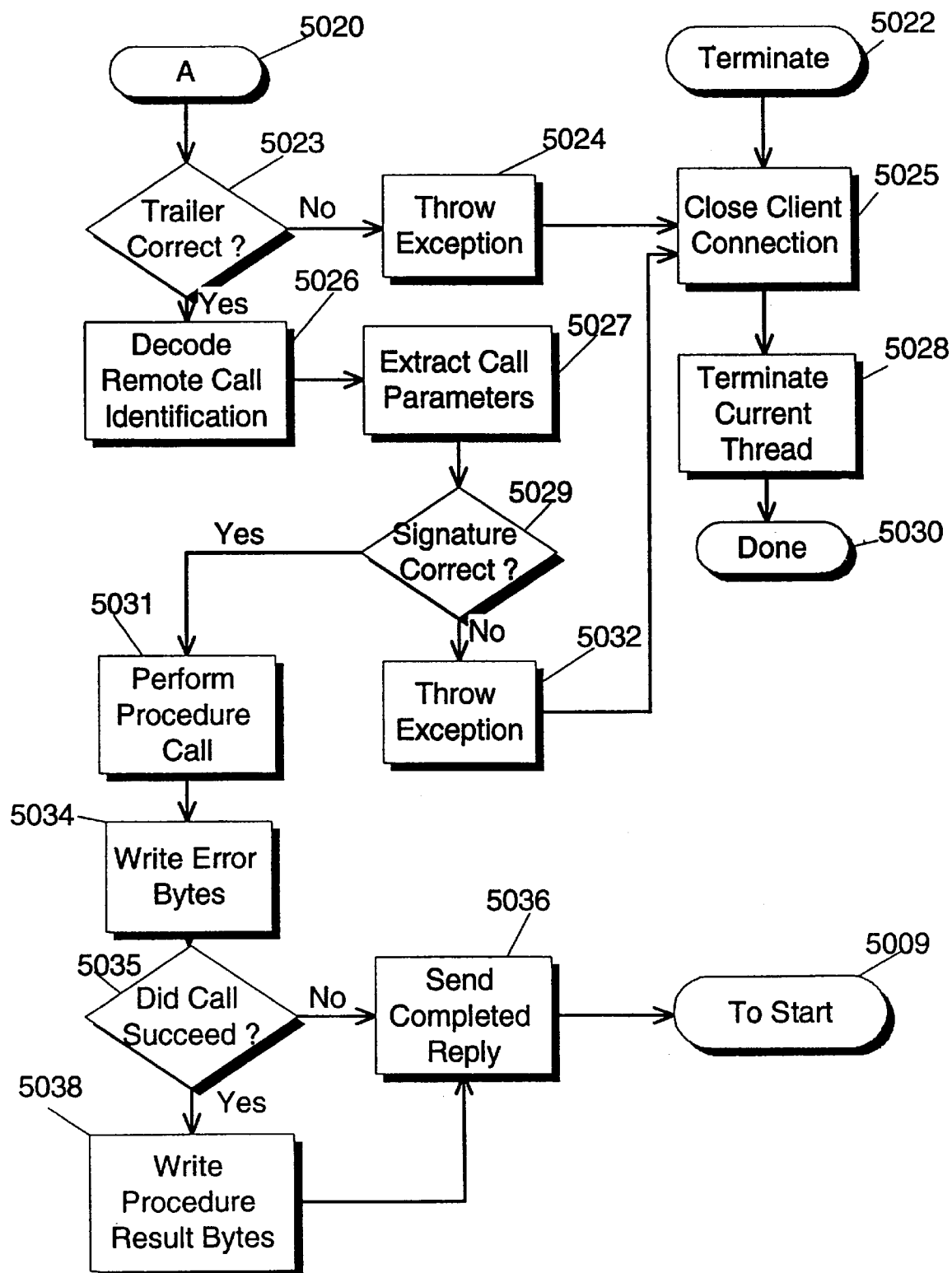
FIG. 13B is a continuation of the flow chart of FIG. 13A.

The process for the client connection in step 5002 is described in more detail in FIG. 13A and FIG. 13B. The thread starts at step 5009. The thread begins by reading from the communications connection a stream of bytes in step 5010. The stream of bytes is formatted to include a header 5110, a body of data 5111, and a trailer 5112, shown in FIG. 9. The header 5110 and the trailer 5112 are of known size and pattern to both the client 5121 and the server 5128. Details of the header 5110 are shown in FIG. 11, and details of the trailer 5112 are shown in FIG. 10. The packet format described herein provides a mechanism to allow variable length packets 5113 to be transferred. The data byte count field 5106 of the header 51 10 describes the length of the data field 5111 of the packet 5113. The header byte count plus the data byte count 5106 plus the trailer byte count constitute the length of the packet 5113. The packets expected by this thread are a type referred to as a "call packet", and are identified by an appropriate code in a packet type field 5102. The decoding of the packet header 5110 described in step 5011 of FIG. 13A comprises the steps of determining the packet length using the data byte count field 5106, validating that a packet 5113 is recognized as a call packet using information in the packet type field 5102, and validating the magic number field 5100. If the header 5110 is found to contain an error, then an exception is thrown in the Java language, which invokes the language's exception mechanism.

When an exception is caught in step 5013, a terminate sequence is initiated at step 5022. The terminate sequence is further described in FIG. 13B, beginning with the correspondingly numbered step 5022. The connection with the client 5121 is closed in step 5025. This causes the communication circuit that was established in step 5001 to be broken, and all communication with the client 5121 that established the connection will be discontinued. Following the termination of the connection, the thread that is processing the connection dies in step 5028. The processing for that client 5121 is completed in step 5030.

Referring to FIG. 13A, in the normal case where a packet header is found to be correct in step 5012, the process continues in step 5015 with the retrieval of the data portion 5111 of the packet 5113 from the communication circuit. If the correct number of bytes are retrieved from the communication circuit in step 5015, then in step 5016 a decision is made to continue processing in step 5019. If the byte count is incorrect, then an exception is thrown in step 5017, and termination processing is initiated in step 5022. Termination processing continues with steps 5022, 5025, 5028 and 5030 as described above with reference to FIG. 13B.

Referring to FIG. 13A, if a packet 5113 has the correct number of bytes in the data portion 5111 of the packet, then the trailer 5112 is read from the stream in step 5019. Processing continues, as indicated by reference numeral 5020 shown in FIG. 13A and in FIG. 13B. The trailer 5112 of the packet is then verified in step 5023 to determine that all of the data has been transferred from the client 5121. The trailer 5112 is considered to be correct if the magic number 5109 of the trailer matches a corresponding number specified by the protocol. Of the trailer 5112 is found to be incorrect in step 5023, then an exception is thrown in step 5024, and termination proceeds in steps 5025, 5028 and 5030 as previously described.

If the trailer 5112 of the packet is found to be correct in step 5023, the packet 5113 is decoded in step 5026 to determine what action is to be taken by the server 5128 on behalf of the client 5121. A call identifier or call number 5103 is extracted from the packet header 5110 in step 5026, and processing continues with step 5027 to determine what arguments are required for this remote procedure call. The arguments are marshaled in an agreed upon order by the client 5121 and the proxy server 5128, meaning that the client 5121 places the arguments into the stream of data 5111 that is being handled by the communication circuit, and the server 5128 removes the data 5111 from the stream in exactly the same order, using the same data types that the client 5121 used to place the data into the data stream. This is referred to as marshaling. When the argument marshaling has been completed in step 5027, the signature of the call is checked in step 5029 to determine if it is appropriate to proceed with the actual remote procedure call to the server 5128 in step 5031. If the signature is found to be incorrect in step 5029, then the server 5128 proceeds to terminate the connection by throwing an exception in step 5032, and beginning the termination process by proceeding to step 5025. Termination proceeds with steps 5025, 5028 and 5030 as previously described.

A flow chart for the process employed for signature checking is shown in more detail in FIG. 14, and will be described later. Referring to FIG. 13B, if the signature is found to be correct in step 5029, then the actual call to the Krakatoa server 5128 is made in step 5031. In performing step 5031, the Krakatoa server 5128 will typically make a call to one of the PMX servers, i.e., the knowledge base or database server 5130, the registry server 5132, or the license management server 5133. After the call has been performed in step 5031, detailed error information is collected in step 5034 to indicate the success or failure of the operation. The error data is prepared for return to the client 5121 in step 5034. In step 5035, if the error information collected and processed in step 5034 indicates that the remote procedure call was a success, then the resultant data is retrieved in step 5038. The data is then sent back to the client 5121 in step 5036. If the error information indicates that the call was unsuccessful, step 5036 is performed as described more fully below.

Figure 16:
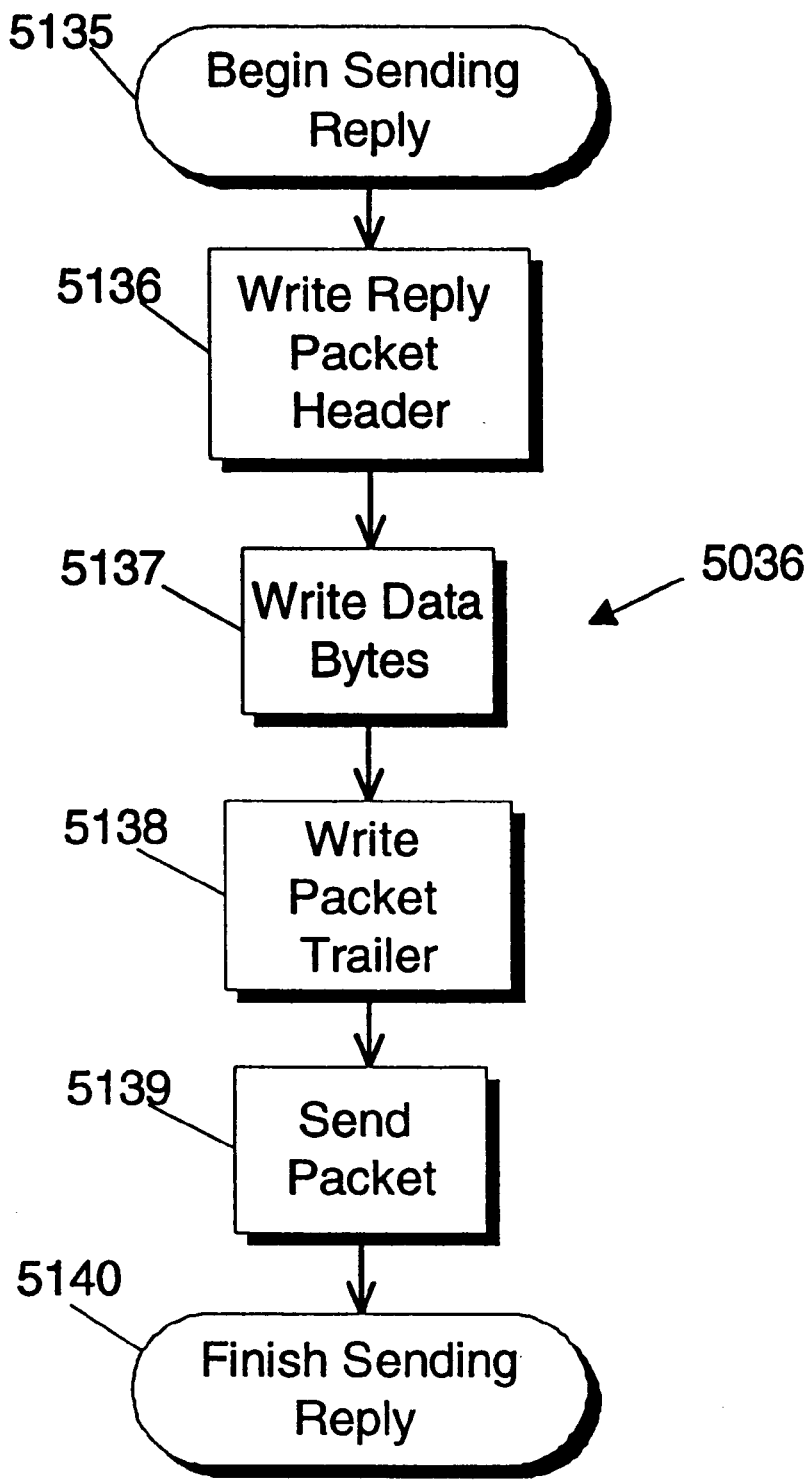
FIG. 16 is a flow chart illustrating a method for generating and sending a reply packet.

FIG. 16 shows in more detail the method performed in step 5036 to send information back to the client. The illustrated method begins with step 5135. In step 5136, a reply packet 5113 is constructed. The packet 5113 is marked as a reply packet in the packet type field 5102, the header magic number 5100 is inserted, the call number 5103 and call version 5104 are added, and the number of bytes of the reply that is made up of the error data 5111, and the return data 5111, if present, is set as the data byte count in field 5106. Step 5136 is completed by writing the packet header 5110 into the communication circuit. In step 5137, the data bytes 5111 that constitute the reply to the client 5121 are written into the communications circuit. In step 5136, the packet trailer 5112 is created and marked with the trailer magic number 5109, and written into the communication circuit. The packet 5113 is now complete, and is sent in step 5139. At this point, the server thread has finished sending the reply, as indicated by step 5140. Returning to step 5036 shown in FIG. 13B, the server thread proceeds to return to the start operation in step 5009 (see FIG. 13A). The server thread is now ready to read additional bytes from the stream and process the next request from the client 5121.

In the event that the client 5121 decides to terminate the connection without issuing a specific logout operation, rather, the client 5121 proceeds to close the communication circuit without warning to the server 5128, the server 5128 receives what appears to be an erroneous packet header in steps 5010, 5011, and 5012. This causes the server thread that was processing remote operations on behalf of the now non-existent (i.e., disconnected) client 5121 to throw an exception in step 5013 and begin termination proceedings in 5022, as described previously.

Figure 14:
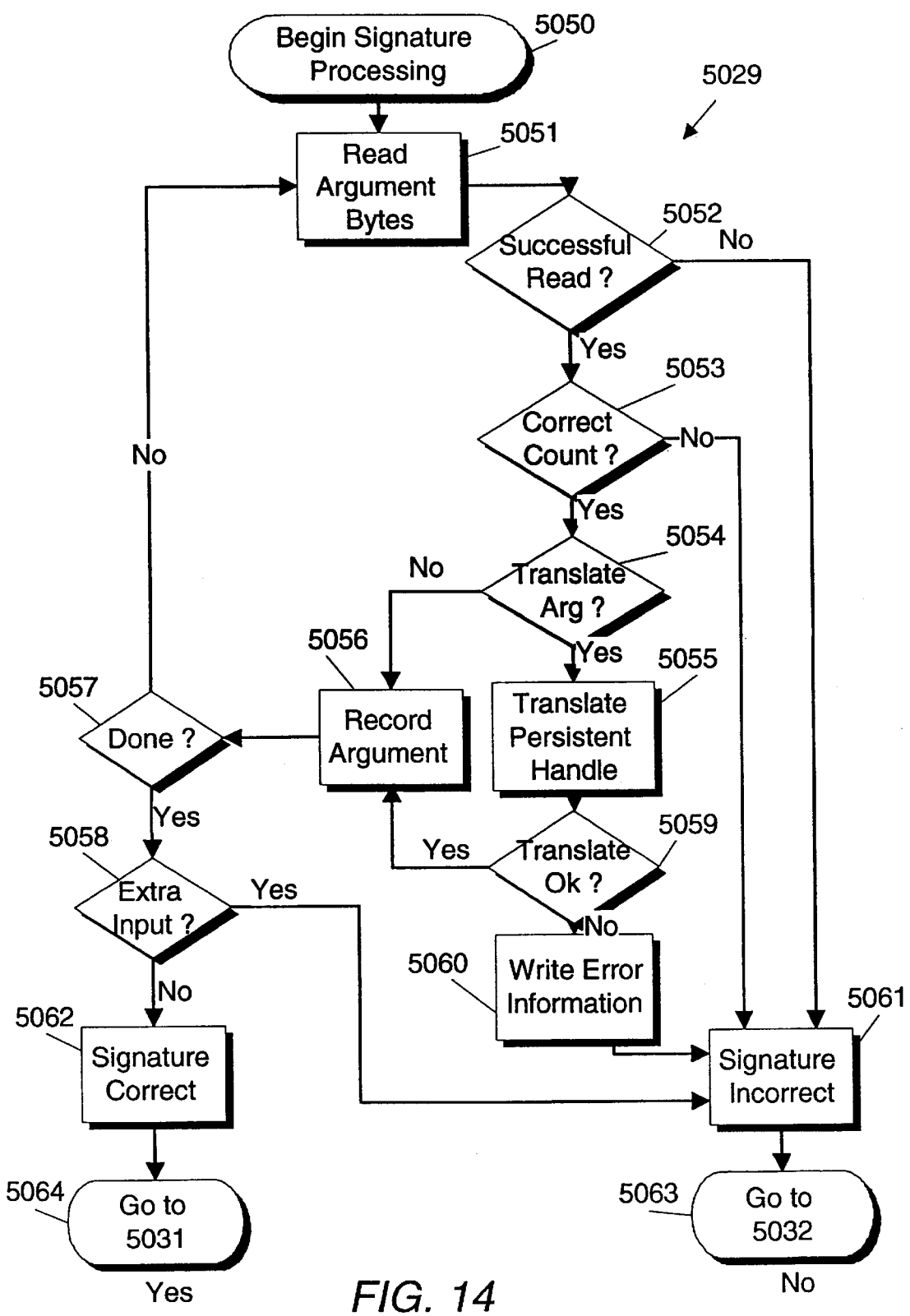
FIG. 14 is a flow chart illustrating in more detail a method for signature processing shown in simplified form as step 5029 in FIG. 13B.

The signature checking mechanism indicated as step 5029 in FIG. 13B is shown in more detail in FIG. 14. Referring to FIG. 14, signature checking begins at step 5050. The first step 5051 involves extracting bytes of information from the data stream provided by the communication circuit. If the stream completed the read successfully, as determined in step 5052, then the number of arguments are checked in step 5053 to determine if the count is correct. If the number of arguments are correct, a determination is made whether to translate certain arguments in step 5054.

If the read of the arguments fails in step 5052, or the argument count is determined to be incorrect in step 5053, then the processing continues at step 5061, wherein the signature is declared as incorrect. Processing continues to step 5032 shown in FIG. 13B.

In step 5054, if certain arguments are determined to be arguments that should be translated, then the arguments are handles used to simulate a persistent session. The handles are translated in step 5055 by looking up a reference given by the client 5121, and translating it to the corresponding handle that is used by the database server 5130. In step 5059, the result of the translation is examined, and the result is stored in step 5056 if the result was correct. If step 5059 determines that the translation failed, error information is generated in step 5060, and processing continues with the declaration of a bad signature in step 5061. In step 5054, if the argument does not require translation, the operation proceeds directly to the storing of the argument in step 5056.

At the conclusion of step 5056, a determination is made in step 5057 concerning whether more arguments need to be extracted from the data stream. If so, the processing continues by returning to step 5051 again. In step 5057, if all of the arguments have been extracted from the stream, then processing continues to step 5058. In step 5058, the data stream is checked to determine if the stream is now empty. If it is not, then extra data has been supplied, and the signature of the requested operation is declared incorrect in step 5061. In step 5058, if the data stream is found to be empty, the process continues to step 5062 where the signature is determined to be correct. The process then returns to step 5031 shown in FIG. 13B.

The error detection mechanisms described in the proxy server 5128 that caused the termination of the connection with the client 5121, and the termination of the thread that is servicing the client 5121, are mechanisms unique to a proxy server 5128 according to the present invention. The model that is used provides protection against rogue clients that may attempt to prevent service to other clients. If a particular first client 5121 attempts to cause the proxy server 5128 to deny service to other clients, the proxy server 5128 destroys the thread that is servicing the first client 5121 that made the rogue request. The described implementation is designed to prevent a first client 5121 from interfering with or affecting a thread that is servicing a second client, and at most, a first client 5121 may deny service to itself by causing its own thread to be terminated, but may not affect any thread that is not servicing the first client 5121.

Typical attempts to deny service involve inflating the data byte count 5106 to cause the proxy server 5128 to allocate all of available memory. Internal limits placed on packets of "call packet" type cause the thread to terminate the transaction, and any further processing of that thread. Any error in protocol, as shown earlier, causes the termination of the thread. The Java programming language allows the enforcement of the error handling cases through the exception model. Java is the preferred implementation language for this type of mechanism. Other languages could implement this model; however, other compilers may not enforce the error handling cases, as the Java language does. Java also provides runtime checking of the types that are being used in each method operation, including, but not limited to, array bounds checking. A rogue client cannot force a Java program to use data that is outside of the bounds of an array, with the intent of spoofing the program into doing an illegal operation, or crashing altogether.

HTTP Simulated Sockets

When an application attempts to setup a client/server communication circuit, in an environment such as the Internet 5124, there are instances where mechanisms exist to prevent the connection from being completed. These prevention mechanisms are known to those skilled in the art as "firewalls." The firewalls consist of hardware and software whose express purpose is to control the flow of information going through the firewall mechanism. FIG. 5 illustrates a first firewall, or client-side firewall 5125, and a second firewall, or server-side firewall 5126. The firewalls 5125 and 5126 accomplish their purposes by controlling the ability to perform incoming or outgoing connections to specific addresses. In practice, operators of these firewall mechanisms typically are not easily persuaded to change their connection policy. As a result, additional measures are required to establish client/server communication in these environments.

Many of the installations that use such firewall techniques allow the use of the http protocol to facilitate the use of the World Wide Web. This protocol is nearly universally allowed to operate through the firewalls 5125 and 5126. As a result, it is possible to request service from an http server 5127 at the serving site to provide information to a requesting entity 5123 at the client site. Since the http protocol is able to pass text information, a mechanism in accordance with the present invention can be used to perform a remote procedure call for a client 5121 that is executable content. The client 5121 must connect correctly, and manage the protocol correctly to make this mechanism work successfully.

The present invention uses a mechanism, referred to as "tunneling," as one feature to permit the http protocol to be used to transfer a RPC request and response data as plain text through the http servers 5127 and 5123. The present method employs a common gateway interface ("CGI") tunnel mechanism 5129 behind the http server 5127 to interpret a request, forward it, and encode a reply that is returned to an executable content client 5121. A CGI tunnel 5129 is invoked through a universal resource locator or URL that has attached arguments. The CGI tunnel 5129, once started, receives the arguments through a command line. The arguments are extracted by the CGI tunnel 5129 for transfer to a Krakatoa proxy server 5128 via a socket 5021.

Referring to FIG. 5, an applet 5121, comprising a graphical user interface and a client, runs as executable content under the control of a World Wide Web browser 5120. For purposes of the following discussion of how connections are established over a communications circuit 5124, the operation of the executable content client 5121 is of primary interest.

When the executable content client 5121 needs to request information, or perform a query or other function, a request is formatted or encoded as a standard request from a World Wide Web browser 5120 to run a CGI program. Of course, although the request appears to an http server 5127 on the other end of a communications circuit 5124 as having originated from the browser 5120, the request actually originates from the executable content client 5121. The executable content client 5121 generates a remote procedure call, and converts the remote procedure call from a binary form to a text form. The purpose of this conversion will be better understood in connection with the below discussion, but is generally performed so that the remote procedure call may be transmitted over the Internet 5124 using an http protocol.

In order to communicate the request to an http server 5127, it is necessary to establish a connection through the Internet 5124. The connection may optionally be established through a first http proxy server 5123, although a connection may be established directly without an intervening http proxy server 5123. The use of the first http proxy server 5123 is determined by the browser 5120, and is outside of the control of the executable content client 5121.

In the illustrated example, the Internet 5124 is used to complete a communication circuit by routing the request to a second http server 5127 that is identified in the requested URL. However, it should be understood that use of the Internet is not required, and a request could be routed to the http server 5127 over a wide area network, or a local area network. The request from the executable content client 5120 that is addressed to the http server 5127 may be routed through a first firewall 5125 and a second firewall 5126 using http protocol. The first and second firewalls 5125 and 5126 are typically configured to allow the operation of http protocol through the Internet 5124. The second http server 5127 interprets the URL received from the executable content client 5121 to determine what action to take. In the present example, the URL is formatted as a request to run a CGI program, and a tunnel 5129 is invoked to run as a CGI program. The tunnel 5129 takes an argument portion of the URL received from the executable content client 5121, and blindly converts the argument from text to a binary form. The tunnel 5129 does not attempt to interpret the argument. However, the conversion performed by the tunnel 5129 places the data back into the form of a remote procedure call that can be executed by a Krakatoa proxy server 5128.

At this point, it is necessary to pass the now converted remote procedure call data to the Krakatoa proxy server 5128. The CGI tunnel 5129 is preferably constructed so that it will not allow the executable content client 5121 (and consequently any other external agent) to specify the address of a particular host to which the tunnel 5129 is to connect. This provides a measure of security to prevent hackers from mis-using the tunnel 5129 to penetrate the second firewall 5126. In accordance with a preferred embodiment of the present invention, the tunnel 5129 opens a socket associated with the "localhost," which by convention is usually the host having an Internet Protocol ("IP") address of 127.0.0.1. This provides an additional measure of security. For example, a client 5121 will be limited in the servers to which it could connect by virtue of the use of "localhost" as the socket for such communications. The tunnel 5129 writes the data comprising the remote procedure call to the socket 5021.

The Krakatoa proxy server 5128 listens to the socket 5021. The Krakatoa proxy server 5128 will, therefore, receive the data written to the socket 5021 by the tunnel 5129. The Krakatoa proxy server 5128 interprets this data as a remote procedure call, and executes the corresponding procedure. The Krakatoa proxy server 5128 may use a plurality of available servers 5130, 5132 and 5133 to execute the procedure call and thereby complete the request. The illustrated servers available to the Krakatoa proxy server 5128 include a knowledge base server 5130, a registry server 5032, and a license server 5133. From the standpoint of the servers 5130, 5132 and 5133 associated with the knowledge base 110, the Krakatoa proxy server 5128 functions as a client. The Krakatoa proxy server 5128 generates API calls to the servers 5130, 5132 and 5133 associated with the knowledge base 110. The Krakatoa proxy server 5128 functions as a proxy between one protocol and another. It serves as a proxy between a protocol in the form of RPC calls from the tunnel 5129, and a protocol in the form of API calls to the knowledge base server 5130, and other servers 5132 and 5133 associated with the knowledge base 110.

The CGI tunnel 5129 takes as its arguments the request that is being made of the Krakatoa proxy server 5128. In a preferred embodiment, the arguments are encoded so that all of the bytes in the request are ASCII text characters. The transformation is preferably performed by splitting each byte into two 4-bit entities, and adding the entity to an upper case ASCII "A" character. Thus, a 4-bit entity that represents "0" becomes an "A", a "1" becomes a "B", and so forth. This transformation is faster than attempting to transform the data into an ASCII hex representation of the data, since a like transformation can be applied at the packets' destination.

Figure 15:
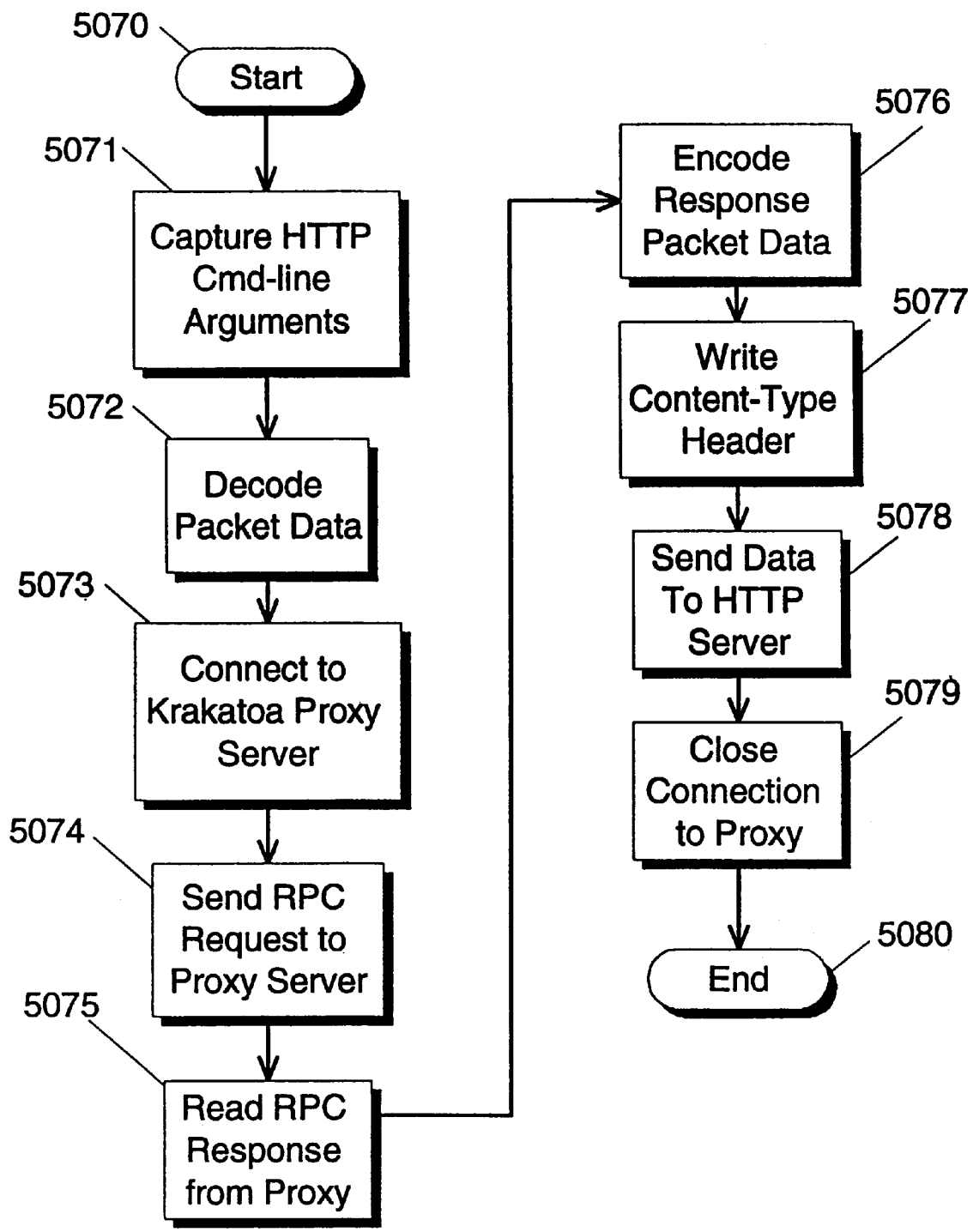
FIG. 15 is a flow chart illustrating a method performed by the CGI tunnel.

A flow chart of the method performed during operation of the CGI tunnel 5129 is depicted in FIG. 15. The tunnel method is started with command line arguments in step 5070. The next step 5071 in the method is capturing an http command line argument. The argument (which is an encoded packet) is then decoded in step 5072, by reversing the algorithm described above (by subtracting an uppercase "A" from each character and then combining pairs of four-bit entities to form one byte). The CGI tunnel 5129 then connects to the Krakatoa proxy server 5128 in step 5073, so that the request can be forwarded to the Krakatoa proxy server 5128. This connection is made via socket 5021, as described more fully in connection with FIG. 5. Once the connection is established, the CGI tunnel 5129 writes the decoded request bytes of data to the Krakatoa proxy server 5128 in step 5074. After sending the data to the Krakatoa proxy server 5128 via the socket 5021, in step 5075 the CGI tunnel 5129 reads from the socket 5021 to obtain a response from the Krakatoa proxy server 5128. In step 5076, the response is then encoded by the CGI tunnel 5129, in the manner described above in connection with the transmission of packets from the client to the proxy, and prepared for transmission back to the executable content client 5121. A content-type identifier is sent to the second http server 5127 (which invoked the CGI tunnel 5129) in step 5077, to notify the second server 5127 what type of reply to send to the executable content client 5121. The content type indicates to the second http server 5127 that the stream of data that is being returned is plain-text. It will be understood that, although the packet data is indicated as being plain-text, the actual data has been encoded as previously described (binary data is converted to text) in step 5076. The encoded data is then sent to the second http server 5127 in step 5078, and the connection to the Krakatoa proxy server 5128 is closed in step 5079. The method ends at step 5080.

Client Interaction With The Karkatoa Proxy Server

The client's 5121 interaction with the Krakatoa proxy server 5128 follows a protocol very similar to the operation of the proxy server. The client portion of the applet 5121 manages the transfer of information between the client applet 5121 (or use of the information transferred), and the Krakatoa proxy server 5128.

The executable content client 5121 begins operation when the client applet 5121 requests an operation. The executable content client 5121 is capable of packaging a request for service that is ultimately intended to be directed to the knowledge base server 5130. The request is delivered to the knowledge base server 5130 through the Krakatoa proxy server 5128. The executable content client 5121 communicates with the proxy server 5128, the preferred method being via the Internet 5124. If the connection is not established through the Internet 5124, then alternate communication circuits may be employed as described previously.

When the request is made by the executable content client 5121, the client 5121 forms a request to the proxy server 5128 by creating a new "call packet". A general form of a packet 5113 is shown schematically in FIG. 9. The illustrated example may either be a call packet or a reply packet, or possibly other types of packets that may optionally be employed in a particular implementation. The general structure for a packet 5113 will first be described in the context of a call packet example. The call packet 5113 contains a header 5110, a data field 5111, and a trailer 5112. These together constitute a call packet or request packet 5113. The packet header 5110 is shown in more detail in FIG. 11. The packet trailer 5112 is shown in more detail in FIG. 10.

In the example of a call packet, the packet 5113 must be identified as a call packet. Referring to FIG. 11, such identification is accomplished by placing an appropriate code in a packet type field 5102 of the packet header 5110.

The operation to be performed by this call to the proxy server 5128 is identified in the packet header's call number field 5103. The version of the call interface is identified in a call version field 5104. The packet header 5110 includes a magic number field 5100. The magic number field 5100 is used to identify the beginning of the packet 5113. The magic number is a predetermined constant that has a particular bit pattern that is uniquely recognized as the beginning of a packet 5113. The header version field 5101 is used to identify the version of the packet header 5110 being used. A data byte count field 5106 describes the number of bytes contained in the data field 5111 of the packet 5113.

Referring to FIG. 10, the packet trailer 5112 contains a predetermined byte pattern in a trailer magic number field 5109 to identify the end of the packet 5113. The magic number is a constant that has a particular bit pattern that is uniquely recognized as the end of a packet 5113. In a preferred embodiment, the trailer 5112 also may include a checksum field 5108 that is applied to all bits from the beginning of the header 5110 up to the beginning of the trailer 5112. This checksum 5108 assists in detecting invalid packets 5113, and is especially useful in detecting errors in transmission.

A bit pattern may be selected for the magic number used in the magic number field 5100 of the packet header 5110 that is unlikely to otherwise occur during communication (in order to avoid erroneous recognition of a stream of data bits as the beginning of a packet header 5110). Similarly, a bit pattern may be selected for the magic number used in the trailer magic number field 5109 of the packet trailer 5112 that is unlikely to otherwise occur during communication (in order to avoid erroneous recognition of a stream of data bits as the end of a packet trailer 5112). However, neither is necessary. Preferably, the magic numbers are a binary pattern that is easy to recognize. The combination of a magic number for the header 5110, a magic number for the trailer 5112, and a data byte count field 5106 is used to determine whether a valid packet 5113 has been received, and it is considered to be highly unlikely that a random bit pattern would coincide to both magic numbers and be spaced apart the exact distance indicated by the value stored in the data byte count field 5106.

When making a call to the proxy server 5128, the client 5121 creates a packet 5113, loads a call identifying number into the call number field 5103, and places the arguments for the requested remote procedure call into the data field 5111. The client 5121 and the Krakatoa proxy server 5128 each recognize a predetermined set of remote procedure calls, each type of call in the set having a unique call identifying number 5103.

The packet 5113, including the arguments carried in the data field 5111, is converted to text in the manner described more fully above to be transported over the Internet 5124 as plain text, until the packet 5113 is reconverted back to its original form by the CGI tunnel 5129 after it reaches its destination. In a preferred embodiment, binary data is encoded to ASCII text. For example, '00h' is encoded as "AA", "01h" is encoded as "AB", and so forth with "0Fh" being encoded as "AP", and "FFh" being encoded as "PP".

Figure 17:
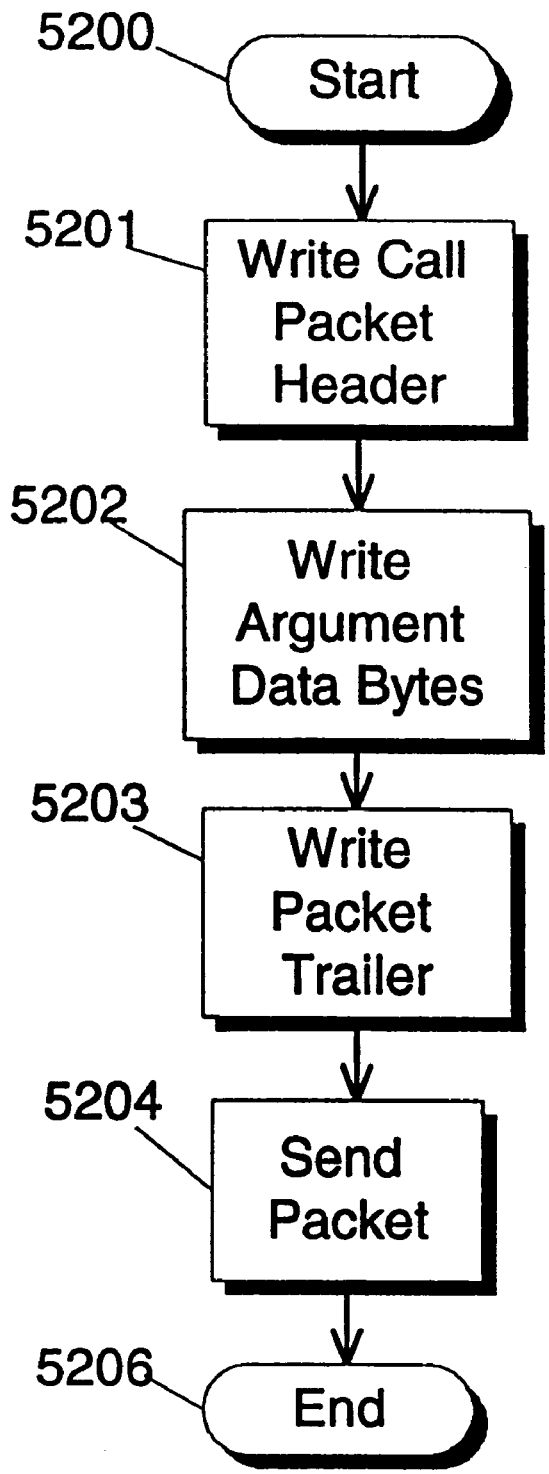
FIG. 17 is a flow chart illustrating a method for generating and sending a call packet.

The process for constructing a call packet is depicted in the flow chart shown in FIG. 17. The process begins, for the sake of discussion, with step 5200. The first step 5201 is to write the call packet header 5110, which is preferably in the form shown in FIG. 11. The packet header 5110 is transferred into a data stream for transmission over the communications circuit.

Arguments are transferred into the stream at step 5202 in the following manner. Integer arguments are preferably converted into four 8-bit bytes. Floating point numbers are preferably transferred as 4 bytes. The transfer order of the bytes is not critical, so long as the client 5121 and the proxy server 5128 use the same ordering technique. Arrays of numbers are preferably transferred as an integer count, followed by the number of items that are indicated in the count field. Strings are preferably transferred in the same manner. Complex data structures can be transferred by using these techniques to transfer the component parts of the complex structure.

After transferring the arguments to the call, the packet trailer 5112 is appended to the data stream in step 5203, and the stream is sent to the proxy server 5128 in step 5204. The request portion of the client's call is now complete in step 5206.

Figure 18A:
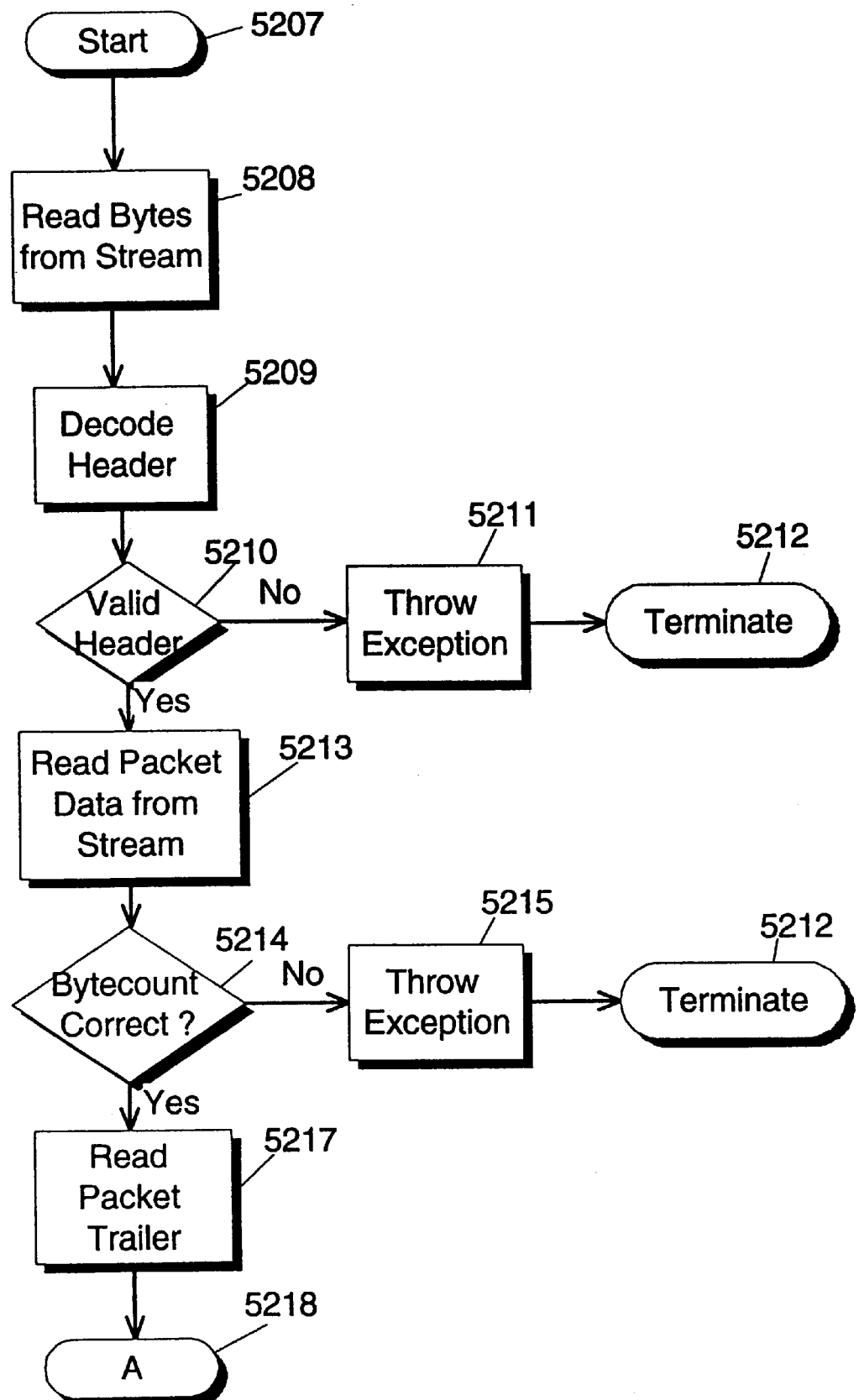
FIG. 18A is a flow chart illustrating a method performed by an executable content client to process reply packets.

Referring to FIG. 18A, the client 5121 then waits for a reply from the proxy server 5128 in step 5207. The client 5121 begins the process described in FIG. 18A by reading from the connection that it has established with the proxy server 5128. The read is performed in step 5208. The client 5121 reads a packet header 5110 in step 5208, and expects to find a packet header 5110 that is a header for a reply packet. The decode process in step 5209 looks for a matching call number 5103, call version 5104, and a packet type 5102 that indicates that the packet 5113 in this example is a reply packet. In step 5210, the packet header 5110 is examined to determine whether it is a valid packet header. If the header 5110 is found to be invalid, then an exception is thrown in step 5211 back to the client 5121, and the communication with the proxy server 5128 has failed. The process terminates in step 5212. If the header 5110 decodes correctly in step 5209, then the client continues to read the data field 5111 of the packet 5113 in step 5213. The length of the data field 5111 is checked against the length specified by the data byte count field 5106 of the header 5110 in step 5214. If the number of bytes in the stream does not match, in step 5215 an exception is thrown back to the client 5121. The process terminates in step 5212.

If the number of bytes in the data field 5111 is correct as specified by the data byte count field 5106 of the header 5110, then processing continues at step 5217 where the packet trailer 5112 is read. The process continues from FIG. 18A to FIG. 18B, as indicated by common reference numeral 5218.

Figure 18B:
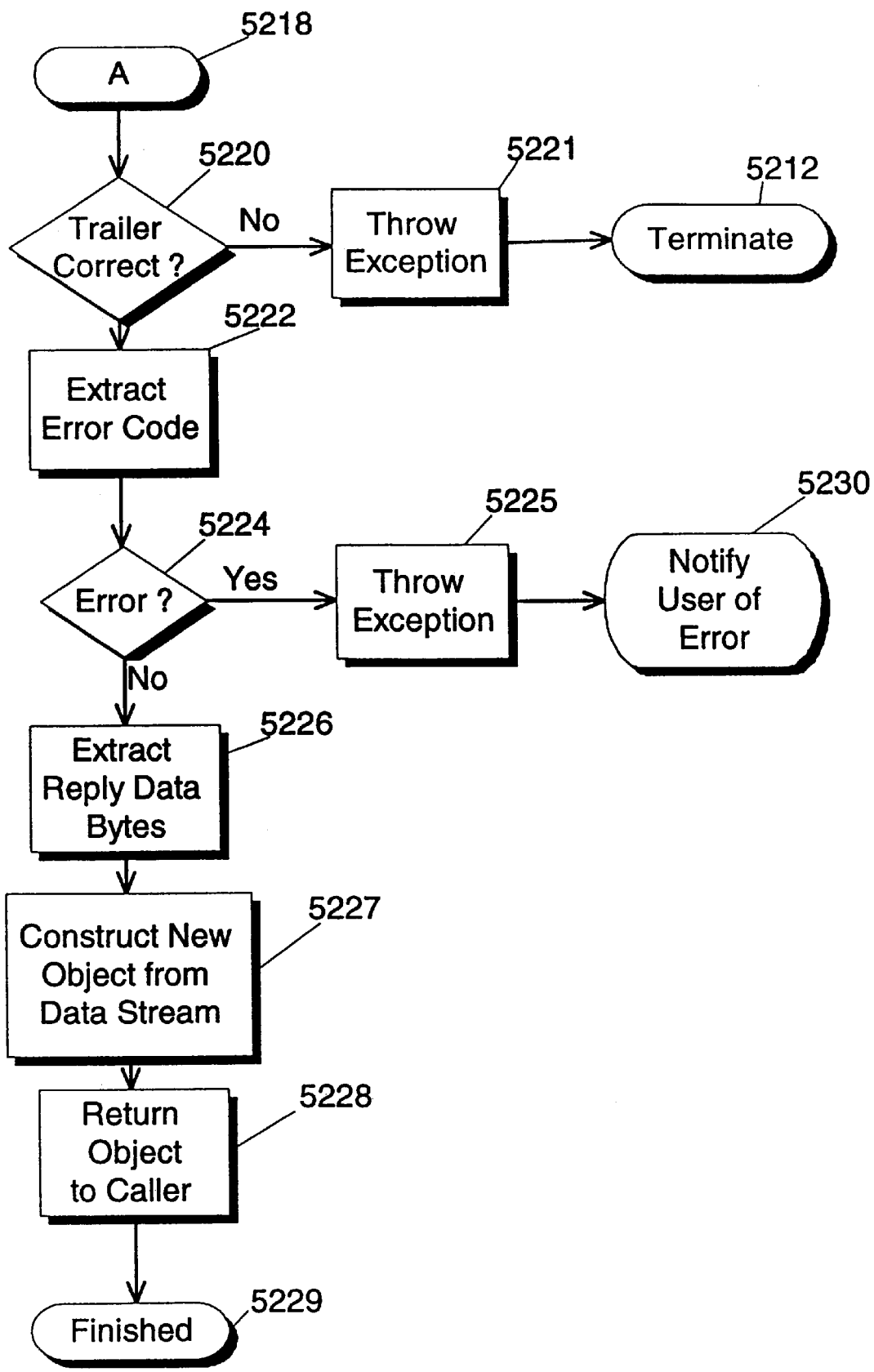
FIG. 18B is a continuation of the flow chart of FIG. 18A.

Referring to FIG. 18B, the trailer 5112 is examined to determined if it is correct in step 5220. If a trailer 5112 is used to ensure that all of the packet 5113 was received from the proxy server 5128, it marks the end of the transfer. If the trailer 5112 is found to be in error in step 5220, then an exception is thrown back to the client 5121 in step 5221. The process terminates in step 5212.

If the trailer is complete, then the transfer is complete, and processing of the contents of the data field can proceed at step 5222. The first thing that is preferably contained in the data field 5111 of a reply packet 5113, is error reporting information. This error information is used to indicate the success or failure of the requested operation. The error information is extracted in step 5222, and is examined in step 5224. If a failure is indicated by the error information in step 5224, then in a preferred embodiment no data follows in the packet 5113. The failure is reported back to the client 5121 by the throwing of an exception that indicates the requested remote operation failed in step 5225. Failure is usually caused by incorrectly specifying the arguments to a requested function or remote procedure call. The user is notified of the error in step 5230.

If, in step 5224, the error code indicates that no error occurred, then the process of extracting the bytes from the data field 5111 continues in step 5226. As the bytes are extracted, in a manner similar to the handling of arguments in the call packet discussed earlier, an object is constructed for use by the client 5121 in step 5227. The object contains data, and may contain methods to access individual data elements. The object may also contain methods which cause actions to additional operations to be performed by the proxy server 5128.

Once this object has successfully been created from the available data, it is returned to the caller 5121 in step 5228. The client operation is complete at step 5229.

In a preferred embodiment, the packet header 5110 may include a client sequence number 5105. As the executable content client 5121 makes calls to the proxy server 5128, each packet sent is given a sequence number 5105 that is incremented by the client 5121 for each call. If a particular packet is delayed or lost in transmission, the proxy server 5128 can use the sequence number 5105 to determine that a call was missed or is missing, or a packet 5113 was received out of sequence. The proxy server 5128 may request retransmission of the missed packet or call, or alternatively return an error code to the client 5121.

A client ID filed 5107 may be used in the packet header 5110 for purposes of identifying the client 5121 that originated a packet 5113. Such information may make it easier to administer multiple connections with less overhead. Alternatively, the proxy server 5128 may establish a table and give each client 5121 establishing a connection a handle, or otherwise keep track of the different clients that have established a connection. A unique client ID filed 5107 may be used as a code to identify registered users, or to identify that a connection being made is the same client 5121 that was previously disconnected, and previous query results may be retrieved for that client 5121. Alternatively, the client ID filed 5107 may be used to display predetermined information intended for a particular user, such as discount pricing for a preferred customer, as described above in connection with FIG. 24.

The Krakatoa proxy server 5128 preferably performs connection management when simulated sockets are used. The proxy server 5128 keeps track of connections, and "ages" the connections. If the executable content client 5121 does not communicate with the proxy server 5128 within a predetermined amount of time, it will "time out". When a connection between the proxy server 5128 and the client 5121 times out, the proxy server 5128 will close an associated connection between the proxy server 5128 and the knowledge base server 5130 to free resources held by it, such as queries, query results, and so forth. In addition, the proxy server 5128 will close an associated connection between the proxy server 5128 and the license server 5133 to free resources, such as licenses allocated to the connection. A similar action occurs with respect to the registry server 5132.

The above discussion has been with reference to an embodiment using what may be referred to as "Java tunnel mode." Alternatively, a mode of operation that may be referred to as "Java direct mode" may be used. On direct mode, connections are preferably managed so that a user can only connect back to the same IP address as the user's IP address.

In the example illustrated in FIG. 5, requests to the proxy server 5128 are accomplished through a firewall 5126 via an http server 5127. In a typical network, a firewall 5126 will permit connections through a port associated with http connections, such as port 80. If no firewall 5126 exists between the executable content client 5121 and the proxy server 5128, a direct connection may be established between the browser 5120 and the proxy server 5128. For example, if the communications circuit between the browser 5120 and the proxy server 5128 is a local area network, the browser would typically be on the same side of a firewall 5126 as the proxy server 5128, if the network had a firewall 5126. In other words, there would be no firewall 5126 between the executable content client 5121 and the proxy server 5128, and a direct connection would be possible. The proxy server 5128 may listen to a port that is designated for direct connection to the proxy server 5128. On addition, users with certain privileges or security clearance may be allowed to connect through a hole in a firewall 5126 that is provided for a port that is specifically designated for connection to the proxy server 5128. (A firewall 5126 controls which ports are allowed for connections through the firewall 5126.) The http server 5127, the CGI tunnel 5129, and the socket 5021 would not be required for such a direct connection.

Extended Queries

One feature of the present invention provides a mechanism for authoring extended queries based on the current selected class, or alternatively, based upon the owning class of the instance. The authoring of extended queries allows the formation of complex queries into the database that is currently in use, or even into another database. For example, it is possible to define a query from one subtree in a hierarchical object oriented knowledge base to another subtree in that hierarchical object oriented knowledge base. It is possible, using extended queries, to establish links between the attributes. It is also possible to do one-to-many cascading queries. A query can comprise a query that maps to any class in a knowledge base, including mapping a class to itself.

Figure 26A:
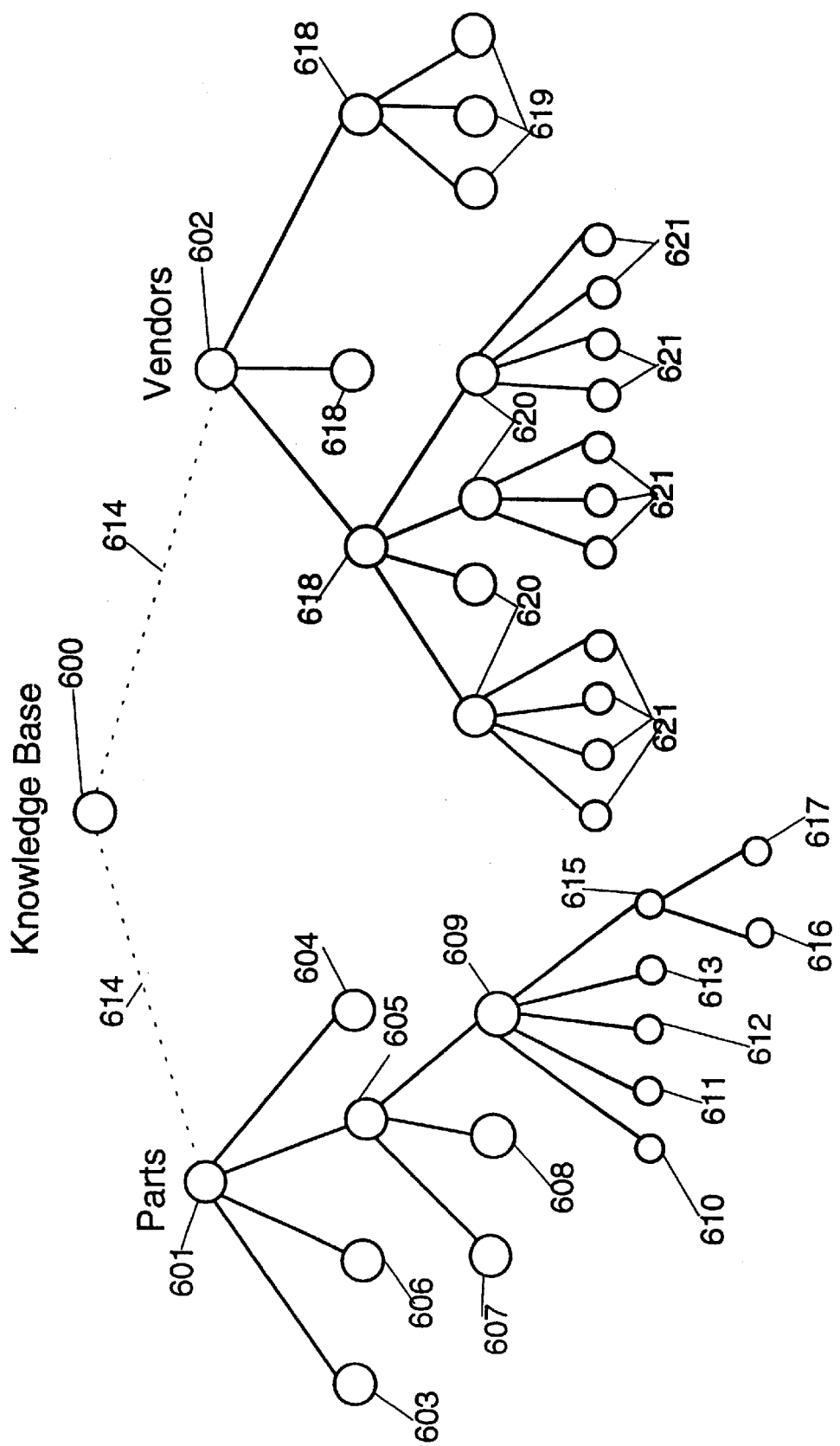
FIG. 26A is a schematic diagram of a class hierarchy in a parts knowledge base and a vendors knowledge base.

This feature may be better understood in connection with FIG. 26A, FIG. 26B and FIG. 26C. FIG. 26A is a schematic diagram of a hierarchical knowledge base having a root class 600. The knowledge base root class 600 has a section containing information about semiconductor components having a class 601. The knowledge base root class 600 also has a section containing information about vendors that starts with class 602. Alternatively, class 601 may be a root class for a first component knowledge base, and the vendor class 602 may be a root class for a separate vendor knowledge base. This is signified by the dotted lines 614 connecting class 601 to root class 600, and connecting class 602 to root class 602.

The components or parts class 601 has a plurality of subclasses 603, 604, 605 and 606. For example, the components knowledge base may have a "digital logic" class 603, a "discrete semiconductor devices" class 606, an "analog/linear" class 605, and a "display circuits" class 604. The "analog/linear" class 605 in turn is shown having a plurality of subclasses 607, 608 and 609. For example, the "analog/linear" class 605 has a "comparators" subclass 607, a "references" subclass 608, and a "standard linear" subclass 609.

The "standard linear" class 609 has a "data acquisition" subclass 610, a "regulators" subclass 611, a "references" subclass 612, a "comparators" subclass 613, and an "amplifiers & buffers" subclass 615. The "amplifiers & buffers" subclass 615 has a "buffers" subclass 616 and an "operational amplifiers" subclass 617.

The vendors class 602 has a plurality of subclasses 618, which in turn may have a plurality of subclasses 619 and 620, which may also have subclasses 621. FIG. 26A is intended to be a simplified diagram, and it will be appreciated that other classes may also exist, but are not shown for the sake of simplicity.

Referring to FIG. 26B, the semiconductor components information 601 shown in FIG. 26A may include attribute information, such as "internal part number" 622, "vendor ID" 623, "vendor part number" 624 and "title" or description 625. Additional attribute information is also included, but is not shown.

Referring to FIG. 26C, the vendor information 602 shown in FIG. 26A may include attribute information, such as "vendor code" 626, "vendor part number" 624, "vendor contact" 627, "address" 628, "vendor name" 629, "sales office locations" 630 and "dealers who carry this vendor's merchandise" 631. Additional attribute information may be included, but is not shown.

An extended query could link a "vendor ID" attribute 623, for example, to a vendor knowledge base root class 602. The results of an extended query, for example that includes a particular vendor ID 623, would have a link or other mechanism for displaying to a user information from the vendor knowledge base 602, such as the vendor contact person 627 for more information about the part, the vendor's address 628 if the user wanted to write for more information, the vendor's sales office locations 630 (if the vendor sells direct), or the identity of dealers who carry this vendor's merchandise 631 (if the vendor sells through dealers). A graphical user interface may display an icon or task bar that a user may click on to access information from an extended query.

Extended queries may cascade. For example, an extended query to determine the sales office 630 nearest to the user's office that will accept fax orders and is open on Saturdays could be created. An extended query linking information about the dealers 631 could also exist.

Figure 27:
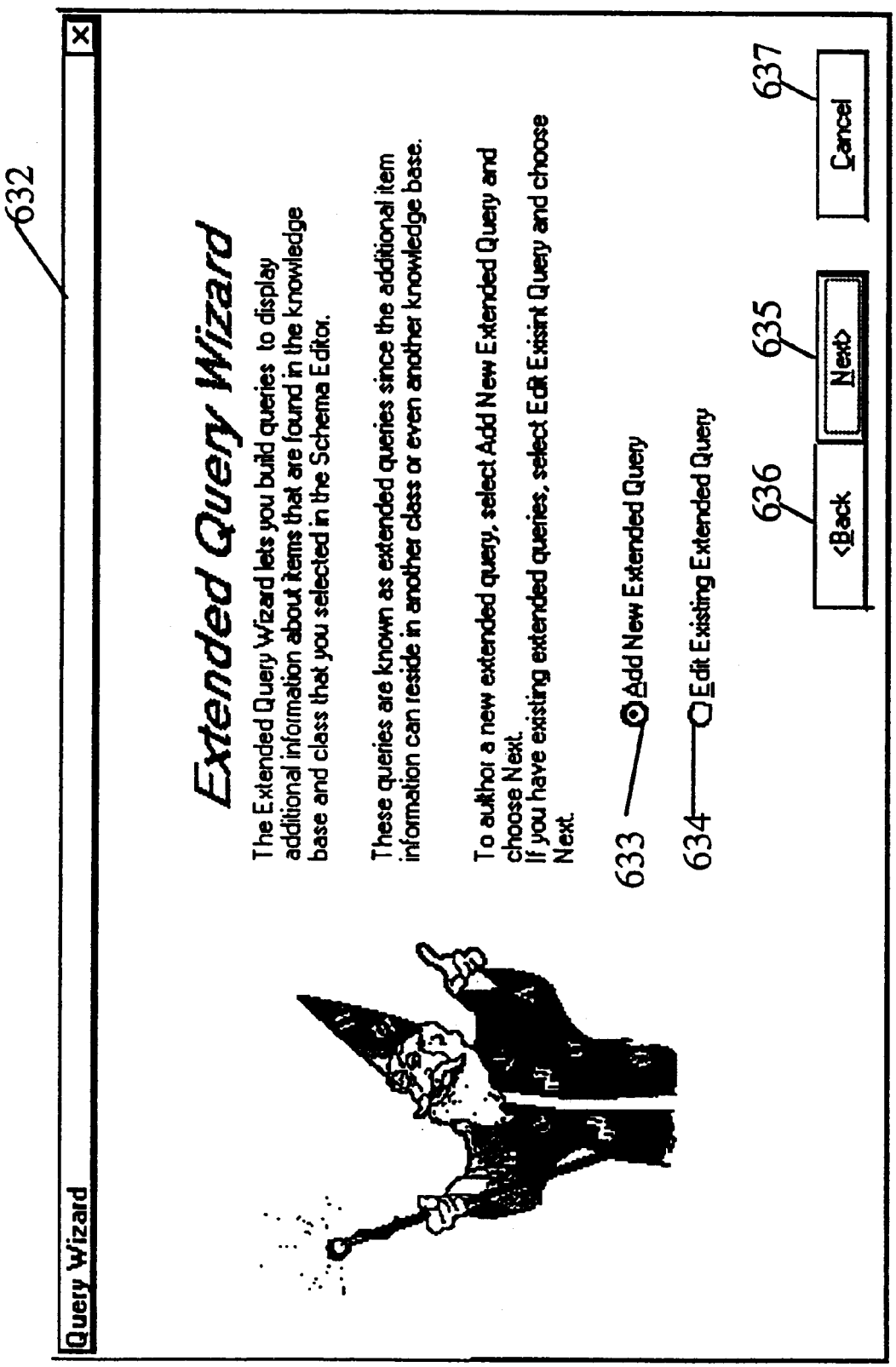
FIG. 27 is an example of a screen display for an extended query wizard.

An extended query wizard method is preferably used for construction of extended queries. The extended query wizard may be better understood with reference to FIG. 27. An extended query wizard window 632 is displayed on the user's display 119. The user has the option of adding a new extended query 633 or editing an existing extended query 634. In the illustrated example, the user selects the desired option by clicking on a button 633 or 634. The user may cancel the operation by clicking on a cancel button 637. To proceed, the user clicks on a "next" button 635. A user is also presented with an option of going "back" 636, which button 636 is greyed if it is not available in a particular context.

Figure 28:
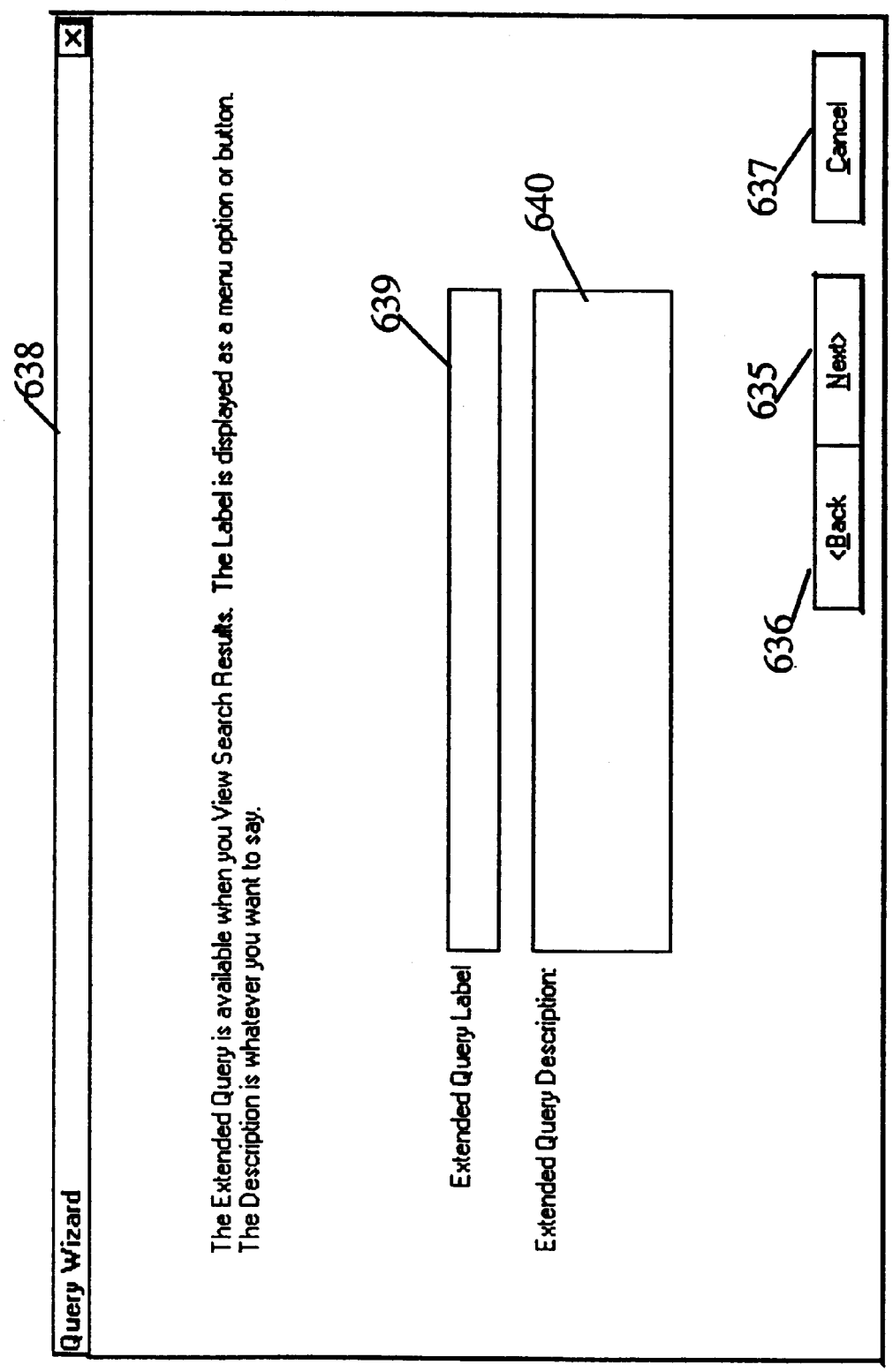
FIG. 28 is an example of a screen display for an extended query wizard.

FIG. 28 shows the next window 638 presented to the user. The user is allowed to label each instance of an extended query, and a label input field 639 is provided in a window. This label 639 may enable the user to find the extended query at a later time, and the user can give the extended query a label that is meaningful to the user. The label 639 need not be unique. Extended queries are identified externally by system generated handles. Like attribute names, extended query labels are not required. Extended quries are inherited from the class where the extended query is defined, similar to the way that attributes are inhierited. The user may also enter a detailed description of the extended query in an extended query description field 640.

Figure 29:
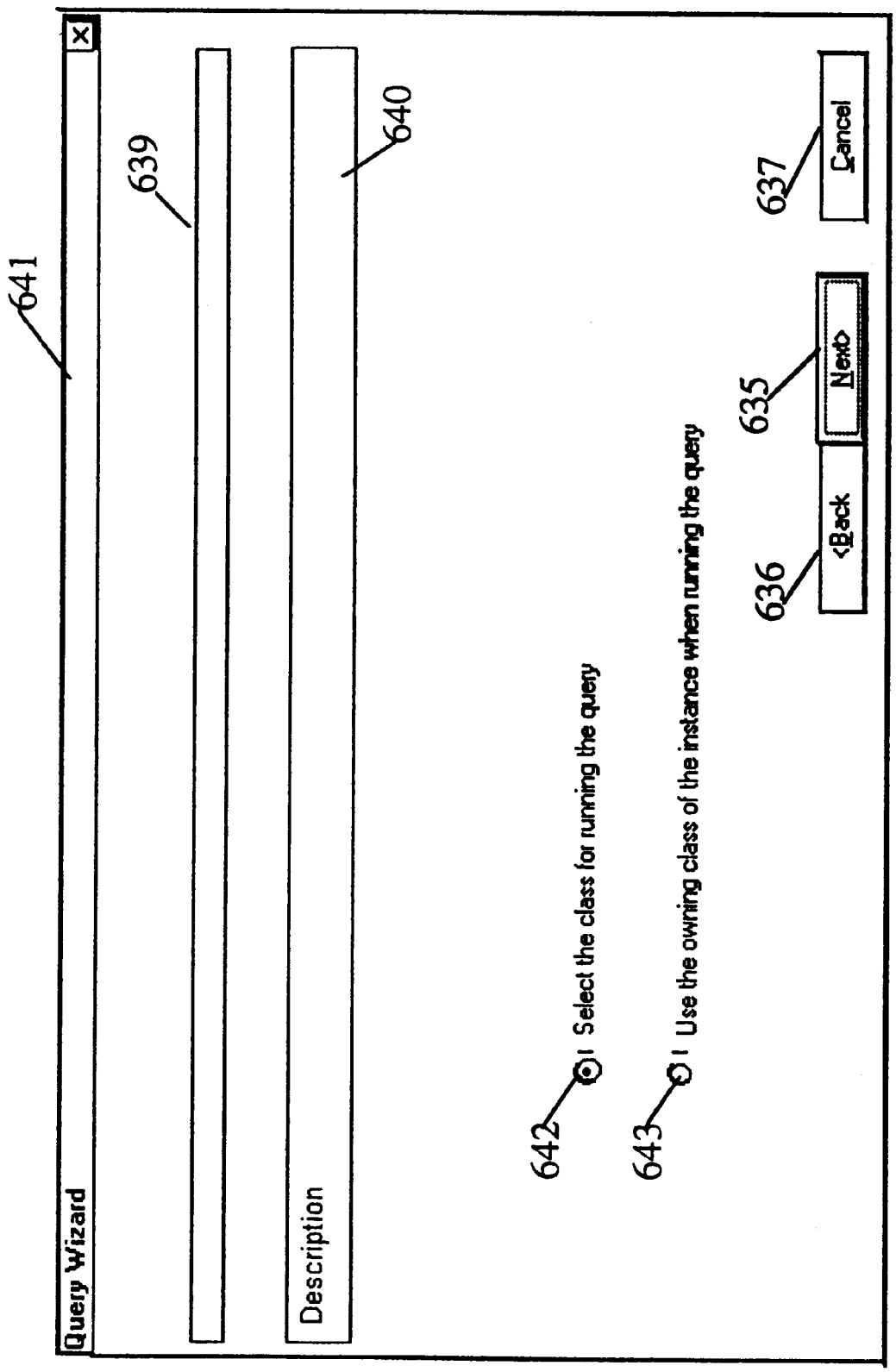
FIG. 29 is an example of a screen display for an extended query wizard.

FIG. 29 shows the next window 641 displayed to the user when the user clicks the "next" button 635. The label 639, and the description 640, entered by the user are displayed. The user is presented with an option of selecting the desired class for running the query 642, or to use the owning class of the instance when running the query 643. This selection is preferably made by clicking on radio buttons 642 or 643, as shown.

Figure 30:
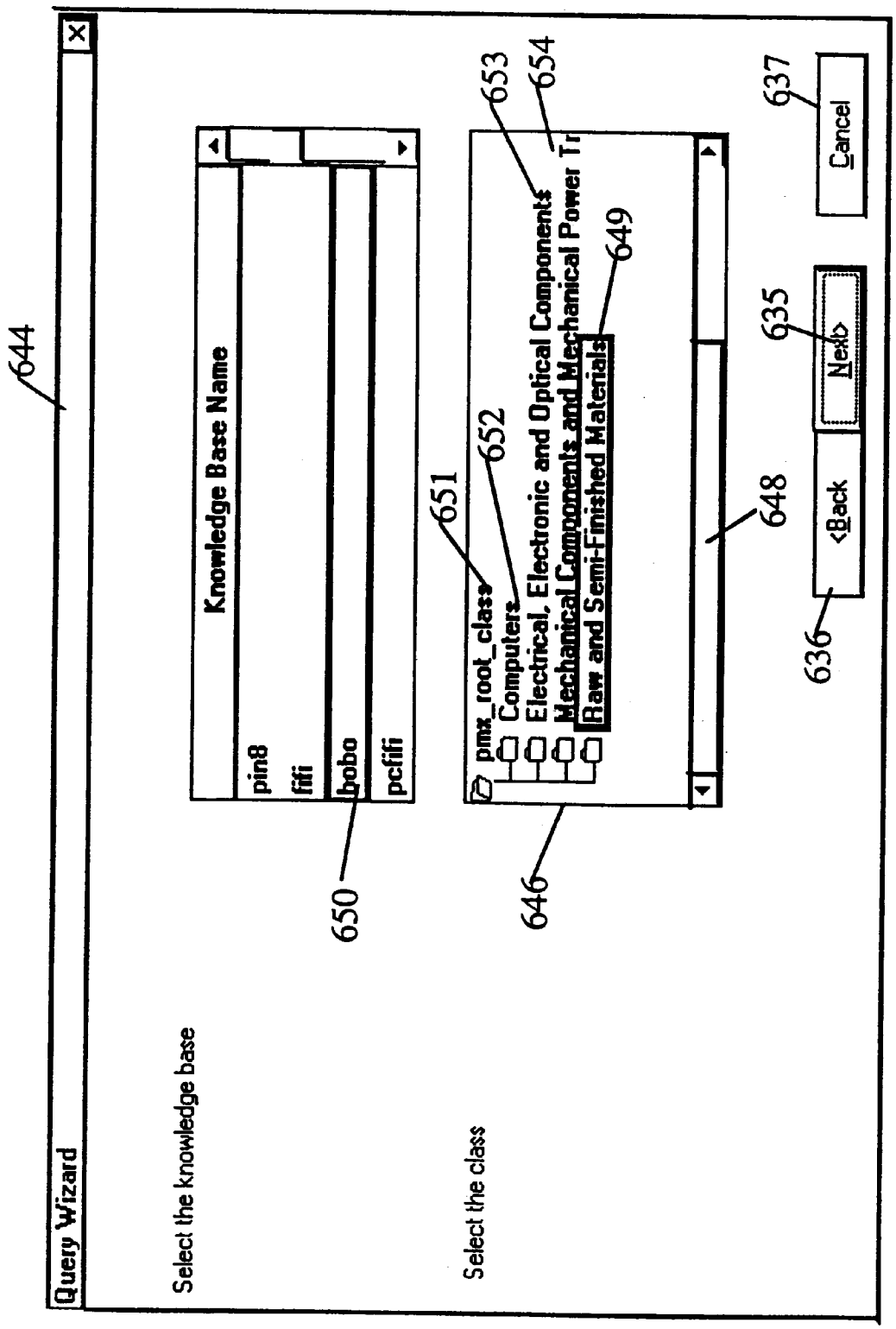
FIG. 30 is an example of a screen display for an extended query wizard.

If the user selects the option of selecting the class for running the query 642, and clicks on the "next" button 635, the window 644 shown in FIG. 30 is displayed. In order to allow the user to perform extended queries linking a plurality of knowledge bases, the user is presented with a knowledge base selection window 645, where the user selects from among the available knowledge bases by clicking or highlighting the desired knowledge base 650. If the number of knowledge bases that are available exceed the number that may be displayed at one time in the knowledge base selection window 645, a scroll bar 647 is provided to enable the user to view all of the available knowledge bases.

A class selection window 646 is provided that displays available classes in the selected knowledge base 650. Only opened classes 651 and subclasses 652, 653, 654 and 649 of opened classes 651 will be displayed. A user may open each displayed class by double-clicking on the class 649, in order to navigate the class hierarchy to reach the desired class 649. A scroll bar 648 is provided to allow the user to view long class names 654 that exceed the size of the class selection window 646. When the user clicks on the "next" button 635, a window 655 shown in FIG. 31 will be displayed.

Figure 31:
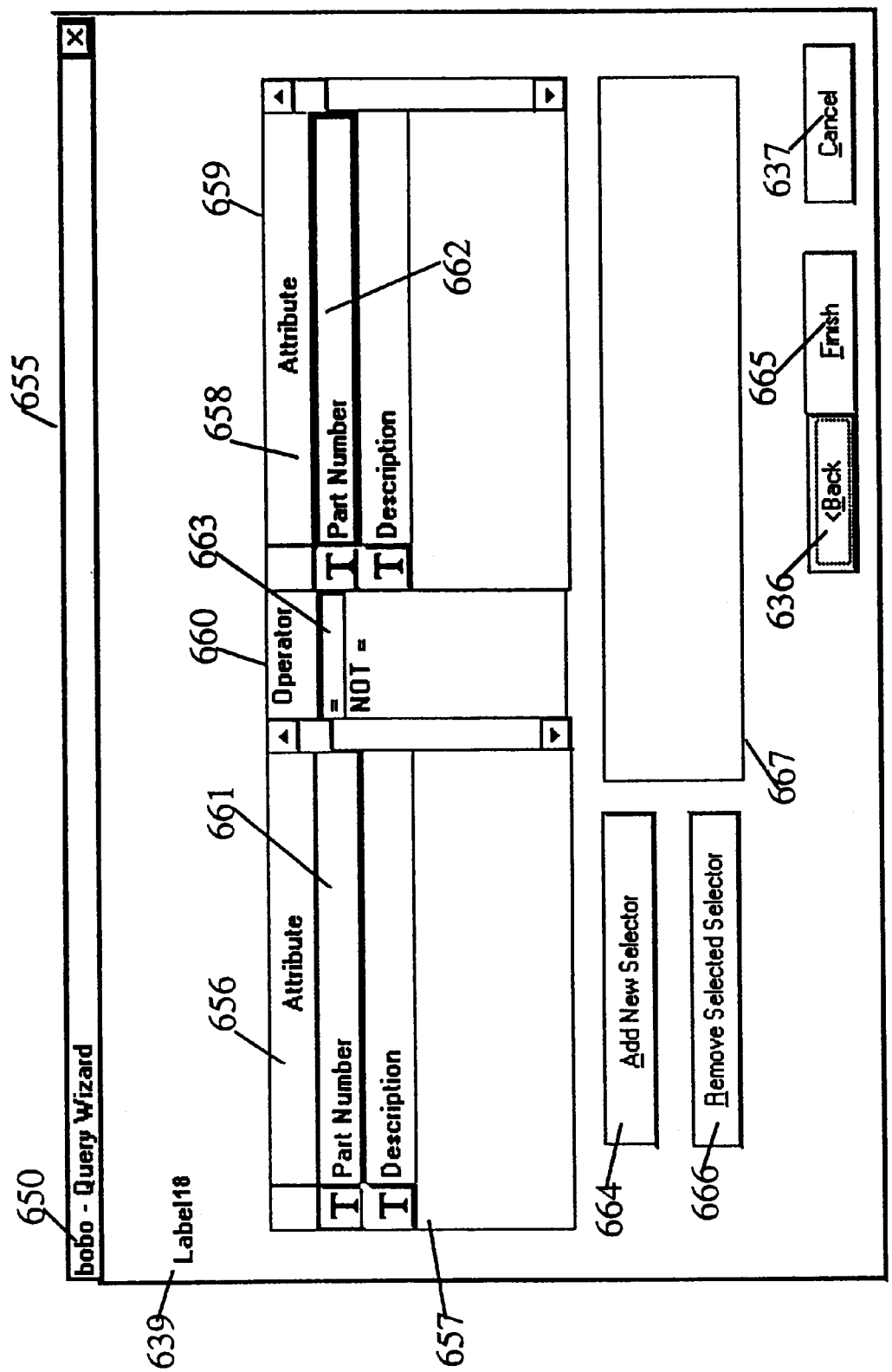
FIG. 31 is an example of a screen display for an extended query wizard.

FIG. 31 shows a query construction window 655. The selected knowledge base 650 and label for this extended query 639 are preferably displayed for the user's reference. The attributes 656 to be used in the extended query are displayed in a first attribute display window 657. The attributes 658 to be mapped in the extended query are displayed in a second attribute display window 659.

The operators or selectors that are selected to be used for mapping in the extended query are displayed in an operator display window 660. The user adds a new operator or selector by clicking on an "add new selector" button 664. The user may be presented with a list of available operators in an operator or selector display window 667, or alternatively, the user may type in a desired selector. If a user wants to edit or modify an extended query, the user may select an operator 663, and then click on a "remove selected selector" button 666 to remove the selected operator 663.

A user may construct an extended query by selecting an attribute 661 in the first attribute display window 657. The user then selects an attribute 662 in the second attribute display window 659. The logical operators to be used in the query are selected, and displayed in the operator display window 660. When the extended query has been built, the user completes the process by clicking on a "finish" button 665.

Figure 50:
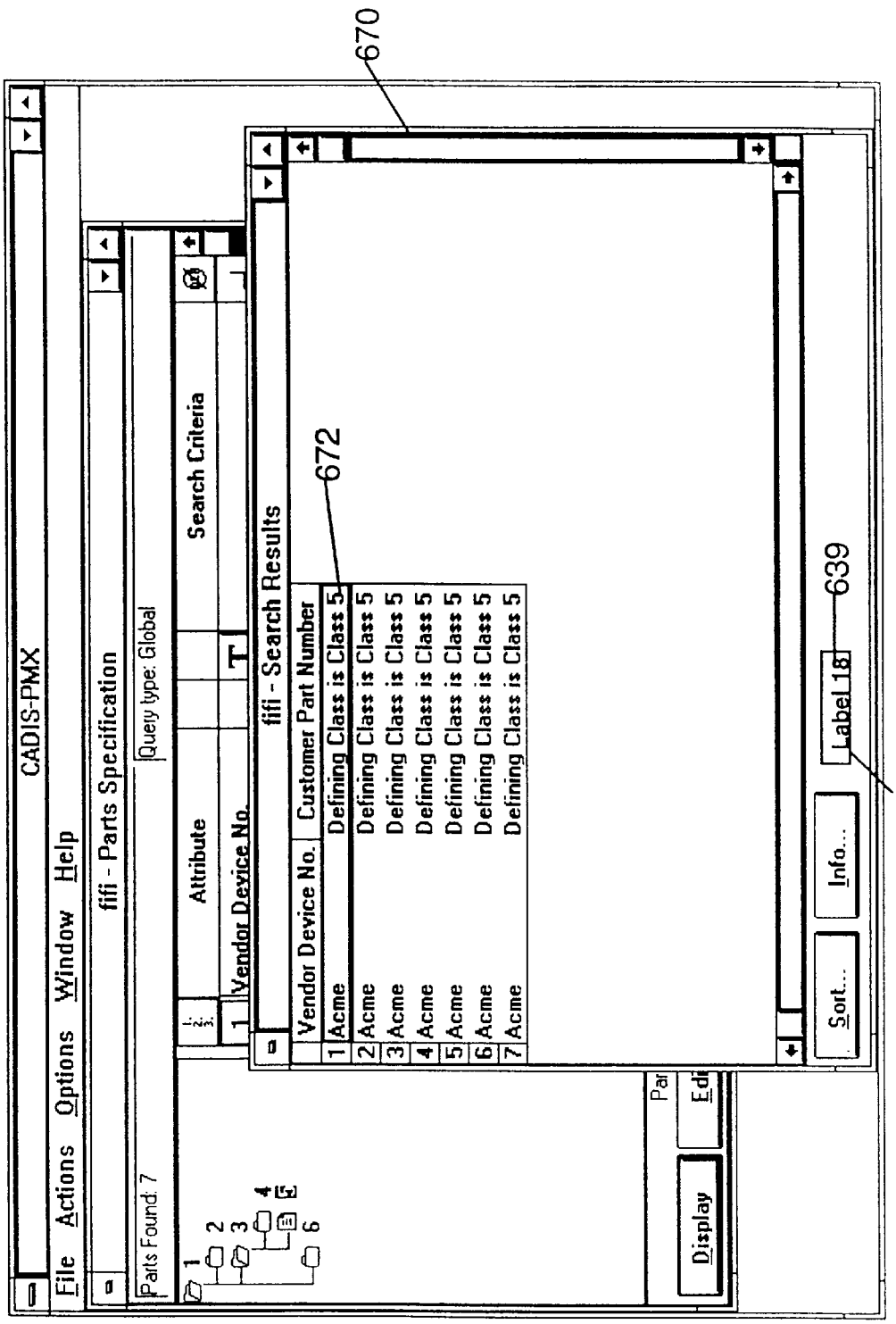
FIG. 50 illustrates a screen display for an embodiment showing an example of a search results window.

For example, a user who is performing queries on a first knowledge base 601 obtains search results that provide a vendor part number 624, and the user wishes to perform an extended query linking a second knowledge base 602 to obtain vendor information relating to that part number 624. The user may select the part number attribute 661 in the first attribute display window 657, select part number in the second attribute display window 659, and select the operator to be "equals" 663. Then, when the user performs a query in the first knowledge base 601, and selects view search results, the user would be presented with a search results window 670, an example of which is shown in FIG. 50. A button 671 or other graphical selection mechanism (or a menu) may be displayed to the user, which is identified with the user specified label 639. By clicking on the button 671, the user will then be able to view the associated information for a corresponding selected part 672 in the vendor knowledge base 602 based upon the extended query.

As noted above, a class 649 may be mapped to itself, if desired. Referring to FIG. 31, an extended query may be built to determine replacement, upgrade, and/or downgrade parts. For example, to be a replacement, an attribute such as the number of pins may be selected, and an operator selected so that this parameter must be equal for another instance to qualify as a replacement part. A parameter such as breakdown voltage may be selected and set so that this parameter must be greater than or equal to the selected attribute in the first attribute display window 657 in order for another instance to qualify as a replacement part. An attribute such as slew rate may be selected to be less than or equal in order for another instance to qualify as a replacement part.

As another example, the selected class 649 may be a carbon resistor subclass for a parent class of resistors. Instances in the resistor class may have a tolerance attribute that is an enumerated attribute having possible values of 10%, 5%, or 1%. The selected class 649 for the initial query is the subclass of carbon resistors that have a corresponding tolerance attribute in the first attribute display window of 10%. The user may be interested in building an extended query that would include not only carbon resistors, but also metal film resistors and others, to consider upgrade parts if the price and availability information for such upgrade parts are acceptable. To be an upgrade, the enumerated values of 5% and 1% could be selected in the second attribute display window 659 for the tolerance attribute.

In FIGS. 27–31, a user's input may also be via a keyboard 121. For example, in FIG. 27 the radio button 633 includes an associated label "Add New Extended Query." The initial "A" is underlined to indicate to the user that the associated option 633 may be selected via the keyboard 121 by pressing the ALT-A keys. Optional keyboard input may be accomplished by highlighting the currently selected option, cycling through available options in response to the Tab key, and interpreting a Space-Bar input as a "mouse click." Those skilled in the art will appreciate that optional keyboard input may be facilitated in a number of ways, but preferably in a manner that is consistent with a Windows interface so that experienced Windows users may immediately recognize how to use the keyboard 121 for input.

Configurable Graphical Action Bar

A unique feature of a user interface in accordance with a preferred embodiment of the present invention includes what may be referred to as a "configurable graphical action bar." The configurable graphical action bar is available for use by a searcher to more conveniently utilize extended queries, or display the results of an extended query based upon the current search results.

Extended queries are given a textual name 639 (see FIG. 29) and an optional graphic file for presentation to the user. The present invention takes this information and builds an action bar at the bottom of each view results screen. Thus, it becomes a configurable, class-dependent query that is presented to the user at the level of the classification hierarchy that is appropriate. The action bar also contains extended queries appropriate for the current class. In addition, the action bar contains default actions for "close", "page next 10", "page previous 10", "sort", and "item information" (abbreviated as "item info."). In a preferred embodiment, these items always appear on the configurable graphical action bar.

A user then selects the appropriate action from the bar. The system performs the extended query and displays the results in a new window. The current instance information is displayed followed by the extended query information. Another action bar appears at the bottom of this display which contains additional, possible extended queries. This action bar contains default actions for "close", "page next 10", "page previous 10", and "item info." These default actions preferably always appear on a configurable graphical action bar.

1. Authoring Component (URL Wizard)

One feature of the present invention provides a process or mechanism for building parameterized URLs based on the current class. The authoring of such URLs allows the formation of complex URLs from templates that are filled in with knowledge base information from a currently selected instance. The parameterized URLs are given a textual name or label and an optional graphic file that may be used, for example, to display an icon for presentation to the user on the user's display 116.

Figure 32:
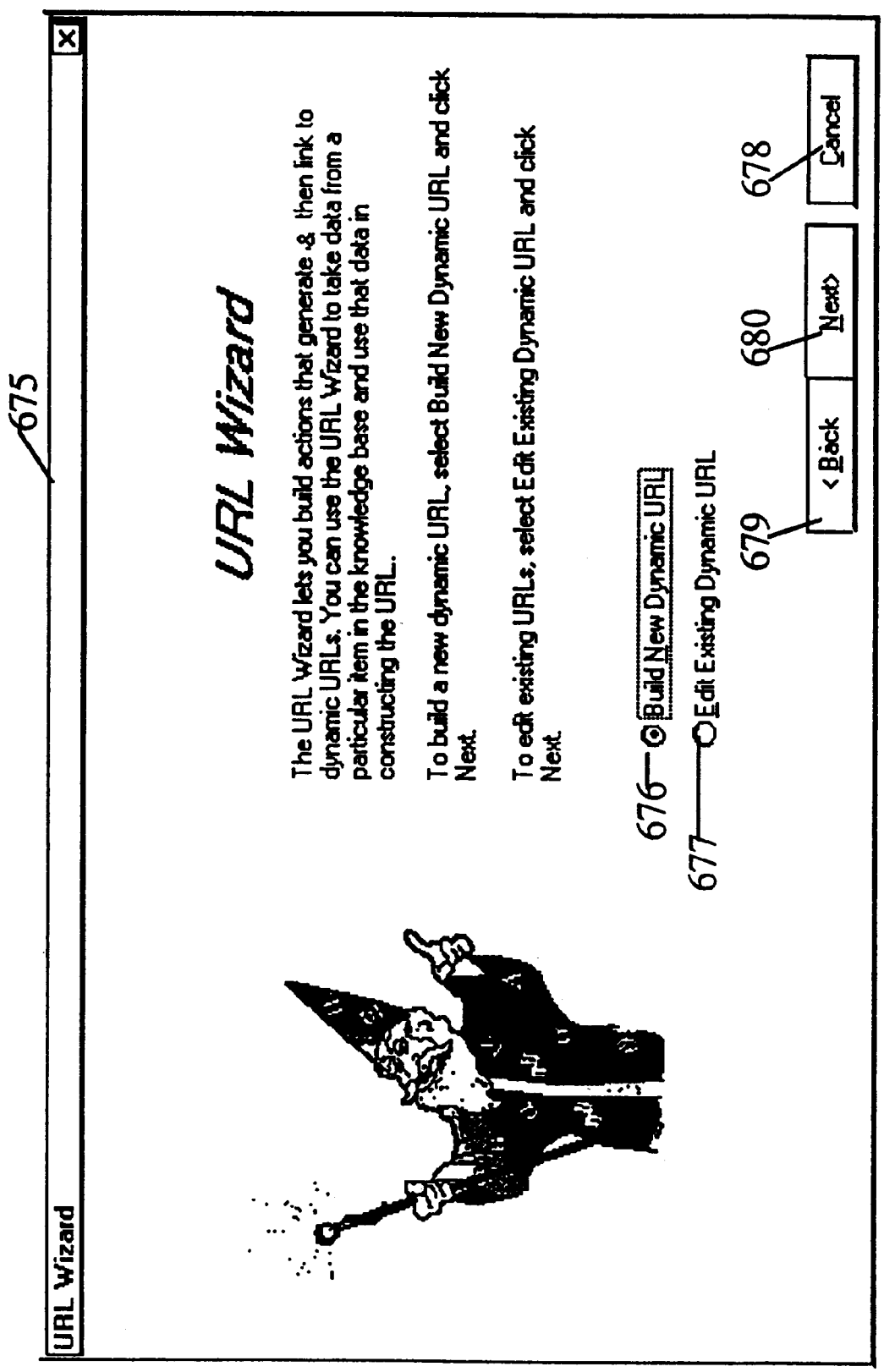
FIG. 32 is an example of a screen display for a URL wizard.

Parameterized uniform resource locators or dynamic URL links are preferably built using a URL wizard process. The URL wizard process may be explained in connection with FIG. 32. FIG. 32 shows an example of a screen displayed when the URL wizard process is initiated. A URL wizard window 675 is opened, and the user is presented with the option of building a new dynamic URL 676, or editing an existing dynamic URL 677. The user selects the desired option 676 or 677 by clicking on the associated button 676 or 677 with the user's mouse 117.

If the user decides to cancel the URL wizard process, the user may do so by clicking on a "cancel" button 678. After the user has indicated the desired option 676 or 677, or the user decides to accept the default option, which is preferably the option of building a new parameterized URL 676, the user proceeds to the next step in the URL wizard process by clicking on a "next" button 680.

A "back" button 679 is provided for allowing the user to go back to the immediately previous screen. In the case of a first URL wizard window 675, the back button 679 may be greyed to indicate that it is not currently operational or does not apply to this window 675. Optionally, in an executable content client 5121, the "back" button 679 may be operational in the first URL wizard window 675 to go back to the previous screen, and have the same effect as a cancel button 678.

Figure 33:
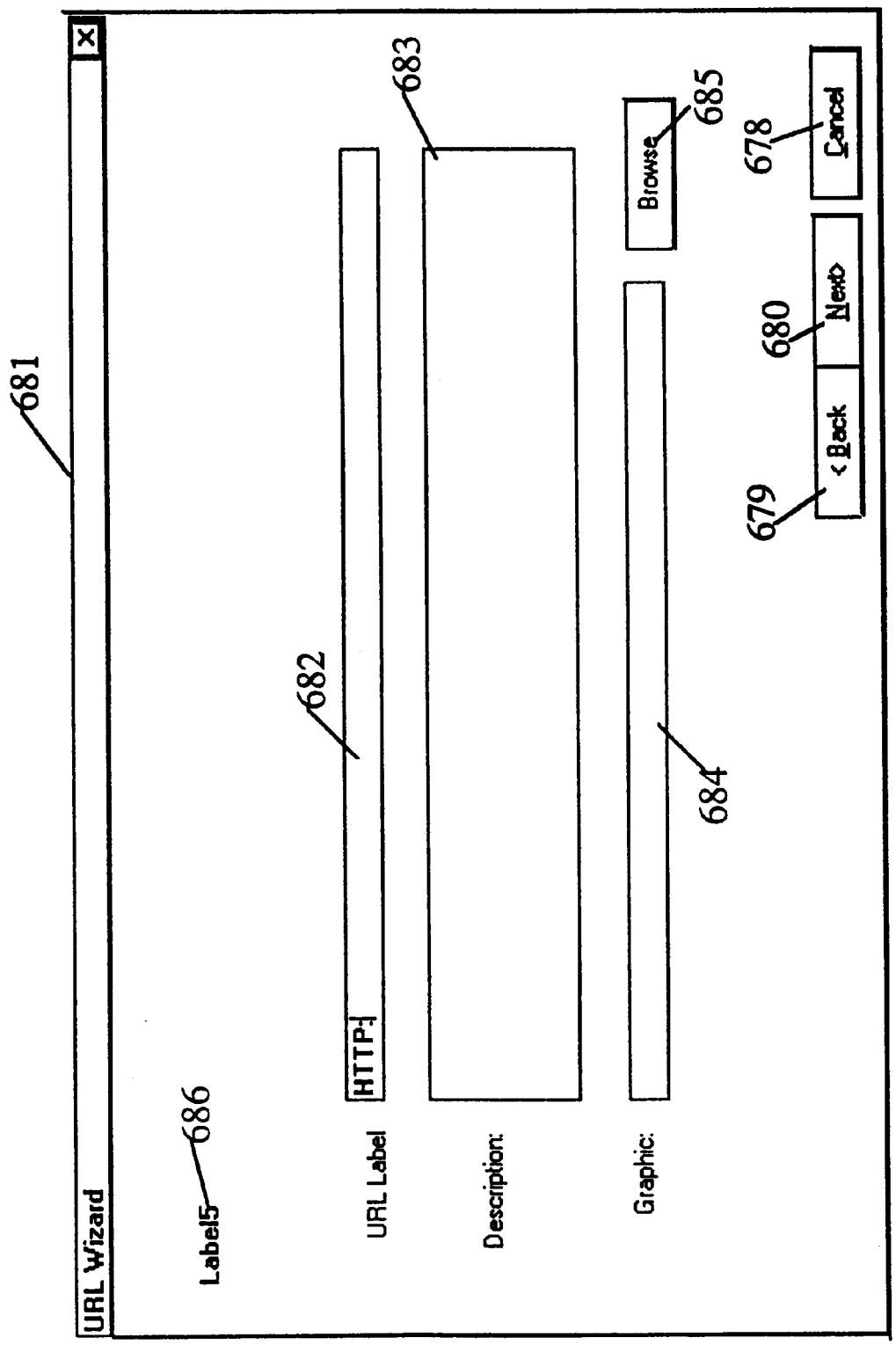
FIG. 33 is an example of a screen display for a URL wizard.

If the user clicks the "next" button 680 in FIG. 32, the URL wizard process opens a URL label window 681, as shown in FIG. 33. Referring to FIG. 33, a first field 682 is provided for entering a label 686 for the dynamic URL that is being built. A second field 683 is provided for the entry of a description of the dynamic URL that is being built. A third field 684 is provided to allow the user to specify a path to an optional graphic file to be displayed by the executable content client 5121 as an icon to click on to invoke the dynamic URL that is being built. A "browse" button 685 is also provided. The user may click the "browse" button 685, and browse directory folders to locate a desired graphic file. Once the desired file is located in this manner, if the user clicks on the file name, the directory path information will automatically be entered into the third field 684. When the user has completed entry of this information, the user clicks the "next" button 680. Alternatively, if the "next" button is highlighted, the user may hit the Return or Enter key on his keyboard 122.

Figure 34:
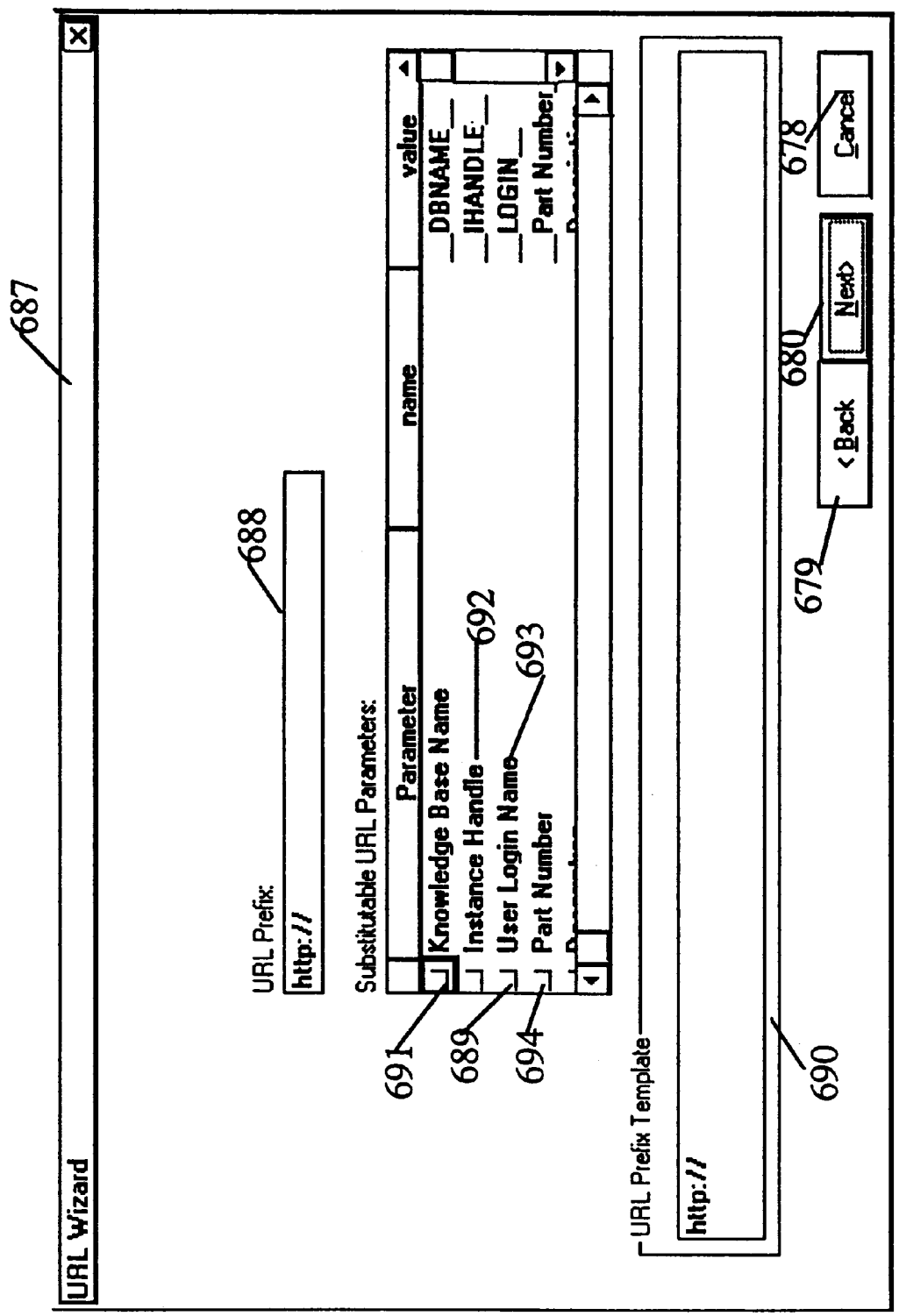
FIG. 34 is an example of a screen display for a URL wizard.

FIG. 34 shows the next window 687 displayed in the URL wizard process. A URL prefix field 688 is provided for entry of basic information concerning the dynamic URL that is being built. The URL information entered in the URL prefix field 688 is the part of the URL being built that is not dynamic.

A substitutable URL parameter window 689 is provided to display the parameters that may be substituted in this parameterized URL. In this example, the knowledge base name 691, instance handle 692, user login name 693, and part number 694 may all be dynamically changed to effectively accomplish extended queries of remotely accessible knowledge bases 4012 over the Internet 5124.

A URL prefix template window 690 is provided to aid in building the dynamic parameterized URL. When the entry of information required in FIG. 34 has been completed, the user may click on the "next" button 680 with his mouse 117.

Figure 35:
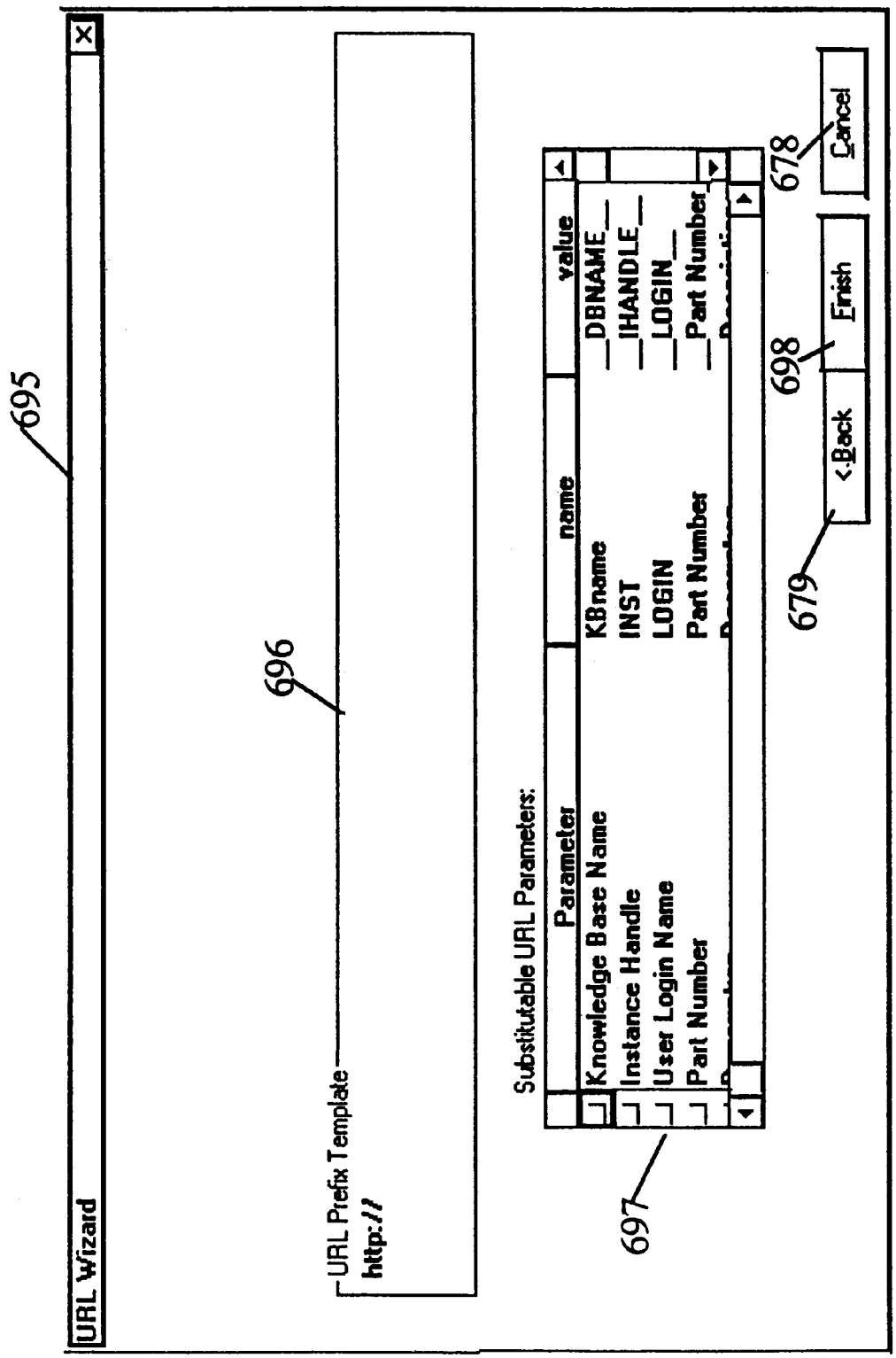
FIG. 35 is an example of a screen display for a URL wizard.

FIG. 35 shows the final window 695 that opens in a preferred URL wizard process. A substitutable URL parameter window 696 is provided to display the parameters that may be substituted in this parameterized URL. A URL prefix template window 697 is also provided. When the process has been completed, the user clicks on a "finish" button 698. The final window 695 closes, and the dynamic URL is built.

2. Krakatoa Configuration Graphical Action Bar

One significant feature of the present invention provides a process or mechanism for using dynamic parameterized URLs with an executable content client 5121. Building such URLs allows the formation of complex URLs from knowledge base data. The parameterized URLs are given a textual name or label and an optional graphic file that may be used, for example, to display an icon for presentation to the user on the user's display 116. FIG. 40 shows an example of a display screen 701 having a configurable graphical action region or bar 700. The dynamic parameterized URL information, including the textual name and associated graphic file, for each dynamic URL is used to build a configurable graphical action bar 700, which is preferably displayed at the bottom of each view results screen 701 displayed by the executable content client 5121. This produces a configurable, class-dependent, dynamic URL represented by a hyperlinked graphic 702 that is presented to the user at the level of the classification hierarchy that is appropriate. The configurable graphical action bar 700 contains dynamic parameterized URLs 702 appropriate for the current class. While described herein as a configurable dynamic action bar 700, the present invention is not necessarily limited to a "bar" configuration. The configurable dynamic action region 700 may be represented graphically in shapes other than a "bar." The configurable graphical action bar 700 may also include extended queries 707 appropriate for the current class. The configurable graphical action bar 700 preferably includes default actions 703, 704, 705 and 706 for "close" 703, display a page for the "next 10" 704 (if 10 items remain to be displayed, otherwise "next n" where "n" is the number remaining to be displayed and 0<n<10), display a page for the "previous 10" (if applicable), "sort" 705, and item "info" 706, and in a preferred embodiment, these always appear on the configurable graphical action bar 700 (if applicable). An action button for "previous 10" is not shown in FIG. 40, because it is not applicable in the illustrated example.

The example illustrated in FIG. 40 is a screen display showing the search results of a knowledge base for major league baseball. The illustrated screen display shows search results of a search for American League teams. The search returned fourteen teams. The screen displays that appeared during navigation of the knowledge base and search are not shown, this example being selected for the purpose of illustrating the configurable graphical action bar 700. In a preferred embodiment, ten items are displayed per page 701, leaving four teams that are not currently displayed. Thus, action button 704 is configured in this example to display information for the remaining four teams not currently shown. If the user clicks on the action button 704 with his mouse 117, a similar window would be displayed for the remaining four teams of the American League.

Each item in this example is an instance, and each instance has attributes such as team name 711, number of wins 712, number of losses 713, and batting average 708.

The "sort" action button 705 offers the user options for the order in which the items (in this example, American League baseball teams) are displayed that were returned in the search. The user could click on the sort action button 705, and select a sort according to batting average 708. The order in which the teams would be displayed would then change to their rank in team batting average 708. In this example, the Cleveland Indians (abbreviated "CLE") 709 would appear at the top of the displayed page 701.

Each instance shown in FIG. 40 has a radio button 714, 715, 710 associated with it. The user can select an instance (such as the California Angels) by clicking on the radio button 710 associated with it. The Cleveland Indians 709 would be selected by clicking on the radio button 715 associated with that instance. In the example depicted in FIG. 40, the California Angels instance 710 has been selected, as shown by the appearance of a dot inside the radio button 710. The radio buttons 714, 715, 710 are used to dynamically configure the dynamic parameterized URL action button 702. The action taken by the system when the action button 702 is actuated depends upon which radio button 714, 715, 710 is selected. The action button 702 is dynamic because it is configured based upon the radio button 714, 715, 710 that is selected.

When the action button 702 is actuated by clicking on it, a remote procedure call to the Krakatoa knowledge base server is generated by the executable content client 5121 as described above with reference to FIGS. 1–5 and FIGS. 9–18. The parameters passed via a CGI mechanism depend upon the radio button 714, 715, 710 that is selected by the user.

Figure 41:
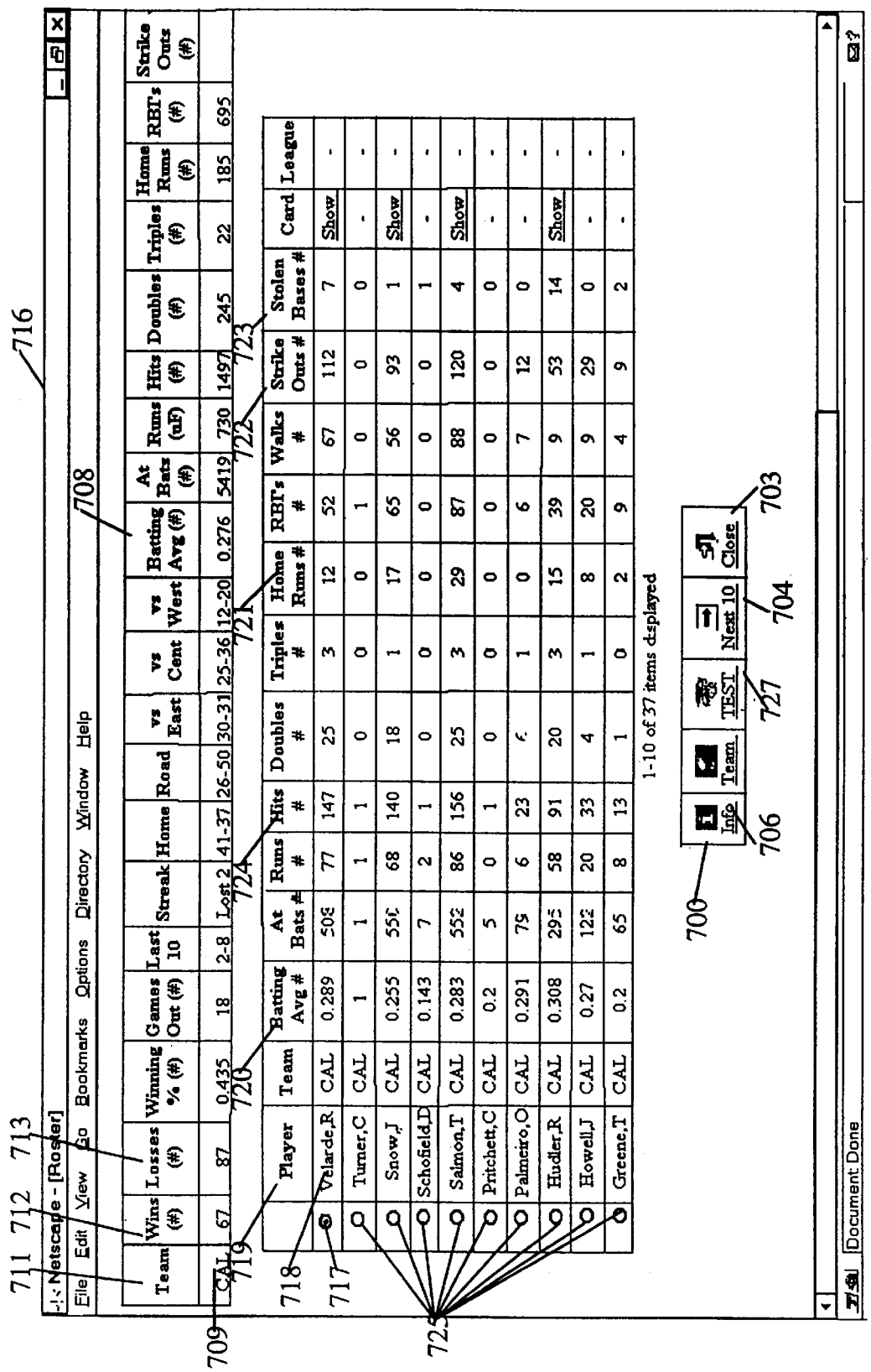
FIG. 41 is an example of a screen display generated by an executable content retriever client showing a configurable dynamic action bar.

Referring to FIG. 40, the dynamic action button 702 will cause the roster information to be retrieved and displayed for the team that is selected 710. In the illustrated example, the selected radio button 710 shows that the Cleveland Indians 709 has been selected, and if the user clicks on the dynamic configurable action button 702, roster information for the Cleveland Indians will be retrieved. A display window 716 will be opened and displayed as shown in FIG. 41. The window 716 depicts at the top of the page the information for the Cleveland Indians instance 709 from which this parameterized URL remote procedure call originated.

In the window 716 displayed in FIG. 41, each instance corresponds to a player 719. Each instance has attributes, such as individual batting average 720, number of home runs 721, number of strike outs 722, number of stolen bases 723, hits 724, and so forth. The window 716 includes a configurable graphical action bar 700. The configurable graphical action bar 700 shown in FIG. 41 includes an "info" action button 706, a "team" action button 726, a "test" action button 727, a "next 10" action button 704, and a "close" button 703. The "next 10" action button 704, when actuated by clicking on it, results in the display of the next ten players for the California Angels 709. The "close" action button 703 will result in closing this window 716 when it is actuated.

Each instance has an associated radio button 725, 717. The user may select an instance 718 by clicking on the associated radio button 717. In the illustrated example, the player "Velarde, R." has been selected. The selected radio button 717 is used to dynamically configure parameterized URLs for the "info" action button 706.

When the "info" action button 706 is clicked, it results in the display of an information window for the selected instance or player. A web page displaying information for the player Randy Velarde may be retrieved by the executable content client 5121 and displayed in the information window. In this example, the information window may be the display of an HTML document, including text and graphics.

Figure 36:
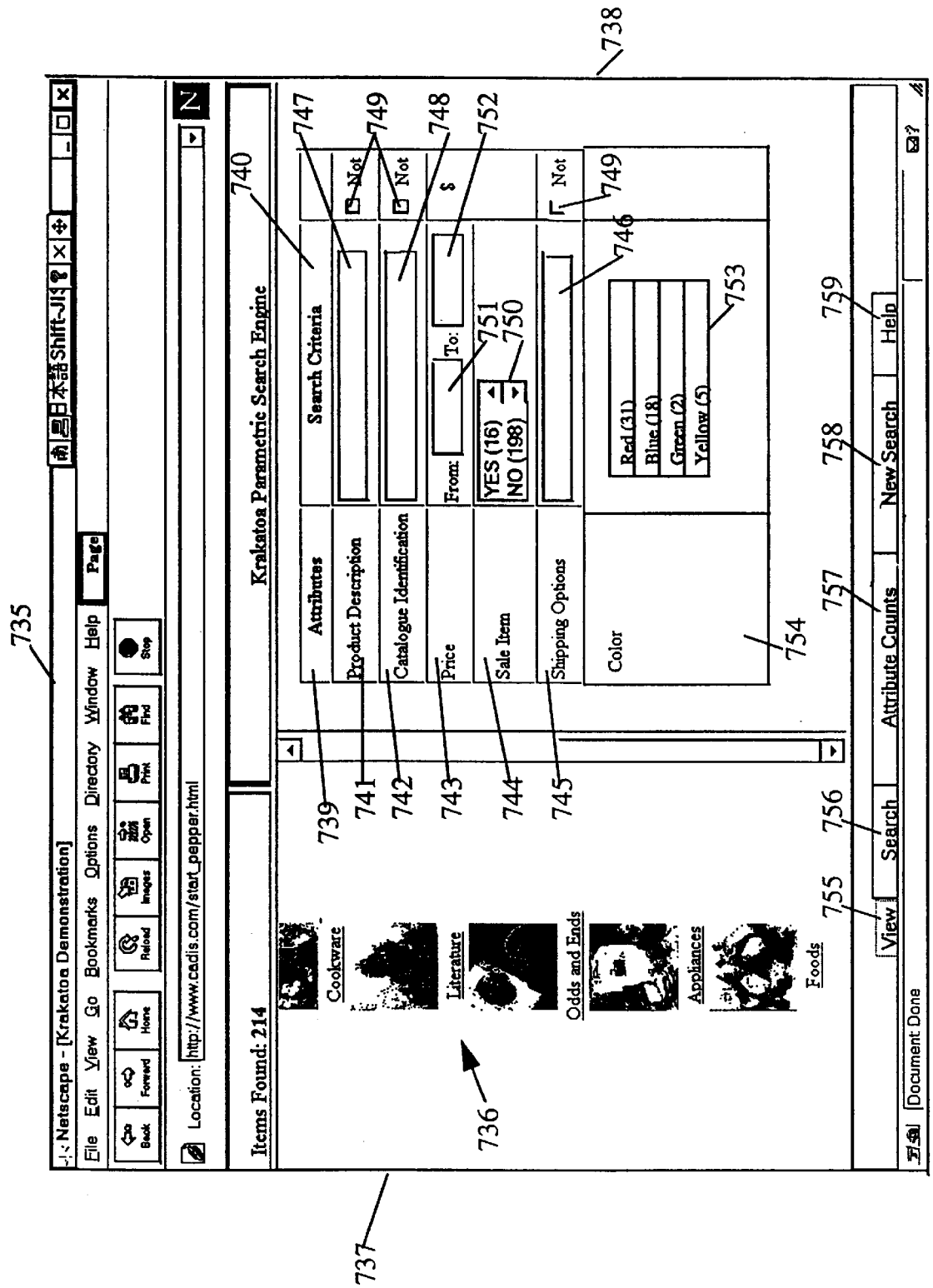
FIG. 36 is an example of a screen display generated by an executable content retriever client showing guardrails.

FIG. 36 shows an example of a display window 735 of an executable content retriever 5121 for performing parametric searches of a remote knowledge base 4012. This shows a version of a display that includes a first frame 737 depicting a graphical representation 736 of classes of a knowledge base 4012. A second frame 738 displays attributes 739, such as "product description" 741, "catalogue identification" 742, "price" 743, "sale item" 744, "shipping options" 745 and "color" 754. The second frame 738 also displays search criteria 740 for the attributes 739. Entry fields 747, 748 and 746 provide for the specification of search parameters for the attributes 739. Check boxes 749 allow the user to negate the specified attribute parameters 747, 748 and 746, which make it possible, for example, for a user to specify a search for instances that do not have certain shipping options 745.

A first range field 751 and a second range field 752 allow search criteria to locate instances having an attribute 739 such as price 743 that falls within a range.

A unique feature shown in FIG. 36 is a guardrails display 750. Guardrails 753 are also shown for the color attribute 754. Guardrails 750 and 754 are described in more detail below.

The display window 735 shown in FIG. 36 also includes a "view" button 755, a "search" button 756, an "attribute counts" button 757, a "new search" button 758 and a "help" button 759. Actuating the "search" button 756 by clicking on it will cause the search criteria 740 entered by the user to be packaged as parameters into a remote procedure call to a Krakatoa knowledge base server, which performs the requested call and returns query results to the executable content client retriever 5121.

Figure 37:
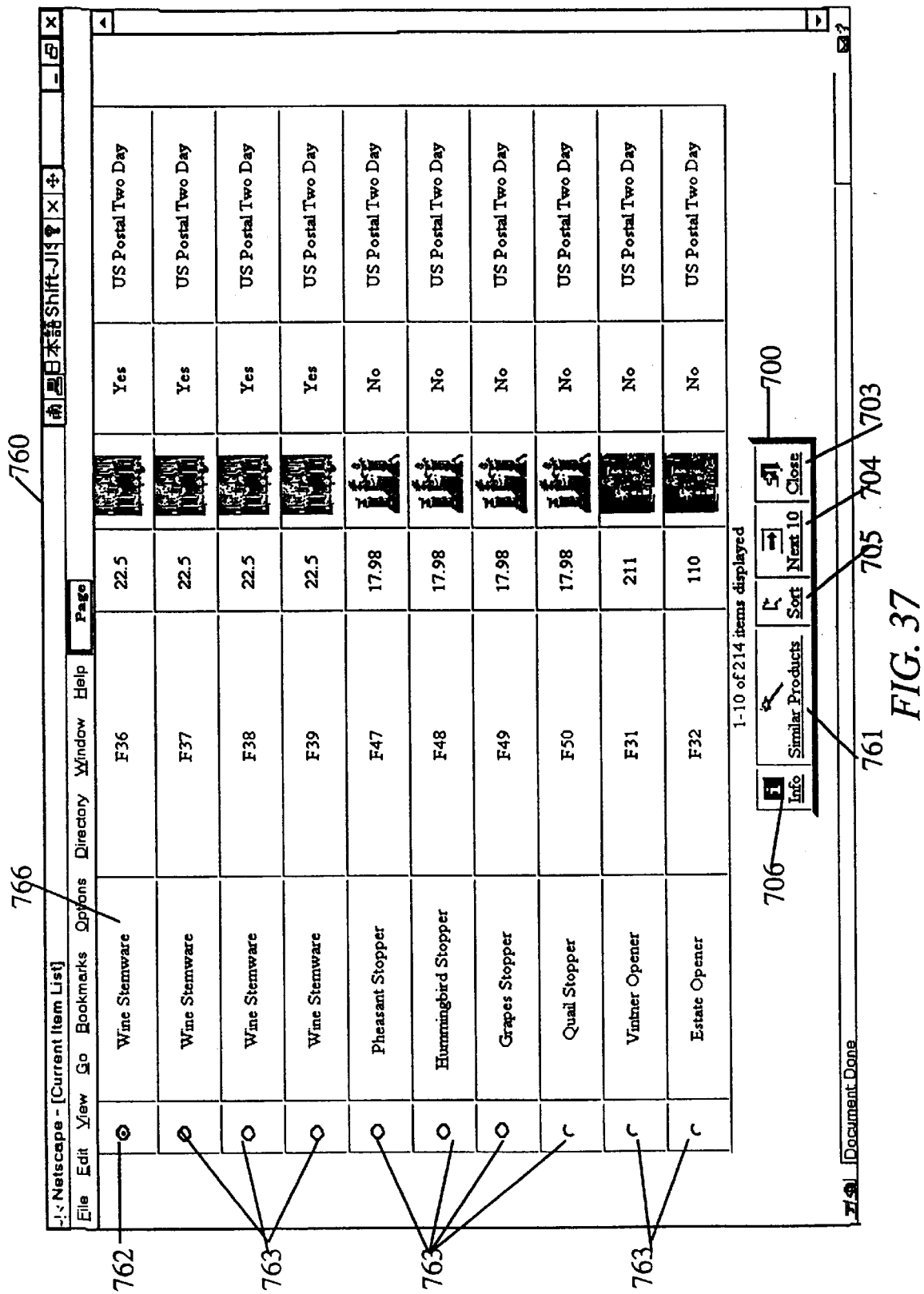
FIG. 37 is an example of a screen display generated by an executable content retriever client showing a configurable dynamic action bar.

Clicking on the "view" button 755 results in the display of a search results window 760 shown in FIG. 37, based upon the user specified search criteria 740. Instances have associated radio buttons 763, 762 to permit an instance 766 to be selected by clicking on the radio button 763, 762 associated with the desired instance 766. In the illustrated example, the radio button 762 has been selected.

Figure 38:
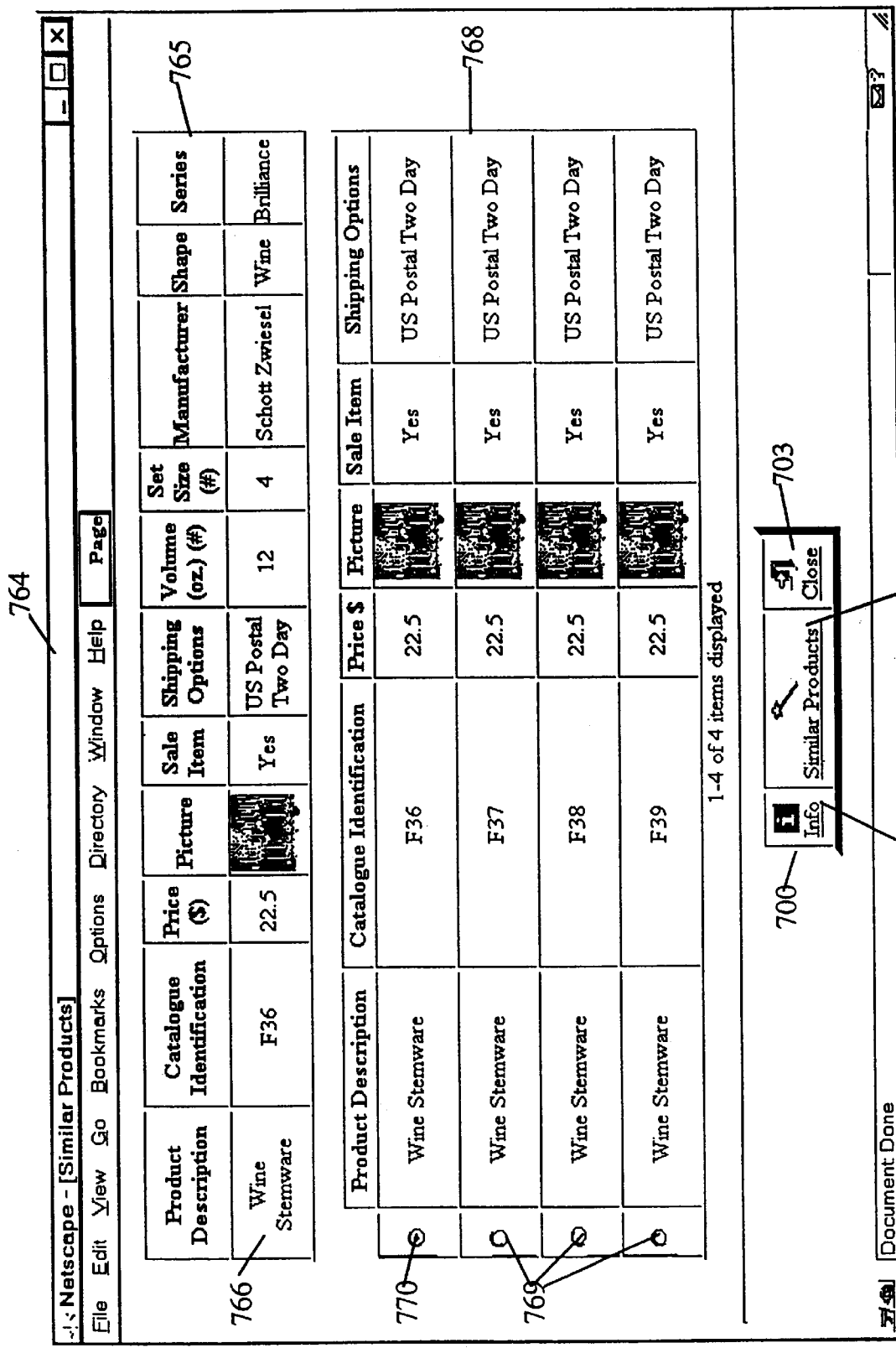
FIG. 38 is an example of a screen display generated by an executable content retriever client showing a configurable dynamic action bar.

A configurable graphical action bar 700 is displayed at the bottom of the search results window 760. A dynamic URL or extended query action button 761 is included on the configurable graphical action bar 700. Actuating the action button 761 builds an extended query dynamically based upon the selected instance 762 of "wine stemware" 766 to search for similar "wine stemware" products. FIG. 38 shows the extended query results window 764 that is displayed when the extended query action button 761 is actuated.

In FIG. 38, information 765 is displayed for the "wine stemware" instance 766 that was selected in window 760 and which formed the basis for the displayed extended query results 768. The similar products information 768 includes instances that may be selected using radio buttons 769, 770. The selected instance 770 is used to build a dynamic action button 767 that can cascade an extended query for similar products that are similar to the selected instance 770.

Another example of cascaded extended queries would be an extended query of baseball teams (see FIG. 40) that have won more than 5 World Series championships. Then a cascaded extended query can be performed to bring up player statistics for players who have played in such games, such as, of the pitchers who pitched in those World Series games, which pitcher won the most of those games.

Figure 39:
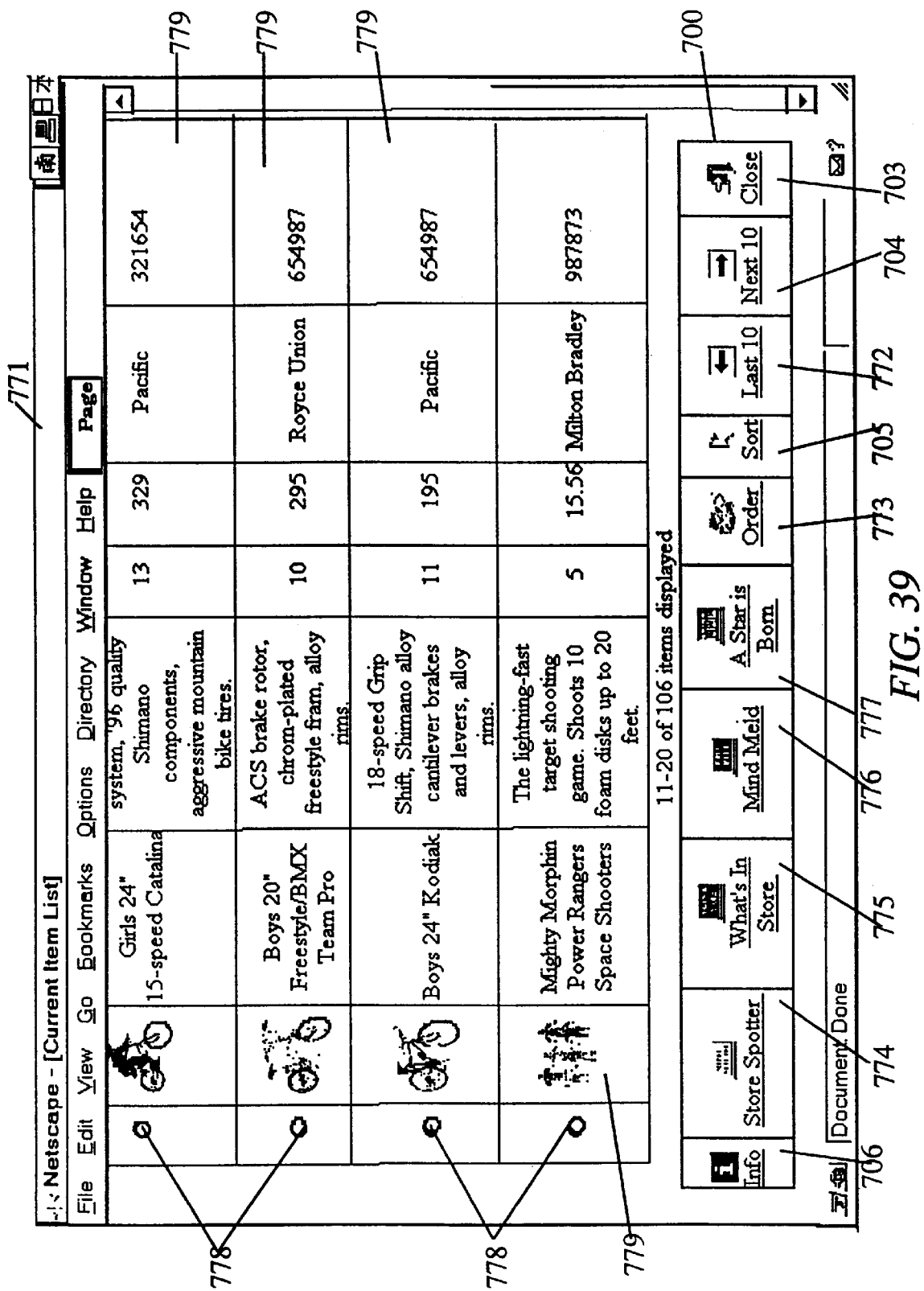
FIG. 39 is an example of a screen display generated by an executable content retriever client showing a configurable dynamic action bar.

FIG. 39 shows another example of a search results window 771. This example shows a configurable graphical action bar 700 having a "previous 10" or "last 10" action button 772. Actuating an "order" action button 773 runs a template for an order system to enable a user to order a desired product over the Internet 5124. The configurable graphical action bar 700 includes parameterized URL action buttons 774, 775, 776 and 777. For example, a particular product may be selected by clicking on its associated radio button 778. Then clicking on the "store spotter" action button 774 will cause an extended query to be performed to find stores that have the selected product in stock.

Figure 43:
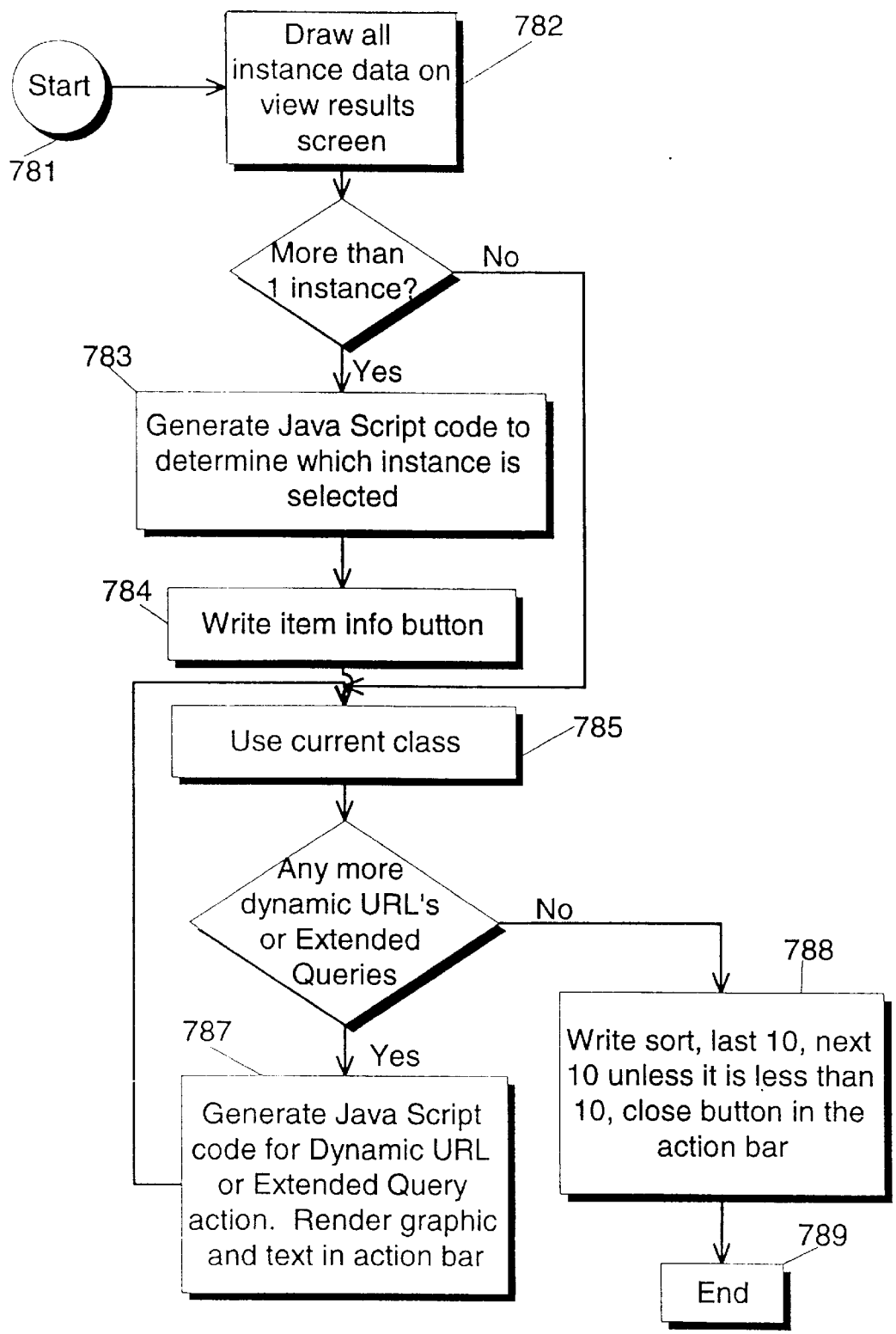
FIG. 43 is a flow chart depicting a process for building a configurable dynamic action bar.

A process for building a configurable dynamic action bar 700 is shown in the flowchart of FIG. 43. The process starts at step 781. In step 782, information for all instances 779 is drawn to a new results screen 771 (such as that shown in FIG. 39). A determination is made as to whether more than one instance exists in this case. If the answer is no, (i.e., only one instance exists), the process proceeds directly to step 784. If more than one instance exists, then the process proceeds to step 783, where JavaScript™ code is generated to determine which instance is selected by the user (by clicking on radio buttons 778). Then the process proceeds to step 784.

In step 784, the "item info" button 706 is drawn. The process proceeds to step 785. In step 785, the selected class is used to build an extended query or dynamic URL (depending upon whether a remote procedure call via a Krakatoa knowledge base server is required). A determination is made as to whether there are any more dynamic URLs or extended queries. If the answer is yes, the process proceeds to step 787, where JavaScript™ code is generated for dynamic URL or extended query execution. The associated graphic and text are rendered in the configurable dynamic action bar 700. The process loops back to step 785.

When it is determined in step 785 that there are no more dynamic URLs or extended queries, the process proceeds to step 788. In step 788, the "sort" button 705, the "last 10" button, the "next 10" button, and the "close" button are written on the configurable dynamic action bar 700. The process ends with step 789.

In a preferred embodiment, the configurable dynamic action bar 700 is implemented by having the executable content client 5121 build special JavaScript™ code and HTML for each possible choice 778. When the user chooses an instance by clicking on a radio button 778, the executable content client 5121 then executes the corresponding JavaScript™ and HTML code for the chosen instance in order to make the remote procedure call.

In summary, a user can select an appropriate query 702 and another window is opened displaying the results for the parameterized URL 702. Parameterized URLs can contain static hypertext markup language (HTML) for connection to a common gateway interface (CGI) mechanism for dynamic HTML generation of other actions. A useful application of this technology for the present invention will be to connect to knowledge base servers 4013 with dynamically generated instance information.

In an alternative embodimant, a CGI tunnel 5129 may be provided having a JavaScript™ class that is a JavaScript™ code generator based upon input from the selected class associated with the selected radio button 778.

3. Server Component

The Krakatoa server 5128 may include a URL string that contains tags for attributes selected in a URL wizard process.

Executable content clients 5121 may make a call to a specialized method that takes the current instance information and fills in these parameters to produce a valid URL query string. This string is appended to a URL authored by the URL wizard process to make a fully qualified, parameterized URL.

Guardrails

Referring to FIG. 20, a user, after navigating to a class 4024, can access all of the attributes 4025 at that class 4024 and use them to further refine his search. When Boolean attributes, enumerated attributes, or enumerated set attributes are selected, the predefined valid values for the attribute are displayed. For example, in FIG. 20, the enumerated attribute "package type" 4039 has been selected, and the predefined valid values are displayed in the dialog window 4041. The user can then select from those values to define search criteria 4095 to further refine his search. For example, the user can select the "ceramic flatpack" 4045 and "cerdip" 4046 package type values to further refine his search to look for components with those type packages, and eliminate components with, for example, "cerquad", "MDIP", "CQJB", "LCC", and "CPGA" type packages.

Guardrails (alternatively referred to as guardrail counts or attribute counts) provide information to the user about how many instances exist in the knowledge base that have each specific predefined possible value for such Boolean attributes, enumerated attributes, or enumerated set attributes. Instead of the display shown in the dialog window 4041 of FIG. 20, a user would see the display of a dialog box that would give, in addition to the possible package type values, an indication beside each package type of how many instances in this class have each possible value. For example, in FIG. 36, the color attribute 754 may be selected, and a dialog box 753 would show, not only the color values that are possible, but also how many instances of each exist. Thus, the user knows immediately, without doing another search, how many instances have each parameter value for the selected attribute. This can lead the user to structure the next search more effectively when selecting additional search criteria 740 by avoiding values that are contained in no or very few instances (thus the concept of "guardrails" as information that keeps the user from "falling off" the knowledge base by searching for something that doesn't exist), as well as provide an indication of the distribution of values for that attribute 754.

Referring to FIG. 36, the guardrails 750 show how many instances correspond to the two possible values of a Boolean "sale item" attribute 744, that is, in this example sixteen product instances are on sale, and one hundred and ninety-eight are not on sale.

Similarly, in FIG. 36, guardrails 753 provide information on how many instances correspond to enumerated values for the color attribute 754. Guardrails 753 show that thirty-one instances have a "red" color attribute, eighteen instances have a "blue" color attribute, two instances have a "green" color attribute, and five instances have a "yellow" color attribute. Guardrails 753 give a searcher some advance information on the likely results of a query, and prevent the searcher from wasting time looking for instances that do not exist, such as performing a search for products that have a color attribute 754 that is "purple."

In accordance with one feature of the present invention, guardrails 750, 753 are preferably used with attributes that have a set of discrete values. The most general of these attributes is an enumerated set, which allows an instance to have multiple parameters each of whose values is from the set of valid enumerators. An enumerated attribute 754 is similar, except an instance can have only one parameter value from the set of enumerators. A Boolean attribute 744 is essentially a simple case of an enumerated attribute, having only two possible "enumerators," true and false. The mechanism for generating guardrail counts 753 works similarly for all three attribute types, with minor variations described below.

Guardrails are evaluated in the context of a specified query. A query is based at a specific class, typically the class that has been navigated to. Only the instances at that class (for a local query) or in the subtree rooted at that class (for a global query) take part in the query.

If the specified query has attribute selectors 740 set, they form the set of search criteria that are applied against the candidate instances. Only those instances that meet the search criteria are considered in the guardrail counts 753. In this manner, each guardrail count 753 represents the number of instances that meet the current query criteria 740 and also have that specific attribute value 753.

When the search criteria 740 are modified, the guardrail counts 753, 750 may need to be updated. Actuating the "attribute counts" button 757 shown in FIG. 36 causes the guardrail counts in the dialog boxes 750 and 753 to be updated when new search criteria 740 have been set.

As will be appreciated from the more detailed description below of the present methods for computing guardrail counts, special attention must be given when applying a specified query if a query selector refers to an attribute that is being guard railed. In that case, the "associated-selector" does not take part in the application of the query for that attribute. This is performed in a preferred method, because a guardrail count is meant to indicate the number of instances that meet the query criteria where each instance has that specific parameter value, and only that value, for that attribute. For example, in FIG. 36, the guardrail count 753 for the color attribute 754 shows a count of thirty-one for the value "red," which is intended to indicate the number of instances that meet the currently set query criteria 740 and which are "red" and not some other color. If an associated-selector did take part in the query, for example, the search criteria included the color attribute 754 as part of the search criteria 740, then a guardrail count would effectively yield the number of instances that met the query criteria and whose parameter value for the guardrailed attribute 754 had both the value specified in the associated-selector and the value being counted. This is not even possible for Boolean and enumerated attributes, since an instance can have only one such attribute value. However, this is possible for enumerated set attributes, in which case the semantics of the guardrails counts becomes quite complex, and the counts become meaningless in most cases.

To obtain guardrail counts, therefore, a query must be specified. In addition, guardrails must be turned "on" for one or more attributes whose guardrails counts are desired. A preferred method for determining guardrail counts will comprise steps where query selectors, if any, are then divided into two sets: those selectors that don't refer to any of the attributes are part of the base query; those selectors that do refer to an attribute are placed in a set of associated selectors.

The base query can be applied to each of the candidate instances. Then, for each guardrailed attribute, a subset of the associated selectors is applied to each instance, where the subset consists of all the selectors except the one, if any, that refers to that attribute. In a preferred method, these steps can be optimized so that selectors are applied to each instance only once even if there are multiple guardrailed attributes.

As an example, suppose that there is a class of items that have the attributes of color, size, and availability. Color is an enumerated attribute, with enumerators of "blue," "red," "yellow," and "green." Size is a numeric attribute. Availability is a Boolean attribute.

In a first example, the specified query has no selectors set, and guardrail counts are desired for color. (In other words, guardrails are turned "on" for the color attribute). The method for determining guardrail counts would include a step in which each item in the class is examined. For each item, its attribute or parameter value, if it exists, for color is found. The number of items with each possible value (for example, "yellow") is incremented each time an item is found having that value. After all items have been examined, these steps will produce separate counts of the number of items having each of the four colors, (as well as a count of the number of items, if any, having no color value indicated in the data available in the knowledge base). Thus, there will be a count of the number of items that are "red." There will be a count of the number of items that are "blue." There will be a count of the number of items that are "green." And there will be a count of the number of items that are "yellow."

In a second example, the specified search attributes for a query set a selector for size, restricting the size to less than ten, and a selector for availability, restricting it to true. Again, in this second example, guardrail counts are desired for color. This time, for each item, the base query, which consists of both selectors (size and availability), is applied first. Only if the item meets those criteria (i.e., the item must have a size that is less than ten and the item must be available), is it then used in the guardrail counts, in the same manner as described above in the first example.

In a third example that is the same as the second example, except that in addition, guardrail counts are desired for "availability," the base query consists of only the "size" selector. In the present method for determining guardrail counts, the "availability" selector is not used to reduce the number of instances that are counted in determining guardrail counts, because it refers to an attribute that is being guardrailed. For each item, this reduced base query is applied first to eliminate instances that do not meet the base query criteria before determining guardrail counts. If an item meets the base criteria (i.e., the item has a size less than ten), then its parameter value, if it exists, for "availability" is found. The number of available items is incremented each time an item is found having a "true" value for that Boolean attribute, and the number of unavailable items is incremented each time an item is found having a "false" value for the Boolean "availability" attribute. After all items have been examined, a total count of items that are available (and have a size less than ten), and a total count of items that are not available (and have a size less than ten), may be displayed to the searcher as guardrail counts.

Figure 44:
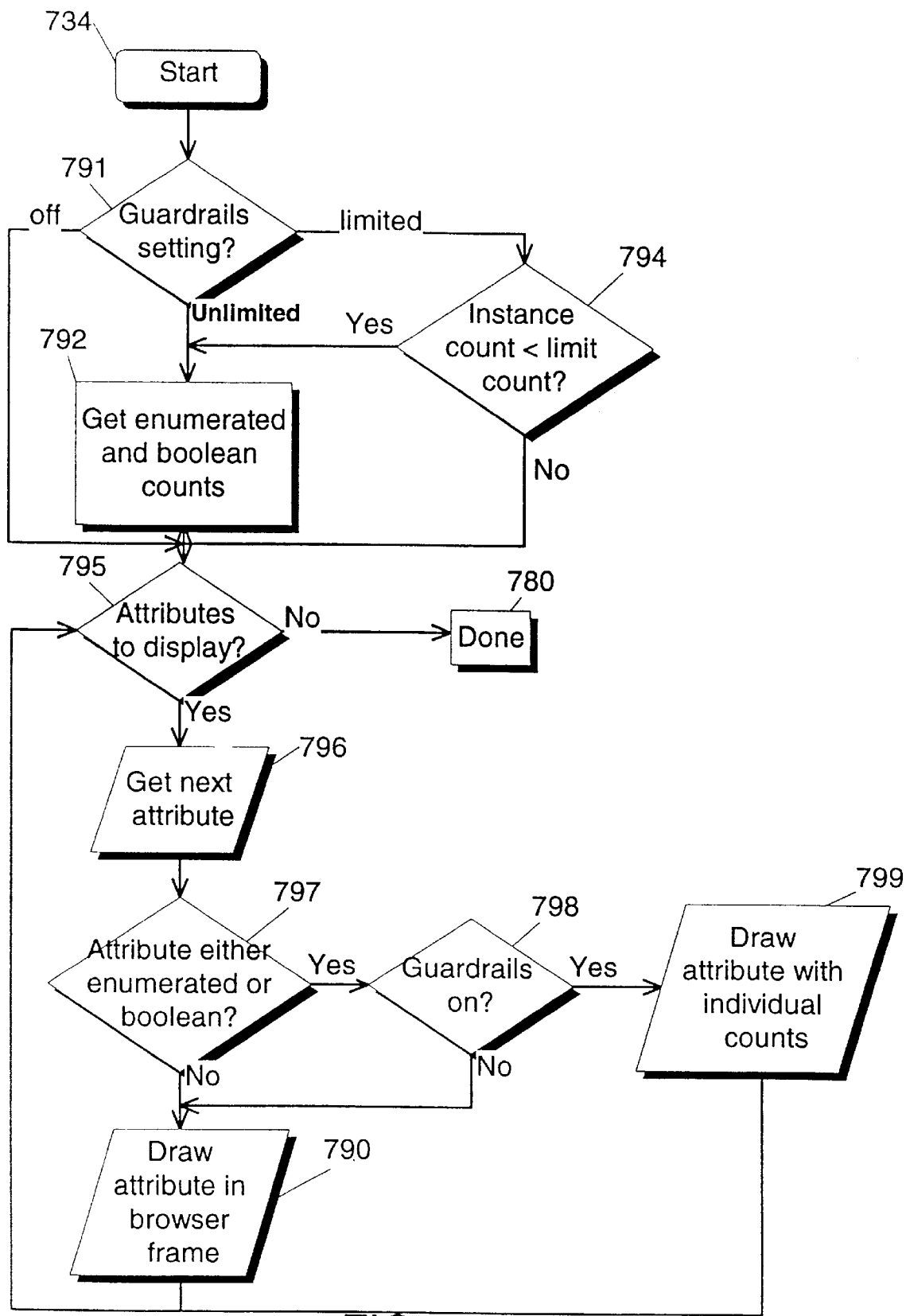
FIG. 44 is a flow chart depicting a process for displaying guardrails.

A preferred process for displaying guardrails is depicted in the flow chart of FIG. 44. The process starts with step 734, for example, when the user actuates the "attribute counts" button 757. The next step in the process is step 791, where a determination is made as to whether guardrails are "on" for any attributes that are available for display to the user. If not, the process proceeds to step 793, where a determination is made as to whether a guardrails "limit" is selected. For example, if the number of instances that meet the current search criteria is very large, the calculation of guardrail counts may be undesirable, either as excessively time consuming, or as not particularly helpful until the number of items found is reduced to a more reasonable number. If a limit is selected, the process proceeds to step 794, where a determination is made as to whether the instance count is less than the limit that is set. If the instance count is less than the set limit count, guardrail counts will not be computed and the process proceeds to step 795. In step 794, if the instance count is less than the limit count, the process will proceed to step 792.

Referring back to step 791, in the event that guardrails are "on," the process proceeds to step 792.

When step 792 is executed, the enumerated and Boolean counts (which determined following the steps described in the above three examples) are obtained. The counts are preferably placed in temporary storage until needed for display. After step 792 is executed, the process proceeds to step 795.

Referring again to step 793, if the guardrails limit is not selected, the process proceeds to step 795. As stated above, if the instance count in step 794 is not less than the limit count, the process proceeds to step 795.

In step 795, a determination is made as to whether there are any attributes 739 to display. If there are attributes 739 to display, the process proceeds with step 796, where the next attribute is retrieved. A determination is then made as to whether the attribute is either an enumerated attribute (including enumerated sets), or a Boolean attribute. If not (i.e., the attribute is neither Boolean or enumerated), in step 790 the attribute 741 is drawn in the browser frame 738. The process then loops back to step 795.

In step 797, if the attribute is either an enumerated attribute or a Boolean attribute, the process proceeds to step 798. In step 798, a determination is made as to whether guardrails are "on" for this particular attribute. If not, the process proceeds to step 790, and the attribute is drawn in the browser frame. If guardrails are "on" in step 798, the process proceeds to step 799. In step 799, the attribute is drawn in a guardrail window or dialog box in the browser frame with the individual guardrail counts displayed. The guardrail counts may be retrieved from temporary storage where they were placed during step 792. Preferably, an option is available to suppress the display of attribute counts that are zero. In cases where a large number of discrete values for a guardrailed attribute are possible, when a search has been refined to the point that a relatively small number of instances appear in a query result, the suppression of zero counts from a guardrails display can be a significant advantage. Then the process loops back to step 795.

In step 795, if there are no more attributes to display, the process completes with step 780.

Figure 45A:
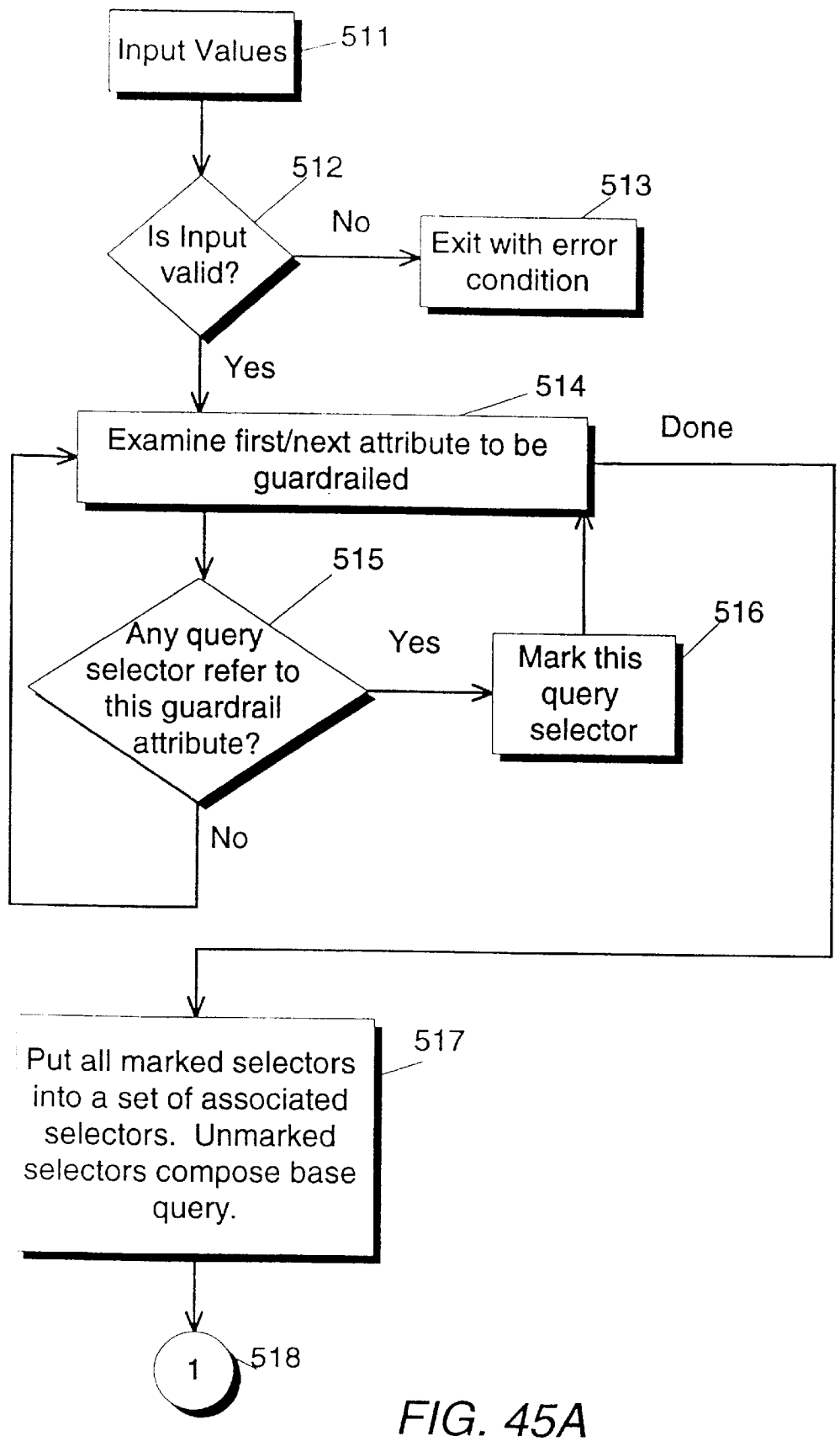
FIG. 45A is a flow chart depicting a method used in building guardrails.
Figure 45B:
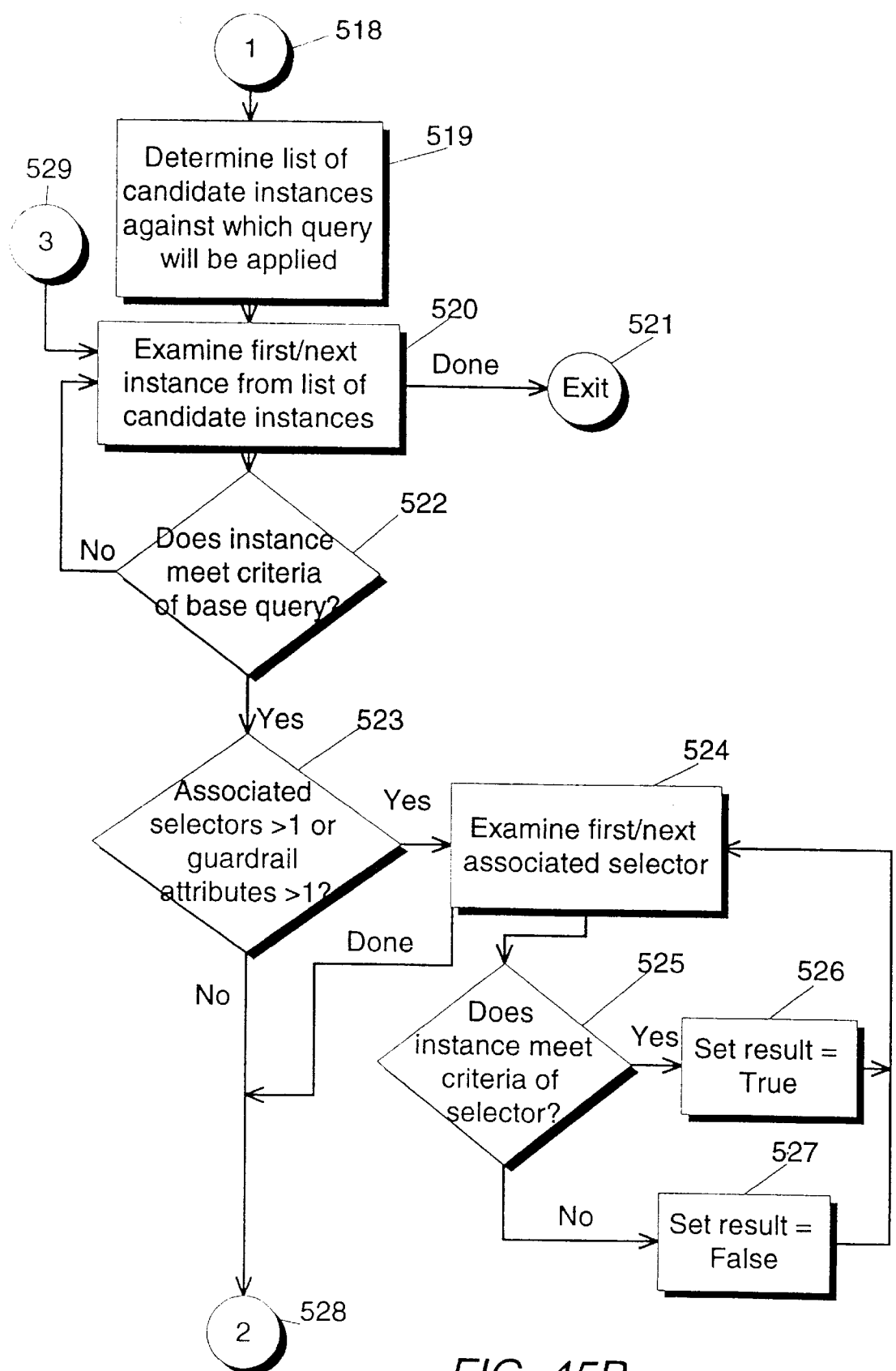
FIG. 45B is a continuation of the flowchart shown in FIG. 45A.
Figure 45C:
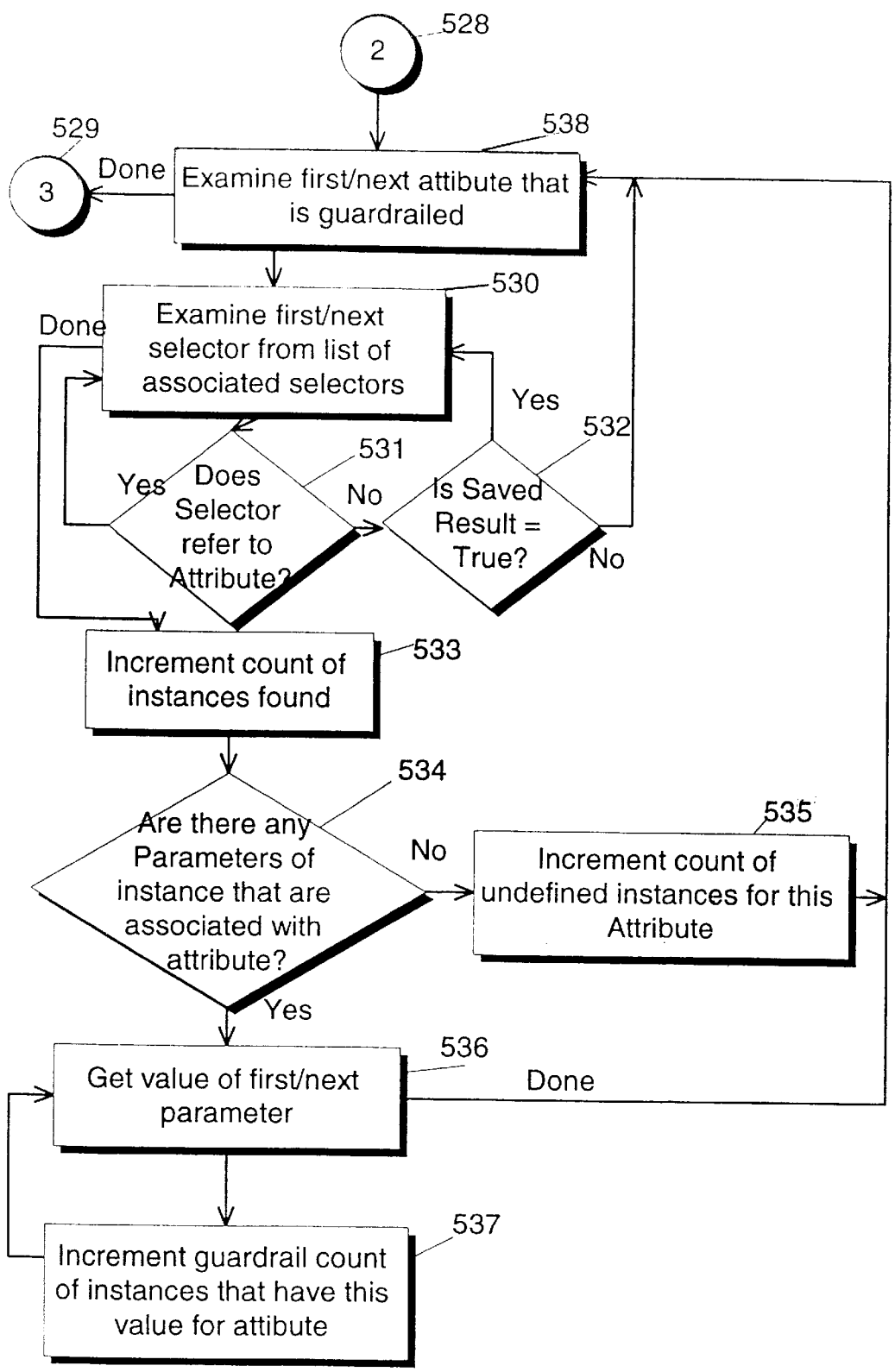
FIG. 45C is a continuation of the flowcharts shown in FIGS. 45A and 45B.

A more detailed description of a method for calculating guardrail counts is shown in FIGS. 45A, 45B and 45C. The method depicted in the flowcharts of FIGS. 45A, 45B and 45C allows for any number of attributes that are to be guardrailed. Some simplifications to the illustrated method are possible if guardrail counts are to be computed for only one attribute, i.e., there is only one guardrailed attribute.

The illustrated method begins with step 511, for example, when a user actuates the attribute counts button 757. Input to the method for calculating guardrail counts consists of a query, one or more attributes whose guardrail counts are desired, and a global flag "GF" that specifies whether the instances to be examined are local to the query class (GF is false) or reside in the subtree rooted at the query class. In step 512, the input is examined for errors. If the input is not valid, the method exits with an error condition in step 513. If the input is valid, the method proceeds to step 514.

Referring to FIG. 45A, first, each attribute that is to be guardrailed is examined in step 514. In step 515, each query selector that is set in the search criteria is examined to determine whether it refers to a guard railed attribute. If no query selector refers to the examined guardrailed attribute, the method proceeds to step 514. In step 516, query selectors that refer to any of the guardrailed attributes are marked. Then the process returns to step 514.

When this processing is done, the method proceeds to step 517. The marked query selectors make up the set of "associated-selectors" that can only be applied when calculating some, but not all, of the guardrail counts. The unmarked selectors make up the base query, and can be applied against every instance. The item identified with reference numeral 518 in FIG. 45A is intended to represent the same point in the flowchart as item 518 in FIG. 45B. After step 517 in FIG. 45A, the method proceeds to step 519 in FIG. 45B.

In step 519 shown in FIG. 45B, the list of candidate instances is preferably created in the same manner that is used for any query. A flag "GF" is used to specify the scope of the search. If the flag "GF" is false, the list of candidate instances comprises only the instances that are local to the query class. If the flag "GF" is true, the list of candidate instances comprises the instances that are included in the query class or any subclass of the query class.

Each candidate instance is then examined in step 520 one at a time. In step 522, if the candidate instance does not meet the base query search criteria, it is discarded and the method returns to step 520 where the next candidate instance is then examined. Indexing techniques are applied, as appropriate, against the base query selectors to reduce the list of candidate instances. In other words, instances that do not meet the search criteria specified by the base query selectors are eliminated from consideration and are not counted when determining guardrail counts. If a candidate instance meets the criteria of the base query, it will be used in the guardrail counting and the method proceeds to step 523.

Optimization steps are preferred when there are multiple associated-selectors and/or multiple attributes in the list of guardrailed attributes. A determination of whether such conditions exist is made in step 523. If so, the method proceeds to step 524. Each associated selector is then applied against the instance and the result is saved. In this manner, these selectors need only be applied once against the instance, instead of once for every attribute in the list of guardrailed attributes. Specifically, in step 524 each selector from the group of associated selectors is examined. In step 525 a determination is made whether the instance meets the criteria of this selector. If it does, the result of the comparison is saved in step 526, i.e., an appropriate flag is set to "true," and the method returns to step 524. If it does not meet the criteria, the result of the comparison is saved in step 527, i.e., an appropriate flag is set to "false," and the method returns to step 524.

When this instance has been compared against each applicable selector and the results saved, the method proceeds to step 538 shown on FIG. 45C. Alternatively, if in step 523 there is only one guardrailed attribute and only one associated selector, the method proceeds to step 538 bypassing steps 524, 525, 526 and 527. The item identified with reference numeral 528 in FIG. 45B is intended to represent the same point in the flowchart as item 528 in FIG. 45C.

Referring to FIG. 45C, guardrails counts are calculated for each attribute that is a guardrailed attribute, one at a time. This is done by applying all of the selectors in the associated selectors against the instance, except for any selector that refers to the guardrailed attribute. If the instance meets these additional criteria, then it has met all of the applicable query criteria, and the count of such instances is incremented.

Specifically, in step 538, each attribute from the list of attributes that are guardrailed are examined. In step 530, each selector from the list of associated selectors is examined. In step 531, a determination is made as to whether the selector refers to this attribute. If it does, the method returns to step 530. If it does not, the method proceeds to step 532, and a determination is made as to whether the saved results from previous steps 524, 525, 526 and 527, if applicable, are "true." If the saved results are "true," the method proceeds to step 530. If the saved results are not "true," the method proceeds to step 538.

When this processing is done, the method proceeds to step 533, and this instance can be incorporated into the guardrail counts for the attribute. In step 534, the instance is checked to see whether it has a value associated with this attribute. If this instance does not have a parameter that is associated with this attribute, then the count of undefined instances for this attribute is incremented in step 535, and the method proceeds to step 538.

In step 534, if this instance has one or more (for enumerated sets) parameters that are associated with this attribute, then for each such parameter the parameter value is obtained in step 536, and the count of instances having that value for this attribute is incremented in step 537. The method returns to step 538.

When all of this processing has been done, the method returns (via item 529) to step 520 shown in FIG. 45B. In step 520, after all instances have been examined, the method is completed at step 521.

An additional optional optimization may be made in the method for computing guardrail counts. Each attribute in the list of guardrailed attributes that has no associated-selectors that refer to it may be marked as "clean." At each instance, the full query that needs to be applied (the base query plus the appropriate associated-selectors) is then the same for all of the clean attributes, since for each of them all of the associated-selectors are applied. This result can be calculated once, and then used for each clean attribute each time a result is needed.

An Example of an Object Oriented Knowledge Base Server

The present invention may be advantageously employed to provide remote access, navigation, and query of a remotely located object oriented database management system. An embodiment of a suitable object oriented database management system that may be used as a knowledge base server 5130 will be described below.

Figure 6:
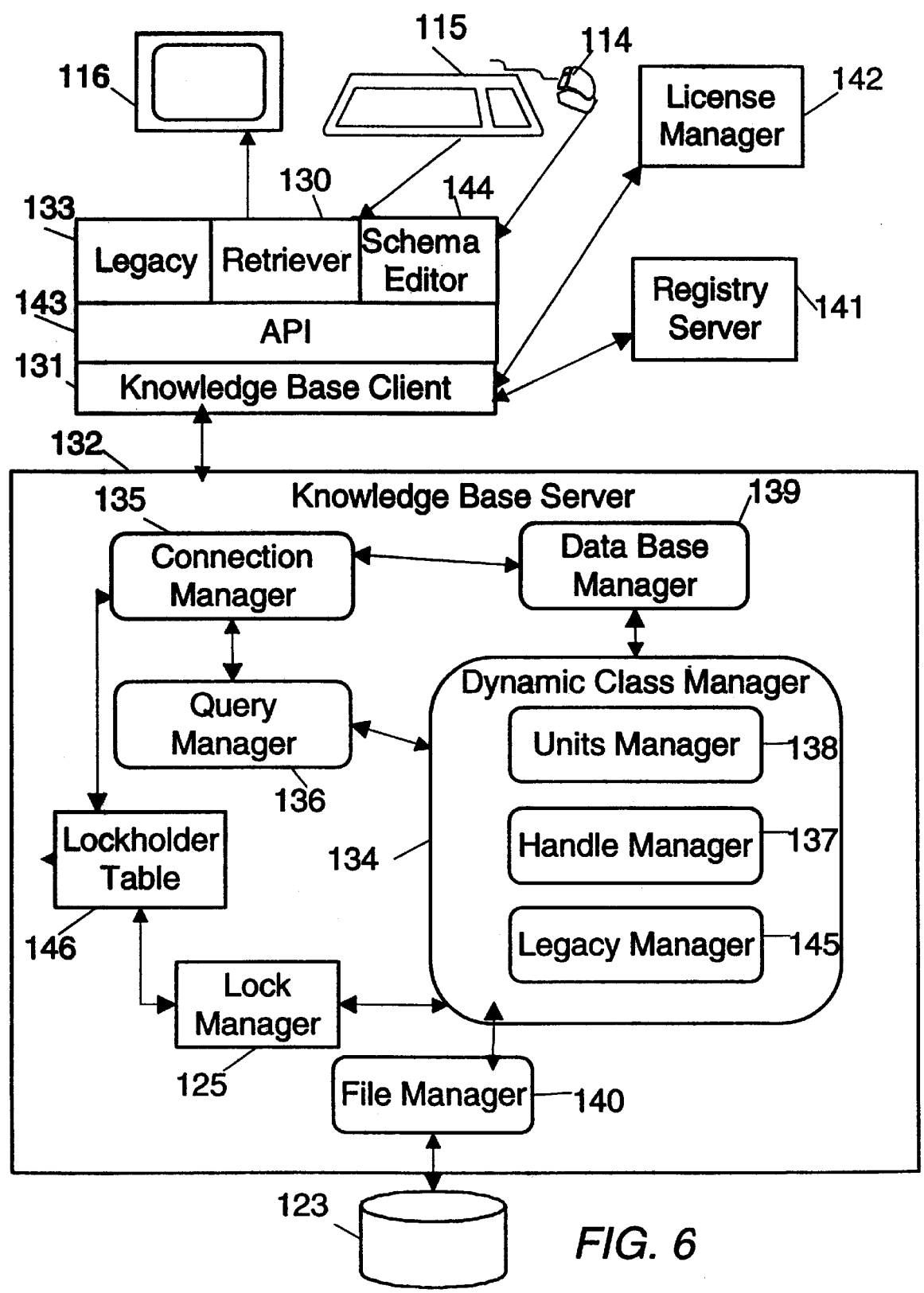
FIG. 6 is a block diagram depicting an overall architecture for a system employing an embodiment of an object oriented database management system.

In the embodiment of an object oriented database management system shown in more detail in FIG. 6. A preferred embodiment of a knowledge base server 132 includes an object oriented lock manager 125, a dynamic class manager 134, a connection manager 135, a query manager 136, a handle manager 137, a units manager 138, a database manager 139, and a file manager 140. A knowledge base client 131 may interact with the knowledge server 132 over a local area network 100, as shown for example in the illustrated client 112 shown in FIG. 1, or over the Internet 5124, as shown for example in the illustrated client 111 shown in FIG. 1. As shown in FIG. 6, a preferred system includes a registry server 141 and a license manager 142 to control unauthorized access to the system. The license manager 142 may be implemented as a license manager server 104, shown for example in FIG. 1. Referring to FIG. 6, a legacy client 133 and a legacy manager 145 may be included to facilitate organization of an existing legacy database into schema for use in connection with an object oriented database management system. An application programming interface or API 143 is also shown in the illustrated embodiment.

A schema editor 144 is preferably provided for modifying and changing the schema or database 123. Of course, it will be appreciated that not all users will be allowed to make changes in a schema in many applications, and a schema editor 144 is not provided for users who do not have access rights that permit them to modify the schema. The structure and operation of the schema editor 144, the dynamic class manager 134, the retriever 130, the connection manager 135, the query manager 136, the handle manager 137, the units manager 138, the database manager 139, the file manager 140, the registry server 141, the license manager 142, the API 143, and the legacy manager 145 are described in more detail in application Ser. No. 08/339,481, filed Nov. 10, 1994, by Thomas S. Kavanagh, et al., for OBJECT ORIENTED DATABASE MANAGEMENT SYSTEM, now U.S. Pat. No. 5,838,965, the entire disclosure of which is incorporated herein by reference. A knowledge base client 131 especially adapted for use over a local area network is also described in application Ser. No. 08/339,481 (U.S. Pat No. 5,838,965).

In the example illustrated in FIG. 1, a plurality of users or clients 112 and 118 are shown connected to the network 100. A first client 111 is shown coupled to the Internet 5124. The first client implementation 111 in this particular example uses a Sun Microsystems SPARCstation 111, which is shown having a display 116, a mouse 117, and a keyboard 122. However, the first client 111 is not limited to any particular hardware configuration, but may run on a wide variety of platforms. A second client implementation 112 in this particular example uses an IBM compatible computer 112, shown having a display 113, a mouse 114, and a keyboard 115. A third X Windows implementation of a client 118 is illustrated in this particular example having a computer 118, a display 119, a mouse 120, and a keyboard 122. Each of the illustrated client implementations 111, 112, and 118 provide examples of suitable platforms for a client 5121, and it should be understood that the particular platforms are considered to be interchangeable in this example. The executable content client 5121 is intended to be implemented to run in a virtual machine environment. The executable content client 5121 is therefore independent of the particular hardware platform used, and may be supported by a large number and wide variety of platforms.

The illustrated system may support interactive editing by one or more users connected through respective clients 131. For example, users are able to use a schema editor 144 to change the schema by adding and deleting attributes, to add whole sections to the schema, to reposition whole sections of the schema within the schema hierarchy, and to modify, add, and delete classes and instances. The process of adding classes or instances may be facilitated by automatically deriving class names and descriptions in accordance with the system described in application Ser. No. 08/526,555, filed Sep. 12, 1995, by Thomas S. Kavanagh et a., for IMPROVEMENTS IN AN OBJECT ORIENTED DATABASE MANAGEMENT SYSTEM, now U.S. Pat. No. 5,835,910, the entire disclosure of which is incorporated herein by reference.

Interactive editing operations may be performed while other users are simultaneously using retrievers 130 to access the database 123. The management of these simultaneous operations, including the ability of the plurality of users to access the database 123 while a plurality of users are at the same time making changes to the database 123, is provided by a concurrency control system including the object oriented lock manager 125. The example described herein works well for a read oriented database system, but is not necessarily limited to such systems. It is particularly advantageous in a knowledge base schema that is used for parts management. The concurrency control system is described in more detail in application Ser. No. 08/527,161, filed Sep. 12, 1995, by Thomas S. Kavanagh, et al., for METHOD AND APPARATUS FOR CONCURRENCY IN AN OBJECT ORIENTED DATABASE, now U.S. Pat. No. 5,742,813 the entire disclosure of which is incorporated herein by reference.

Figure 46:
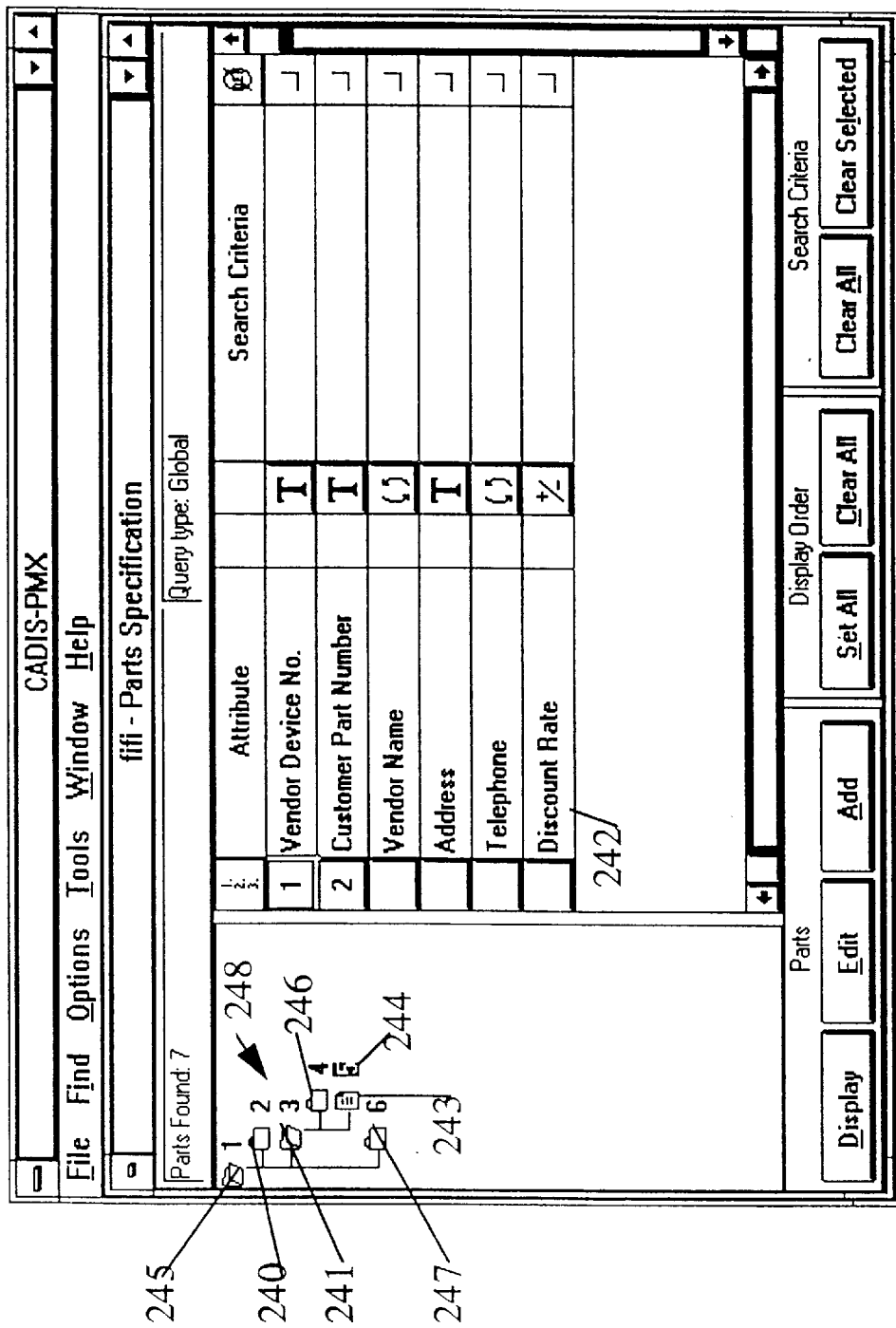
FIG. 46 depicts an example of a screen display shown when navigating a schema by opening and selecting classes.

FIG. 46 shows an example of a screen that may be displayed on the user's display 116 when the user is navigating a class tree 248. A root class 245 is designated class 1 in the display. Class 240 is a descendent of the root class 245, and is designated class 2 in the display. Class 241 is also a descendent of the root class 245, and is designated class 3 in the display. In addition, class 247 is a descendent of the root class 245, and is designated class 6 in the display. Class 241 has two descendants: class 246 and class 243. Class 246 is designated class 4 in the display shown in FIG. 46. And class 243 is designated class 5 in the display. In the illustrated example, the user selected class 243. Assuming that any required locks are granted in a concurrency control system, when the class 243 becomes the selected class, it is preferably displayed in a highlighted fashion 244, and associated attributes 242 are displayed.

Figure 47:
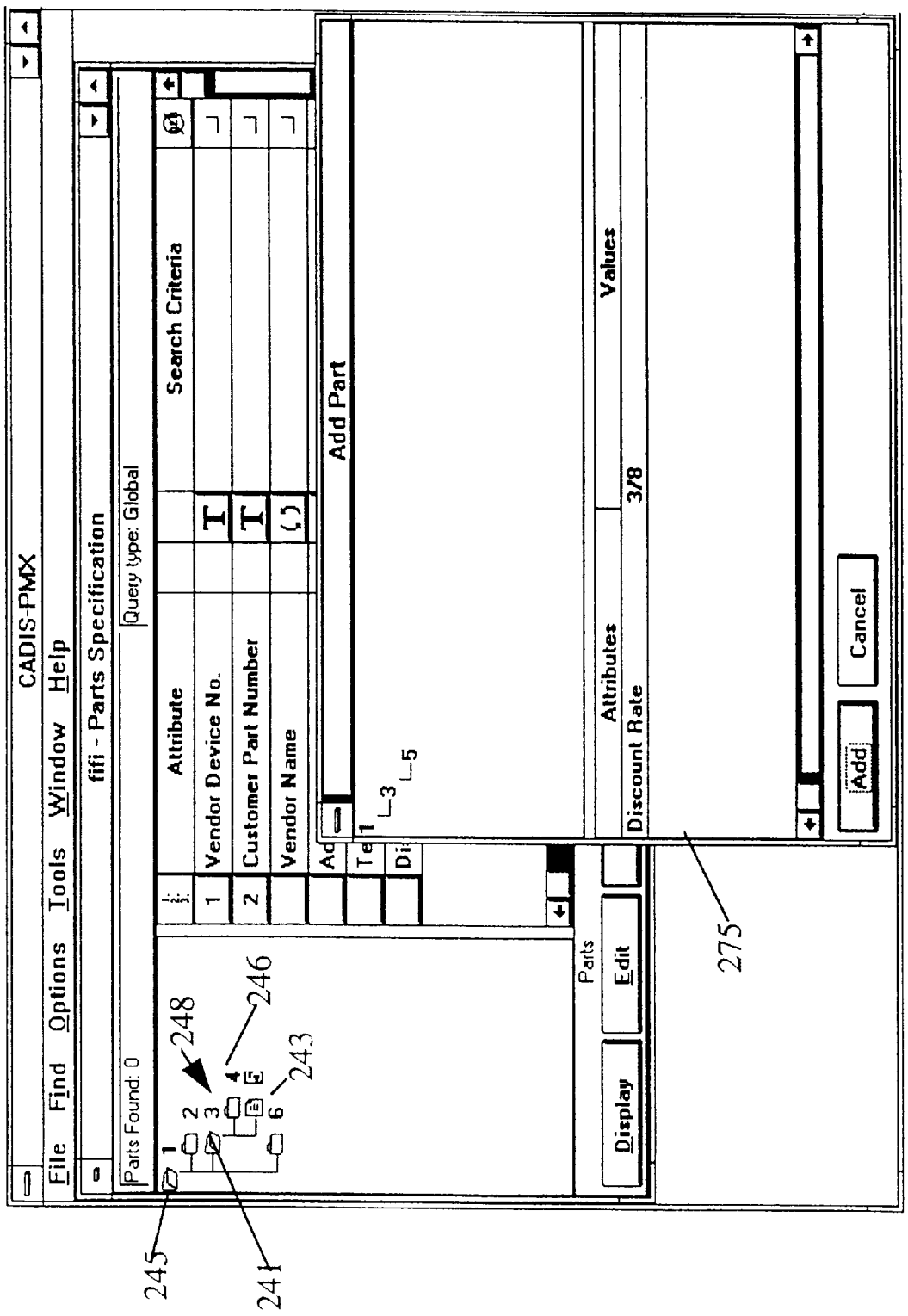
FIG. 47 depicts an example of a screen displayed when adding a part to the schema.
Figure 48:
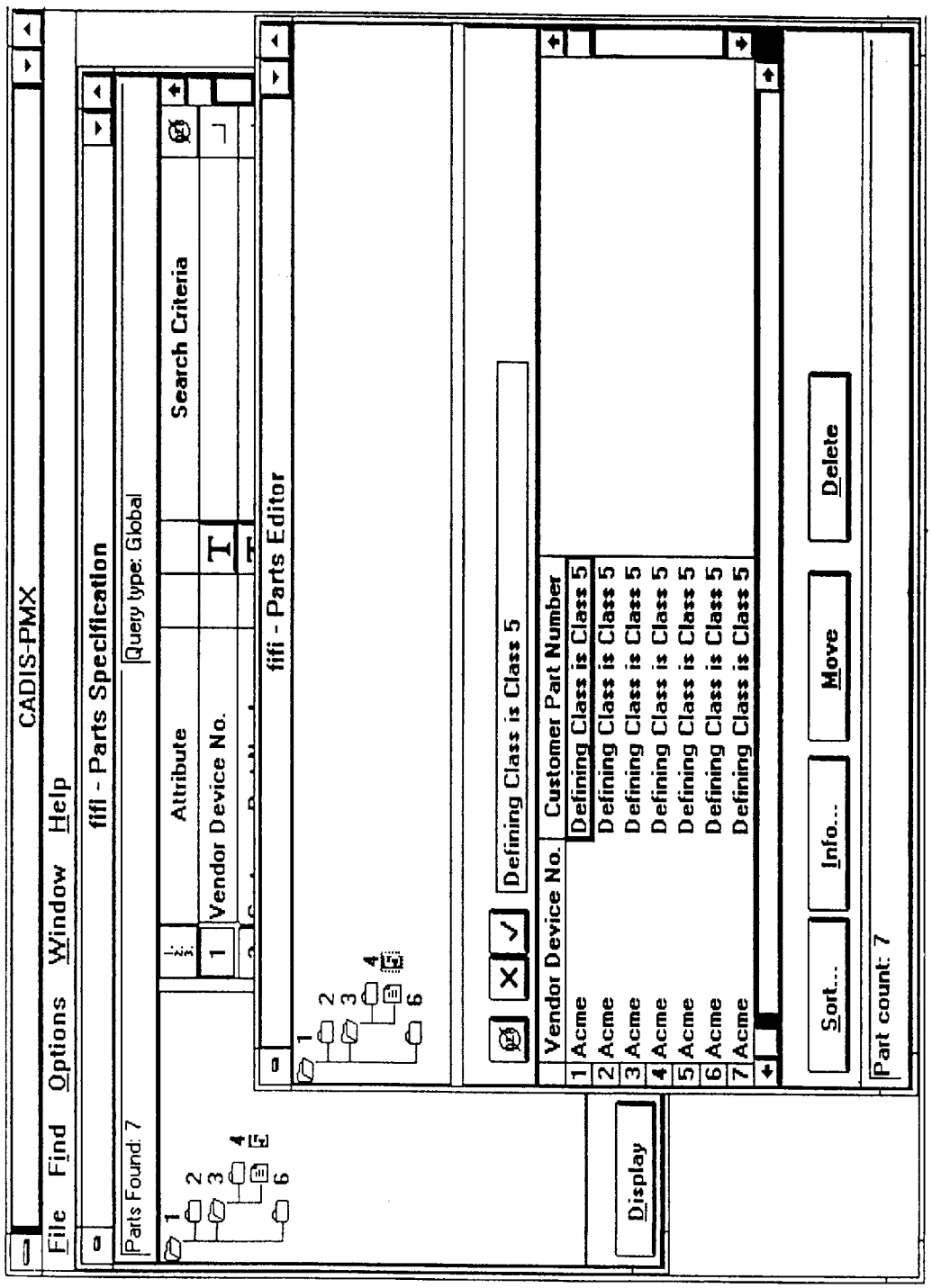
FIG. 48 depicts an example of a screen displayed when editing a part.
Figure 49:
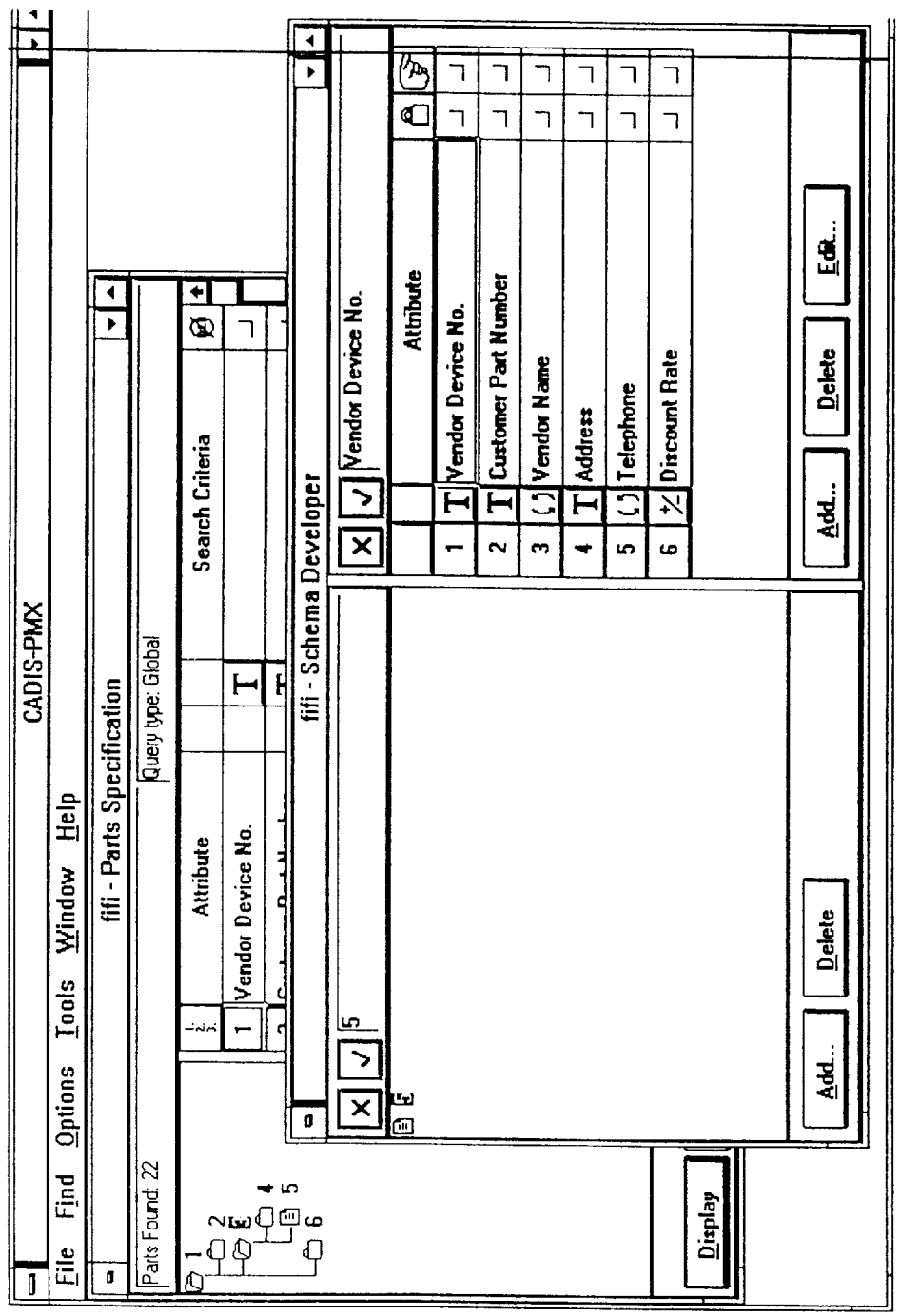
FIG. 49 illustrates a screen display for an embodiment showing a schema developer window.

Referring to FIG. 46, in opening a class to view subclasses, the user double clicks on the class 241 to be opened. As shown in FIG. 47, the display of the class 241 changes from a closed folder (such as is shown in FIG. 46 for class 240) to an open folder 241, and all subclasses 246 and 243 are displayed. FIG. 47 shows the screen display during the process of adding a part under these circumstances. When a part is added in a preferred embodiment, the step of opening an add part window 275 shown in FIG. 47 is performed. FIG. 48 depicts an example of a screen display when editing a part. FIG. 49 illustrates a screen display for a preferred embodiment showing a schema developer window. FIG. 50 illustrates a screen display for a preferred embodiment showing a search results window.

Figure 7:
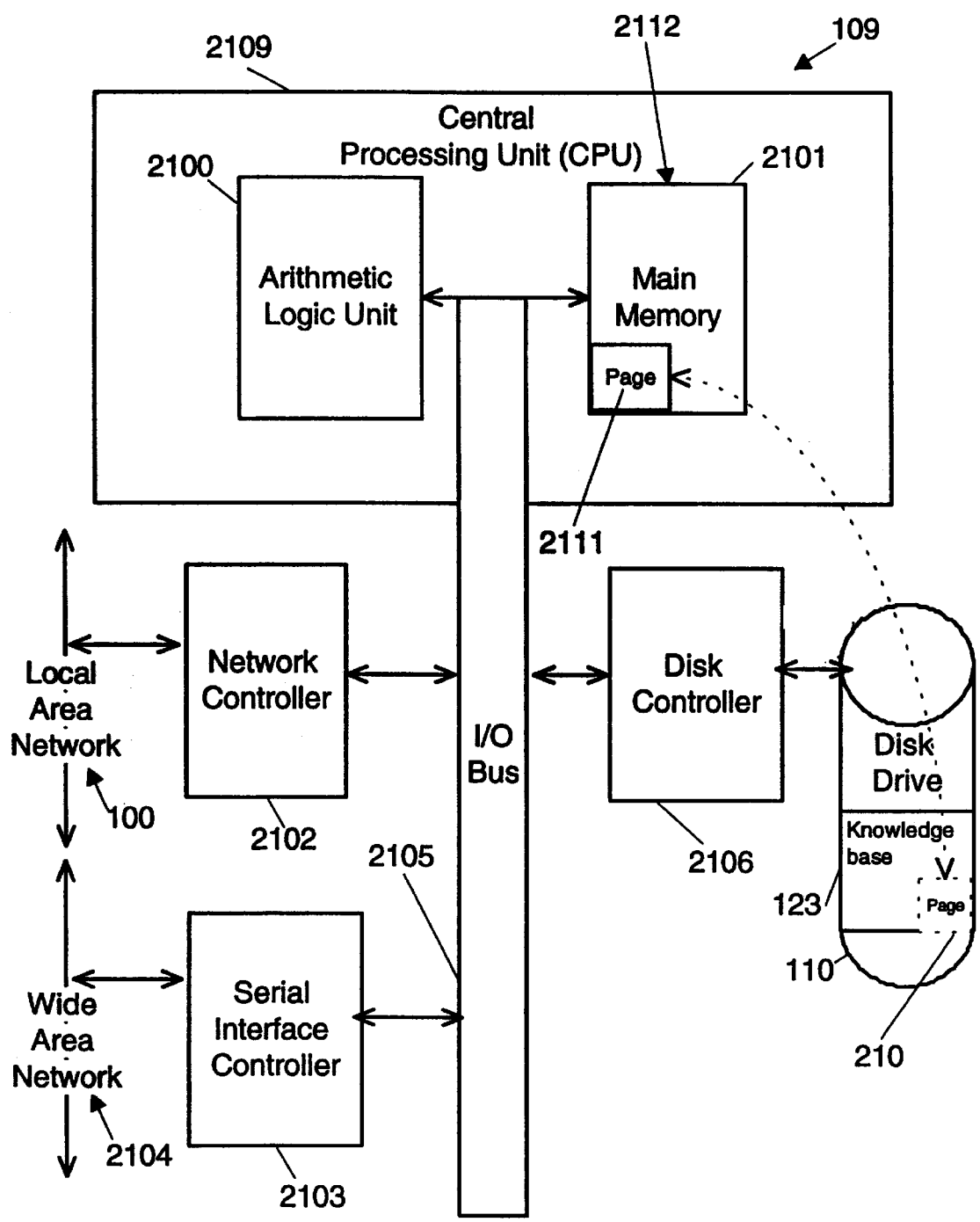
FIG. 7 shows the major components of a computer hardware configuration suitable for a server.

FIG. 7 shows the major components of a computer hardware configuration 109 providing the computational and communications environment for a knowledge base server 132. This configuration consists of a central processing unit or CPU 2109 which includes an arithmetic logical unit 2100 which fetches and executes program instructions from main memory 2101. The programs are stored on a disk drive 110, access to which is provided through a disk controller 2106. The knowledge base files 123 are also stored on disk drive 110 and accessed through virtual memory addresses 2112 in main memory 2101, through which, when required, a page 2111 of contiguous data in a disk file 2108 is copied into main memory 2101. In this example, the use of virtual memory 2112 for the knowledge base management system is preferred. The knowledge base server 132 interacts with the client API 143 through a local area network 100, access to which is controlled by network controller 2102, or through a wide area network 2104, access to which is controlled by a serial interface controller 2103. An I/O bus 2105 mediates data transfers between the CPU 2109 and the peripheral data storage, interface and communication components.

Figure 8:
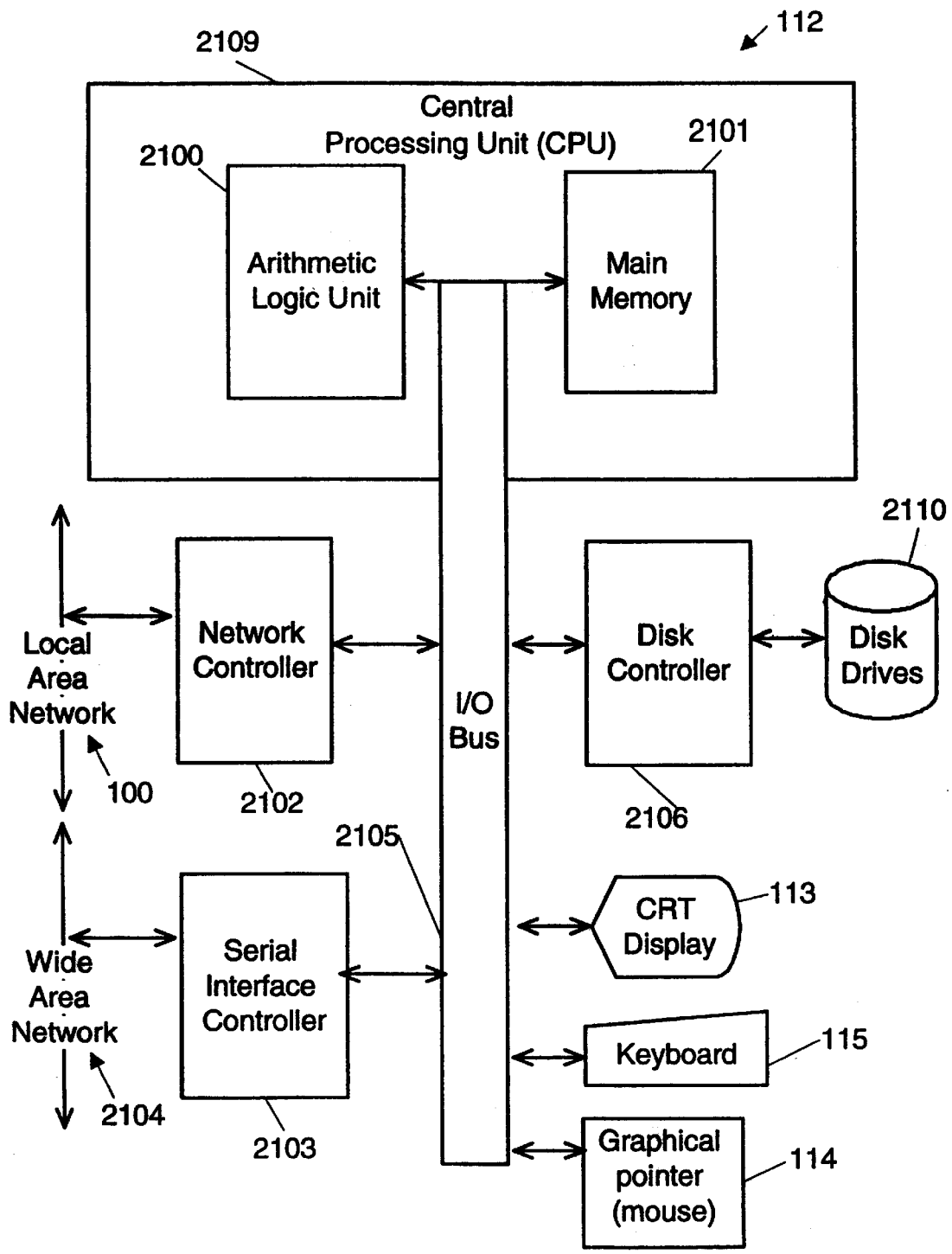
FIG. 8 shows the major components of a computer hardware configuration that provides a suitable platform for a browser that may include an executable content client.

FIG. 8 shows the major components of a computer hardware configuration 112 providing the computational and communications environment for a retriever 130, schema editor 144, a graphical user interface component of legacy 133, and an API 143. This configuration consists of a central processing unit or CPU 2109 which includes an arithmetic logical unit 2100 which fetches and executes program instructions from main memory 2101. The programs are stored on one or more disk drives 2110, access to which is provided through a disk controller 2106. The user interacts with the system through the keyboard 115 and mouse or similar graphical pointer 114 with the graphical user interface displayed on the CRT display 113. The API 143 communicates with the knowledge base server 132 through a local area network 100, access to which is controlled by network controller 2102, or through a wide area network 2104, access to which is controlled by a serial interface controller 2103. An I/O bus 2105 mediates data transfers between the CPU 2109 and the peripheral data storage, interface and communication components.

Figure 52:
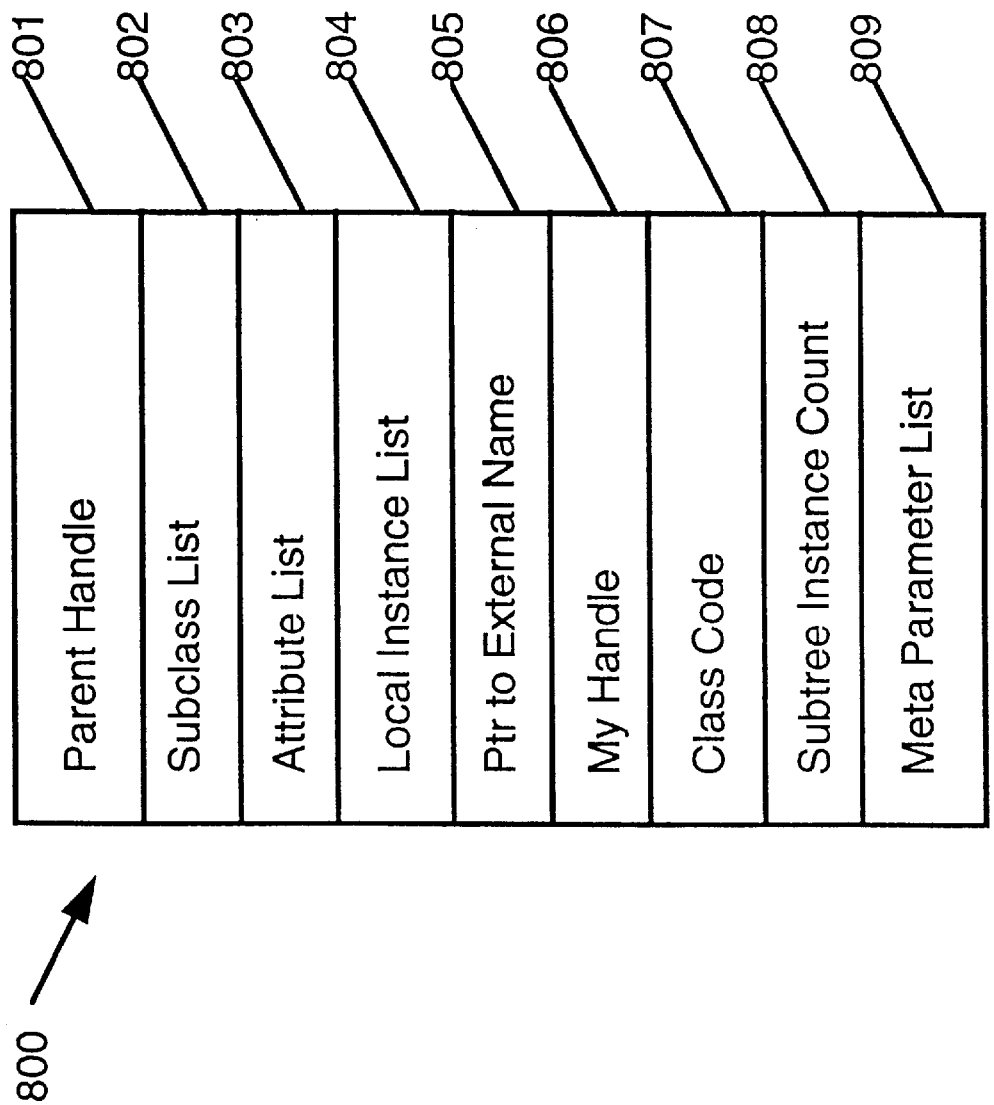
FIG. 52 shows the internal object representation for a class.

FIG. 52 shows the internal object representation for a class 800. In the present schema, a class has a parent handle 801. Every class object 800 includes stored information representing the handle of its parent class, except in the special case of the root class, which has no parent. A null is stored in this location in that case. A handle is a reference to an object. The parent handle information 801 is used by the handle manager 137 to identify the stored class object which is the parent class for the class 800.

The class object 800 includes a subclass list 802. The subclass list 802 is an array of handles which may be used by the handle manager 137 to identify those class objects which are subclasses of the class 800. In the internal representation provided in the described embodiment of an object oriented database, lists can grow virtually without bounds and are dynamic. The storage space available is not fixed.

This provides flexibility and power to the database structure, because the class object 800 may have an extremely large number of subclasses in a large database without substantial degradation in performance.

The class object 800 includes an attribute list 803. The attribute list 803 is a list of handles. The handle manager 137 may use the information stored in the attribute list 803 to identify the attributes possessed by class object 800.

The class object 800 also includes a local instance list 804, which is a handle list. Field 805 shown in FIG. 52 is a pointer to a storage location of the class name, i.e., the text identifying the class.

Field 806 is used to store the handle for the class 800. The field 807 stores an indication of the class code, i.e., whether it is primary, secondary, or a collection.

The class object 800 also includes a subtree instance count 808. The subtree instance count 808 is a numeric indication of the total number of items or instances present in all of the descendants of the class 800 i.e., the total number of instances in class 800, all of the class 800's subclasses, all of the subclasses' subclasses, and so on. Thus, when a user is navigating through the tree structure of a knowledge base, as a user selects and opens subclasses, the user can be immediately informed of the number of parts found at any location on the tree by retrieving the subtree instance count 808 for the current class and passing that information to the retriever 130. The subtree instance count 808 is kept up to date whenever the knowledge base is modified, so it is not necessary while a user is navigating through the tree structure of the database to perform a real time computation of parts found 3172.

Referring again to FIG. 52, the class object 800 also preferably includes a meta parameter list or meta data list 809. The meta parameter list 809 is a string list, and may be used as a pointer to strings containing linking information, for example, the name of a file that contains a graphical display of the type of parts represented by the class 800, thesaurus information used for legacizing data, or other legacizing information.

Figure 53:
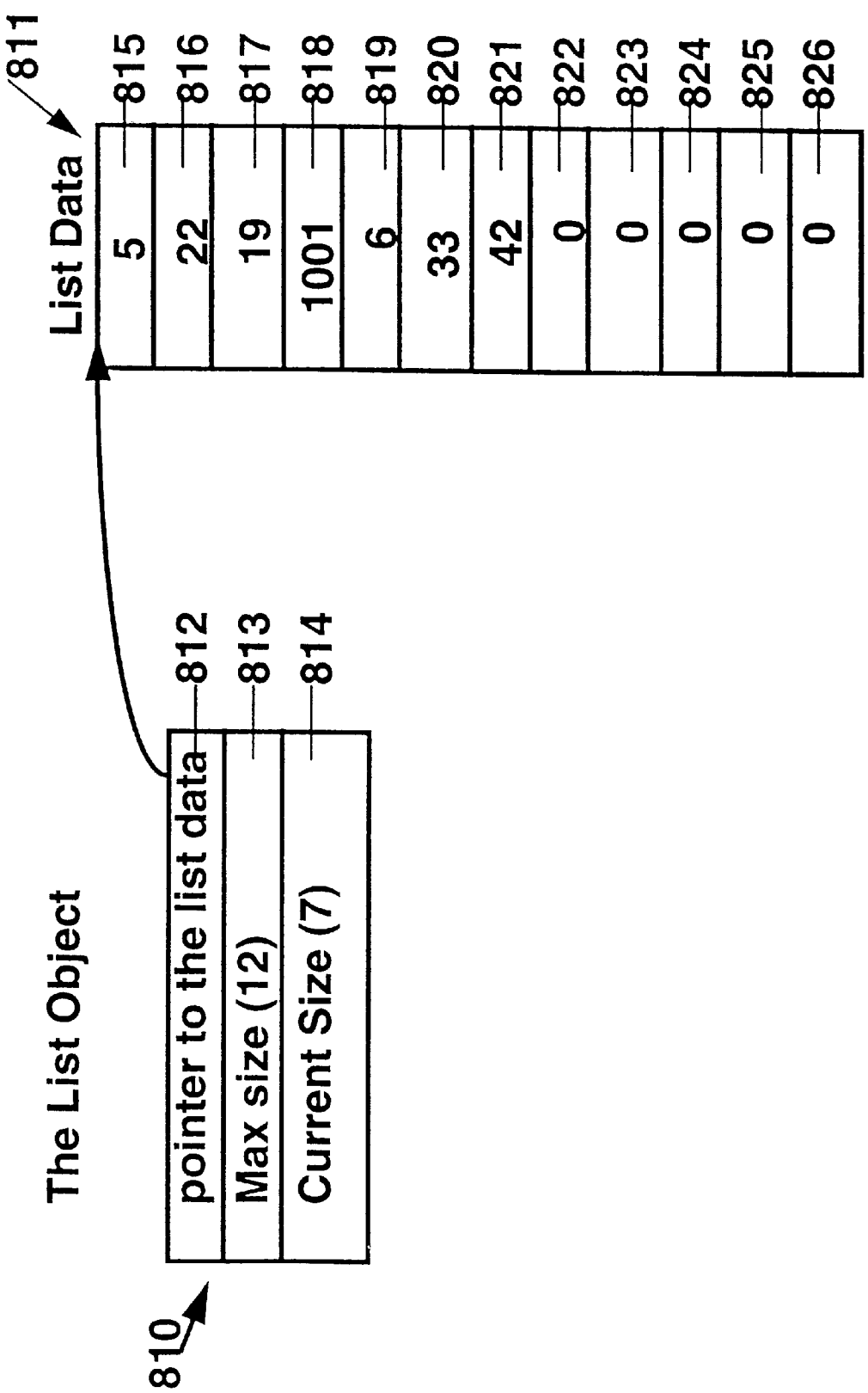
FIG. 53 depicts an example of a generic list.

FIG. 53 depicts an example of a generic list 810. The class manager 134 uses lists of handles, lists of floating point values, lists of pointers to character strings, etc. whenever a variable amount of data can be associated with an object. Examples of lists would be items 802, 803, 804 and 809. The list 810 depicts a list of simple integers.

A list object 810 includes a pointer 812 which points to the beginning 815 of the list data 811. A list object 810 also includes a field 813 indicating the currently allocated size for the list data 811. The list object 810 also includes a field 814 containing information indicating the amount of list data 811 currently in use.

The list data 811 contains the actual list of values. The first item 815 in the list in this example contains the value "5". Similarly, in this example list items 816, 817, 819, 820 and 821 contain additional values. List items 822, 823, 824, 825 and 826 in this example are not currently in use and are set to zero. In this illustrated example, the currently allocated size 813 of the list is twelve. The amount in use 814 of the list is seven, meaning that the first seven items in the list are valid.

Figure 54:
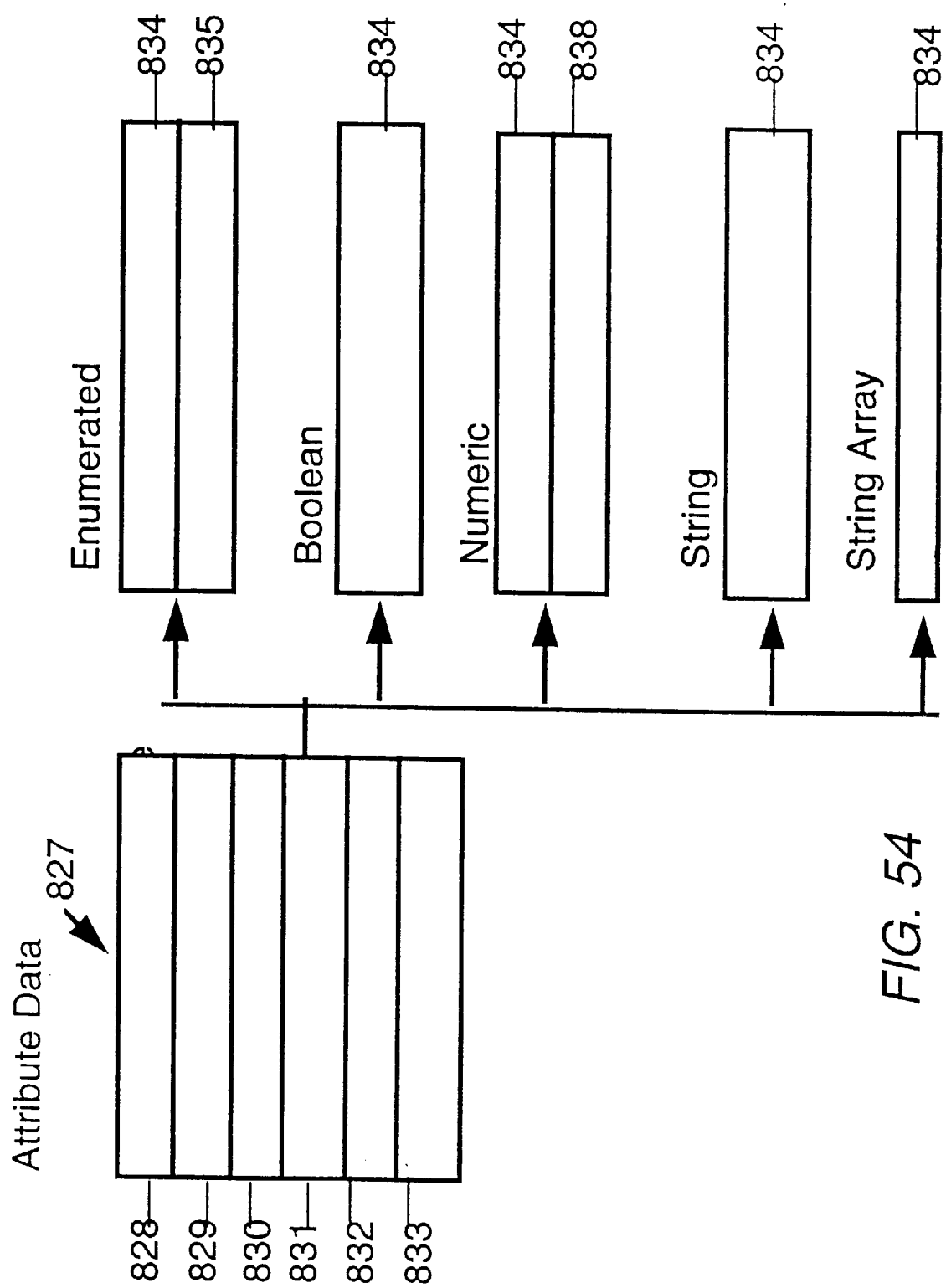
FIG. 54 illustrates the data structure for attribute data.

FIG. 54 illustrates the data structure for attribute data 827. An attribute object 827 contains at least six fields in the illustrated embodiment. A first field 828 contains a pointer to an external name comprising an ASCII character string that is the name for the attribute. The attribute object 827 also contains a field 829 containing the handle for this attribute object 827. The attribute object 827 also contains a field 830 which contains the handle of the class that defines this attribute 827. The fourth field 831 is a Boolean indication of whether this attribute is a required attribute for the defining class. A fifth field 832 contains a Boolean field indicating whether this attribute is protected. This is preferably indicated by display of a protected icon. In the data structure of the attribute object 827 shown in FIG. 54, this information is stored in field 832. The attribute object 827 also contains a field 833 which is a meta parameter list.

Enumerated attributes include fields 828–833, indicated collectively as attribute data 834, plus a field 835 which is a list of enumerator handles.

In the case of a Boolean attribute, only fields 828–833 are used, which are again indicated collectively in FIG. 54 as attribute data 834.

Numeric attributes include fields 828–833, indicated collectively as attribute data 834, plus a field 838 which contains the handle of the unit family for this numeric attribute.

In the case of a string attribute, and in the case of a string array attribute, only the attribute data 834 comprising fields 828–833 is included.

One example of the use of these data structures by the dynamic class manager 134 is the procedure of a user selecting a class by clicking on the closed folder icon 3189 associated with the class. When a class is opened, the dynamic class manager 134 will check the class object 800 and retrieve the attribute list 803. The handles stored in the attribute list 803 will be passed to the handle manager 137. The handle manager 137 will return the virtual memory address for each attribute 827 of the class. The dynamic class manager 134 may then use the pointer 828 to the external name of an attribute object 827 to retrieve the character string text for the external name for the attribute. That ASCII text information can then be passed through the API 143 so that it may eventually be provided to the retriever 130 for display to a user on the display 116.

Figure 55:
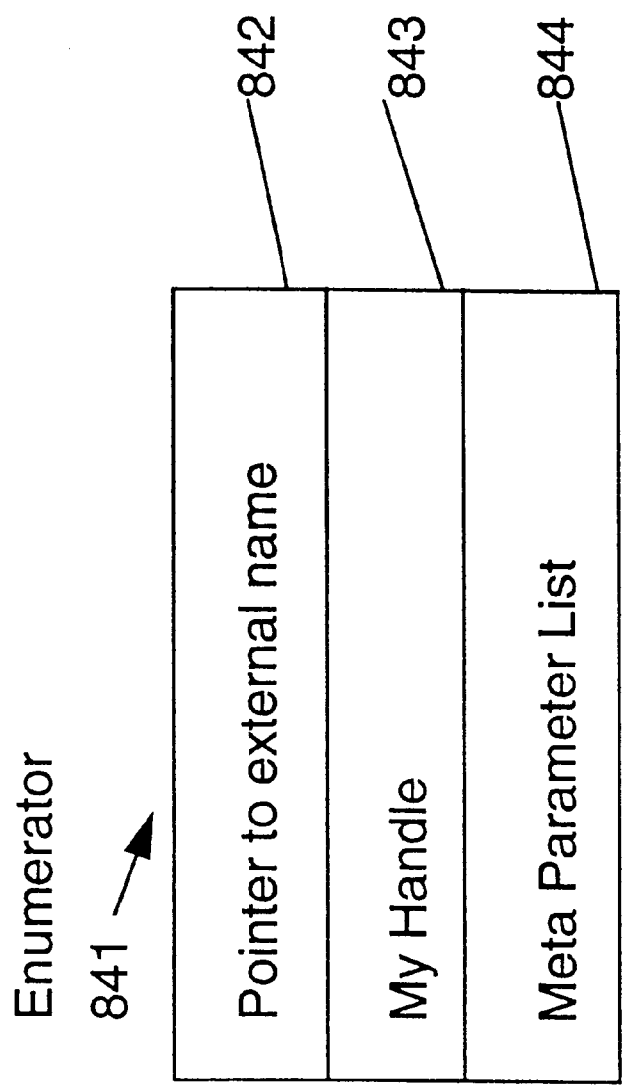
FIG. 55 illustrates a data structure for an enumerator object.

FIG. 55 illustrates the data structure for an enumerator object 841. An enumerator object 841 may comprise three fields. A first field 842 contains a pointer to the external name for the enumerator object 841. A second field 843 contains the handle for the enumerator object 841. A third field 844 may contain a meta parameter list 844. Handles are used to link from other objects to the enumerator object 841. An advantage of this structure is the ability to easily modify a knowledge base if it becomes desirable to change the external name of an object. Such a change need only be performed once to the ASCII character string that is used to represent the external name. All other objects merely contain a handle which can be used by the handle manager 3137 to provide the dynamic class manager 134 with the actual external name.

Figure 56:
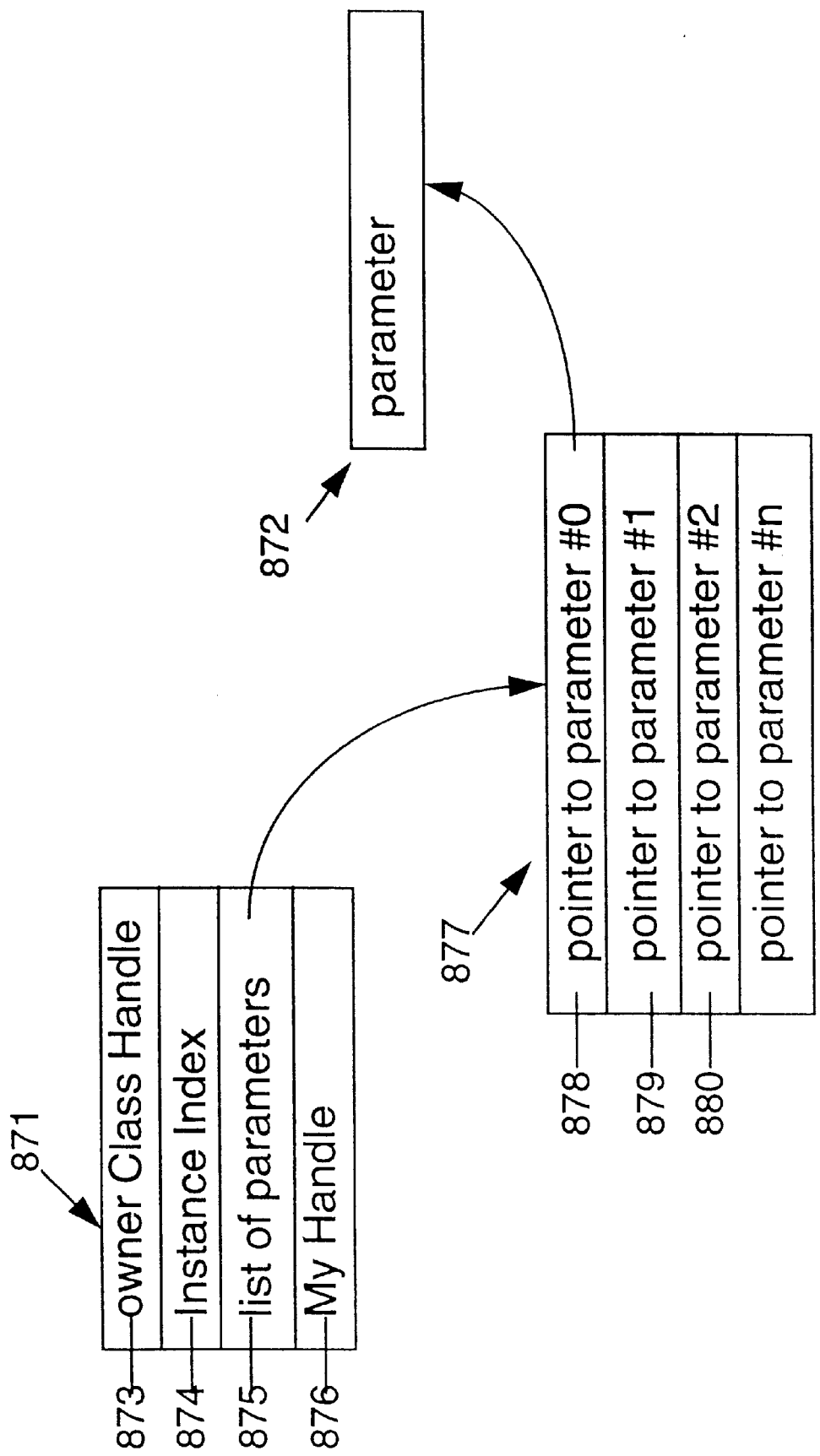
FIG. 56 depicts the data structure for an instance and associated parameters.

FIG. 56 depicts the data structure for an instance 871 and associated parameters 872. An instance object 871 may contain four fields 873–876. The first field 873 is the handle for the owner class of this instance. The second field 874 may give the ordinal location of this instance's handle in the instance list 804 of its owning class. The third field 875 is a list of parameters, which points to the values contained in 877. The fourth field 876 is the handle for the instance object 871. The list of parameters 877 contains a plurality of pointers to parameters for the various attributes associated with this instance object 871. In the example illustrated in FIG. 56, the list 877 contains three entries 878, 879 and 880. Additional elements of the list 877 have been omitted for clarity. The pointer 878 in list 877 points to information concerning the associated parameter 872. The data structure for the parameter 872 is illustrated in more detail in FIG. 57.

Figure 57:
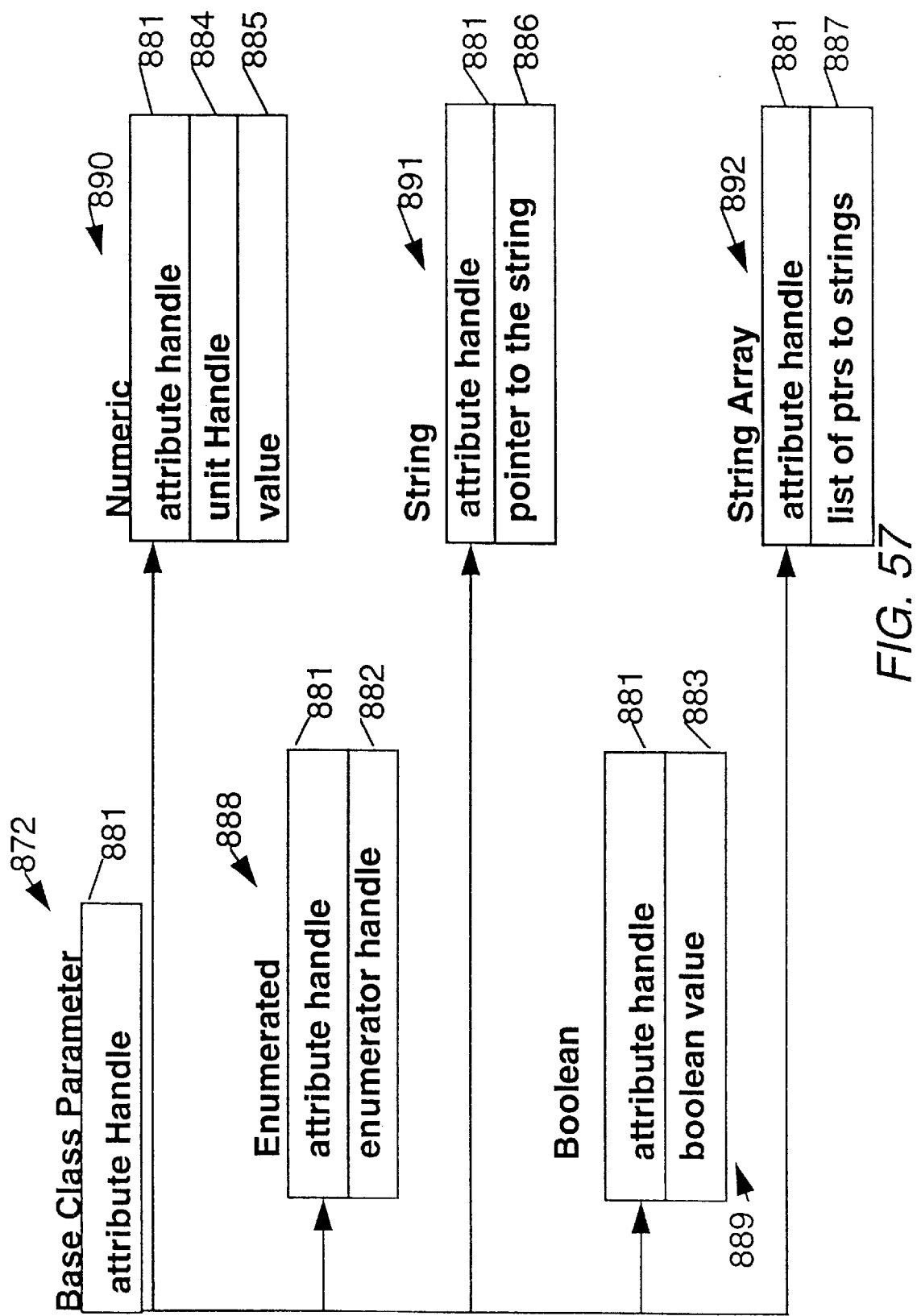
FIG. 57 shows the data structure for five different types of parameters: enumerated, Boolean, numeric, string and string array.

FIG. 57 shows the data structure for five different types of parameters: enumerated, Boolean, numeric, string and string array. Each of the parameter objects 872 has an attribute handle 881. An enumerated object 888 has an attribute handle 881 and an enumerator handle 882. A Boolean object 889 has an attribute handle 881 and a Boolean value 883. A numeric parameter object 890 has an attribute handle 881, a unit handle 884 and a value 885. For example, if the numeric parameter is 10 ohms, the unit handle 884 would be the handle for the ohms unit, and the value 885 would be 10. A string parameter 891 contains a field for the attribute handle 881 and a pointer 886 to an ASCII character string. A string array parameter 892 contains an attribute handle 881 and a field 887 that points to a list of pointers to string arrays.

Figure 58:
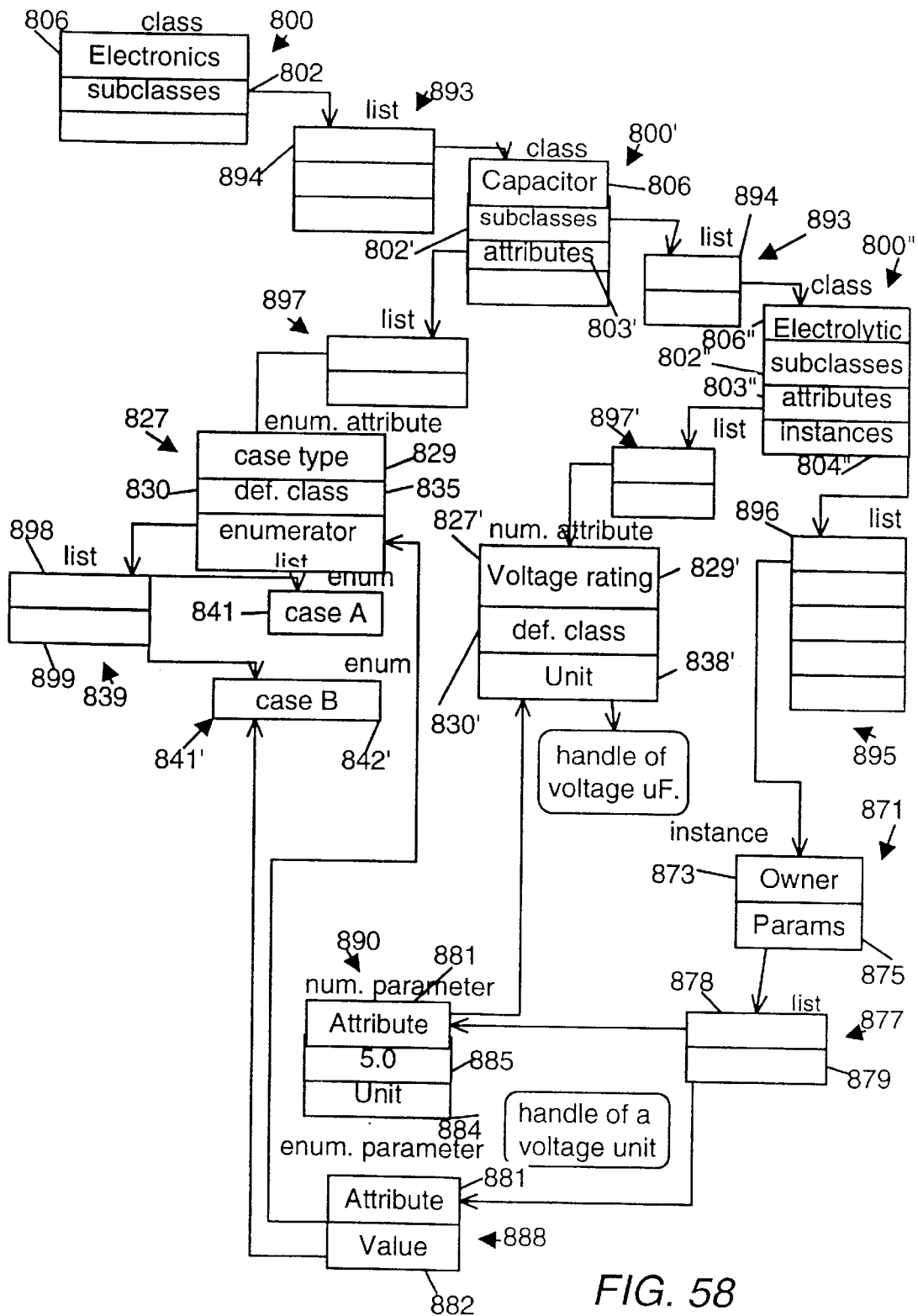
FIG. 58 is an example of a schema with instances.

FIG. 58 is an example of a schema with instances. The example has a class named "electronics", which has a subclass 800' named "capacitors". The capacitors subclass 800' has an attribute 827 called "case type". There are two possible types of cases in this example, which are referred to as "case A" and "case B". The subclass capacitors 800' has a subclass 800' named "electrolytic". The electrolytic subclass 800' has an attribute 827' called "voltage rating", and one instance 871' is provided that has parameters 890 and 888 of 5 volts and a type B case, respectively. Most objects and lists are shown incomplete in order to simplify the illustration, it being understood that like reference numerals refer to the same objects described in connection with FIG. 52, FIG. 53, FIG. 54, FIG. 55, FIG. 56 and FIG. 57.

In FIG. 58, the class object 800 has a name 806, which in this case is "electronics". The class object 800 has a field 802 which points to a list of subclasses 893. The list 893 has a first entry 894 which is the handle for the subclass 800'. In this case, the name 806' of the subclass 800' is capacitors. Of course, all references to schema objects actually use handles (not shown in FIG. 58) and actually go through the handle manager 3137 and handle table. This is not shown in FIG. 58 in order to simplify the diagram.

The subclass 800' capacitor has a field 802' which points to a list of subclasses 893'. The list 893' has an entry 894' which is the handle for subclass 800". The name 806" for subclass 800" is electrolytic. The subclass 800" has a null entry in the field 802" which would normally contain a pointer to a list of subclasses, if any. In this example, the subclass 800" does not have any subclasses.

Returning to the capacitors subclass 800', field 803 contains a pointer to a list of attributes 897. The list 897 contains the handle for the enumerated attribute 827 called "case type". Field 830 of the enumerated attribute object 827 contains the handle of the defining class 800' called capacitors. The enumerated attribute object 827 contains a pointer 835 which points to a list 839 of handles for enumerators. In this example, the list 839 contains a handle 898 for the enumerator 841. The enumerator 841 contains a pointer 842 to the external name for this enumerator, which may be an ASCII string for "case A". Similarly, item 899 in the list 839 points to enumerator 841' associated with case B.

Figure 59:
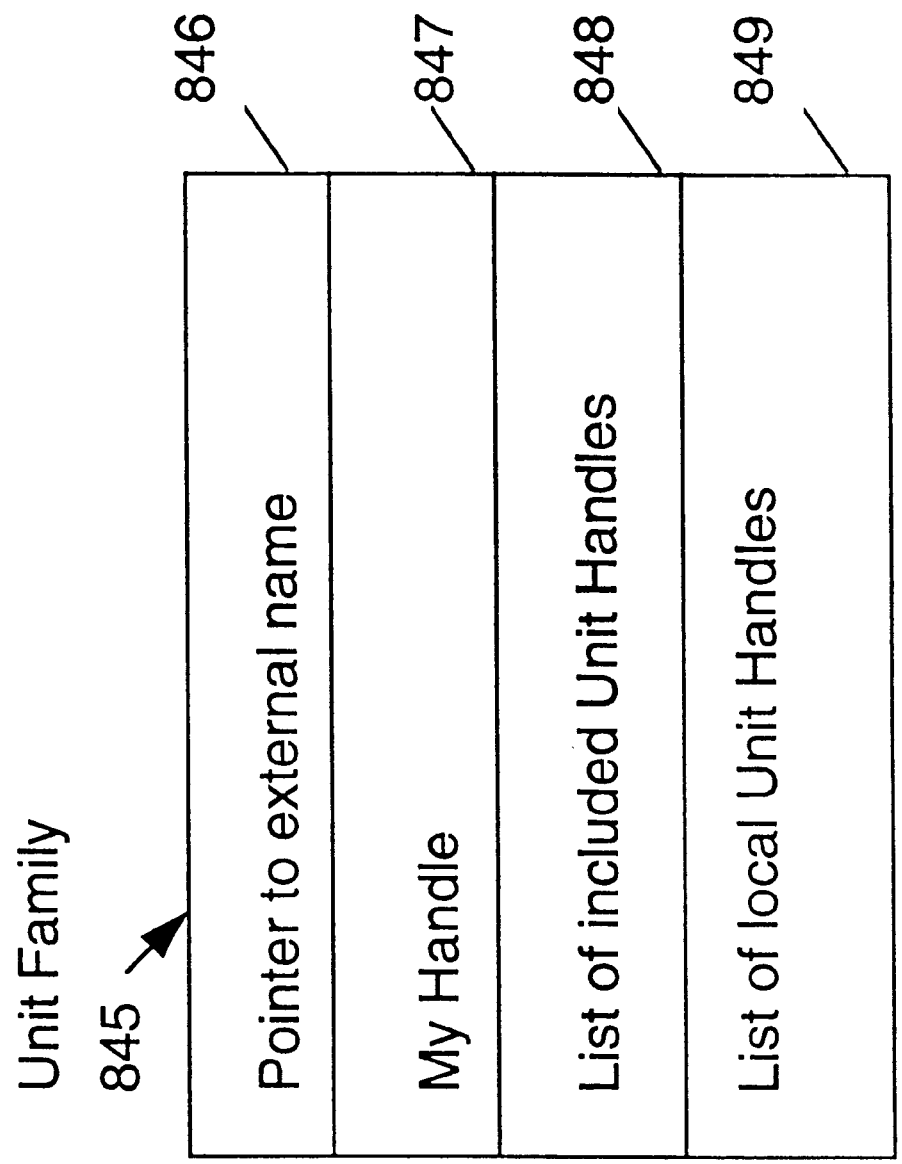
FIG. 59 depicts a data structure for an example of a unit family.

Returning now to subclass 800" named electrolytic, the pointer 803" points to a list 897' of attributes, and one of the fields in the list 897' contains the handle for numeric attribute 827' which is "voltage rating". The numeric attribute 827' contains a field 830' which contains the handle of the defining class which in this example is the class 800" named electrolytic. The numeric attribute object 827' also contains a field 838' which contains the handle of the voltage unit family 845 (see FIG. 59).

Returning to the electrolytic class 800", a field 804" contains a pointer to a list 895 of handles of instances. Item 896 in the list 895 contains the handle associated with instance 871. Instance 871 contains a field 873 which contains the handle of the owning class, which in this case is the electrolytic class 800". The instance data object 871 also contains a field 875 which points to a list of parameters 877. The list 877 contains a pointer 878 which points to the numeric parameter 890. The numeric parameter 890 contains a field 881 which contains the handle of the attribute 827' (voltage rating). The numeric parameter object 890 also contains a field 884 which has the handle of the units, which in this case is "volts". For simplicity, the unit object is not shown. The numeric parameter object 890 contains a field 885 which contains the value 5.0. In this instance, the electrolytic capacitor is rated at 5.0 volts.

The parameter list 877 contains a pointer 879 which points to the enumerated parameter 888. The enumerated parameter object 888 contains a field 881' which contains the handle of the attribute, which in this instance is case type. The enumerated parameter object 888 also contains a field 882 which is the handle for the enumerator 841". In this example, the electrolytic capacitor rated at 5.0 volts has a type case B.

The data structure described herein has significant advantages. Referring to FIG. 58, it is easy to change a name or description in this data structure. Consider an example where the database may contain 1,000 instances of capacitors with a type B case. If the type B case is discontinued, or the name changed to "re-enforced", the only change that would need to be made would be to replace a single ASCII string representing the name for that case type. All 1,000 instances in the database simply contain a handle that the handle manager 3137 associates with that ASCII text string. No other changes need to be made in the database.

Another advantage of the data structure in accordance with the described embodiment is that if a primary value is undefined, nothing is stored. Thus there is no wasted space.

Another advantage of the database structure is that algorithms do not have to be changed based upon location in the tree structure. All algorithms work the same regardless of location in the tree structure. The only special case is the root class. For example, the algorithm for adding an instance to the database is the same no matter where in the tree structure you are located. This makes dynamic changes to the schema very easy. A class or an entire branch of the tree structure can be moved from one location to another simply by changing lists of handles. It is not necessary to run a convert program. Everything is self contained. A class object 800 contains the handle of its parent 801 and thus knows who it's parent is. The class object 800 also contains a pointer 802 to a list of its subclasses, so it knows who its children are.

In a preferred embodiment, the value of parameters are always stored in base units. The objects in fields described do not necessarily occupy a word of memory. In a preferred embodiment, all parameters of a particular type are stored contiguously. This improves the speed of searches. For example, the case type 841' described with reference to FIG. 58 would be stored contiguously with all the other parameters for case type. The numeric parameter of 5.0 volts would be stored in a different physical location in memory contiguous with other numeric volt parameters.

An important function of the dynamic class manager 134 is the ability to modify the database structure during operation. The database structure is known as the schema. The schema of the object oriented database is structured using classes. The classes contain attributes. The attributes may contain enumerators, and unit families. The ability to add, move and delete these items is important to the dynamic operation of the database.

Figure 60A:
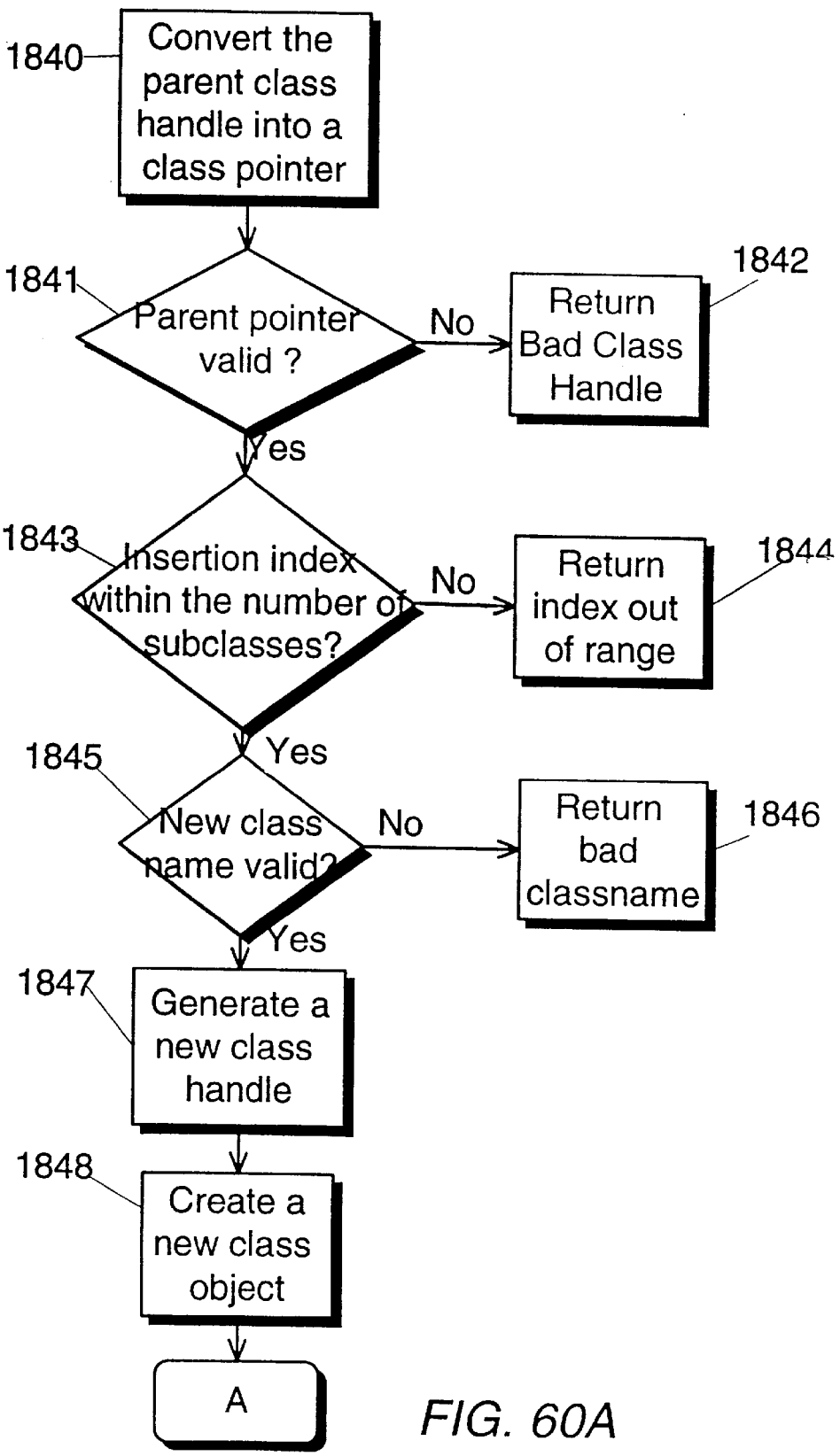
FIG. 60A is a flow chart depicting a method for adding a class to a schema.
Figure 60B:
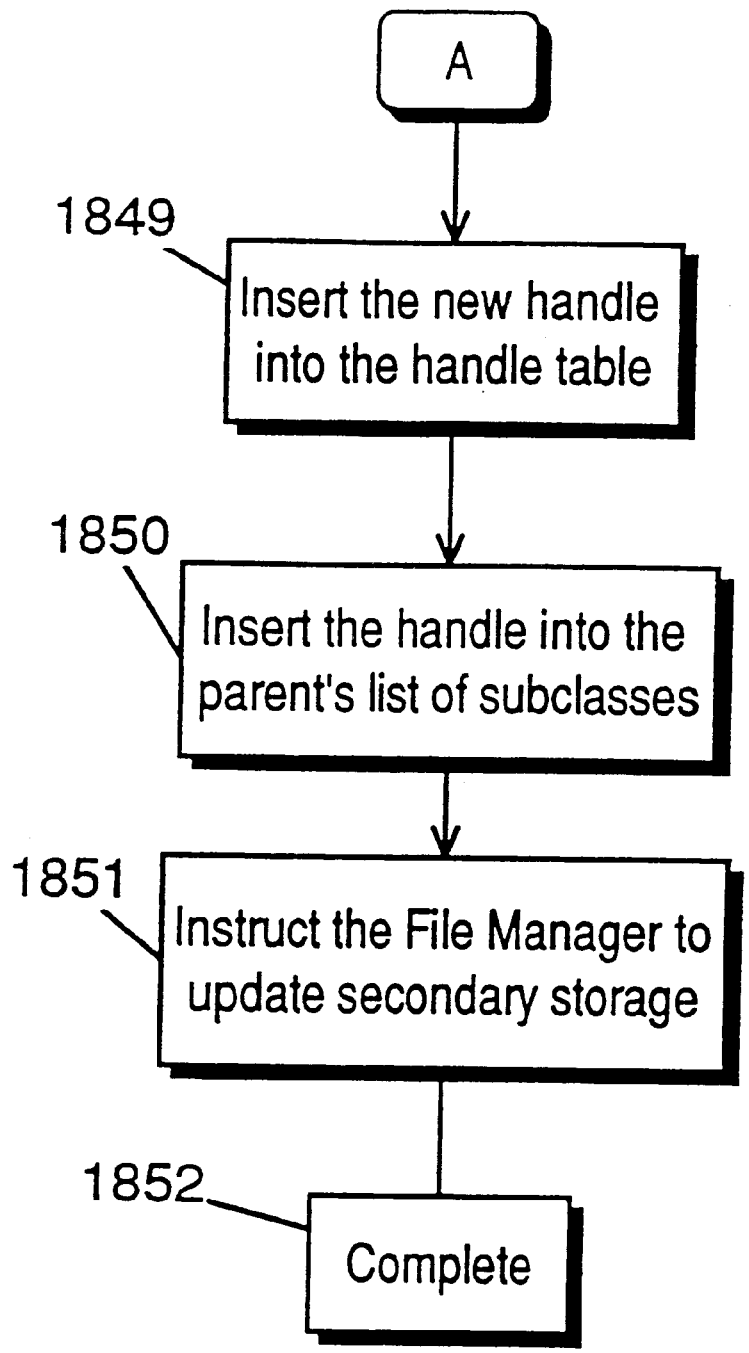
FIG. 60B is a continuation of the flow chart in FIG. 60A.

To add a class to the schema, three items must be known: the class name, the parent of the new class, and the location within the list of subclasses to insert the new class. FIG. 60A and FIG. 60B illustrate this operation. The first step 1840 converts the handle of the parent class into an actual class pointer. The parent pointer must be immediately tested in step 1841 prior to its use. If the pointer proves to be invalid, then the operation terminates at step 1842. If the pointer is valid, the insertion index is tested in step 1843. If it proves to be invalid, the operation is terminated in step 1844. Finally, the name of the class must be tested in step 1845 to determine if it fits the guidelines of valid class names. If the class name fails, then the operation terminates in step 1846. When step 1845 accepts the class name, the new class can be created. A new handle is created in step 1847 first, and then the new class is created in internal memory in step 1848. The new handle is inserted into the table of class handles in step 1849 of FIG. 60B, followed by the handle being added to the parents list of subclass handles in step 1850. The last operation is to cause the file manager 140 to add the new class to the indicated parent on the secondary storage device 110.

Queries

Figure 61:
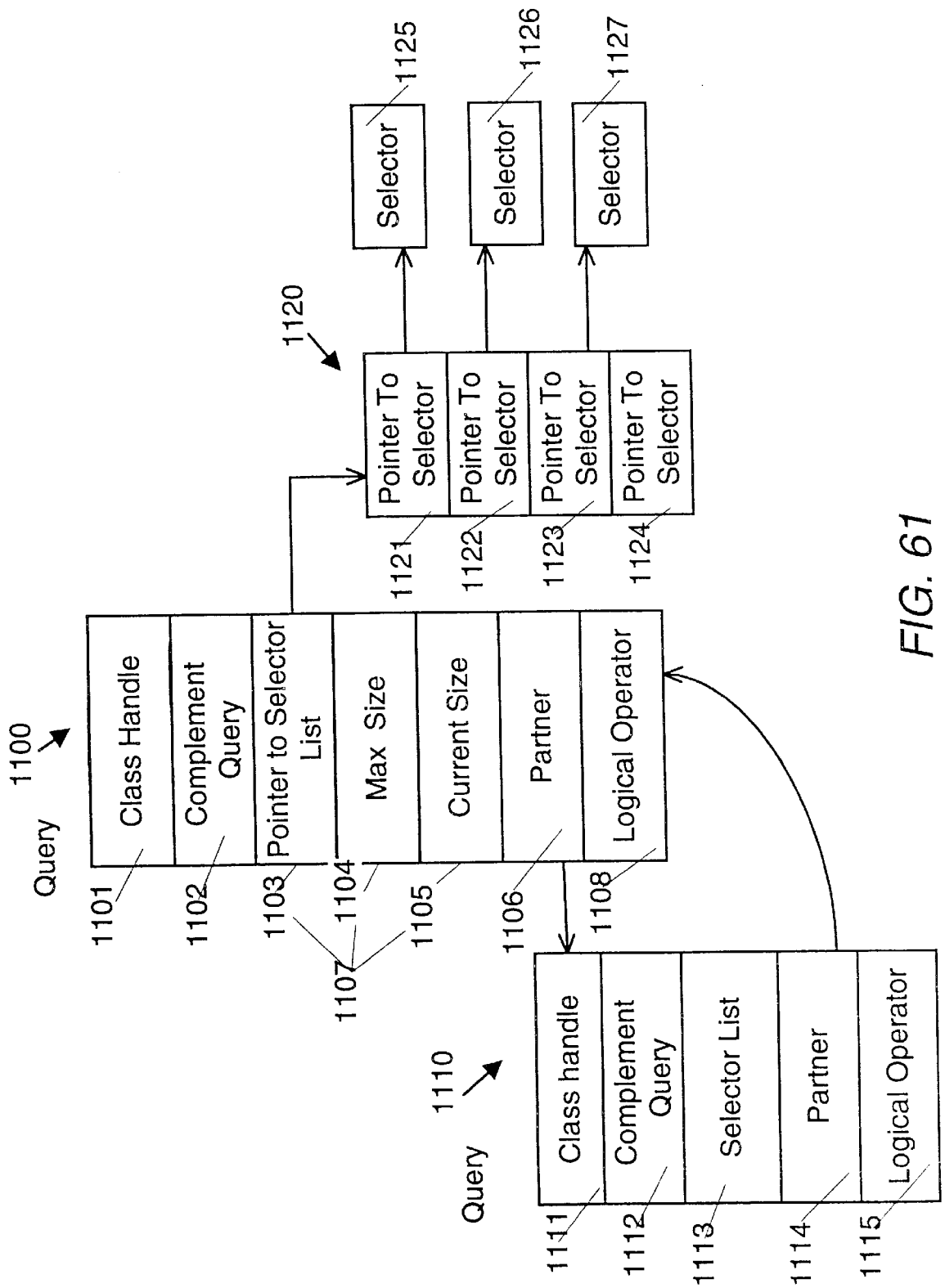
FIG. 61 is a schematic diagram of a query object.

Details of how a query are performed by a knowledge base server 132 may be best understood by first referring to FIG. 61. FIG. 61 is a schematic diagram of a data structure 1000, referred to as a query object 1000, that is used to store a query. A query object 1000 is composed of a class handle 1101, a complement query flag 1102, a selector list 1107, query partner pointer 1106, and a partner logical operator 1108. The query is applied to find a subset of instances in a knowledge base 123 that match the criteria specified by the fields in the query.

The class handle 1101 is called the "query class." The query class binds the query to the instances in the subtree rooted by the class, thus defining the search domain for the query. The query can applied either globally or locally. A global query is applied to all the instances in the subtree. A local query is applied only to the instances that are owned by the query class. The other fields in the query are used to test against the parameter values in the instances.

The parameters for which values are to be tested are specified with the list of selectors, item 1107. The list of selectors is a generic list object 240 comprising the maximum allocated size of the list 1104 and the current size of the list in use 1105. In the example these values are four and three, respectively. The selector list also comprises a pointer to a list of pointers to selectors 1103 which points to the data, item 1120. In this example, three of the pointers are in use, pointer 1121 refers to selector 1125, pointer 1122 refers to selector 1126, and pointer 1123 refers to selector 1127. Pointer 1124 is "Null" because the data is not in use. Selectors are described in more detail with regard to FIG. 62.

A query is applied by comparing each instance in the domain defined by the query class 1101 with each of the selectors in the query. If all the selectors match, then the instance is said to match the query. This means that the conjunction (or 'AND') of the selectors is used. The method steps for applying queries are described in more detail in FIGS. 68, 69, 70, 71, 72, and 42.

The query complement fag 1102 indicates that the query should be complemented. After the selectors have been compared to an instance, if the complement flag 1102 is FALSE, the instance is considered to match if the values in the selectors matched the parameter values in the instance. If the selectors did not match the parameters, then the instance does not match. However, if the complement flag 1102 is TRUE, then the instance is considered to match if the values in the selectors do not the parameter values in the instance. And, if the selectors did not match the parameters, then the instance matches.

The query partner 1106 is a pointer to a second query 1110 that can be associated with the first query 1100. The query partner 1110, has fields identical to the query 1100, being a query class handle 1111, a complement flag 1112, a selector list 1113, a partner 1114, and a logical operator 1115. If the query 1100 has a query partner pointer 1106, then the class handles 1101 and 1111 must be identical, the logical operators 1108 and 1115 must be identical, and the query partner pointer 1106 refers to the second query 1110 and the query partner pointer 1114 refers to the first query 1100. A query 1100 need not have a partner 1110, in which case the query partner pointer 1106 is "Null," and the logical operator 1108 is meaningless.

If a query 1100 has a partner 1110, then an instance matches the query 1100 depending on the logical operator 1108. The logical operator 1108 can be either 'AND' or 'OR'. If the logical operator 1108 is 'AND', then an instance matches the query 1100 only if the instance matches both the first query 1100 and the second query 1110. If the logical operator 1108 is 'OR', then an instance matches the query if it matches either the first query 1100 or the second query 1110 or both queries 1100 and 1110. Thus, the query partner 1106 and logical operator 1108 are used to create queries with more complexity than can be created with only a single query 1100. This partnered query 1106 can be used to perform a conjunction or disjunction of two queries 1100 and 1110.

A practitioner skilled in the art, after having the benefit of this disclosure, will be able to see how to extend this concept of the partner query 1106 in several ways. First, the query 1100 and partner query 1110 form a linked list of just two objects. The query partner pointer 1106 could be modified to become an arbitrary linked list of queries with arbitrary logical operators. The queries could be applied in sequence to determine if an instance matches the query. Or, the partner query pointer 1106 could be modified into a left-child/right-child duple and, along with the logical operator 1108, represent an arbitrary logical query expression with a query tree.

Another extension is to allow the class handles 1101 and 1111 to differ. Recall that the class handle 1101 defines a domain of instances for the query 1100. If the logical operator 1108 between two partnered queries 1100 and 1110 is 'OR', then the domain for the query is the union of the instances in query 1100 and query 1110. If the logical operator 1108 between the queries is 'AND', then the domain for the query is the intersection of the instances in query 1100 and query 1110. Clearly, if the generality mentioned above is used, then the domain for the query is the result of doing all the intersections and unions of all the queries in a linked list or tree.

Figure 62:
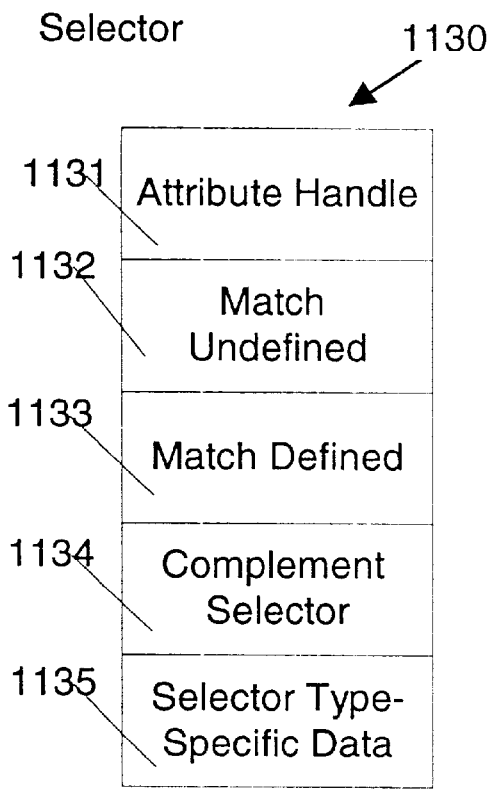
FIG. 62 is a schematic diagram of a selector object.

Referring now to FIG. 62, a selector for an attribute (for example 1125, 1126, or 1127 in FIG. 61) is described in greater detail. The attribute selector 1130 comprises an attribute handle 1131, a match undefined flag 1132, a match defined flag 1133, a complement selector flag 1134, and some attribute type specific data 1135.

The attribute handle 1131 is a reference to an attribute that must be inheritable to the query class 1101 in query 1100 shown in FIG. 61. All attribute handles 1131 in selectors 1130 in a query 1100 must be distinct. In other words, a query can have at most one selector for each of the attributes inheritable to the query class. The attribute handle 1130 specifies which parameter value for instances will be tested when the query is applied. The remaining fields specify the nature of the parameter value test.

The match undefined flag 1132 is used to specify that parameters that are undefined match the selector. If the match undefined flag 1132 is TRUE, then undefined parameters match the selector. If the match undefined flag 1133 is FALSE, then the other fields are used to test for a match.

The match defined flag 1133 is used to specify that parameters that are defined with any value match the selector. If the match defined flag 1133 is TRUE and a parameter value is not undefined, then that parameter value matches the selector. If the match defined flag 1133 is FALSE, then the other fields are used to test for a match. Note that the match undefined flag 1132 and the match defined flag 1133 cannot both be TRUE. This state would be the same as 'always match' and this is done in practice by not specifying a selector for the attribute.

The complement selector flag 1134 is used in conjunction with the selector type-specific data 1135. The type-specific data 1135 are described in the following figures. For example, if the attribute handle 1131 type is Boolean, then the type-specific data 1135 are specifiers for the Boolean parameter values TRUE and FALSE. Or, if the attribute handle 1131 type is enumerated, then the type-specific data 1135 are enumerators that need to match. If the complement selector flag 1134 is TRUE, then the type-specific data 1135 is complemented for the match. This is useful for making the type-specific data simpler. In other words, if the attribute handle 1131 type is enumerated, and the enumerated attribute is, for example, "Color" with one hundred color enumerators, the type-specific data can be set to match every color except "Blue" by setting the type-specific data to match "Blue" and setting the complement selector flag 1134 to TRUE. If the complement selector flag 1134 is FALSE, then the flag has no effect on the selector type-specific data. The selector type-specific data 1135 can be empty, in which case the complement selector flag 1134 is ignored and no test need by done on the parameter value.

The match undefined flag 1132 can be used together with the complement selector flag 1134 and the type-specific data 1135. If the match undefined flag 1132 is TRUE and selector type-specific data 1135 is non-empty, then a parameter value that is either undefined or matches the type-specific data 1135 matches the query. However, if the match defined flag 1133 is TRUE, then the type-specific data 1135 must be empty and, as mentioned previously, the match undefined flag 1132 must be FALSE. These constraints can be summarized in the truth table of Table I:

TABLE I

| defined set? | undefined set? | selector type-specific data non-empty? | |
|---|---|---|---|
| TRUE | TRUE | TRUE | - not allowed, would match everything |
| TRUE | TRUE | FALSE | - not allowed, would match everything |
| TRUE | FALSE | TRUE | - not allowed, defined overrides values |
| TRUE | FALSE | FALSE | - ok |
| FALSE | TRUE | TRUE | - ok |
| FALSE | TRUE | FALSE | - ok |
| FALSE | FALSE | TRUE | - ok |
| FALSE | FALSE | FALSE | - ok, but this state is the same as if the selector didn't exist. In the preferred embodiment, if an application were to set the selector to this state, the selector should be removed from the query. |

Figure 63:
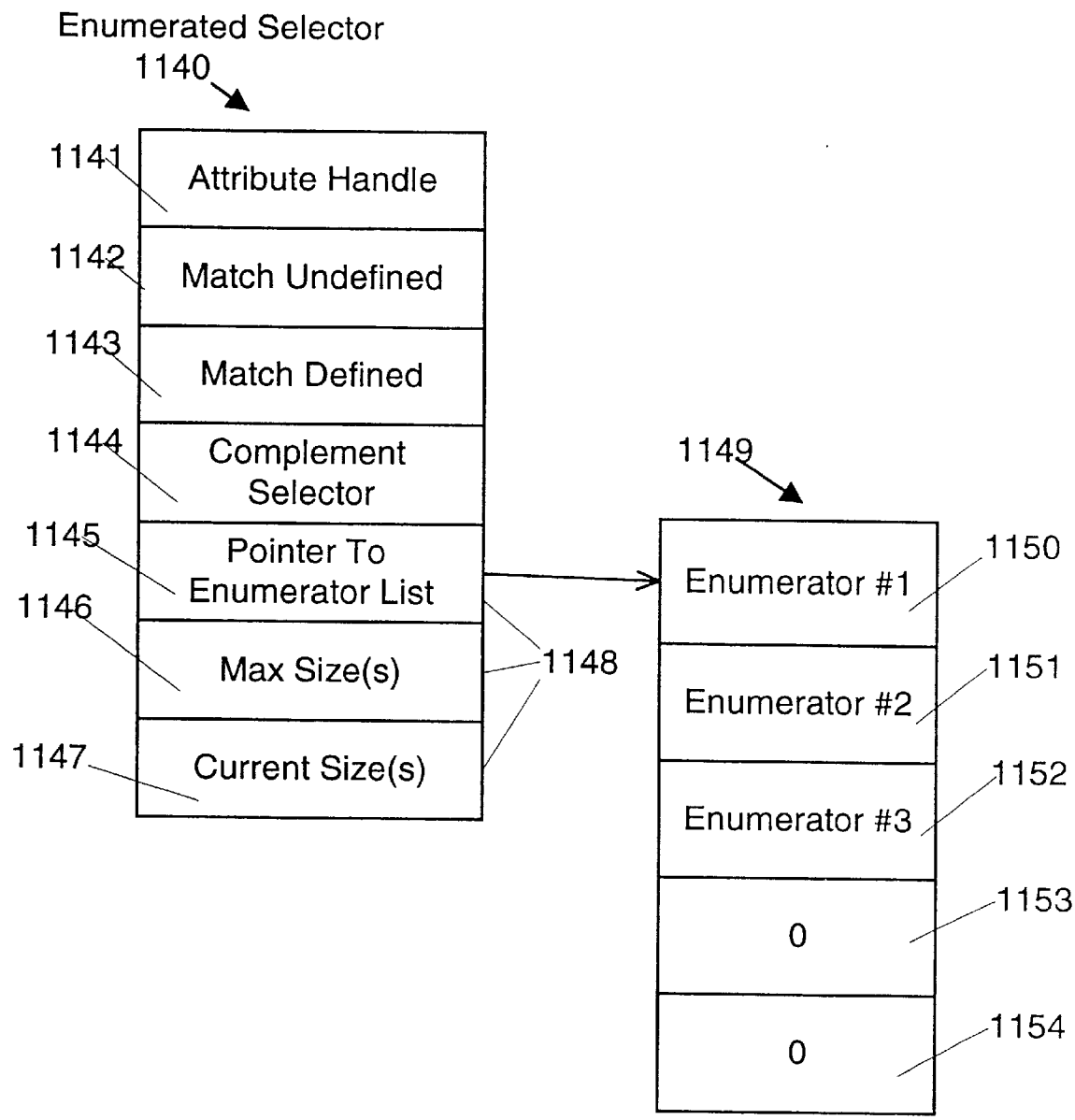
FIG. 63 is a schematic diagram of an enumerated selector object.

The selector type-specific data for enumerated attributes is explained in FIG. 63. In this diagram, the fields common to all selectors are repeated for clarity. The enumerated selector 1140 comprises the attribute handle 1141, the match undefined flag 1142, the match defined flag 1143, and complement selector flag 1144. The type specific data 1148 is a list of enumerators. The list 1148 is a generic list object 240 comprising the maximum allocated size of the list 1146, the current size 1147, and a pointer to a list of enumerator handles 1145. The list of enumerator handles 1149, in this example has five elements, three of which are in use. These are the three enumerators 1150, 1151, and 1152 that are to be compared to parameter values. The two elements of the list 1149 that are not in use, items 1153 and 1154, are set to zero.

An instance with an enumerated parameter value that is any one of the enumerators in the enumerator list 1149 matches the selector. As an example, if the attribute handle 1141 is the enumerated attribute "Color" and the enumerator handles 1150, 1151, and 1152 are the colors "Red," "White," and "Blue," then an enumerated parameter with one of these colors matches the selector. If the parameter is not one of these colors, then it does not match the selector.

Figure 64A:
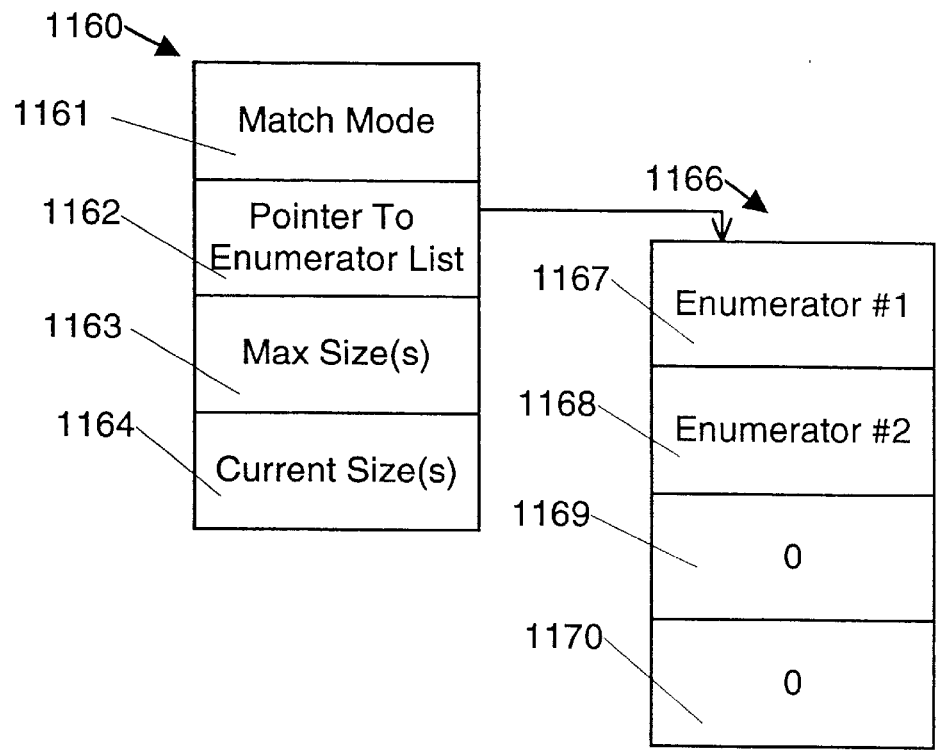
FIG. 64A is a schematic diagram of an enumerated set selector specific data object.
Figure 64B:
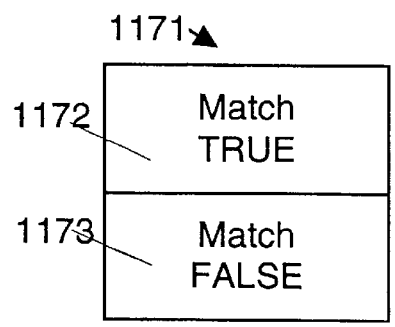
FIG. 64B is a schematic diagram of a Boolean selector specific data object.

Referring next to FIGS. 64A and 64B, the selector type-specific data for an enumerated set selector is shown. Henceforth, the fields common to all selectors will be omitted during this description for clarity, and only the type-specific data will be depicted, it being understood that the other common fields are present, but are not shown. The enumerated set selector type-specific data 1160 comprises a match mode flag 1161 and a list of enumerator handles 1165. The list of enumerators handles 1165 is a generic list object comprising the pointer to the enumerator handles 1162, the maximum size 1163, and current size 1164.

The enumerator handles in the list 1166 are used in conjunction with the match mode 1161 to determine if a parameter value matches the selector. The match mode 1161 can be one of 'ANY', 'ALL', or 'EXACT'. If the match mode 1161 is 'ANY', then the parameter value testing is done in the same manner as for the enumerated type selector 1140. If any one of the enumerated set selector values 1166 equals any one of the enumerated set parameter values, then the parameter value matches. If the match mode 1161 is 'ALL', then only if all of the enumerated set selector values 1166 are found in the enumerated set parameter values does the parameter match. In other words, the enumerated set selector values must be a subset of the parameter values for the match to be TRUE. Finally, if the match mode 1161 is 'EXACT', then the enumerated set parameter values must equal all of the enumerated set selector values 1166 for the match to be TRUE.

FIG. 64B also depicts the Boolean selector type-specific data 1171. If the match TRUE flag 1172 is TRUE, then Boolean parameters values that are TRUE match the selector. If the match FALSE flag 1173 is TRUE, then Boolean parameters values that are FALSE match the selector.

Figure 65A:
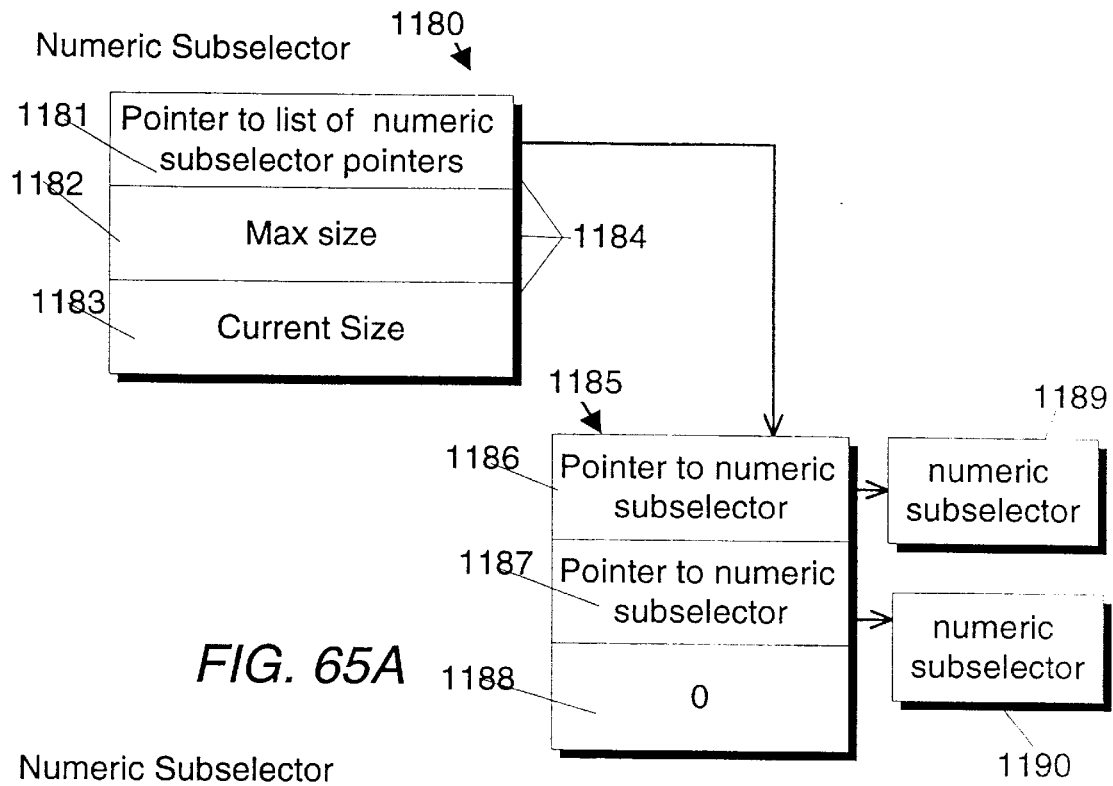
FIG. 65A is a schematic diagram of a numeric selector type-specific data object.
Figure 65B:
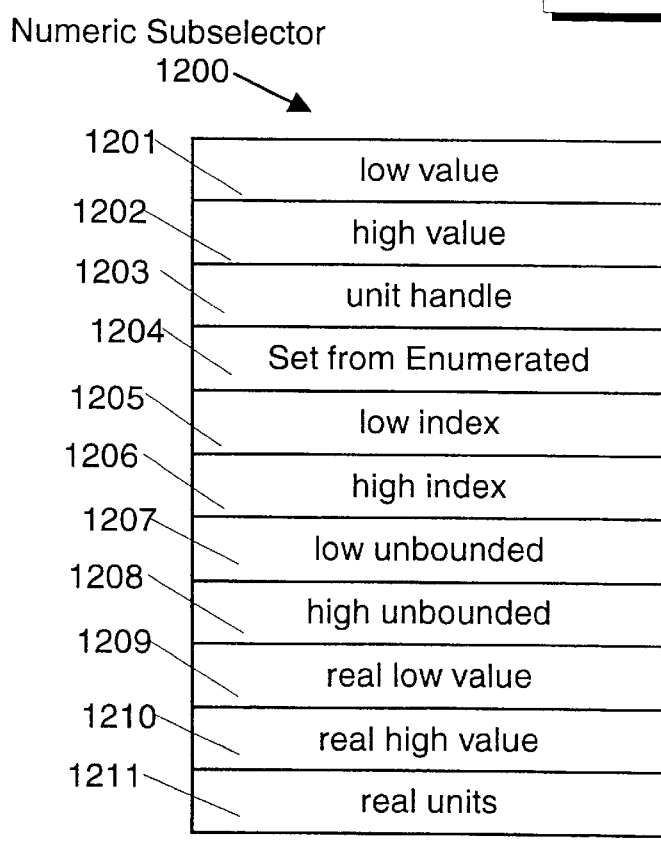
FIG. 65B is a schematic diagram of a numeric subselector object.

Continuing with FIGS. 65A and 65B, the numeric selector type-specific data 1180 is shown. The numeric selector type-specific data is a list 1184 of pointers to numeric sub-selectors. The list 1184 is a generic list object comprising the pointer to a list of pointers to numeric sub-selectors 1181, the maximum size of the list 1182, and the current size 1183. The list of pointers to sub-selectors 1185, is shown in this example with two pointers, item 1186 which points to the numeric sub-selector 1189, and item 1187 which points to the number sub-selector 1190. The remaining pointer 1188 in list 1185 is unused and set to "Null."

The numeric sub-selectors 1189 and 1190 are described more completely as item 1200. The numeric sub-selector 1200 contains several fields that are not used in the query, but are used to recall the way the user specified the query. These fields are the low value 1201, the high value 1202, the unit handle 1203, the set from enumerated flag 1204, the low index 1205, and the high index 1206. A numeric sub-selector can be specified by a low value 1201, high value 1202, and unit handle 1203. The low and high values are converted from the unit handle 1203 into the base units for the numeric attribute 1131. The converted low and high values are stored in the real low value 1209 and real high value 1210, respectively. The base unit to which the values were converted is stored in the real units handle 1211.

A numeric sub-selector can also be specified by a low index 1205 and a high index 1206. These indices refer to values in an enumerated unit table that can be associated with the numeric attribute 1131. The numeric values found in the enumerated unit table at the low and high indices are stored in the real low value 1209 and real high value 1210, respectively. The base unit associated with the enumerated unit table is stored in the real units handle 1211.

The real low value 1209 and real high value 1210 define a range of values in between which a numeric parameter value must lie for the parameter to match the selector. In addition, a numeric sub-selector can be specified to be open-ended at either the low end, high end, or both. This is done by setting the low unbounded flag 1207 or the high unbounded flag 1208 to TRUE. If either flag is TRUE, then the respective real low value 1209 or real high value 1210 is ignored. Using the low unbounded flag 1207 or the high unbounded flag 1208 is exactly equivalent to setting the real low value 1209 or real high value 1210 to negative or positive infinity, respectively.

A numeric parameter value is compared to the ranges defined in all the numeric sub-selectors and if the numeric parameter value lies within at least one of the ranges, then the numeric parameter matches the selector.

Figure 66:
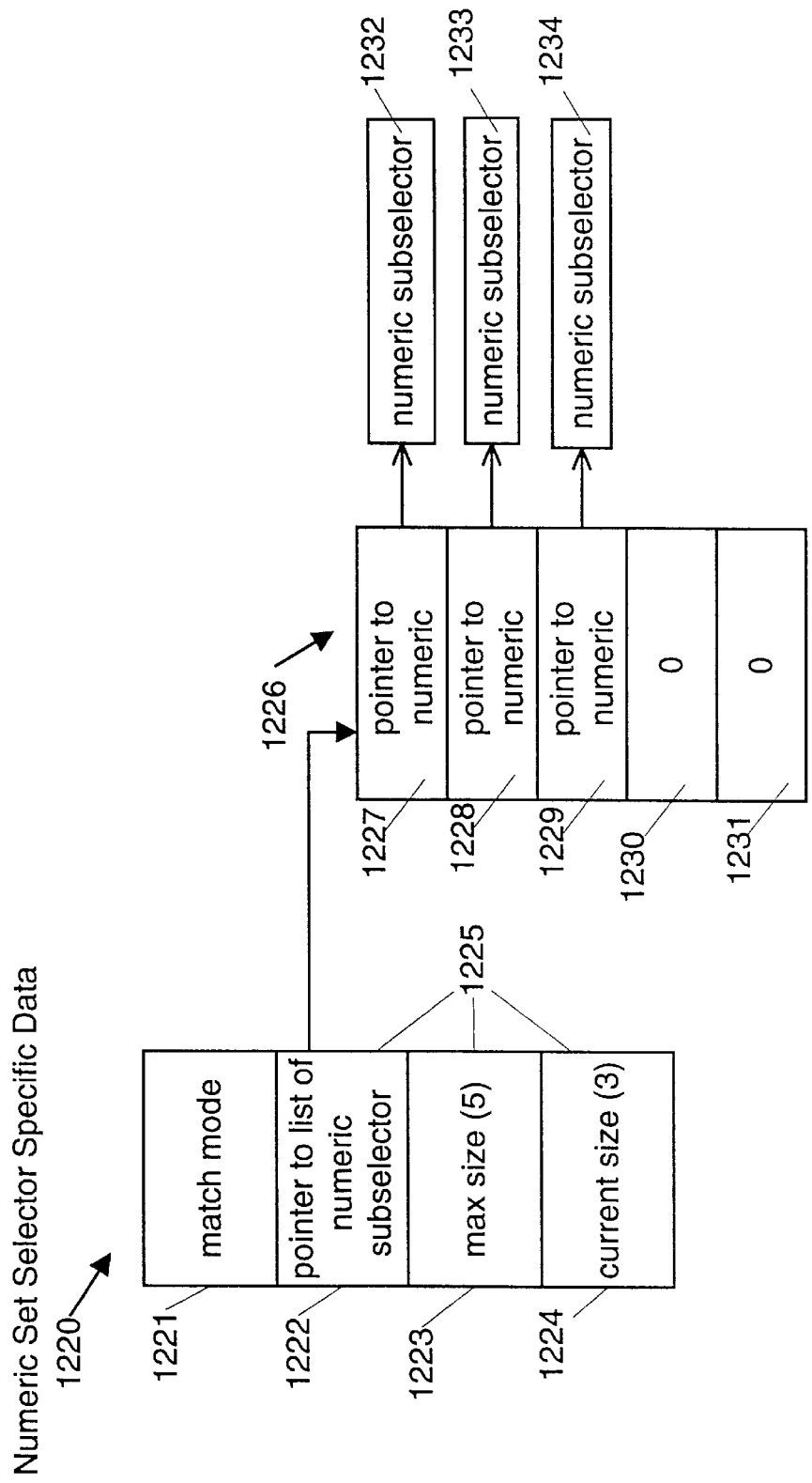
FIG. 66 is a schematic diagram of a numeric set selector specific data object.
Figure 68:
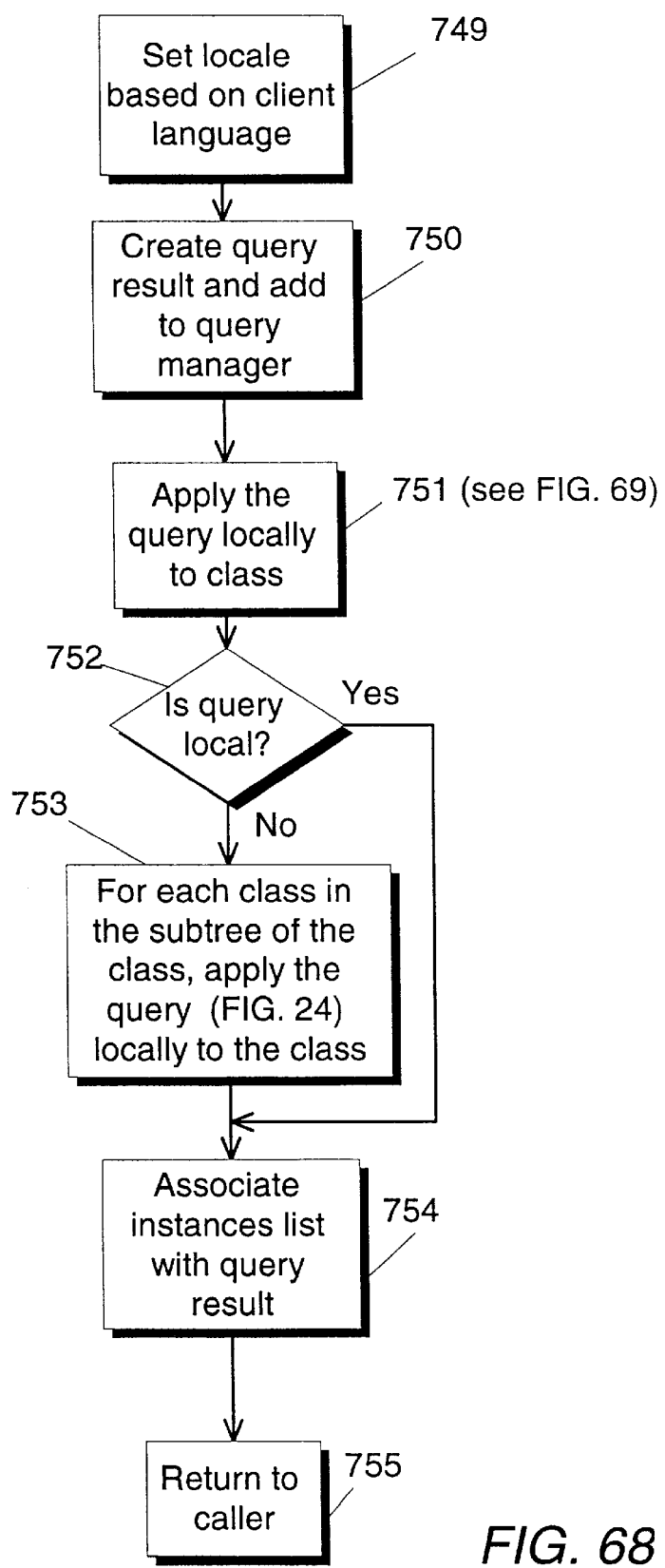
FIG. 68 is a flow chart describing a method of applying a query.

The numeric set selector type-specific data 1220 is shown in FIG. 66. It is composed of a match mode flag 1221 and a list of pointers to numeric sub-selectors 1225. The match mode flag 1221 has semantics identical to the match mode flag 1161 in the enumerated set selector type-specific data 1160. The list 1225 is a generic list object 240 comprising the pointer to the list of pointers to sub-selectors 1222, the maximum list size 1223, and the current size 1224. The list of pointers to numeric sub-selectors 1226 is identical in form and use to the list 1185 in the numeric selector 1180 and the numeric sub-selectors 1232, 1233, and 1234 in this example are the numeric sub-selector 1200 shown in FIG. 65B.

Similar to the way the enumerated set selector 1160 is used, the numeric set selector 1220 matches a numeric set parameter depending on the match mode flag 1221. If the match mode flag is 'ANY', then if any one of the numeric set parameter values is in between any of the ranges specified by the numeric sub-selectors, then the parameter matches the selector. The two other match mode values are slightly different from the match modes in the enumerated set because the numeric sub-selector allows a range. If the match mode flag is 'ALL', then all of the ranges specified by the numeric sub-selectors must match the numeric set parameter values for the selector to match. In other words, comparing the numeric set parameter values with the ranges in the numeric sub-selectors, each numeric sub-selector must get matched, but not all the parameters need match. And, if the match mode flag is 'EXACT', then each of the numeric set parameter values must be in between at least one of the ranges specified by the numeric sub-selectors and each of the ranges specified by the numeric sub-selectors must match at least one of the numeric set parameter values for the selector to match.

Finally, string selector type-specific data, string array selector type-specific data, and international string selector type-specific data are identical, shown as item 1240. This will be referred generically as string type-specific data. The string type-specific data 1240 comprises a list of pointers to string sub-selectors 1244. The list 1244 is a generic list object comprising the pointer to a list of pointers to string sub-selectors 1241, the maximum size of the list 1242, and the current size of the list 1243.

The list of pointers to string sub-selectors 1245 is depicted in FIG. 67A with a maximum of four elements, of which two are currently used. The pointer 1246 refers to a string sub-selector 1250, the pointer 1247 refers to a string sub-selector 1251, and the two elements 1248 and 1249 are set to "Null" because they are unused.

String subselectors 1252, shown in FIG. 67B, are composed of a pointer to a character string 1253, which is a pattern 1255 for matching against the string. In the preferred embodiment, the pattern 1255 is a sequence of characters that match strings similar to Unix shell patterns. Also, the pattern 1255 can be a more powerful regular expression. For example, the pattern "45*96" matches all strings that start with "45" and end with "96". The complement pattern flag 1254 is used to invert the sense of the pattern match. If the complement pattern flag 1254 is FALSE, then it has no effect. However, if the complement pattern flag 1254 is TRUE, then strings that do not match the pattern match the string sub-selector. Using the example above, if the complement pattern flag were TRUE, then all strings that do not start with "45" and end with "96" would match the string sub-selector.

The semantics of the string selector match depend on the type of the attribute. A string parameter value matches the selector if any one of the string sub-selectors match. Also, an international string parameter value matches the selector if any one of the string sub-selectors match. Methods used for international string parameters are disclosed in more detail in application Ser. No. 08/745,255, filed contemporaneously herewith on Nov. 8, 1996, by William C. Heiny, for DYNAMICALLY SELECTABLE LANGUAGE DISPLAY SYSTEM FOR OBJECT ORIENTED DATABASE MANAGEMENT SYSTEM, now U.S. Pat. No. 5,778,356, the entire disclosure of which is incorporated herein by reference. If the attribute type is a string array, then the string array parameter value matches if any one of the elements of the string array parameter values matches any one of the string sub-selectors.

Figure 69:
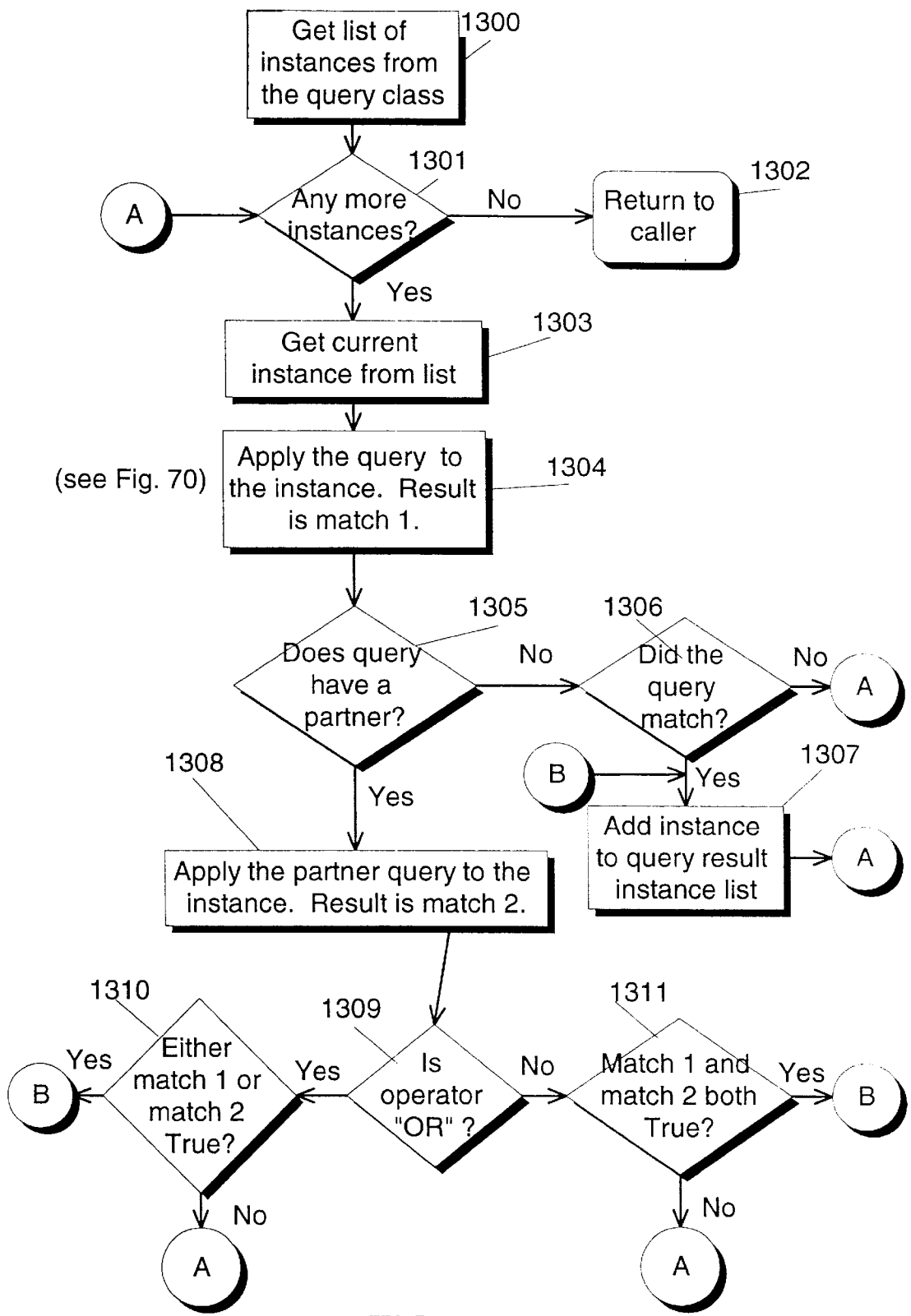
FIG. 69 is a flow chart describing a method of applying a query to a class.

The procedure for applying each of the selectors in the query to each of the instances owned by a class is described in FIG. 69. Beginning with step 1300, processing begins with the list of instances that are owned by the class. If the list of instances is empty at step 1301, then control is returned to the caller, step 1302.

Figure 70:
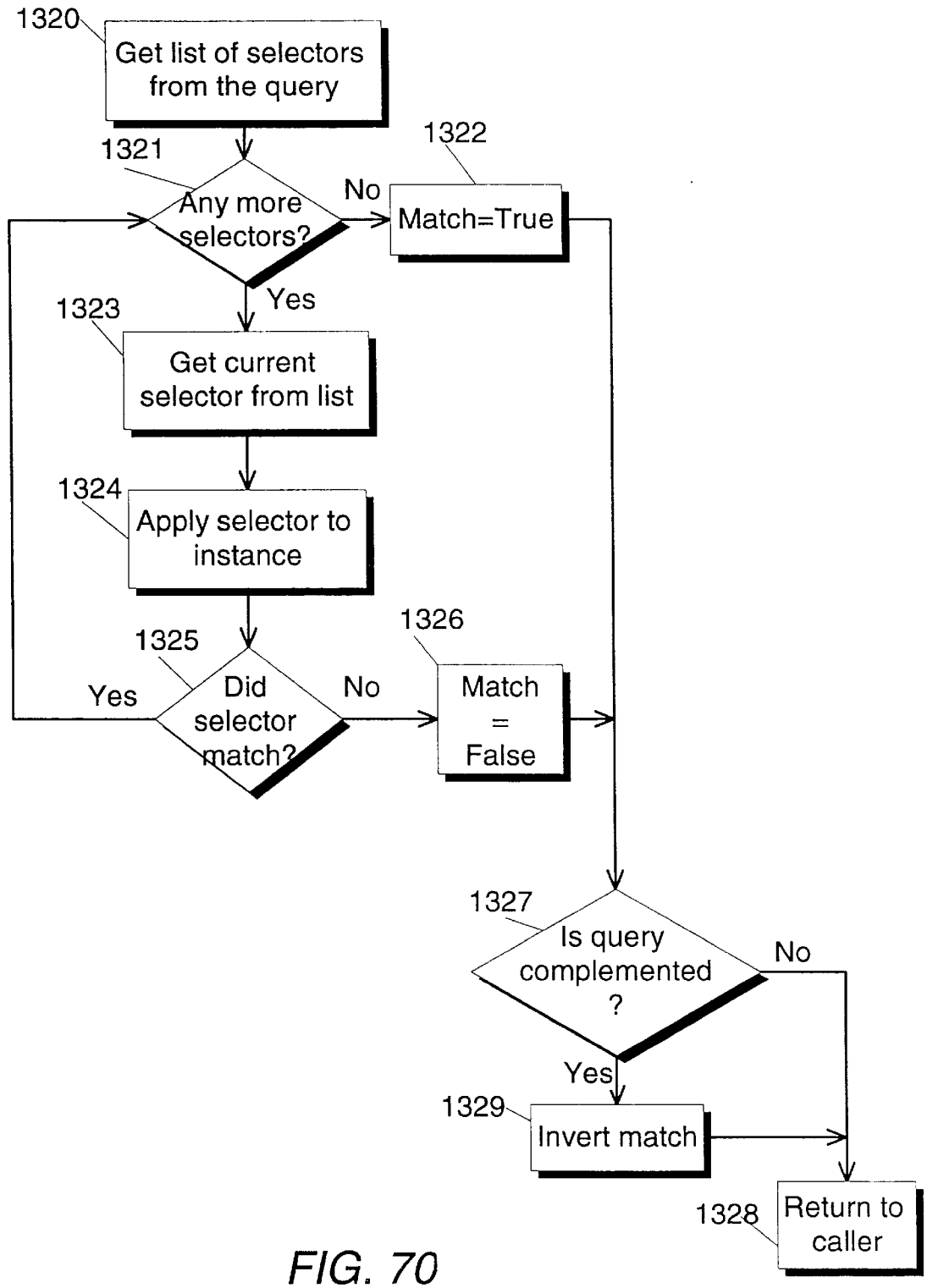
FIG. 70 is a flow chart describing a method of applying a query to multiple instances.

At step 1301, if there are instances to be examined, control continues at step 1303. At step 1303, the first instance to be examined becomes the current instance. The query is applied to the current instance in step 1304. This step 1304 is explained in more detail in FIG. 70, beginning with step 1320. The return 1328 from FIG. 70 is a Boolean value which is TRUE if the match between the instance and the query succeeded. If the match failed, then the return 1328 is FALSE. This result is called "match1" in this example.

Referring to FIG. 69, the query is tested for a non-null partner in step 1305. If the query does not have a partner, processing continues with step 1306. The result of applying the query to the instance is known to be match1. In step 1306, if match1 is FALSE, then processing continues with step 1301 where the list of instances is inspected to see if any remain to be processed. If instances remain to be processed at step 1301, then processing continues at step 1303, where the next instance to be examined becomes the current instance. Control continues with step 1304 as described above.

If the value of match1 is TRUE at step 1306, then control passes on to step 1307. At step 1307 the instance, which is now known to match, is added to the query result instance list. Control then continues with step 1301 as described above.

If the query has a partner at step 1305, then the partner query must also be applied to the instance. Processing continues with step 1308 where the partner query is applied to the instance using the method shown in FIG. 70 beginning at step 1320. This is the same method used for the instance and the first query, and the description of the steps of this method need not be repeated. The result of this match is called "match2" in this example.

Now returning to FIG. 69, match1 and match2 must be logically combined to determine the match for the partnered query. In step 1309, the logical operator 1108 is checked to see if it is "OR". If it is "OR", then processing continues with step 1310. If it is not "OR" (it must, therefore, be "AND"), processing continues with step 1311. In step 1310, if either of match1 or match2 is TRUE, then control continues with step 1307 where the instance is known to match the query and it is added to the query result instance list. Otherwise, the instance does not match and control continues with step 1301 as described above. In step 1311, if both of match1 or match2 is TRUE, then control continues with step 1307 where the instance is known to match the query and it is added to the query result instance list. Otherwise, the instance does not match, and control continues with step 1301 as described above.

After having the benefit of this disclosure, a practitioner skilled in the art will appreciate that this algorithm can be optimized. The logical operator 1108 could be tested at step 1305 and, if match1 is TRUE and the logical operator is "OR", then there is no need to apply the partner query. The instance is known to match the query and a branch directly to step 1307 can be done.

FIG. 70 shows the process of applying the selectors 1120 of a query 1100 to a single instance. The process begins with the list of selectors from the query at step 1320. The list of selectors is examined in step 1321. If the list of selectors is empty at step 1321, then control continues at step 1322. A query with zero selectors always means that the instance thus far matches the query. At step 1322, the match state is set to TRUE.

However, a query can be complemented. The method continues with step 1327 where the query complement flag 1102 is tested. If the query complement flag 1102 is FALSE, then the method continues with step 1328 where the match state is returned to the caller. At step 1327, the query complement flag 1102 is TRUE, then the match state must be inverted at state 1329. At step 1329, if the match state is TRUE, then it is switched to FALSE. If the match state is FALSE, it is switched to TRUE, thus complementing the value. The method continues with step 1328 and the match state is returned to the caller.

If the list of selectors is not empty at step 1321, then the first selector becomes the current selector to be examined at step 1323. At step 1324 the current selector is applied to the instance. This method is explained in detail in FIG. 71 beginning with step 1330. Referring to FIG. 70, the selector to be applied to the instance in step 1324 is tested in step 1325. If the selector does not match the instance, then the entire query does not match the instance and the method continues with step 1326. At step 1326, the match state is set to FALSE and control continues with step 1327 as described above.

If the selector does match the instance in step 1325, then the remaining selectors must be tested and the method returns to step 1321. At step 1321, a check is made to see if any selectors remain to be examined. If the list of selectors has been exhausted, the method continues with step 1322. Otherwise, the method continues with step 1323, where the next selector that has not been processed becomes the current selector.

Notice that all the selectors must match the instance for the query to match the instance and thus be added to the query result instance list. This means that the query comprises the conjunction or logical 'AND' of the selectors. In this preferred embodiment, the conjunction is optimized by rejecting the instance upon the first selector that doesn't match.

Figure 71:
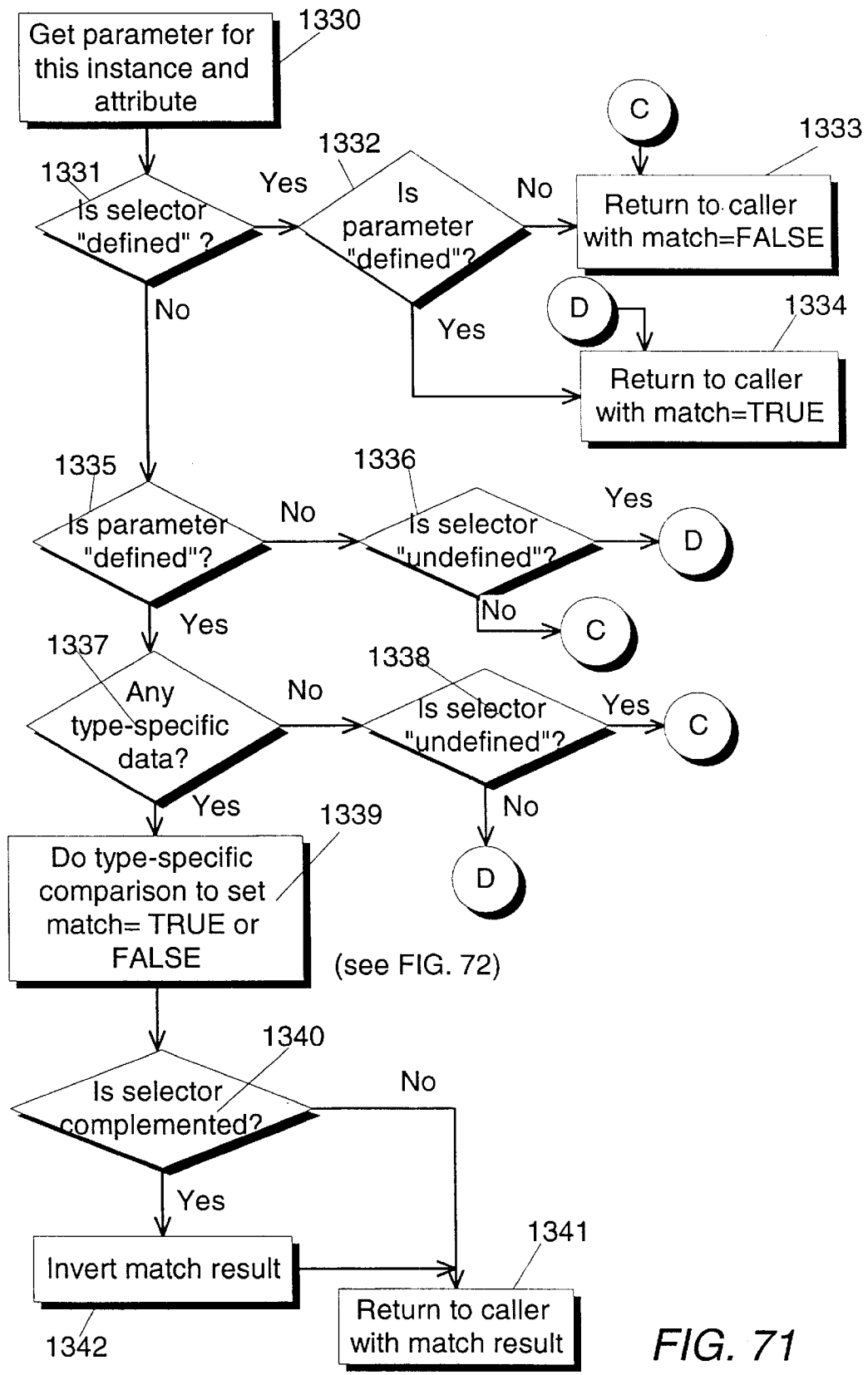
FIG. 71 is a flow chart describing a method of applying a selector to an instance.

FIG. 71 shows the algorithm for matching a single selector and instance. Beginning at step 1330, the parameter for the current instance (found in step 1303 shown in FIG. 69) for the attribute corresponding to the selector's attribute is found. Additional information concerning this technique is disclosed in application Ser. No. 08/339,481, filed Nov. 10, 1994, by Thomas S. Kavanagh, et al., for OBJECT ORIENTED DATABASE MANAGEMENT SYSTEM, now U.S. Pat. No. 5,839,965 the entire disclosure of which is incorporated herein by reference.

A truth table demonstrating the test that must be performed between the parameter and attribute is shown in Table II. This table combines the five legal states of the selector (see FIG. 62) with the state of the parameter value (defined or undefined). The result of the match is shown in Table II.

TABLE II

| match defined set? | parameter is defined? | match undefined set? | selector type-specific data non-empty? | result of match |
|---|---|---|---|---|
| TRUE | TRUE | FALSE | FALSE | TRUE |
| TRUE | FALSE | FALSE | FALSE | FALSE |
| FALSE | TRUE | TRUE | TRUE | Test parameter |
| FALSE | TRUE | TRUE | FALSE | FALSE |
| FALSE | TRUE | FALSE | TRUE | Test parameter |
| FALSE | TRUE | FALSE | FALSE | TRUE |
| FALSE | FALSE | TRUE | TRUE | TRUE |
| FALSE | FALSE | TRUE | FALSE | TRUE |
| FALSE | FALSE | FALSE | TRUE | FALSE |
| FALSE | FALSE | FALSE | FALSE | FALSE |

The preferred method for implementing the truth table begins at step 1331 in FIG. 71. At step 1331, the selector is checked for the match defined flag 1133. If the match defined flag 1133 is TRUE, then the method continues with step 1332. In step 1332, if the parameter is not defined, then the method continues with step 1333, where control is returned to the caller (step 1328 in FIG. 70) with the indication that the selector and parameter do not match (match=FALSE). In step 1332, if the parameter is defined then the method continues with step 1334, where control is returned to the caller with the indication that the selector and parameter do match (match=TRUE).

If the the match defined flag 1133 in step 1331 is FALSE, then the method continues with step 1335. At step 1335 the parameter is checked to see if it is defined. If the parameter is not defined (in other words, the parameter has not been given a value), then the method continues with step 1336. In step 1336, a check is made to see if the selector matches undefined parameters. If the match undefined flag 1132 is set in the selector, then the method continues with step 1334 as described above. If the match undefined flag 1132 is not set in the selector, then the method continues with step 1333 as described above.

If the parameter is defined in step 1335, then the method continues with step 1337. Selectors can specify zero values to match. For example, the selector may be set to match only undefined parameters. At step 1337, if there are no type-specific data 1135 set in the selector, then the method continues with step 1338. In step 1338, a check is made to see if the selector matches undefined parameters. If the match undefined flag 1132 is set in the selector, then the method continues with step 1333 as described above. If the match undefined flag 1132 is not set in the selector, then the method continues with step 1334 as described above.

If type-specific data 1135 are set in the selector at step 1337, then the method continues at step 1339. In step 1339, a determination of the type of the parameter (and selector) is made, which determines the type of test that is done to see if the parameter and selector match. The semantics of each type-specific test is described in more detail in FIG. 72. Thus, the applicable test may be "plugged in" at this point in the flowchart of FIG. 71. A match value of either TRUE or FALSE will be generated and returned by each specific test when the described method is performed.

Referring to FIG. 71, the method continues with step 1340 after the selector and parameter values have been compared. If the complement selector flag 1134 is set to FALSE, the method continues with step 1341 where the result of the match is returned to the caller. If the complement selector flag 1134 is set to TRUE, then the result of the match must be inverted. At step 1342, if the match was TRUE then it is changed to FALSE. If the match was FALSE, then it is changed to TRUE in step 1342. The method continues with step 1341 where the result of the match is returned to the caller.

Figure 72:
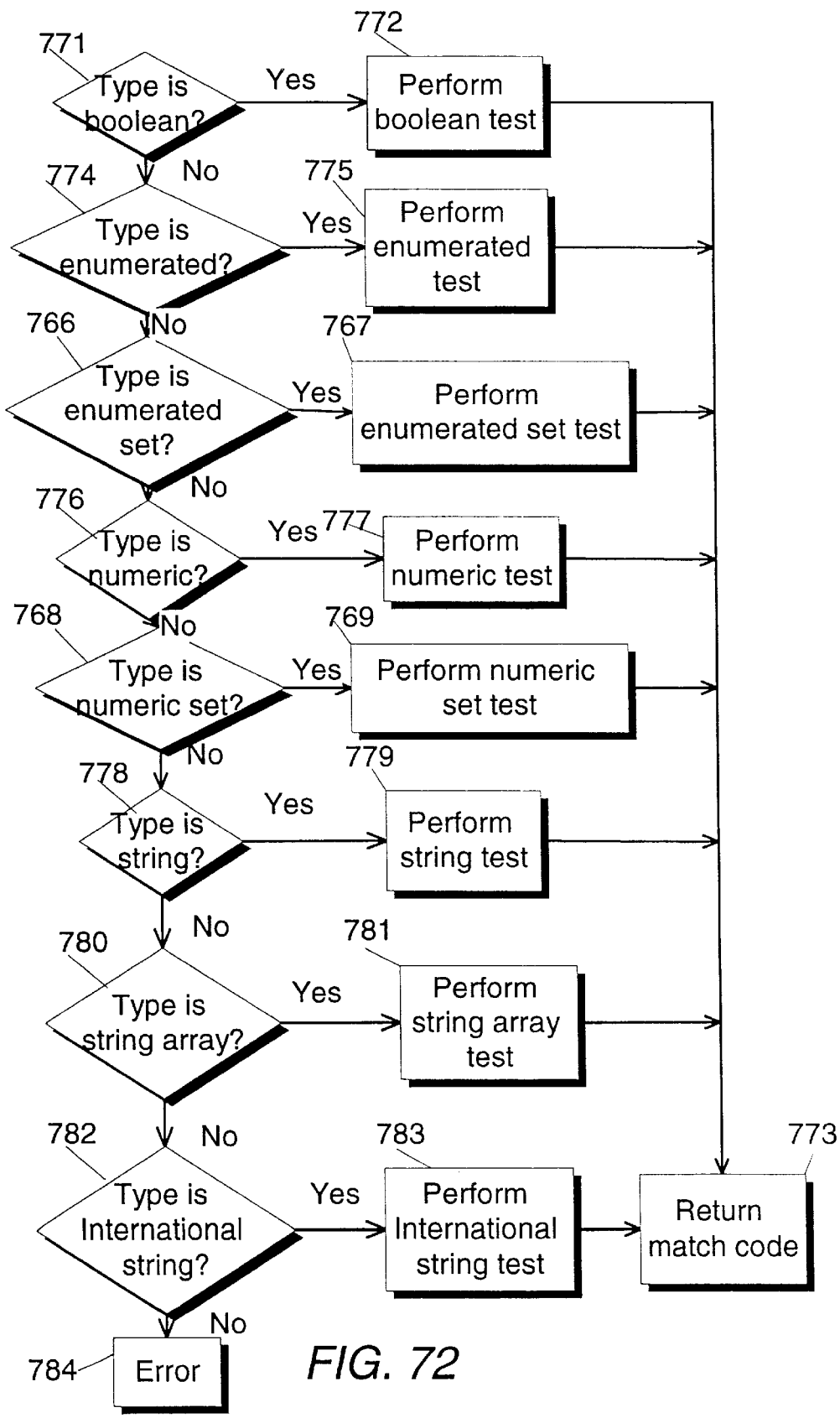
FIG. 72 is a flow chart depicting a process for applying a selector to a parameter.

One procedure for comparing a parameter and a selector for purposes of applying a query is shown in FIG. 72. The system determines the type of the parameter (and selector) which determines the type of test that is done to determine if the parameter and selector match. At step 771, the type is tested for boolean. If the type is boolean, control continues with step 772. If the type is not boolean, control continues with step 774. If the type is enumerated at step 774, then the method continues with step 775. Otherwise, the method continues with step 766. If the type is an enumerated set at step 766, then the method continues with step 767. Otherwise, the method continues with step 776. If the type is numeric at step 776, then the method continues with step 777. Otherwise, the method continues with step 776. If the type is a numeric set at step 768, then the method continues with step 769. Otherwise, the method continues with step 778. If the type is string at step 778, then the method continues with step 779. Otherwise, the method continues with step 780. If the type is string array at step 780, then the method continues with step 781. Otherwise, the method continues with step 782. If the type is international string at step 782, then the method continues with step 783. Otherwise, the method continues with step 784. In step 784, an error is returned because the type is not one of those recognized by the system.

At step 771, the Boolean test is performed. If the value of the parameter matches the value in the selector (as explained in connection with FIG. 63), then the method continues with step 773, returning a match to the caller. Otherwise, the method continues with step 773, returning no match to the caller.

At step 774, the enumerated parameter value is compared with the list of enumerators in the selector. If the parameter value matches one of the enumerators in the selector, then control continues with step 773, returning a match to the caller. Otherwise, control continues with step 773, returning no match to the caller.

At step 766, the enumerated set parameter value is compared with the list of enumerators in the selector (as explained in connection with FIGS. 64A & 64B).

At step 776, the numeric parameter value is compared with the numeric values in the selector. The parameter value matches if the numeric value is within the range of the numeric values specified in the selector. If the parameter value matches, then control continues with step 773, returning a match to the caller. Otherwise, control continues with step 773, returning no match to the caller.

At step 768, the numeric set parameter value is compared with the list of enumerators in the selector (as explained in connection with FIGS. 65A & 65B).

At step 778, the string parameter value is compared with the string patterns in the selector. If any one of the string patterns matches the string parameter value, then the parameter value matches. Additional information on pattern matching can be found in P. J. Plauger, *The Standard C Library* (1992). If the parameter value matches, then control continues with step 773, returning a match to the caller. Otherwise, control continues with step 773, returning no match to the caller.

At step 780, the string array parameter values are compared with the string patterns in the selector. If any one of the string array values matches any one of the patterns in the selector, then the parameter value matches. If the parameter value matches, then control continues with step 773, returning a match to the caller. Otherwise, control continues with step 773, returning no match to the caller.

At step 782, the international string parameter value 216 is compared with the string patterns in the selector. The international string parameter value 216 that is matched with the pattern is character string 279 found as shown in FIG. 9A using the process in FIG. 17. If the parameter value matches, then control continues with step 773, returning a match to the caller. Otherwise, control continues with step 773, returning no match to the caller.

Figure 42:
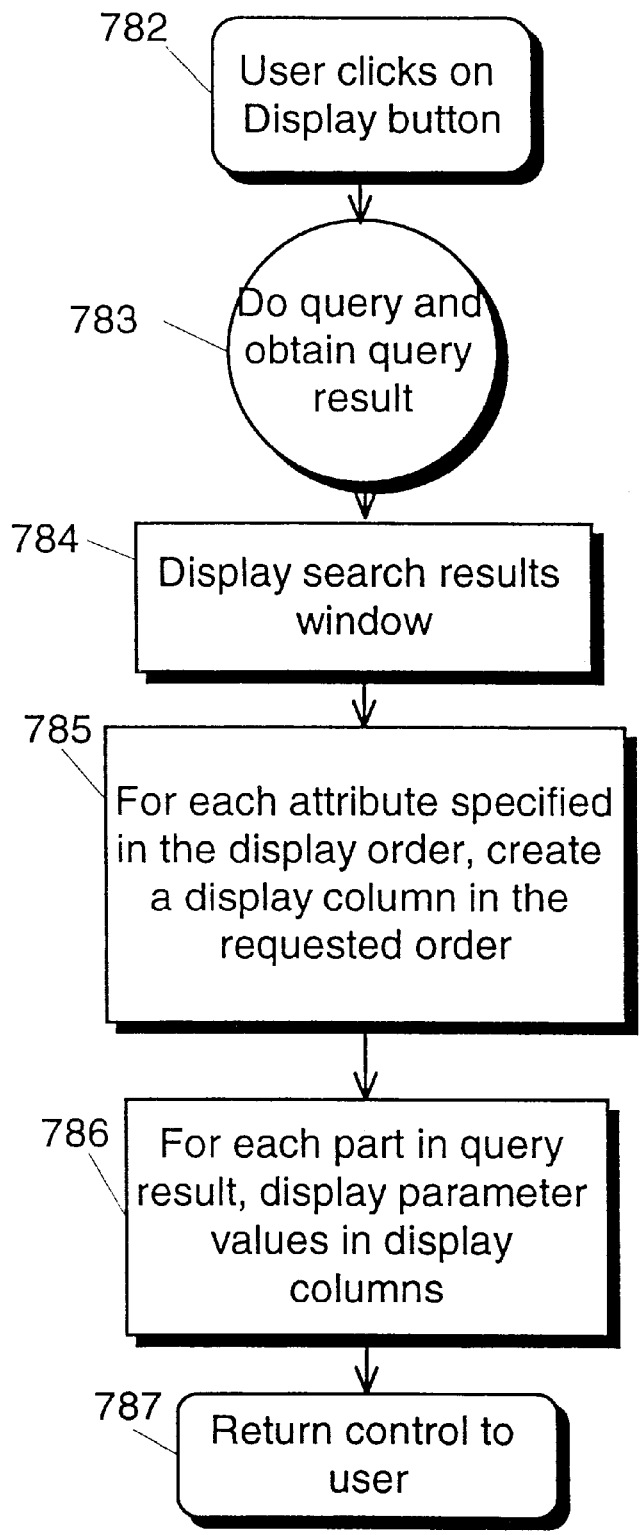
FIG. 42 is a flow chart depicting the application of a query count.

A procedure for requesting display of search results is depicted in FIG. 42. The procedure is initiated in step 782 when the user clicks on a display button 325. The procedure then moves to step 783 shown in FIG. 42. In this step, the system does a query and obtains the query result. After the query result is obtained, the procedure then moves to step 784 and displays a search results window.

Referring again to FIG. 42, the next step in the procedure is step 785. For each attribute specified, a display column is created. The procedure then moves to step 786, and for each part in the query result, the parameter values for the specified attributes are displayed in the respective display columns. Control is then returned to the user in step 787 and the executable content client 5121 waits for another command.

The above description is intended to set forth one or more presently preferred embodiments and examples of the present invention. The description is only intended to provide examples of embodiments employing the inventive concepts that are disclosed. Persons skilled in the art, after having the benefit of this disclosure, will appreciate that many modifications may be may to the particular embodiments and examples described herein without departing from the spirit or scope of the present invention. The present invention is not limited to the particular embodiments and examples described herein. The present invention is intended to be as broad as the claims appended hereto, when properly construed.

What is claimed is:

1. An apparatus for guided interactive queries of an object oriented knowledge base, comprising:
    a hypertext markup language browser capable of managing executable content, said browser being adapted to provide a virtual machine runtime environment for an executable content client application, said browser being coupled to a communications circuit capable of transmitting packets of digital information according to a network protocol;
    an executable content client application capable of running in the virtual machine runtime environment of the browser, said executable content client application having a remote procedure call mechanism written as executable content which is capable of running in the virtual machine runtime environment of the browser, said remote procedure call mechanism being capable of translating remote procedure calls into digital information that can be transmitted over said communications circuit by said browser;
    a data base management system server, said server being located at a remote location; and
    an interface mechanism, said interface mechanism being coupled to said communications circuit at the remote location, said interface mechanism being coupled to said data base management system server, said interface mechanism being capable of translating digital information received from said browser via said communications circuit into remote procedure calls to said data base management system server.

2. The apparatus according to claim 1, wherein:

said communications circuit is a wide area network.

3. The apparatus according to claim 1, wherein:

said executable content client application is downloadable over said communications circuit so that said executable content client application may be transferred over said communications circuit to a browser capable of managing executable content.

4. The apparatus according to claim 1, wherein:

said communications circuit is the Internet.

5. The apparatus according to claim 4, wherein:

said data base management system server comprises an object oriented knowledge base server.

6. The apparatus according to claim 5, further comprising:

an object oriented knowledge base associated with and accessible by said object oriented knowledge base server.

7. The apparatus according to claim 6, wherein:

when a user interacts with said browser and chooses to search a data base, said executable content client application is downloaded over said communications circuit so that said executable content client application runs in the virtual machine runtime environment of the browser, said executable content client application including a client database retrieval applet, said executable content client application including a graphical user interface to said client database retriever applet, whereby said user can interact through said graphical user interface to navigate a class hierarchy of said object oriented knowledge base associated with said object oriented knowledge base server.

8. The apparatus of claim 1 wherein said remote procedure call mechanism translates procedure calls into a format that is conforms to a document transfer protocol.

9. The apparatus of claim 8 wherein said protocol is the hypertext transfer protocol.

10. The apparatus of claim 8 wherein said mechanism encodes procedure calls into text characters.

11. A method for performing queries of a knowledge base from a remote site, comprising the steps of:

executing a client application within a browser that is running on a computer located at said remote site;

generating a remote procedure call within said client application;

encoding said remote procedure call into a request having a format which conforms with a document transfer protocol;

transmitting the encoded request to the site of a database management system via a communications network, in accordance with said protocol;

decoding the request, to reconstruct the procedure call;

executing a query within the database management system in accordance with said procedure call, to retrieve a result;

encoding said result in a format which conforms to said protocol;

transmitting the encoded result to the remote site via said communications network, in accordance with said protocol; and retrieving the encoded result within said client application and displaying the result.

12. The method of claim 11 wherein said protocol is the hypertext transfer protocol.

13. The method of claim 11 wherein said procedure calls are encoded into text characters.

14. The method of claim 11 further including the initial step of transferring the client application from the site of the database management system to the browser running at said remote site via said communications network.

15. The method of claim 11 wherein said database management system is an object-oriented database management system.

\* \* \* \* \*